United States Patent
Agee et al.

(10) Patent No.: US 7,149,238 B2
(45) Date of Patent: Dec. 12, 2006

(54) HIGHLY BANDWIDTH-EFFICIENT COMMUNICATIONS

(75) Inventors: Brian G. Agee, San Jose, CA (US); Matthew Bromberg, San Jose, CA (US); Derek Gerlach, Mountain View, CA (US); David Gibbons, Redmond, WA (US); James Timothy Golden, Carnation, WA (US); Minnie Ho, Palo Alto, CA (US); Elliott Hoole, Redmond, WA (US); Mary Jesse, Issaquah, WA (US); Robert Lee Maxwell, Duvall, WA (US); Robert G. Mechaley, Jr., Lexington, MA (US); Robert Ray Naish, San Jose, CA (US); David J. Nix, Issaquah, WA (US); David James Ryan, Seattle, CA (US); David Stephenson, San Jose, CA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

(21) Appl. No.: 11/409,437

(22) Filed: Apr. 21, 2006

(65) Prior Publication Data

US 2006/0193373 A1 Aug. 31, 2006

Related U.S. Application Data

(63) Continuation of application No. 09/920,903, filed on Aug. 3, 2001, which is a continuation of application No. 08/993,721, filed on Dec. 18, 1997, now Pat. No. 6,359,923, which is a continuation of application No. 08/804,619, filed on Feb. 24, 1997.

(51) Int. Cl.
*H04B 1/69* (2006.01)

(52) U.S. Cl. .............................. 375/141; 375/130
(58) Field of Classification Search ............. 375/141, 375/130, 143, 150, 267, 135, 136; 370/510, 370/206, 342, 337
See application file for complete search history.

(56) References Cited

U.S. PATENT DOCUMENTS 3,522,540 A 8/1970 Lee (Continued)

FOREIGN PATENT DOCUMENTS

CA 2278852 8/1998

(Continued)

OTHER PUBLICATIONS

"Multicarrier CDMA in indoor wireless radio networks," *Proc. PIMRC '93*, Yokohama, Japan, pp. 109-113, Sep. 1993.

(Continued)

*Primary Examiner*—Khai Tran
(74) *Attorney, Agent, or Firm*—Woodcock Washburn LLP

(57) ABSTRACT

A discrete multitone stacked-carrier spread spectrum communication method is based on frequency domain spreading including multiplication of a baseband signal by a set of superimposed, or stacked, complex sinusoid carrier waves. In a preferred embodiment, the spreading involves energizing the bins of a large Fast Fourier transform (FFT). This provides a considerable savings in computational complexity for moderate output FFT sizes. Point-to-multipoint and multipoint-to-multipoint (nodeless) network topologies are possible. A code-nulling method is included for interference cancellation and enhanced signal separation by exploiting the spectral diversity of the various sources. The basic method may be extended to include multielement antenna array nulling methods for interference cancellation and enhanced signal separation using spatial separation. Such methods permit directive and retrodirective transmission systems that adapt or can be adapted to the radio environment. Such systems are compatible with bandwidth-on-demand and higher-order modulation formats and use advanced adaptation algorithms. In a specific embodiment the spectral and spatial components of the adaptive weights are calculated in a unified operation based on the mathematical analogy between the spectral and spatial descriptions of the airlink.

20 Claims, 116 Drawing Sheets

U.S. PATENT DOCUMENTS

| | | | |
|---|---|---|---|
| 3,633,107 A | 1/1972 | Brady | |
| 3,745,464 A | 7/1973 | Lee | |
| 3,971,988 A | 7/1976 | Denenberg | |
| 4,249,181 A | 2/1981 | Lee | |
| 4,381,562 A | 4/1983 | Acampora | |
| 4,383,332 A | 5/1983 | Glance et al. | |
| 4,412,350 A | 10/1983 | Miedema | |
| 4,488,445 A | 12/1984 | Aske | |
| 4,495,648 A | 1/1985 | Giger | |
| 4,510,595 A | 4/1985 | Glance et al. | |
| 4,644,562 A | 2/1987 | Kavehrad et al. | |
| 4,723,321 A | 2/1988 | Saleh | |
| 4,726,040 A | 2/1988 | Acampora | |
| 4,789,983 A | 12/1988 | Acampora et al. | |
| 4,807,253 A | 2/1989 | Hagenauer et al. | |
| 4,827,499 A | 5/1989 | Warty et al. | |
| 4,835,517 A | 5/1989 | van der Gracht et al. | |
| 4,914,676 A | 4/1990 | Iwamatsu et al. | |
| 5,029,185 A | 7/1991 | Wei | |
| 5,048,057 A | 9/1991 | Saleh et al. | |
| 5,054,035 A | 10/1991 | Tarallo et al. | |
| 5,056,112 A | 10/1991 | Wei | |
| 5,084,869 A | 1/1992 | Russel | |
| 5,088,113 A | 2/1992 | Wei | |
| 5,136,612 A | 8/1992 | Bi | |
| 5,177,765 A | 1/1993 | Holland et al. | |
| 5,226,071 A | 7/1993 | Bolliger et al. | |
| 5,260,967 A | 11/1993 | Schilling | |
| 5,260,968 A | 11/1993 | Gardner et al. | |
| 5,274,384 A | 12/1993 | Hussain et al. | |
| 5,278,892 A | 1/1994 | Bolliger et al. | |
| 5,289,464 A | 2/1994 | Wang | |
| 5,291,475 A | 3/1994 | Bruckert | |
| 5,295,138 A | 3/1994 | Greenberg et al. | |
| 5,295,152 A | 3/1994 | Gudmundson et al. | |
| 5,302,914 A | 4/1994 | Arntz et al. | |
| 5,305,308 A | 4/1994 | English et al. | |
| 5,305,353 A | 4/1994 | Weerackody | |
| 5,319,634 A | 6/1994 | Bartholomew et al. | |
| 5,361,397 A | 11/1994 | Wright | |
| 5,363,375 A | 11/1994 | Chuang et al. | |
| 5,367,539 A | 11/1994 | Copley | |
| 5,394,435 A | 2/1995 | Weerackody | |
| 5,400,322 A | 3/1995 | Hunt et al. | |
| 5,410,538 A | 4/1995 | Roche et al. | |
| 5,410,740 A | 4/1995 | Hagstrom | |
| 5,414,699 A | 5/1995 | Lee | |
| 5,438,329 A | 8/1995 | Gastouniotis et al. | |
| 5,463,656 A | 10/1995 | Polivka et al. | |
| 5,481,570 A | 1/1996 | Winters | |
| 5,490,174 A | 2/1996 | Shin et al. | |
| 5,504,775 A | 4/1996 | Chouly et al. | |
| 5,509,015 A | 4/1996 | Tiedemann, Jr. et al. | |
| 5,515,378 A | 5/1996 | Roy, III et al. | |
| 5,541,954 A | 7/1996 | Emi | |
| 5,570,349 A | 10/1996 | Bustamante et al. | |
| 5,598,428 A | 1/1997 | Sato | |
| 5,613,211 A | 3/1997 | Matsuno | |
| 5,613,219 A | 3/1997 | Vogel et al. | |
| 5,654,955 A | 8/1997 | Natali | |
| 5,657,313 A | 8/1997 | Takahashi et al. | |
| 5,657,355 A | 8/1997 | Reusens | |
| 5,661,780 A | 8/1997 | Yamamoto et al. | |
| 5,689,502 A | 11/1997 | Scott | |
| 5,694,388 A | 12/1997 | Sawahashi et al. | |
| 5,732,068 A | 3/1998 | Takahashi et al. | |
| 5,732,113 A | 3/1998 | Schmidl et al. | |
| 5,734,647 A | 3/1998 | Yoshida et al. | |
| 5,745,860 A | 4/1998 | Kallin | |
| 5,752,168 A | 5/1998 | Monot et al. | |
| 5,752,202 A | 5/1998 | Obright | |
| 5,799,000 A | 8/1998 | Hoole | |
| 5,802,044 A | 9/1998 | Baum et al. | |
| 5,864,543 A | 1/1999 | Hoole | |
| 5,875,208 A | 2/1999 | Hoole | |
| 5,896,425 A | 4/1999 | Hirano et al. | |
| 5,907,577 A | 5/1999 | Hoole | |
| 5,914,981 A | 6/1999 | Veintimilla | |
| 5,923,700 A | 7/1999 | Zhang | |
| 5,924,034 A | 7/1999 | Dupuy | |
| 5,933,421 A * | 8/1999 | Alamouti et al. | 370/330 |
| 5,933,478 A | 8/1999 | Ozaki et al. | |
| 5,943,375 A | 8/1999 | Veintimilla | |
| 5,987,338 A | 11/1999 | Gibbons et al. | |
| 5,999,569 A | 12/1999 | Oshima | |
| 6,047,200 A | 4/2000 | Gibbons et al. | |
| 6,064,338 A | 5/2000 | Kobayakawa et al. | |
| 6,073,032 A | 6/2000 | Keskitalo et al. | |
| 6,081,566 A | 6/2000 | Molnar et al. | |
| 6,084,932 A | 7/2000 | Veintimilla | |
| 6,085,114 A | 7/2000 | Gibbons et al. | |
| 6,128,276 A | 10/2000 | Agee | |
| 6,131,016 A | 10/2000 | Greenstein et al. | |
| 6,160,839 A | 12/2000 | Zhang | |
| 6,175,555 B1 | 1/2001 | Hoole | |
| 6,198,719 B1 | 3/2001 | Faruque et al. | |
| 6,215,777 B1 | 4/2001 | Chen et al. | |
| 6,216,019 B1 | 4/2001 | Gibbons et al. | |
| 6,347,236 B1 | 2/2002 | Gibbons et al. | |
| 6,359,923 B1 | 3/2002 | Agee et al. | |
| 6,408,016 B1 | 6/2002 | Zhang | |
| 6,442,222 B1 | 8/2002 | Ghazi-Moghadam et al. | |
| 6,480,522 B1 | 11/2002 | Hoole et al. | |
| 6,480,526 B1 | 11/2002 | Shoki et al. | |
| 6,487,235 B1 | 11/2002 | Hoole | |
| 6,501,771 B1 * | 12/2002 | Hoole | 370/479 |
| 6,510,182 B1 | 1/2003 | Lee et al. | |
| 6,519,278 B1 | 2/2003 | Hiramatsu | |
| 6,560,209 B1 | 5/2003 | Alamouti et al. | |
| 6,584,144 B1 | 6/2003 | Alamouti et al. | |
| 6,600,776 B1 | 7/2003 | Alamouti et al. | |
| 6,621,851 B1 * | 9/2003 | Agee et al. | 375/130 |
| 6,782,039 B1 | 8/2004 | Alamouti et al. | |
| 2002/0034217 A1 | 3/2002 | Zhang | |
| 2003/0053488 A1 | 3/2003 | Hoole | |
| 2003/0156570 A1 | 8/2003 | Alamouti et al. | |

FOREIGN PATENT DOCUMENTS

| | | |
|---|---|---|
| EP | 0 490 509 B1 | 6/1992 |
| EP | 0 582 537 A | 2/1994 |
| EP | 0 637 181 B1 | 2/1995 |
| EP | 0 639 035 A1 | 2/1995 |
| EP | 0 641 096 A1 | 3/1995 |
| EP | 0 653 859 A1 | 5/1995 |
| EP | 0 653 973 B1 | 5/1995 |
| EP | 0 668 664 A | 8/1995 |
| EP | 0 685 973 A2 | 12/1995 |
| EP | 0 690 593 A2 | 1/1996 |
| EP | 0 696 856 A | 2/1996 |
| WO | 94/05094 A | 3/1994 |
| WO | 94/13077 A1 | 6/1994 |
| WO | 94/19877 A1 | 9/1994 |
| WO | 95/09512 A1 | 4/1995 |
| WO | 95/10144 A1 | 4/1995 |
| WO | 95/32595 A1 | 11/1995 |
| WO | 96/09731 A1 | 3/1996 |
| WO | 96/22662 A | 7/1996 |
| WO | 96/31009 A | 10/1996 |
| WO | 96/36136 A1 | 11/1996 |
| WO | 96/39001 A | 12/1996 |
| WO | 97/01256 A1 | 1/1997 |
| WO | 97/02665 A | 1/1997 |
| WO | 97/5709 A | 2/1997 |

| | | |
|---|---|---|
| WO | 98/35463 A2 | 8/1998 |
| WO | 98/87638 A3 | 8/1998 |

OTHER PUBLICATIONS

"Wireless personal Communications: Trends and Challenges", Rappaport, Woerner and Reed, editors,Kluwer Academic Publishers, 1994, pp. 69-80.

A. F. Naguib, et al. "Performance of CDMA cellular networks with base-station antenna arrays", in C.G. Gunther, ed. "*Mobile Communications-Advanced systems and components*", Springer-Verlag, pp. 87-100, Mar. 1994.

A. Sandhu, et al. "A Hopfield neurobeamformer for spread spectrum communications". *Sixth IEEE Int. Symposium on Personal Indoor and Mobile Radio Communications*, Sep. 1995.

B. Quach. et al. "Hopfield network approach to beamforming in spread spectrum communications". *IEEE Proc. Seventh SP Workshop on Statistical Signal and Array Processing*, pp. 409-412, Jun. 1994.

Chen et al., "Efficient frequency Assignments Scheme for Intermodulation Distortion Reduction in Fiber-Optic Microcellular Systems," Electronic Letters, Oct. 27, 1994, pp. 1831-1832, vol. 30, No. 22, IEEE. Stevenage, UK.

Chang, *Bell Sys. Tech. Jour.*, vol. 45, pp. 1775-1796, Dec. 1996.

Cimini, Jr. Leonard J., "Analysis and Simulation of a Digital Mobile Channel Using Orthogonal Frequency Division Multiplexing," Jul. 1985, IEEE Transactions on Communications, vol. Comm. 33, No. 7, pp. 665-675, IEEE, New York.

Davies et al., in A.T.R., vol. 22, No. 1, 1988.

Fazel, "Narrow-Band Interference Rejection in Orthogonal Multi-Carrier Spread Spectrum Communications", Record, 1994, Third Annual International Conference on Universal Personal Communications, IEEE, 1994, pp. 46-50.

G. Tsoulos, et al. "Adaptive Antennas for third generation DS-CDMA cellular systems", Proc. *IEEE VTC'95,w.45-49*, Aug. 1995.

Giner, V.C., "An Approximate Analysis of TDMA Out-of-Slot Random Access Protocols for Microcellular Mobile Communications," Int'l Journal of Wireless Information Networks, Jan. 1996, pp. 41-53, vol. 3, No. 1, XP002077581.

H. Iwai, et al. "An investigation of space-path hybrid diversity scheme for base station reception in CDMA mobile radio", *IEEE J.Sel.Areas, Comm.*, vol.SAC-12, pp. 962-969, Jun. 1994.

Jung, P. et al., "On Multicarrier CDMA Mobile Radio Systems with Joint Detection and Coherent Receiver Antenna Diversity, 1996, 5th IEEE International Conference on University Personal Communications," vol. 1, Sep. 1996, pp. 61-65, IEEE, New York.

K. Fazel. "Performance of CDMA/OFDM for Mobile Communication System". *2nd IEEE International Conference on Universal Personal Communications*. Otawa, Ontario, pp. 975-979, Oct. 12-15, 1993.

L. Vandendorpe. "Multitone Direct Sequence CDMA System in an Indoor Wireless Environment". *IEEE First Symposium on Communications and Vehicular Technology*, Benelux Delft Netherlands, pp. 4.1-1 to 4.1-8, Oct. 27-28-1993.

L. Vandendorpe. "Multitone Spread Spectrum Multiple Access Communications System in a Multipath Rician Fading Channel". *IEEE Transactions on Vehicular Technology*. vol. 44 No. 2, pp. 327-337, May 1995.

Litva et al., "Fundamentals of Digital Beamforming," Digital Beamforming in Wireless Communications, 1996 Artech House, Inc. Chapter 2, pp. 13-57.

N. Yee, Jean-Paul M.G. Linnarta, G. Fettweis, "*Multi-Carrier CDMA in Indoor Wireless Radio Networks*", *IEICE Transactions on Communications*, vol. E77-B, No. 7 pp. 900-904, Jul. 1994.

Ojanpera et al., "Frames-Hybrid Multiple Access Technology," IEEE 4[th]Int'l. Symposium on Spread Spectrum Techniques, Sep. 22-25, 1996, vol. 1, pp. 320-324.

Proc. Virginia Tech. Third Symposium on Wireless Personal Communications, Jun. 1993, pp. 15-1 to 15-12.

R. Kohno, et al. "A spatially and temporally optimal multi-user receiver using an array antenna for PS/CDMA". *Sixth IEEE Int. Symposium on Personal Indoor and Mobile Radio Communications*, Toronto, pp. 950-954, Sep. 1995.

Ramjee Prasad, "CDMA System Concepts," CDMA For Wireless Personal Communications, 1996 Artech House, Inc., Chapter 3, pp. 39-61.

Rappaport et al., editors, "Wireless Personal Communications: Trends and Challenges," 1994, Chapter 7, pp. 69-80, Kluwer Academic Publishers, Boston/Dordrecht/London.

Rohling, H. et al., "Performance of an OFDM-TDMA Mobile Communication System," 1996 IEEE 46[th]Vehicular Technology Conference 46, Apr. 28-May 1, 1996, vol. 3, No. 46, pp. 1589-1593, Atlanta, XP000595799.

Swales et al., IEEE Trans. Veh. Technol. vol. 39, No. 1, Feb. 1990.

Telecom Australia, Rev. Activities, 1985/1986, pp. 41-43.

Theodore S. Rappaport, "Multiple Access Techniques for Wireless Communications," Wireless Communication: Principles And Practice, 1996 Prentice Hall, Chapter 8, pp. 395-410.

V. Ghazi-Moghadam, et al., "Interference cancellation using adaptive antennas". *Sixth IEEE Int. Symposium on Personnal, Indoor and Mobile Radio Communications*, pp. 936-939, Sep. 1995.

Vandendorpe, L. et al., "Analysis of Residual Interference After MSE Linear Equalization of Multitone Spread Spectrum Signals," Communications-Gateway to Globalization, Proceedings of the Conference on Communications, Seattle, Jun. 18-22, 1995, vol. 3, pp. 1673-1677, XP000535041.

Vandendorpe, L. et al., "Performance Analysis of Linear Joint Multiple Access Interference Cancellation-Equalization for Asynchronous Multitone CDMA," IEEE, Sep. 25, 1995, pp. 537-541, XP000610292.

Weinstein and Ebert, IEEE Trans. on Comm. Tech., vol. com-19, No. 5, Oct. 1971, p. 628.

Y. Wane et al.. "Adantive antenna arravs for cellular CDMA *communication systems*", Proc. *IEEE Intl. Conf. Acoustics, Speech and Signal Processing*, Detroit, pp. 1725-1725, 1995.

\* cited by examiner

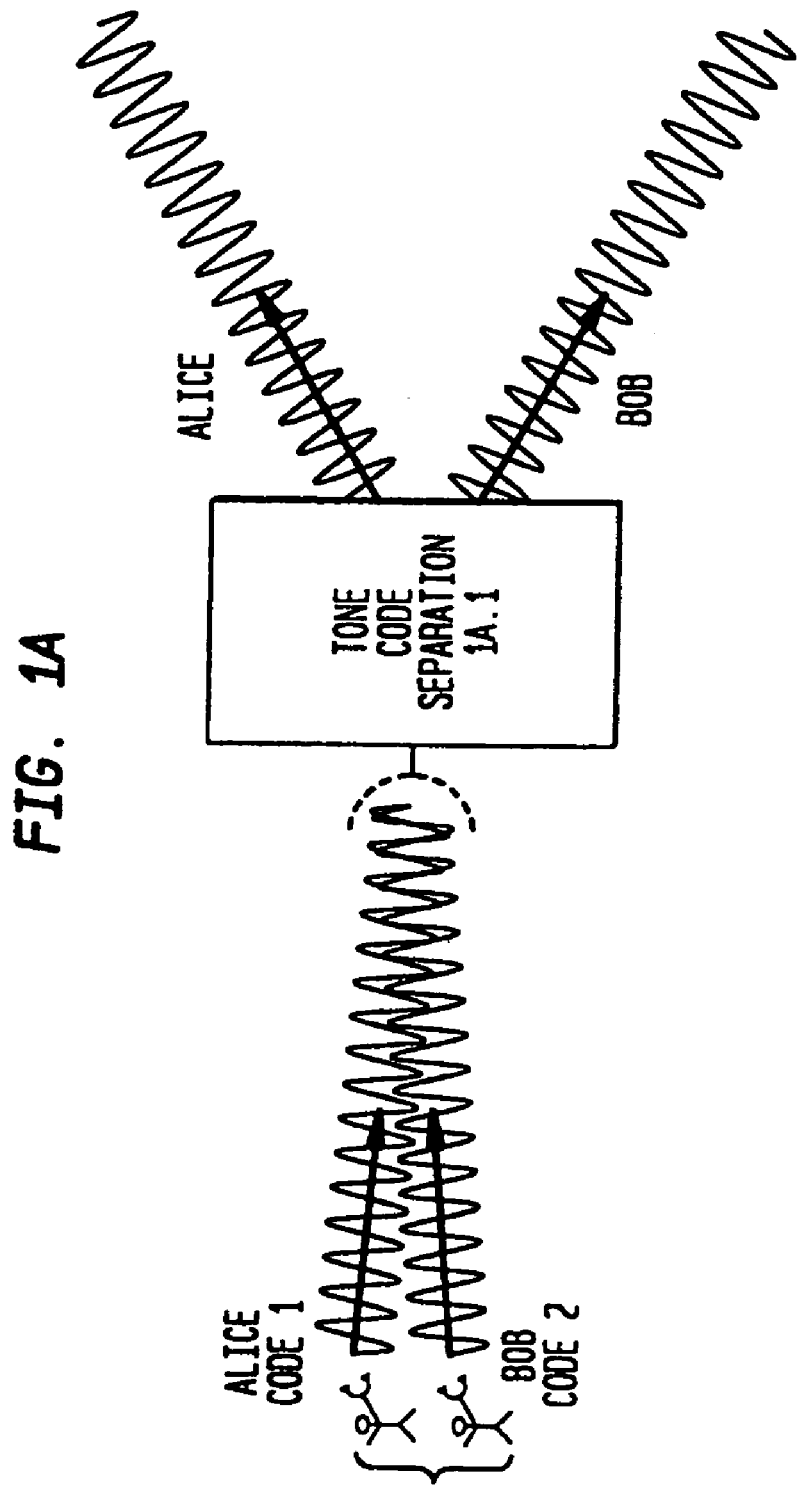

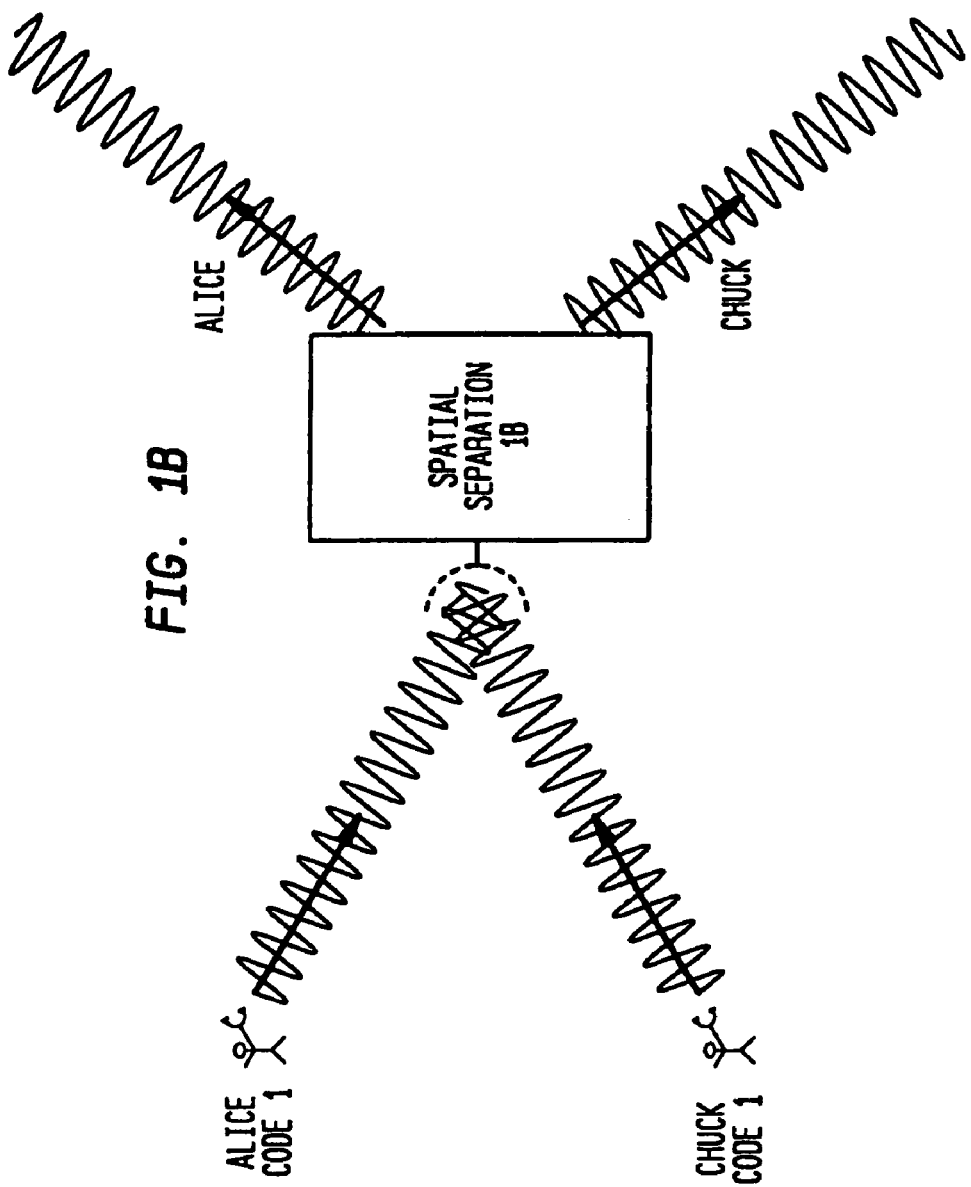

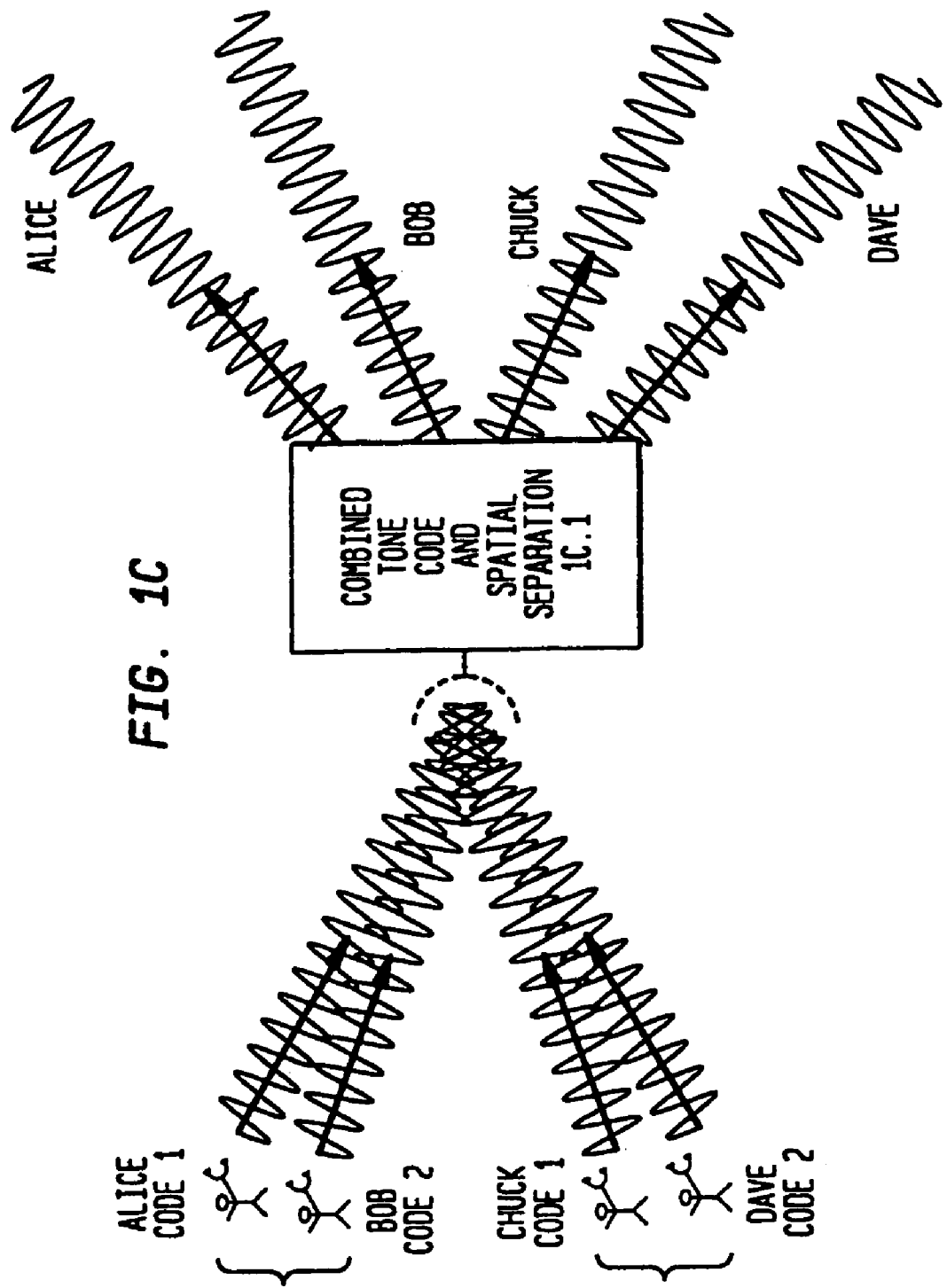

FIG. 18

| BASE FREQUENCY | LOWER RF BAND | UPPER RF BAND |
|---|---|---|
| 1850 MHz | 1850-1855 MHz | 1930-1935 MHz |
| 1855 MHz | 1855-1860 MHz | 1935-1940 MHz |
| 1860 MHz | 1860-1865 MHz | 1940-1945 MHz |
| 1865 MHz | 1865-1870 MHz | 1945-1950 MHz |
| 1870 MHz | 1870-1875 MHz | 1950-1955 MHz |
| 1875 MHz | 1875-1880 MHz | 1955-1960 MHz |
| 1880 MHz | 1880-1885 MHz | 1960-1965 MHz |
| 1885 MHz | 1885-1890 MHz | 1965-1970 MHz |
| 1890 MHz | 1890-1895 MHz | 1970-1975 MHz |
| 1895 MHz | 1895-1900 MHz | 1975-1980 MHz |
| 1900 MHz | 1900-1905 MHz | 1980-1985 MHz |
| 1905 MHz | 1905-1910 MHz | 1985-1990 MHz |

| SUBBAND PAIR DESIGNATION | | TONES |
|---|---|---|
| SUBBAND PAIR 0 | 0 A | $\{T_0, T_1, \ldots, T_{319}\}$ |
| | 0 B | $\{T_{1280}, T_{1281}, \ldots, T_{1599}\}$ |
| SUBBAND PAIR 1 | 1 A | $\{T_{320}, T_{321}, \ldots, T_{639}\}$ |
| | 1 B | $\{T_{1600}, T_{1601}, \ldots, T_{1919}\}$ |
| SUBBAND PAIR 2 | 2 A | $\{T_{640}, T_{641}, \ldots, T_{959}\}$ |
| | 2 B | $\{T_{1920}, T_{1921}, \ldots, T_{2239}\}$ |
| SUBBAND PAIR 3 | 3 A | $\{T_{960}, T_{961}, \ldots, T_{1279}\}$ |
| | 3 B | $\{T_{2240}, T_{2241}, \ldots, T_{2559}\}$ |

FIG. 22

| TONE INDEX | TONE | TONE INDEX | TONE | TONE INDEX | TONE | TONE INDEX | TONE |
|---|---|---|---|---|---|---|---|
| $P_i(0)$ | $T_{20i+1}$ | $P_i(18)$ | $T_{20i+161}$ | $P_i(36)$ | $T_{20i+1281}$ | $P_i(54)$ | $T_{20i+1441}$ |
| $P_i(1)$ | $T_{20i+2}$ | $P_i(19)$ | $T_{20i+162}$ | $P_i(37)$ | $T_{20i+1282}$ | $P_i(55)$ | $T_{20i+1442}$ |
| $P_i(2)$ | $T_{20i+3}$ | $P_i(20)$ | $T_{20i+163}$ | $P_i(38)$ | $T_{20i+1283}$ | $P_i(56)$ | $T_{20i+1443}$ |
| $P_i(3)$ | $T_{20i+4}$ | $P_i(21)$ | $T_{20i+164}$ | $P_i(39)$ | $T_{20i+1284}$ | $P_i(57)$ | $T_{20i+1444}$ |
| $P_i(4)$ | $T_{20i+5}$ | $P_i(22)$ | $T_{20i+165}$ | $P_i(40)$ | $T_{20i+1285}$ | $P_i(58)$ | $T_{20i+1445}$ |
| $P_i(5)$ | $T_{20i+6}$ | $P_i(23)$ | $T_{20i+166}$ | $P_i(41)$ | $T_{20i+1286}$ | $P_i(59)$ | $T_{20i+1446}$ |
| $P_i(6)$ | $T_{20i+7}$ | $P_i(24)$ | $T_{20i+167}$ | $P_i(42)$ | $T_{20i+1287}$ | $P_i(60)$ | $T_{20i+1447}$ |
| $P_i(7)$ | $T_{20i+8}$ | $P_i(25)$ | $T_{20i+168}$ | $P_i(43)$ | $T_{20i+1288}$ | $P_i(61)$ | $T_{20i+1448}$ |
| $P_i(8)$ | $T_{20i+9}$ | $P_i(26)$ | $T_{20i+169}$ | $P_i(44)$ | $T_{20i+1289}$ | $P_i(62)$ | $T_{20i+1449}$ |
| $P_i(9)$ | $T_{20i+11}$ | $P_i(27)$ | $T_{20i+171}$ | $P_i(45)$ | $T_{20i+1291}$ | $P_i(63)$ | $T_{20i+1451}$ |
| $P_i(10)$ | $T_{20i+12}$ | $P_i(28)$ | $T_{20i+172}$ | $P_i(46)$ | $T_{20i+1292}$ | $P_i(64)$ | $T_{20i+1452}$ |
| $P_i(11)$ | $T_{20i+13}$ | $P_i(29)$ | $T_{20i+173}$ | $P_i(47)$ | $T_{20i+1293}$ | $P_i(65)$ | $T_{20i+1453}$ |
| $P_i(12)$ | $T_{20i+14}$ | $P_i(30)$ | $T_{20i+174}$ | $P_i(48)$ | $T_{20i+1294}$ | $P_i(66)$ | $T_{20i+1454}$ |
| $P_i(13)$ | $T_{20i+15}$ | $P_i(31)$ | $T_{20i+175}$ | $P_i(49)$ | $T_{20i+1295}$ | $P_i(67)$ | $T_{20i+1455}$ |
| $P_i(14)$ | $T_{20i+16}$ | $P_i(32)$ | $T_{20i+176}$ | $P_i(50)$ | $T_{20i+1296}$ | $P_i(68)$ | $T_{20i+1456}$ |
| $P_i(15)$ | $T_{20i+17}$ | $P_i(33)$ | $T_{20i+177}$ | $P_i(51)$ | $T_{20i+1297}$ | $P_i(69)$ | $T_{20i+1457}$ |
| $P_i(16)$ | $T_{20i+18}$ | $P_i(34)$ | $T_{20i+178}$ | $P_i(52)$ | $T_{20i+1298}$ | $P_i(70)$ | $T_{20i+1458}$ |
| $P_i(17)$ | $T_{20i+19}$ | $P_i(35)$ | $T_{20i+179}$ | $P_i(53)$ | $T_{20i+1299}$ | $P_i(71)$ | $T_{20i+1459}$ |

FIG. 23

| TONES ALLOCATED TO CLC/CAC IN SUBBAND PAIR i ($CLC_i/CAC_{i,0}$) | | | | | | | |
|---|---|---|---|---|---|---|---|
| INDEX | TONE | INDEX | TONE | INDEX | TONE | INDEX | TONE |
| 0 | $T_{320i}$ | 1 | $T_{320i+20}$ | 2 | $T_{320i+40}$ | 3 | $T_{320i+60}$ |
| 4 | $T_{320i+160}$ | 5 | $T_{320i+180}$ | 6 | $T_{320i+200}$ | 7 | $T_{320i+220}$ |
| 8 | $T_{320i+1280}$ | 9 | $T_{320i+1300}$ | 10 | $T_{320i+1320}$ | 11 | $T_{320i+1340}$ |
| 12 | $T_{320i+1440}$ | 13 | $T_{320i+1460}$ | 14 | $T_{320i+1480}$ | 15 | $T_{320i+1500}$ |
| TONES ALLOCATED TO BRC/CAC IN SUBBAND PAIR i ($BRC_i/CAC_{i,9}$) | | | | | | | |
| INDEX | TONE | INDEX | TONE | INDEX | TONE | INDEX | TONE |
| 0 | $T_{320i+90}$ | 1 | $T_{320i+110}$ | 2 | $T_{320i+130}$ | 3 | $T_{320i+150}$ |
| 4 | $T_{320i+250}$ | 5 | $T_{320i+270}$ | 6 | $T_{320i+290}$ | 7 | $T_{320i+310}$ |
| 8 | $T_{320i+1370}$ | 9 | $T_{320i+1390}$ | 10 | $T_{320i+1410}$ | 11 | $T_{320i+1430}$ |
| 12 | $T_{320i+1530}$ | 13 | $T_{320i+1550}$ | 14 | $T_{320i+1570}$ | 15 | $T_{320i+1590}$ |
| TONES ALLOCATED TO RSC/DCC IN SUBBAND PAIR i ($RSC_i/DCC_i$) | | | | | | | |
| INDEX | TONE | INDEX | TONE | INDEX | TONE | INDEX | TONE |
| 0 | $T_{320i+10}$ | 1 | $T_{320i+20}$ | 2 | $T_{320i+50}$ | 3 | $T_{320i+70}$ |
| 4 | $T_{320i+80}$ | 5 | $T_{320i+100}$ | 6 | $T_{320i+120}$ | 7 | $T_{320i+140}$ |
| 8 | $T_{320i+170}$ | 9 | $T_{320i+190}$ | 10 | $T_{320i+210}$ | 11 | $T_{320i+230}$ |
| 12 | $T_{320i+240}$ | 13 | $T_{320i+260}$ | 14 | $T_{320i+280}$ | 15 | $T_{320i+300}$ |
| 16 | $T_{320i+1290}$ | 17 | $T_{320i+1310}$ | 18 | $T_{320i+1330}$ | 19 | $T_{320i+1350}$ |
| 20 | $T_{320i+1360}$ | 21 | $T_{320i+1380}$ | 22 | $T_{320i+1400}$ | 23 | $T_{320i+1420}$ |
| 24 | $T_{320i+1450}$ | 25 | $T_{320i+1470}$ | 26 | $T_{320i+1490}$ | 27 | $T_{320i+1510}$ |
| 28 | $T_{320i+1520}$ | 29 | $T_{320i+1540}$ | 30 | $T_{320i+1560}$ | 31 | $T_{320i+1580}$ |

| TDD PARAMETER | VALUE (μs) |
|---|---|
| $T_{forward}$ | 1610 |
| $T_{reverse}$ | 1390 |
| $T_{f\_guard}$ | 255 |
| $T_{r\_guard}$ | 35 |
| $T_{revisit}$ | 3000 |
| $T_{burst}$ | 320 |
| $T_{b\_guard}$ | 25 |

*FIG. 41*

| OUTPUT SYMBOL | OUTPUT BITS | | | | SIGNAL MAPPING (16QAM) | | SIGNAL MAPPING (16PSK) | |
|---|---|---|---|---|---|---|---|---|
| | $y_3$ | $y_2$ | $y_1$ | $y_0$ | IN PHASE | QUADRATURE | IN PHASE | QUADRATURE |
| 0 | 0 | 0 | 0 | 0 | $-3/\sqrt{10}$ | $3/\sqrt{10}$ | 1.0 | 0.0 |
| 1 | 0 | 0 | 0 | 1 | $3/\sqrt{10}$ | $3/\sqrt{10}$ | 0.924 | 0.383 |
| 2 | 0 | 0 | 1 | 0 | $-3/\sqrt{10}$ | $-3/\sqrt{10}$ | 0.707 | 0.707 |
| 3 | 0 | 0 | 1 | 1 | $3/\sqrt{10}$ | $-3/\sqrt{10}$ | 0.383 | 0.924 |
| 4 | 0 | 1 | 0 | 0 | $-3/\sqrt{10}$ | $-1/\sqrt{10}$ | 0 | 1 |
| 5 | 0 | 1 | 0 | 1 | $-1/\sqrt{10}$ | $3/\sqrt{10}$ | -0.383 | 0.924 |
| 6 | 0 | 1 | 1 | 0 | $1/\sqrt{10}$ | $-3/\sqrt{10}$ | -0.707 | 0.707 |
| 7 | 0 | 1 | 1 | 1 | $3/\sqrt{10}$ | $1/\sqrt{10}$ | -0.924 | 0.383 |
| 8 | 1 | 0 | 0 | 0 | $1/\sqrt{10}$ | $3/\sqrt{10}$ | -1.0 | 0.0 |
| 9 | 1 | 0 | 0 | 1 | $3/\sqrt{10}$ | $-1/\sqrt{10}$ | -0.924 | -0.383 |
| 10 | 1 | 0 | 1 | 0 | $-3/\sqrt{10}$ | $1/\sqrt{10}$ | -0.707 | -0.707 |
| 11 | 1 | 0 | 1 | 1 | $-1/\sqrt{10}$ | $-3/\sqrt{10}$ | -0.383 | -0.924 |
| 12 | 1 | 1 | 0 | 0 | $1/\sqrt{10}$ | $-1/\sqrt{10}$ | 0 | -1 |
| 13 | 1 | 1 | 0 | 1 | $-1/\sqrt{10}$ | $-1/\sqrt{10}$ | 0.383 | -0.924 |
| 14 | 1 | 1 | 1 | 0 | $1/\sqrt{10}$ | $1/\sqrt{10}$ | 0.707 | -0.707 |
| 15 | 1 | 1 | 1 | 1 | $-1/\sqrt{10}$ | $1/\sqrt{10}$ | 0.924 | -0.383 |

| OUTPUT SYMBOL | OUTPUT BITS | | | SIGNAL MAPPING (8QAM) | | SIGNAL MAPPING (8PSK) | |
|---|---|---|---|---|---|---|---|
| | $y_2$ | $y_1$ | $y_0$ | IN PHASE | QUADRATURE | IN PHASE | QUADRATURE |
| 0 | 0 | 0 | 0 | 1.21 | 0 | 1 | 0 |
| 1 | 0 | 0 | 1 | 0 | -1.21 | $1/\sqrt{2}$ | $1/\sqrt{2}$ |
| 2 | 0 | 1 | 0 | -1.21 | 0 | 0 | 1 |
| 3 | 0 | 1 | 1 | 0 | 1.21 | $-1/\sqrt{2}$ | $1/\sqrt{2}$ |
| 4 | 1 | 0 | 0 | -0.518 | 0.518 | -1 | 0 |
| 5 | 1 | 0 | 1 | 0.518 | 0.518 | $-1/\sqrt{2}$ | $-1/\sqrt{2}$ |
| 6 | 1 | 1 | 0 | -0.518 | -0.518 | 0 | -1 |
| 7 | 1 | 1 | 1 | -0.518 | -0.518 | $1/\sqrt{2}$ | $-1/\sqrt{2}$ |

FIG. 48

| OUTPUT SYMBOL | OUTPUT BITS | | SIGNAL MAPPING | |
|---|---|---|---|---|
| | $y_1$ | $y_0$ | IN PHASE | QUADRATURE |
| 0 | 0 | 0 | 1 | 0 |
| 1 | 0 | 1 | 0 | 1 |
| 2 | 1 | 0 | -1 | 0 |
| 3 | 1 | 1 | 0 | -1 |

FIG. 49

$w_0$ → (ANTENNA ELEMENT 0, TONE 0)
$w_1$ → (ANTENNA ELEMENT 0, TONE 1)
$w_2$ → (ANTENNA ELEMENT 0, TONE 2)
$w_3$ → (ANTENNA ELEMENT 0, TONE 3)
$w_4$ → (ANTENNA ELEMENT 1, TONE 0)
$w_5$ → (ANTENNA ELEMENT 1, TONE 1)
$w_6$ → (ANTENNA ELEMENT 1, TONE 2)
$w_7$ → (ANTENNA ELEMENT 1, TONE 3)

⋮

$w_{28}$ → (ANTENNA ELEMENT 7, TONE 0)
$w_{29}$ → (ANTENNA ELEMENT 7, TONE 1)
$w_{30}$ → (ANTENNA ELEMENT 7, TONE 2)
$w_{31}$ → (ANTENNA ELEMENT 7, TONE 3)

| SYMBOL | SIGNAL MAPPING (16QAM) | |
| --- | --- | --- |
| | IN PHASE | QUADRATURE |
| 0 | 1 | 0 |
| 1 | 0 | 1 |
| 2 | 0 | -1 |
| 3 | -1 | 0 |

FIG. 52

| ANTENNA | BURST NUMBER | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | $D_0$ | $D_1$ | $D_2$ | $D_3$ | $D_4$ | $D_5$ | $D_6$ | $D_7$ | $D'_7$ | $D'_6$ | $D'_5$ | $D'_4$ | $D'_3$ | $D'_2$ | $D'_1$ | $D'_0$ |
| 1 | $D_8$ | $D_9$ | $D_{10}$ | $D_{11}$ | $D_{12}$ | $D_{13}$ | $D_{14}$ | $D_{15}$ | $D'_{15}$ | $D'_{14}$ | $D'_{13}$ | $D'_{12}$ | $D'_{11}$ | $D'_{10}$ | $D'_9$ | $D'_8$ |
| 2 | $D_{16}$ | $D_{17}$ | $D_{18}$ | $D_{19}$ | $D_{20}$ | $D_{21}$ | $D_{22}$ | $D_{23}$ | $D'_{23}$ | $D'_{22}$ | $D'_{21}$ | $D'_{20}$ | $D'_{19}$ | $D'_{18}$ | $D'_{17}$ | $D'_{16}$ |
| 3 | $D_{24}$ | $D_{25}$ | $D_{26}$ | $D_{27}$ | $D_{28}$ | $D_{29}$ | $D_{30}$ | $D_{31}$ | $D'_{31}$ | $D'_{30}$ | $D'_{29}$ | $D'_{28}$ | $D'_{27}$ | $D'_{26}$ | $D'_{25}$ | $D'_{24}$ |
| 4 | $D_{32}$ | $D_{33}$ | $D_{34}$ | $D_{35}$ | $D_{36}$ | $D_{37}$ | $D_{38}$ | $D_{39}$ | $D'_{39}$ | $D'_{38}$ | $D'_{37}$ | $D'_{36}$ | $D'_{35}$ | $D'_{34}$ | $D'_{33}$ | $D'_{32}$ |
| 5 | $D_{40}$ | $D_{41}$ | $D_{42}$ | $D_{43}$ | $D_{44}$ | $D_{45}$ | $D_{46}$ | $D_{47}$ | $D'_{47}$ | $D'_{46}$ | $D'_{45}$ | $D'_{44}$ | $D'_{43}$ | $D'_{42}$ | $D'_{41}$ | $D'_{40}$ |
| 6 | $D_{48}$ | $D_{49}$ | $D_{50}$ | $D_{51}$ | $D_{52}$ | $D_{53}$ | $D_{54}$ | $D_{55}$ | $D'_{55}$ | $D'_{54}$ | $D'_{53}$ | $D'_{52}$ | $D'_{51}$ | $D'_{50}$ | $D'_{49}$ | $D'_{48}$ |
| 7 | $D_{56}$ | $D_{57}$ | $D_{58}$ | $D_{59}$ | $D_{60}$ | $D_{61}$ | $D_{62}$ | $D_{63}$ | $D'_{63}$ | $D'_{62}$ | $D'_{61}$ | $D'_{60}$ | $D'_{59}$ | $D'_{58}$ | $D'_{57}$ | $D'_{56}$ |

FIG. 53

| ROW NUMBER | COLUMN NUMBER | | | |
|---|---|---|---|---|
| | 0 | 1 | 2 | 3 |
| 0 | $CLC_i(0)$[a] | $CLC_i(4)$ | $CLC_i(8)$ | $CLC_i(12)$ |
| 1 | $CLC_i(1)$ | $CLC_i(5)$ | $CLC_i(9)$ | $CLC_i(13)$ |
| 2 | $CLC_i(2)$ | $CLC_i(6)$ | $CLC_i(10)$ | $CLC_i(14)$ |
| 3 | $CLC_i(3)$ | $CLC_i(7)$ | $CLC_i(11)$ | $CLC_i(15)$ | a. i IS THE SUBBAND PAIR INDEX (0,1,2, OR 3)

FIG. 55

| | | COLUMN NUMBER | | | |
|---|---|---|---|---|---|
| | | 0 | 1 | 2 | 3 |
| ROW NUMBER | 0 | $BRC_i(0)^a$ | $BRC_i(4)$ | $BRC_i(8)$ | $BRC_i(12)$ |
| | 1 | $BRC_i(1)$ | $BRC_i(5)$ | $BRC_i(9)$ | $BRC_i(13)$ |
| | 2 | $BRC_i(2)$ | $BRC_i(6)$ | $BRC_i(10)$ | $BRC_i(14)$ |
| | 3 | $BRC_i(3)$ | $BRC_i(7)$ | $BRC_i(11)$ | $BRC_i(15)$ | a. i IS THE SUBBAND PAIR INDEX (0,1,2, OR 3). FOR THE BROADCAST CHANNEL ALL THE SUBBAND PAIRS WILL BE ACTIVE AT THE SAME TIME.

$w_0$ ⟶ (TONE 0)
$w_1$ ⟶ (TONE 1)
$w_2$ ⟶ (TONE 2)
$w_3$ ⟶ (TONE 3)

FIG. 65A

| BIT | SIGNAL MAPPING | |
|---|---|---|
| | IN PHASE | QUADRATURE |
| 0 | 1 | 0 |
| 1 | -1 | 0 |

FIG. 66

| MATRIX | BURST NUMBER | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| | $D_0$ | $D_1$ | $D_2$ | $D_3$ | $D_4$ | $D_5$ | $D_6$ | $D'_6$ | $D'_5$ | $D'_4$ | $D'_3$ | $D'_2$ | $D'_1$ | $D'_0$ |

FIG. 67

| | | COLUMN NUMBER | |
|---|---|---|---|
| | | 0 | 1 |
| ROW NUMBER | 0 | $CAC_{ij}(0)$[a] | $CAC_{ij}(8)$ |
| | 1 | $CAC_{ij}(1)$ | $CAC_{ij}(9)$ |
| | 2 | $CAC_{ij}(2)$ | $CAC_{ij}(10)$ |
| | 3 | $CAC_{ij}(3)$ | $CAC_{ij}(11)$ |
| | 4 | $CAC_{ij}(4)$ | $CAC_{ij}(12)$ |
| | 5 | $CAC_{ij}(5)$ | $CAC_{ij}(13)$ |
| | 6 | $CAC_{ij}(6)$ | $CAC_{ij}(14)$ |
| | 7 | $CAC_{ij}(7)$ | $CAC_{ij}(15)$ | a. i IS THE SUBBAND PAIR INDEX (0,1,2,OR 3) AND j IS THE CAC ID (0 OR 1)

FIG. 69

| | | | BIN NUMBER | | |
|---|---|---|---|---|---|
| | | | BIN 0 TO BIN 95 | BIN 96 TO BIN 415 | BIN 416 TO BIN 511 |
| DFT PAIR | 0 | LOWER | UNUSED | $T_0$ TO $T_{319}$ | UNUSED |
| | | UPPER | | $T_{1280}$ TO $T_{1599}$ | |
| | 1 | LOWER | | $T_{320}$ TO $T_{639}$ | |
| | | UPPER | | $T_{1600}$ TO $T_{1919}$ | |
| | 2 | LOWER | | $T_{640}$ TO $T_{959}$ | |
| | | UPPER | | $T_{1920}$ TO $T_{2239}$ | |
| | 3 | LOWER | | $T_{960}$ TO $T_{1279}$ | |
| | | UPPER | | $T_{2240}$ TO $T_{2559}$ | |

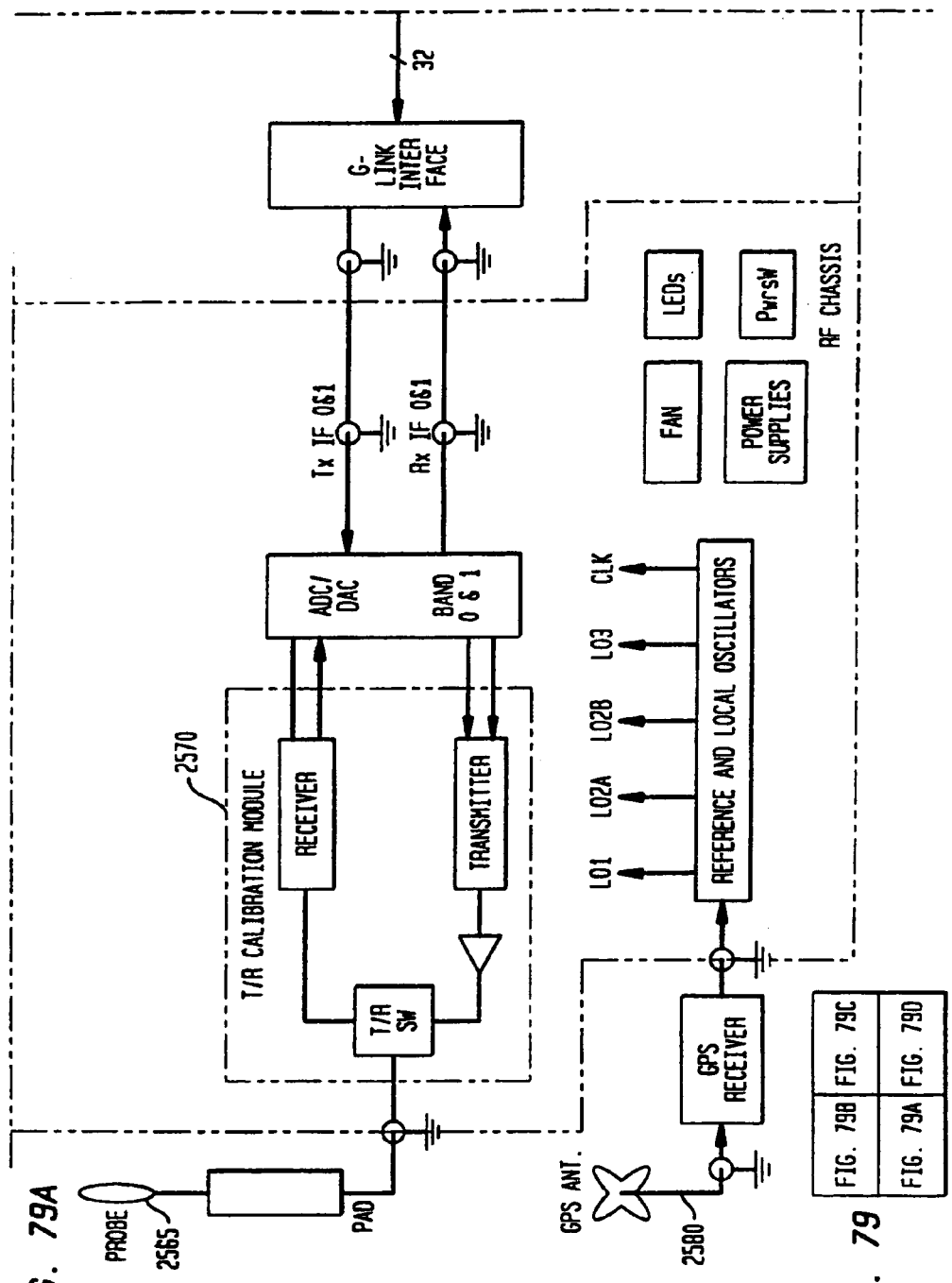

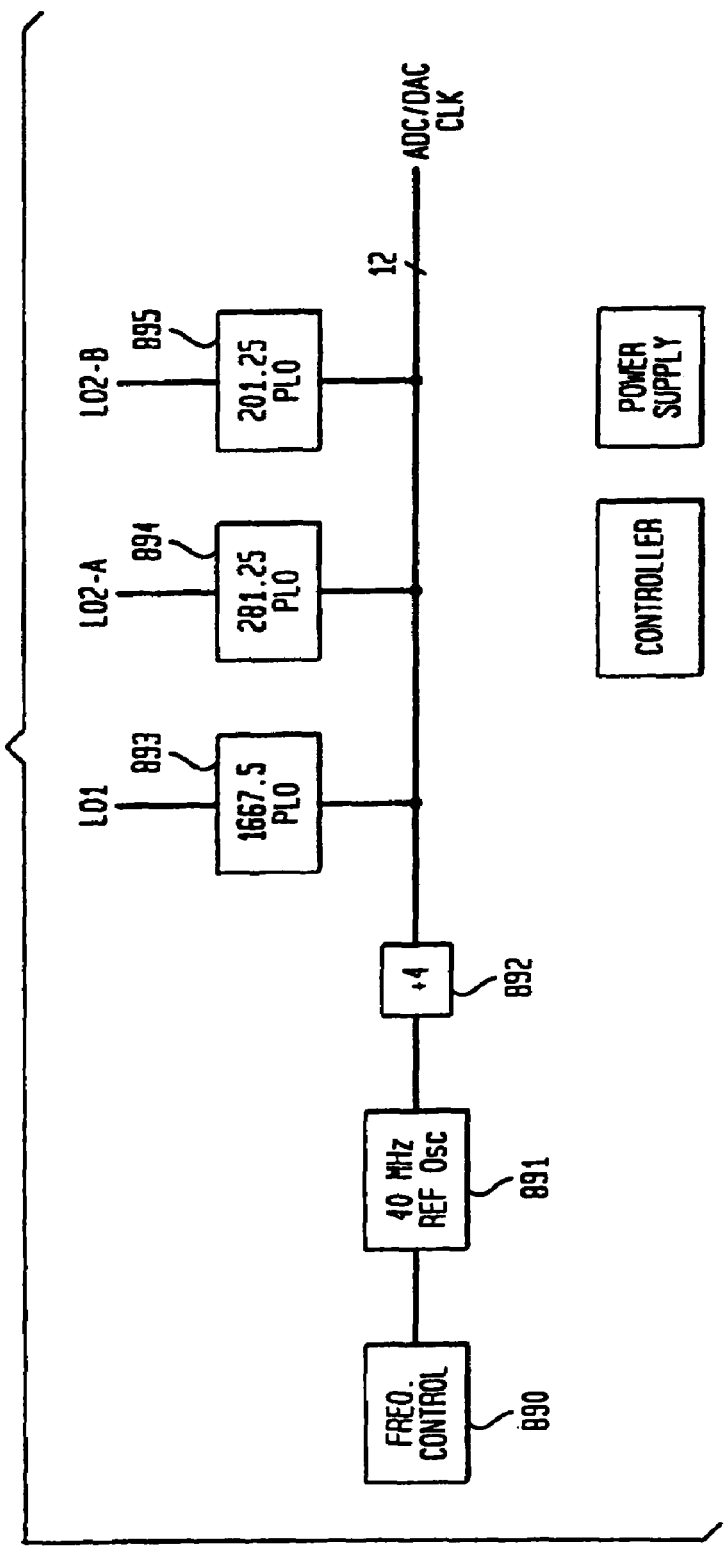

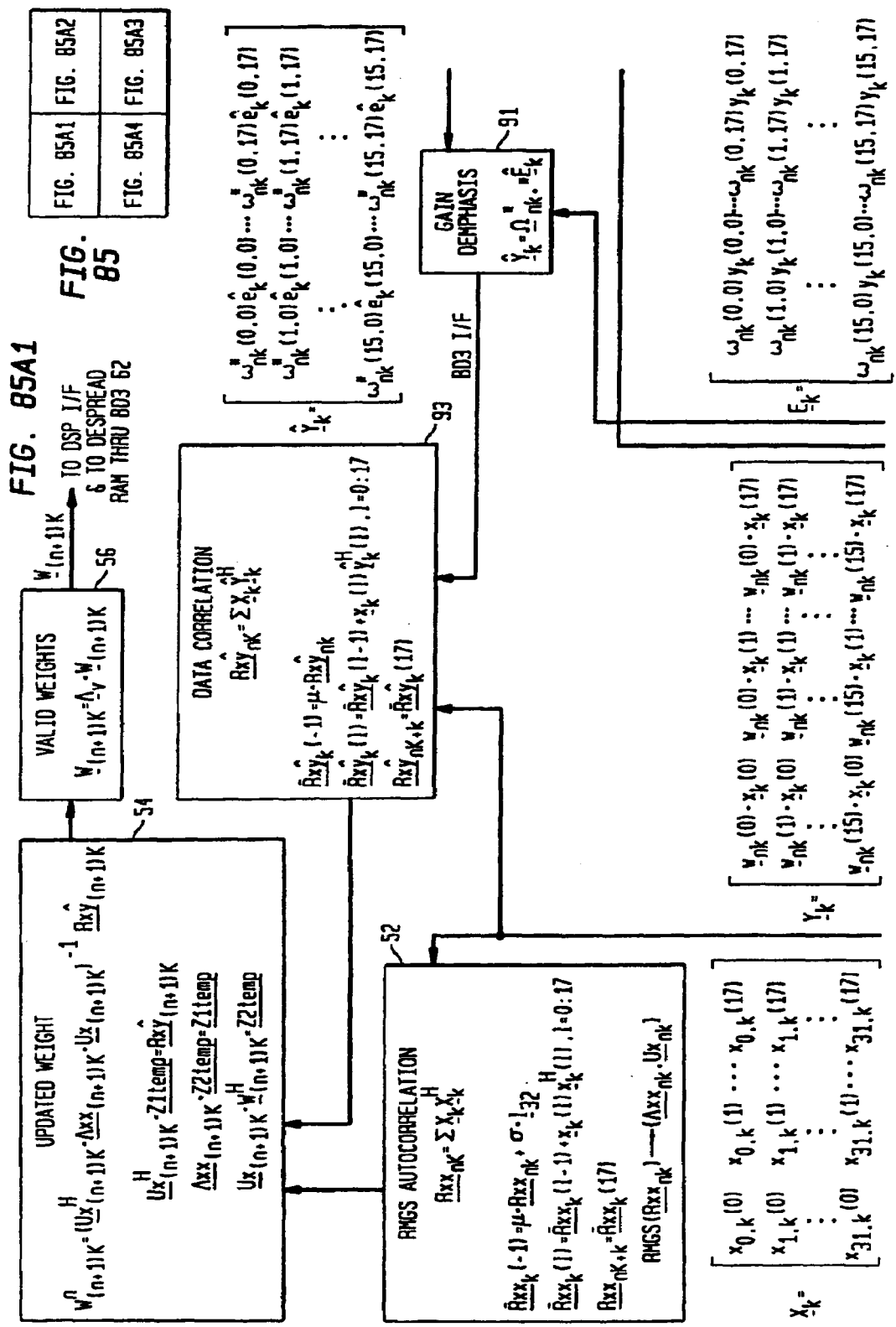

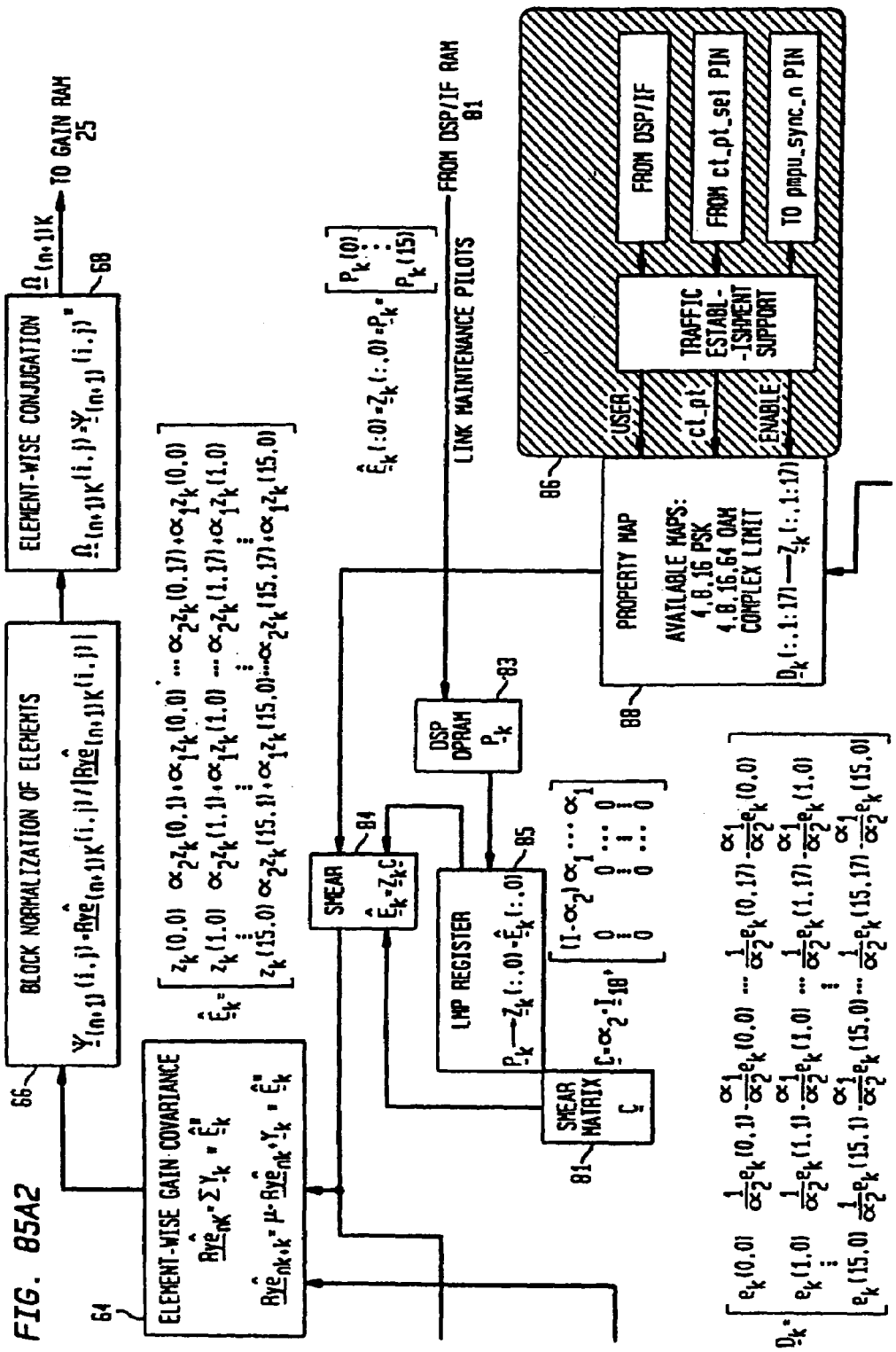
FIG. 85A2

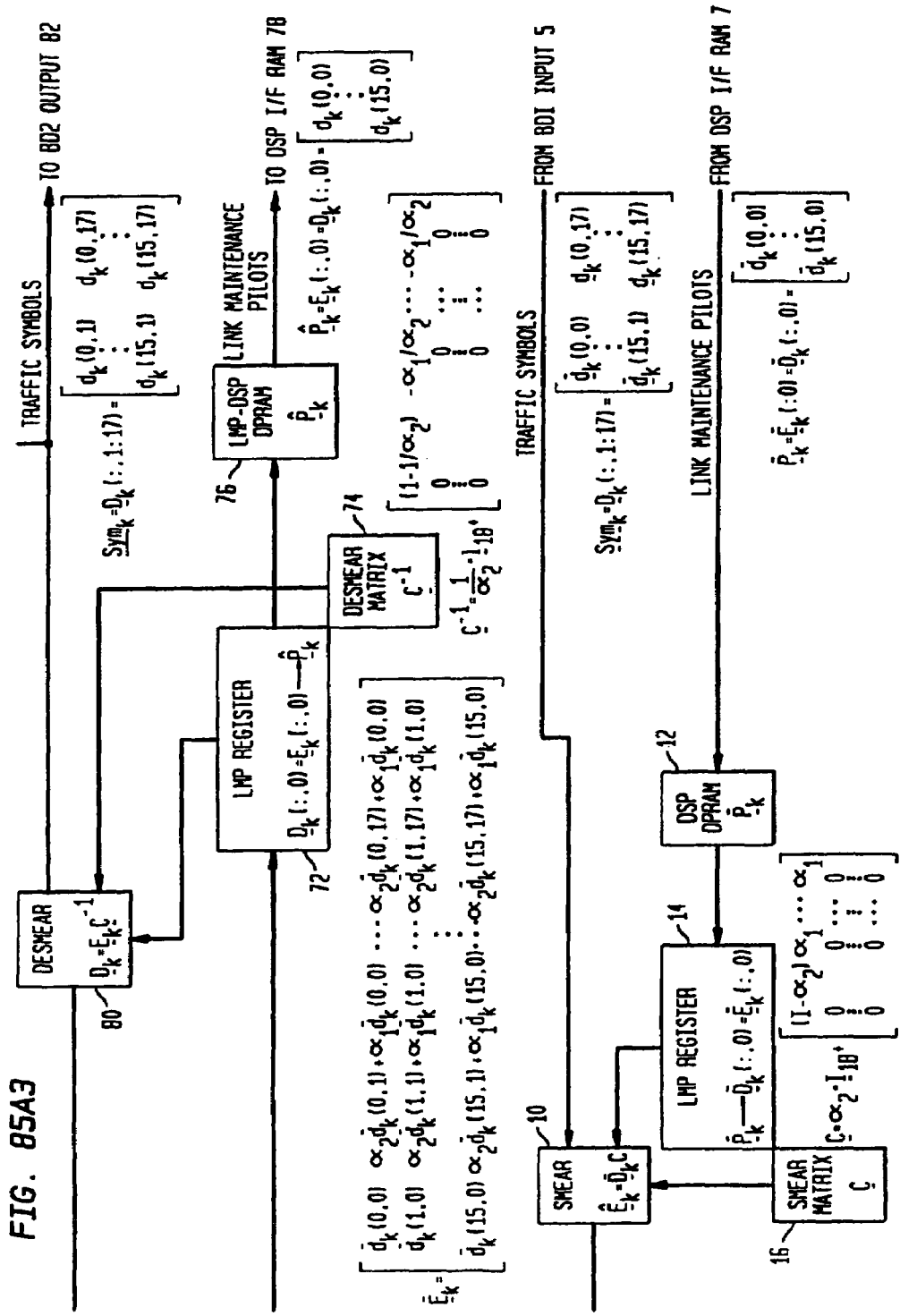
FIG. 85A3

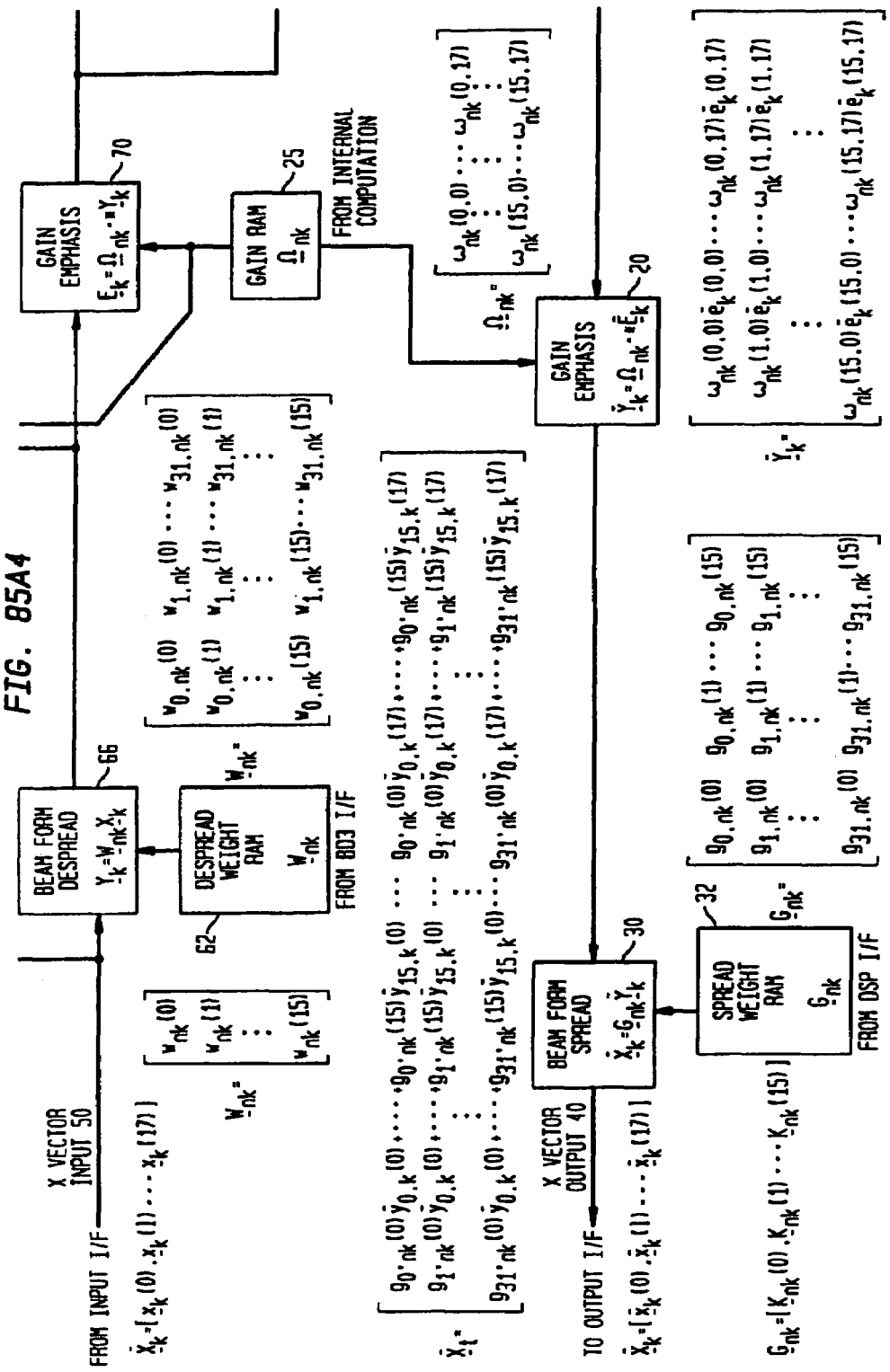
FIG. 85A4

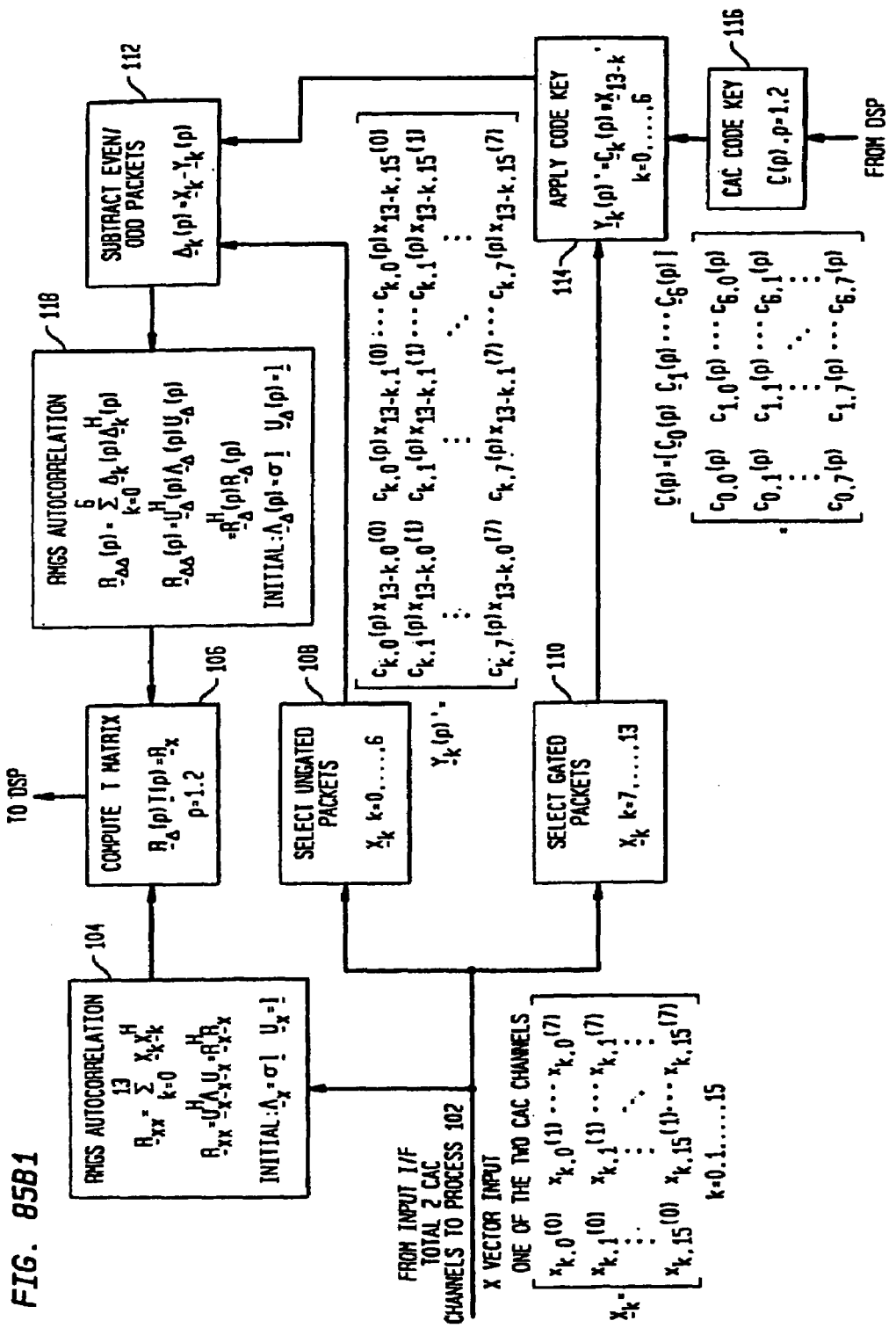
FIG. 85B1

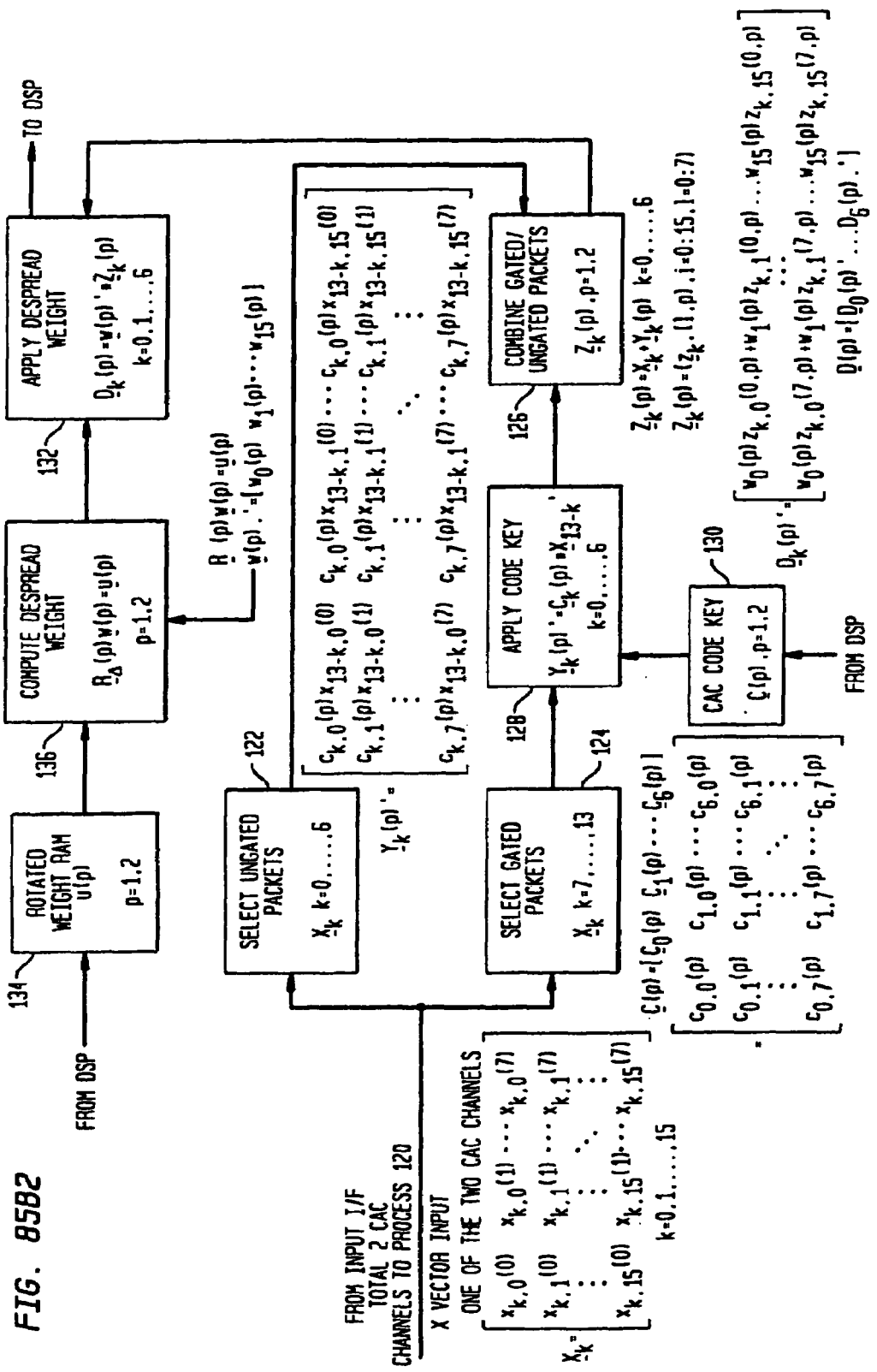

HIGHLY BANDWIDTH-EFFICIENT COMMUNICATIONS

CROSS-REFERENCES TO RELATED APPLICATIONS

This is a continuation application of U.S. application Ser. No. 09/920,903, filed Aug. 3, 2001, which is a continuation application of U.S. application Ser. No. 08/993,721, filed Dec. 18, 1997, now U.S. Pat. No. 6,359,923, issued Mar. 19, 2002, which is a continuation application of U.S. application Ser. No. 08/804,619, filed Feb. 24, 1997, abandoned, each to which priority is claimed and each of which is herein incorporated by reference in its entirety.

FIELD OF THE INVENTION

This invention involves communications methods that make very efficient use of available spectral bandwidth by a combination of multiple access techniques.

BACKGROUND OF THE INVENTION

Communication systems that operate over limited spectral bandwidths must make highly efficient use of the scarce bandwidth resource to provide acceptable service to a large population of users. Examples of such communications systems that deal with high user demand and scarce bandwidth resources are wireless communications systems, such as cellular and personal communications systems.

Various techniques have been suggested for use in such systems to increase bandwidth-efficiency—the amount of information that can be effectively transmitted within a given spectral bandwidth. Many of these techniques involve reusing the same communication resources for multiple users while maintaining the identity of each user's signal. These techniques are generically referred to as multiple access techniques. Among these multiple access protocols are Time Division Multiple Access (TDMA), Code Division Multiple Access (CDMA), Space Division Multiple Access (SDMA), and Frequency Division Multiple Access (FDMA). The technical foundations of these multiple access protocols are discussed, for example, in the recent book by Rappaport entitled "Wireless Communications Principles and Practice", Prentice Hall, 1996.

The Time Division Multiple Access (TDMA) protocol involves the transmission of information from a multiplicity of users on one assigned frequency bandwidth by time division multiplexing the information from the various users. In this multiplexing scheme, particular time slots are devoted to specific users. Knowledge of the time slot during which any specific information is transmitted, permits the separation and reconstruction of each user's message at the receiving end of the communication channel.

The Code Division Multiple Access (CDMA) protocol involves the use of a unique code to distinguish each user's data signal from other users' data signals. Knowledge of the unique code with which any specific information is transmitted, permits the separation and reconstruction of each user's message at the receiving end of the communication channel. There are four types of CDMA protocols, classified by the specific technique that is used to spread the user's data over a wide portion of the frequency spectrum: direct sequence (or pseudo-noise), frequency hopping, time hopping, and hybrid systems. The technical foundations for CDMA protocols are discussed, for example, in the recent book by Prasad entitled "*CDMA for Wireless Personal Communications*", Artech House, 1996.

The Direct Sequence CDMA (DS-CDMA) protocol involves the spreading of a users data signal over a wide portion of the frequency spectrum by modulating the data signal with a unique code signal that is of higher bandwidth than the data signal. The frequency of the code signal is chosen to be much larger than the frequency of the data signal. The data signal is directly modulated by the code signal and the resulting encoded data signal modulates a single, wideband carrier that continuously covers a wide frequency range. After transmission of the DS-CDMA modulated carrier signal, the receiver uses a locally generated version of the user's unique code signal to demodulate the received signal and obtain a reconstructed data signal. The receiver is thus able to extract the user's data signal from a modulated carrier that bears many other users' data signals.

The Frequency Hopping Spread Spectrum (FHSS) protocol involves the use of a unique code to change the value of a narrowband carrier frequency for successive bursts of the user's data signal. The value of the carrier frequency varies in time over a wide range of the frequency spectrum in accordance with the unique code. CDMA protocols are closely related to spread spectrum technology and the term Spread Spectrum Multiple Access (SSMA) is also used for CDMA protocols such as DS-CDMA and FHSS that use a relatively wide frequency range over which to distribute a relatively narrowband data signal.

The Time Hopping CDMA (TH-CDMA) protocol involves the use of a single, narrow bandwidth, carrier frequency to send bursts of the user's data during intervals determined by the user's unique code.

Hybrid CDMA systems employ a combination of two or more CDMA protocols, such as direct sequence/frequency hopping (DS/PH), direct sequence/time hopping (DS/TH), frequency hopping/time hopping (FH/TH), and direct sequence/frequency hopping/time hopping (DS/FH/TH).

The CDMA protocols modulate each user's information with a different code unique to that user. Each user's information is separated and reconstructed at the receiving end of the communication channel by isolating that portion of the multiplexed signal that correlates with the user's code. In specific embodiments, orthogonal codes are used, permitting the complete separation of information associated with different codes, without cross-talk. If orthogonal codes are not employed, "code nulling" may be employed to limit interference due to correlation between various codes. This technique involves the judicious selection of codes that, though non-orthogonal, result in only minimal cross-talk.

The Space Division Multiple Access (SDMA) transmission protocol involves the formation of directed beams of energy, whose radiation patterns do not overlap spatially with each other, to communicate with users at different locations. Adaptive antenna arrays can be driven in phased patterns to simultaneously steer energy in the direction of selected receivers. With such a transmission technique, the other multiplexing schemes can be reused in each of the separately directed beams. For example, the same specific CDMA codes can be used in two different spatially separated beams. Accordingly, if the beams do not overlap each other, different users can be assigned the same code as long as they can be uniquely identified by a specific beam/code combination.

The SDMA receive protocol involves the use of multi-element adaptive antenna arrays to direct the receiving sensitivity of the array toward selected transmitting sources.

Digital beamforming is used to process the signals received by the adaptive antenna array and to separate interference and noise from genuine signals received from any given direction. For a receiving station, received RF signals at each antenna element in the array are sampled and digitized. The digital baseband signals then represent the amplitudes and phases of the RF signals received at each antenna element in the array. Digital signal processing techniques are then applied to the digital stream from each antenna element in the array. The process of beamforming involves the application of weight values to the digital signals from each antenna element, thereby adjusting the numerical representation of their amplitudes and phases such that when added together, they form the desired beam—i.e., the desired directional receive sensitivity. The beam thus formed is a digital representation within the computer of the physical RF signals received by the antenna array from any given direction. The process of null steering at the transmitter is used to position the spatial direction of null regions in the pattern of the transmitted RF energy. The process of null steering at the receiver is a digital signal processing technique to control the effective direction of nulls in the receiver's gain or sensitivity. Both processes are intended to minimize inter-beam spatial interference. SDMA techniques using multi-element antenna arrays to form directed beams are disclosed in the context of mobile communications in Swales et. al., *IEEE Trans. Veh. Technol. Vol.* 39. No. 1 Feb. 1990, and in U.S. Pat. No. 5,515,378. The technical foundations for SDMA protocols using adaptive antenna arrays are discussed, for example, in the recent book by Litva and Lo entitled "*Digital Beamforming in Wireless Communications*", Artech House, 1996.

The Frequency Division Multiple Access (FDMA) protocol services a multiplicity of users over one frequency band by devoting particular frequency slots to specific users, i.e., by frequency division multiplexing the information associated with different users. Knowledge of the frequency slot in which any specific information resides permits reconstruction of each user's information at the receiving end of the communication channel.

Orthogonal Frequency Division Multiplexing (OFDM) addresses a problem that is faced, for example, when pulsed signals are transmitted in an FDMA format. In accordance with principles well known in the communication sciences, the limited time duration of such signals inherently broadens the bandwidth of the signal in frequency space. Accordingly, different frequency channels may significantly overlap, defeating the use of frequency as a user-identifying-parameter, the principle upon which FDMA is based. However, as discussed immediately below, pulsed information that is transmitted on specific frequencies can be separated, in accordance with OFDM principles, despite the fact that the frequency channels overlap due to the limited time duration of the signals.

OFDM requires a specific relationship between the data rate and the carrier frequencies. Specifically, the total signal frequency band is divided into N frequency sub-channels, each of which has the same data rate 1/T. These data streams are then multiplexed onto a multiplicity of carriers that are separated in frequency by 1/T. Multiplexing signals under these constraints results in each carrier having a frequency response that has zeroes at multiples of 1/T. Therefore, there is no interference between the various carrier channels, despite the fact that the channels overlap each other because of the broadening associated with the data rate. OFDM is disclosed, for example, by Chang in *Bell Sys. Tech. Jour.*, Vol. 45, pp. 1775–1796, December 1966, and in U.S. Pat. No. 4,488,445.

Parallel Data Transmission is a technique related to FDMA. It is also referred to as Multitone Transmission (MT), Discrete Multitone Transmission (DMT) or Multi-Carrier Transmission (MCT). Parallel Data Transmission has significant calculational advantages over simple FDMA. In this technique, each user's information is divided and transmitted over different frequencies, or "tones", rather than over a single frequency, as in standard FDMA. In an example of this technique, input data at NF bits per second are grouped into blocks of N bits at a data rate of F bits per second. N carriers or "tones" are then used to transmit these bits, each carrier transmitting F bits per second. The carriers can be spaced in accordance with the principles of OFDM.

A benefit of parallel data transmission derives from certain computational advantages associated with this transmission technique. Specifically, it can be shown that a parallel data signal is equivalent to the Fourier transform of the original serial data train and that the demodulation of the tones is equivalent to the inverse Fourier transform. This has led to the advantageous use of fast Fourier transform techniques (FFT) in implementing this technique, rather than the use of an expensive system of sinusoidal generators, modulators and coherent demodulators. See, for example, Weinstein and Ebert, *IEEE Trans. on Comm. Tech.*, Vol. com-19, No. 5, October 1971, page 628.

Parallel data transmission can be used to service a multitude of users by dedicating specific tones to specific users. In this technique, specific information can be uniquely associated with any particular user by transmitting information only on that user's assigned set of frequencies or tone set. The use of multiple frequencies for one user permits the spreading of the signal over a wide, though discrete, portion of the frequency domain with the benefits familiar from spread spectrum communications. See U.S. Pat. No. 5,410,538 issued to Roche and Wyner.

Further multiplexing can be obtained by reusing the same set of frequencies or tone set for different users by modulating the tone set based on a user specific spreading code. Users assigned to the same tone set can then be distinguished by separating that portion of the multiplexed signals that correlate with their assigned code. See Yee, Linnartz, and Fettweis, "*Multicarrier CDMA in indoor wireless radio networks,*" Proc. PIMRC '93, Yokohama, Japan, pp. 109–113, September 1993.

Both the phase and the amplitude of the carrier can be varied to represent the signal in multitone transmission. Accordingly, multitone transmission can be implemented with M-ary digital modulation schemes. In an M-ary modulation scheme, two or more bits are grouped together to form symbols and one of the M possible signals is transmitted during each symbol period. Examples of M-ary digital modulation schemes include Phase Shift Keying (PSK), Frequency Shift Keying (FSK), and higher order Quadrature Amplitude Modulation (QAM). In QAM a signal is represented by the phase and amplitude of a carrier wave. In high order QAM, a multitude of points can be distinguished on a amplitude/phase plot. For example, in 64-ary QAM, 64 such points can be distinguished. Since six bits of zeros and ones can take on 64 different combinations, a six-bit sequence of data symbols can, for example, be modulated onto a carrier in 64-ary QAM by transmitting only one value set of phase and amplitude, out of the possible 64 such sets.

Suggestions have been made to combine some of the above temporal and spectral multiplexing techniques. For example, in U.S. Pat. No. 5,260,967, issued to Schilling, there is disclosed the combination of TDMA and CDMA. In U.S. Pat. No. 5,291,475, issued to Bruckert, and in U.S. Pat. No. 5,319,634 issued to Bartholomew, the combination of TDMA, FDMA, and CDMA is suggested.

Other suggestions have been made to combine various temporal and spectral multiple-access techniques with spatial multiple-access techniques. For example, in U.S. Pat. No. 5,515,378, filed Dec. 12, 1991, Roy suggests "separating multiple messages in the same frequency, code, or time channel using the fact that they are in different spatial channels." Roy suggests specific application of his technique to mobile cellular communications using an "antenna array". Similar suggestions were made by Swales et. al., in the *IEEE Trans Veh. Technol.* Vol. 39. No. 1 Feb. 1990, and by Davies et. al. in *A.T.R.*, Vol. 22, No. 1, 1988 and in *Telecom Australia*, Rev. Activities, 1985/1986 pp. 41–43.

In U.S. Pat. No. 5,260,968, filed Jun. 23, 1992, Gardner and Schell suggest the use of communications channels that are "spectrally disjoint" in conjunction with "spatially separable" radiation patterns. The radiation patterns are determined by restoring "self coherence" properties of the signal using an adaptive antenna array. "[A]n adaptive antenna array at a base station is used in conjunction with signal processing through self coherence restoral to separate the temporally and spectrally overlapping signals of users that arrive from different specific locations." See the Abstract of the Invention. In this patent, however, adaptive analysis and self coherence restoral is only used to determine the optimal beam pattern; " . . . conventional spectral filters . . . [are used] . . . to separate spatially inseparable filters."

Winters suggests "adaptive array processing" in which "[t]he frequency domain data from a plurality of antennas are . . . combined for channel separation and conversion to the time domain for demodulation." See U.S. Pat. No. 5,481,570, filed Oct. 20, 1993, Column 1 lines 66–67 and Column 2, lines 14–16.

Agee has shown that "the use of an M-element multiport antenna array at the base station of any communication network can increase the frequency reuse of the network by a factor of M and greatly broaden the range of input SINRs required for adequate demodulation . . . " ("*Wireless Personal Communications: Trends and Challenges*", Rappaport, Woerner and Reed, editors, Kluwer Academic Publishers, 1994, pp. 69–80, at page 69. See also, *Proc. Virginia Tech. Third Symposium on Wireless Personal Communications*, June 1993, pp. 15-1 to 15-12.) Agee asserts that in this aspect of his work "[s]patial diversity can be exploited for any networking approach and modulation format, by employing a multiport adaptive antenna array to separate the time-coincident subscriber signals prior to the demodulation operation [underlining added]." op. cit. page 72. In that same work, Agee separately demonstrates that the problem of receiving "signals over greatly disparate propagation ranges" . . . "can be overcome by exploiting the . . . spectral diversity inherent to the modulation format employed by typical communication networks." op. cit. page 69. Considering CDMA networks, Agee shows that "the single-antenna received data signal . . . can be transformed to . . . a vector sequence . . . [that] . . . bears a strong resemblance to the signal generated by a narrowband antenna array receiving . . . spatially coherent signals in the presence of background interference." op. cit. p. 76. The discussion is in terms of "CDMA networks employing an M-chip modulation-on-symbol (MOS) DSSS spreading format . . . " op. cit. p. 69. (DSSS is the abbreviation for the direct sequence spectrum spreading or DS-CDMA protocol.)

Gardner and Schell, in U.S. Pat. No. 5,260,968, filed Jun. 23, 1992, also suggest "time division multiplexing of the signal from the base station and the users" . . . "[i]n order to use the same frequency for duplex communications . . . " "[R]eception at the base station from all mobile units is temporally separated from transmission from the base station to all mobile units." Column 5, lines 44ff. In a similar vein, in U.S. Pat. No. 4,383,332 there is disclosed a wireless multi-element adaptive antenna array SDMA system where all the required adaptive signal processing is performed at baseband at the base station through the use of "time division retransmission techniques."

Fazel, "*Narrow-Band Interference Rejection in Orthogonal Multi-Carrier Spread-Spectrum Communications*", Record, 1994 *Third Annual International Conference on Universal Personal Communications, IEEE*, 1994, pp. 46–50 describes a transmission scheme based on combined spread spectrum and OFDM. A plurality of subcarrier frequencies have components of the spreaded vector assigned to them to provide frequency-diversity at the receiver site. The scheme uses frequency domain analysis to estimate interference, which is used for weighting each received subcarrier before despreading. This results in switching off those subcarriers containing the interference.

Other disclosures of interest in this area include:

N. Yee, Jean-Paul M. G. Linnarta, G. Fettweis, "*Multi-Carrier CDMA in Indoor Wireless Radio Networks*", *IEICE Transactions on Communications*, Vol. E77-B, No. 7 pp. 900–904, July 1994;

L. Vandendorpe, "*Multitone Spread Spectrum Multiple Access Communications System in a Multipath Rician Fading Channel*", *IEEE Transactions on Vehicular Technology*, Vol. 44 No. 2, pp. 327–337, May 1995;

L. Vandendorpe, "*Multitone Direct Sequence CDMA System in an Indoor Wireless Environment*", *IEEE First Symposium on Communications and Vehicular Technology*, Benelux Delft Netherlands, pp. 4.1-1 to 4.1-8, October 27–28-1993; and K. Fazel, "*Performance of CDMA/OFDM for Mobile Communication System*", $2^{nd}$ *IEEE International Conference on Universal Personal Communications*, Otawa, Ontario, pp. 975–979, Oct. 12–15, 1993.

The following references describe various methods to combine adaptive beamforming with processing the spreading codes in CDMA:

G. Tsoulos, et al. "*Adaptive Antennas for third generation DS-CDMA cellular systems*", *Proc. IEEE VTC'95*, pp. 45–49, August 1995.

Y. Wang et al., "*Adaptive antenna arrays for cellular CDMA communication systems*", *Proc. IEEE Intl. Conf Acoustics, Speech and Signal Processing*, Detroit, pp. 1725–1728, 1995.

B. Quach, et al, "*Hopfield network approach to beamforming in spread spectrum communications*", *IEEE, Proc. Seventh SP Workshop on Statistical Signal and Array Processing*, pp. 409–412, June 1994.

A. Sandhu, et al. "*A Hopfield neurobeamformer for spread spectrum communications, Sixth IEEE Int. Symposium on Personal, Indoor and Mobile Radio Communications*", September 1995 (no page given)

A. F. Naguib, et al. "*Performance of CDMA cellular networks with base-station antenna arrays*", in C. G. Gunther, ed. "*Mobile Communications—Advanced systems and components*", Springer-Verlag, pp. 87–100, March 1994.

V. Ghazi-Moghadam, et al, "*Interference cancellation using adaptive antennas*", *Sixth IEEE, Int. Symposium on Personal, Indoor and Mobile Radio Communications*, pages 936–939, September 1995.

H. Iwai, et al. "*An investigation of space-path hybrid diversity scheme for base station reception in CDMA mobile radio*", *IEEE J.SeL.Areas, Comm.*, vol. SAC-12, pp. 962–969, June 1994.

R. Kohno, et al. "*A spatially and temporally optimal multi-user receiver using an array antenna for DS/CDMA*", *Sixth IEEE Int. Symposium on Personal, Indoor and Mobile Radio Communications*, Toronto, pages 950–954, September 1995.

Despite these suggestions to combine certain of the multiple access protocols to improve bandwidth efficiency, there has been little success in implementing such combinations. One reason for this lack of success is that it becomes more difficult to calculate optimum operating parameters as more protocols are combined. The networks implementing combined multiple access protocols become more complex and expensive. Accordingly, the implementation of high-bandwidth efficiency communications using a combination of multiple access protocols continues to be a challenge.

SUMMARY OF THE INVENTION

In accordance with this invention, a highly bandwidth-efficient method for transmitting and receiving information is implemented. In one aspect of the invention, a plurality of multiple-access, bandwidth-efficient communication techniques are combined. The invention is based, in part, on Applicants' realization that the distinct spectral and spatial analyses of received signals may be combined in a unified operation to extract each user's signal in a highly bandwidth-efficient multiple access system.

One aspect of the invention is a method of communicating signals from at least two different spatially separated remote transmitters to a receiving base station having a multi-element antenna array. Each of the transmitters transmits signals representative of different information. In accordance with this aspect of the invention, the mathematical representation of the spectral characteristics of the signals is capable of being put in a mathematical form that is substantially the same as the mathematical representation of the spatial characteristics of signals received by a multi-element antenna array. This enables the receiver to efficiently process the received signals to simultaneously obtain adaptive spectral and spatial despreading and spreading weights that enhance the signal to noise and interference ratio of the signals. The receiver can then identify the data associated with each of the signals transmitted by the transmitters and can forward that data to the respective recipients. The term "spreading gains" can be used instead of "spreading weights", to emphasize the meaning that their values are adaptive and can vary in magnitude.

In another aspect of the invention, the spectral format of the signals is what we call discrete multitone stacked carrier (DMT-SC). In this format, the user's data signal is modulated by a set of weighted discrete frequencies or tones. The weights are spreading codes that distribute the data signal over a plurality of discrete tones covering a broad range of frequencies. The weights are complex numbers with the real component acting to modulate the amplitude of a tone while the complex component of the weight acts to modulate the phase of the same tone. Each tone in the weighted tone set bears the same data signal. Plural users at the transmitting station can use the same tone set to transmit their data, but each of the users sharing the tone set has a different set of spreading codes. The weighted tone set for a particular user is transmitted to the receiving station where it is processed with despreading codes to recover the user's data signal. For each of the spatially separated antennas at the receiver, the method of the invention involves the transformation of the received multitone signals from time domain signals to frequency domain signals. Despreading weights are then assigned to each frequency component of the signals received by each antenna element. Values of the despreading weights are then determined which, when combined with the received signals, results in an optimized approximation of individual transmitted signals characterized by a particular multitone set and transmitting location.

In another aspect of the invention, the spectral portions of the despreading weights are adaptively adjusted in value at the receiving station to improve the quality of the received signal. This process is referred to as adaptive code nulling. When the spreading codes used to spread distinct data signals are orthogonal, interference in the channel can be removed from the spread data. However, when the spreading codes are not orthogonal, which may be the case with spreading codes that are used in neighboring spatial cells, cross modulation may result so that the data signals are not able to be precisely distinguished by simple despreading. In order to compensate for this phenomenon, code-nulling weights are multiplied by the received signal. By nulling out the cross modulation present in the received signal, the appropriate values of the data bits are output by the receiver. The adaptive code nulling procedure may be implemented during the derivation of the overall despreading weights that maximize the signal quality.

In another aspect of the invention, the spatial portions of the despreading weights are adaptively adjusted in value at the receiving station so that the spatial directions of low gain or the null regions of the receiver are adaptively positioned in a pattern so that the nulls are directed towards known interfering signal sources. In this manner, interfering signals are de-emphasized in the spatial domain. This "null steering" procedure may also be implemented during the derivation of the overall despreading weights that maximize the signal quality.

In another aspect of the invention the mathematical formalism used to achieve null-steering is found to be analogous to the formalism used to achieve code-nulling. According to this analogy, just as the tones in a tone set are multiplied by complex weights to alter the amplitude and phase of the tones, so are the gain and relative phase of signals received by the antenna elements altered by a set of multiplicative weights. This multiplication by complex weights can be expressed in a matrix form for both code nulling, which is a spectral concept, and null steering, which is a spatial concept. Thus, the calculations performed in the spectral code domain correspond formally to the calculations performed in the spatial domain. Consequently, in this aspect of the invention null steering can be performed in a system using code-nulling simply by adding extra "spatial" dimensions to the spectral matrices used for calculating the complex weights and multiplying the signals by these "unified spatial/spectral" weights.

In another aspect of the invention, the signals are transmitted in time division duplex format—e.g. a format in which base to remote signals are transmitted in different time periods than remote to base signals. In one embodiment of this aspect of the invention, a first plurality of received signal bursts separated by first-burst time-guard time-periods, are received by the receiving station. This is followed by transmission by the receiving station of a second plurality of transmitted signal bursts separated by second-burst time-guard time-periods. The first and second bursts are separated by an interburst time-guard time-period that is larger than either the first-burst time-guard time-period or the second-burst time-guard time-period. The interburst time-guard time-period is sufficiently large to reduce interference between signals received by the receiving station and signals transmitted by other receiving stations.

Another aspect of the invention is the application to wireless communications of the mathematical analogy that may exist between the representation of data that has been spectrally processed in accordance with certain multiple access techniques and data that has been spatially processed by a multi-element adaptive antenna array. Applicants find that because of this analogy these analyses can be combined in a unified mathematical operation. This greatly simplifies the calculation of optimal operating parameters, including spreading codes, and permits identification of the signals associated with each individual user. Accordingly, in this aspect of the invention the dynamic, real-time calculation of the most desirable operating parameters for high-bandwidth efficiency, and the identification of each user's signal, becomes more economical, despite the fact that a plurality of multiple access techniques are used.

In one aspect of the invention, applicants show that spreading a signal over a set of weighted tones in DMT-SC is one multiple-access spectral-processing format that resembles the format of data that is processed by a multi-element adaptive antenna array. Accordingly, in an embodiment of the invention, space division multiple access (SDMA) using multi-element adaptive antenna array techniques is combined with DMT-SC to obtain significant calculational advantages.

In still another aspect of the invention these techniques are combined with higher order modulation formats, such as higher order QAM or M-ary PSK or FSK to obtain further bandwidth efficiencies.

In embodiments of the invention, a single matrix-calculation implements the spreading/despreading functions, including what would previously have been the separate steps of code determination, code nulling, beam forming, and null steering. This operation yields despreading weights that result in optimum ratios of signal to noise and interference.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

In the drawings:

FIG. 1A is a tutorial diagram illustrating an example of pure spectral diversity, showing how a receiver distinguishes two sets of discrete multitone signals from two transmitters that are placed close to one another, in accordance with the invention.

FIG. 1B is a tutorial diagram illustrating an example of pure spatial diversity, showing how a receiver distinguishes two discrete monotone signals from two transmitters that are placed far from one another, in accordance with the invention.

FIG. 1C is a tutorial diagram illustrating an example of both spectral and spatial diversity, showing how a receiver distinguishes two discrete multitone signals from two transmitters that are placed far from one another, in accordance with the invention.

FIG. 18 is a list of the possible operational frequency bands of a specific embodiment of the invention.

FIG. 22 shows the tone mapping to the ith traffic partition FIG. 23 shows the overhead tone Mapping to Channels for the ith Sub-band Pair FIG. 41 shows the Signal Mappings for Rate 3/4, Pragmatic 16 QAM and 16 PSK Trellis Encoding Schemes Employed in High Capacity Mode FIG. 48 shows the Gray-Coded Mapping for Rate 1/2, QPSK Pragmatic Trellis Encoding Scheme Employed in Low Capacity Mode FIG. 49 shows the Base Mapping of Elements of Received Weight Vectors to Antenna Elements and Tones FIG. 52 is a representation of the CLC Interleaving Rule FIG. 53 shows the Tone Mapping of (4×4) Interleaved Matrix Elements FIG. 55 shows the Tone Mapping of the (4×4) Interleaved Matrix Elements FIG. 63 shows the Remote Unit Tone Mapping of Received Weight Vector Elements FIGS. 65 and 65A show the BPSK Signal Mapping for the CAC Channel FIG. 66 depicts the CAC Interleaving Rule FIG. 67 shows the Tone Mapping of the (8×2) Interleaved Matrix Elements FIG. 69 shows Tone Mapping into DFT Bins

FIGS. 79A–79D are a schematic block diagram that depicts the overall digital signal processing architectural layout within an exemplary base station of the present invention.

FIG. 81A is a simplified schematic block diagram showing the main internal components of the frequency reference circuit shown in FIG. 81.

FIG. 85 is an illustrative flowchart of an embodiment of the adaptive solution of spectral and spatial weights.

DETAILED DESCRIPTION OF THE INVENTION

Figure 1D:
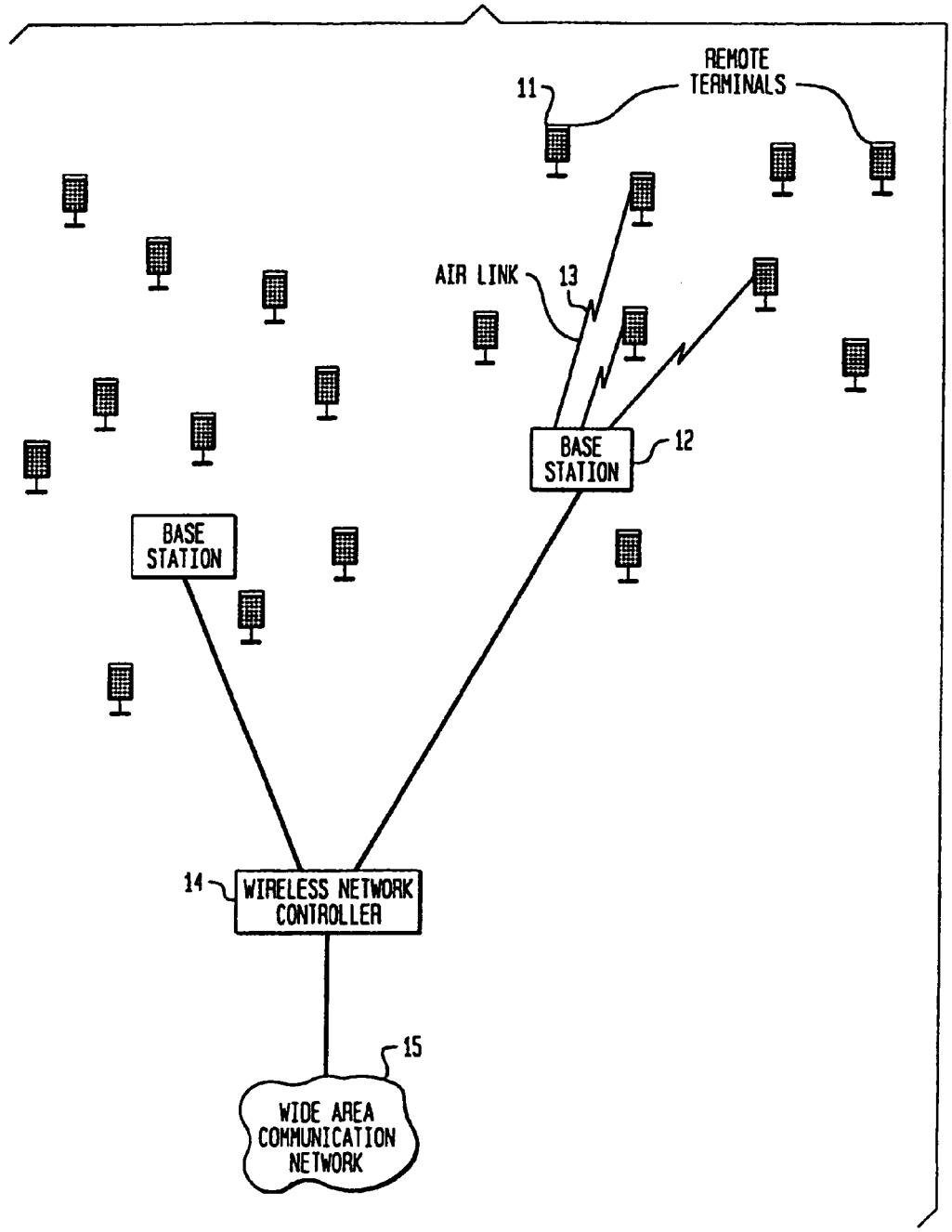
FIG. 1D is a high-level schematic representation of an implementation of the invention in a fixed wireless communication system.

In what follows, aspects of the principles of the invention will be discussed in a tutorial illustrating an example of pure spectral diversity, an example of pure spatial diversity, and an example of mixed spectral and spatial diversity. This will be followed by a discussion of the invention in a high-level overview that will include an explanation of the waveform used in the practice of an aspect of this invention. This will be followed by a description of more specific "details of the invention," and then by a detailed description of a "specific embodiment of the invention."

High Level Overview of the Invention

Introduction

This invention is based, in part, on the realization that there is an analogy between the mathematical description of beams formed by multi-element adaptive, or phased, antenna arrays and the mathematical description of signals that are formatted according to certain multiple access schemes, such as the exemplary DMT-SC. Based on this realization, applicants have been able to simplify the calculations necessary when a plurality of multiple access techniques are combined. Using this invention, one may more effectively use a limited bandwidth region of the electromagnetic spectrum to service a large number of users. Techniques that may be combined in accordance with the teachings of this invention include SDMA using multi-element antenna arrays, DMT-SC, and higher order modulation formats such as higher order QAM.

Tutorial Presentation of the Invention

FIGS. 1A–1C are tutorial illustrations of the technology involved in aspects of this invention. FIG. 1A is a tutorial diagram illustrating how the same spectral frequencies can be used by two different subscribers, Alice and Bob. Although Alice and Bob are located in the same place and their spectral frequencies are the same, those frequencies are coded differently—Alice's signal is encoded with code 1 and Bob's signal is encoded with code 2. Consequently, even though the two signals "mix", they can be separated in box 1A.1, based on the different codes, to produce separate versions of Alice's and Bob's signals.

FIG. 1B is a tutorial diagram illustrating how the same spectral frequencies can be used by two different subscribers, Chuck and Dave, who, although they are using the same frequencies, are located in different places. Although their spectral frequencies are the same, and their signals "mix", since their signals originate in two different locations they can be separated in box 1B to produce separate versions of Chuck's and Dave's signals.

If Alice, Bob, Chuck and Dave all transmit at the same time using the same frequencies, as shown in FIG. 1C, their signals might be divided, as shown in that FIGURE.

In accordance with one aspect of this invention, the signals are separated in one step as shown in FIG. 1C. As shown in that FIGURE, the signals are separated in box 1C.1 in a single operation. Applicant's have shown that the mathematical similarity between the descriptions of the spectral and spatial aspects of the signal permit this unified separation of the signals.

The Airlink

Discrete Multitone Transmission

An exemplary communication system in which the invention may be implemented is shown in FIG. 1D. In this FIGURE, the various elements marked 11 are exemplary fixed remote terminals serving users, while the boxes marked 12 are the base stations associated with certain of those remote terminals. It should be noted that in this context the term "fixed" remote terminals applies not only to remote terminals that do not move during use, but may also apply to terminals that are mobile, so long as they are serviced by one base station during a call. Other "fixed" embodiments may permit motion between spatial cells during a call and motion at less than 10 or 5 miles per hour. Additional remote terminals and base stations are also shown.

The remotes and base stations are connected by exemplary airlinks, 13. The base stations may be connected to a "wireless network controller" 14, which then connects to the wider telecommunications network, 15. Connections between the base station and the network controller and between the controller and the telephone network, may be wired or wireless.

An aspect of the invention is centered about the exemplary airlinks, 13, that connect the base stations and the remotes. These airlinks use scarce bandwidth resources and are advantageously operated in a highly bandwidth-efficient mode so as to accommodate a large number of users. The airlink, shown as 13 in FIG. 1D, involves a multitude of complex transmission techniques. A first exemplary technique is an embodiment of multitone transmission that we call "Discrete Multitone Stacked Carrier (DMT-SC)". In this technique, a signal is transmitted over discrete carrier frequencies, shown in FIG. 2 as 21. Specific tones can be assigned to specific users, as shown in the FIGURE. As discussed above, the tones may be spaced at a frequency of 1/T, where T is the symbol rate, so that they are "orthogonal"—i.e., they do not interfere with one another—as in OFDM. Each tone can carry different data, but for the purposes of this discussion, at least some of the various tones assigned to a specific user will be assumed to be carrying redundant information to realize the advantages of frequency diversity. Such redundant transmission over a range of frequencies allows recovery of the signal even if some frequencies are subject to severe interference—a problem of particular interest in the embodiment of this invention that involves fixed remotes. As mentioned above, certain implementations of this signal format enables analysis that can be effected using fast Fourier transform calculational techniques

DMT-SC

Figure 3:
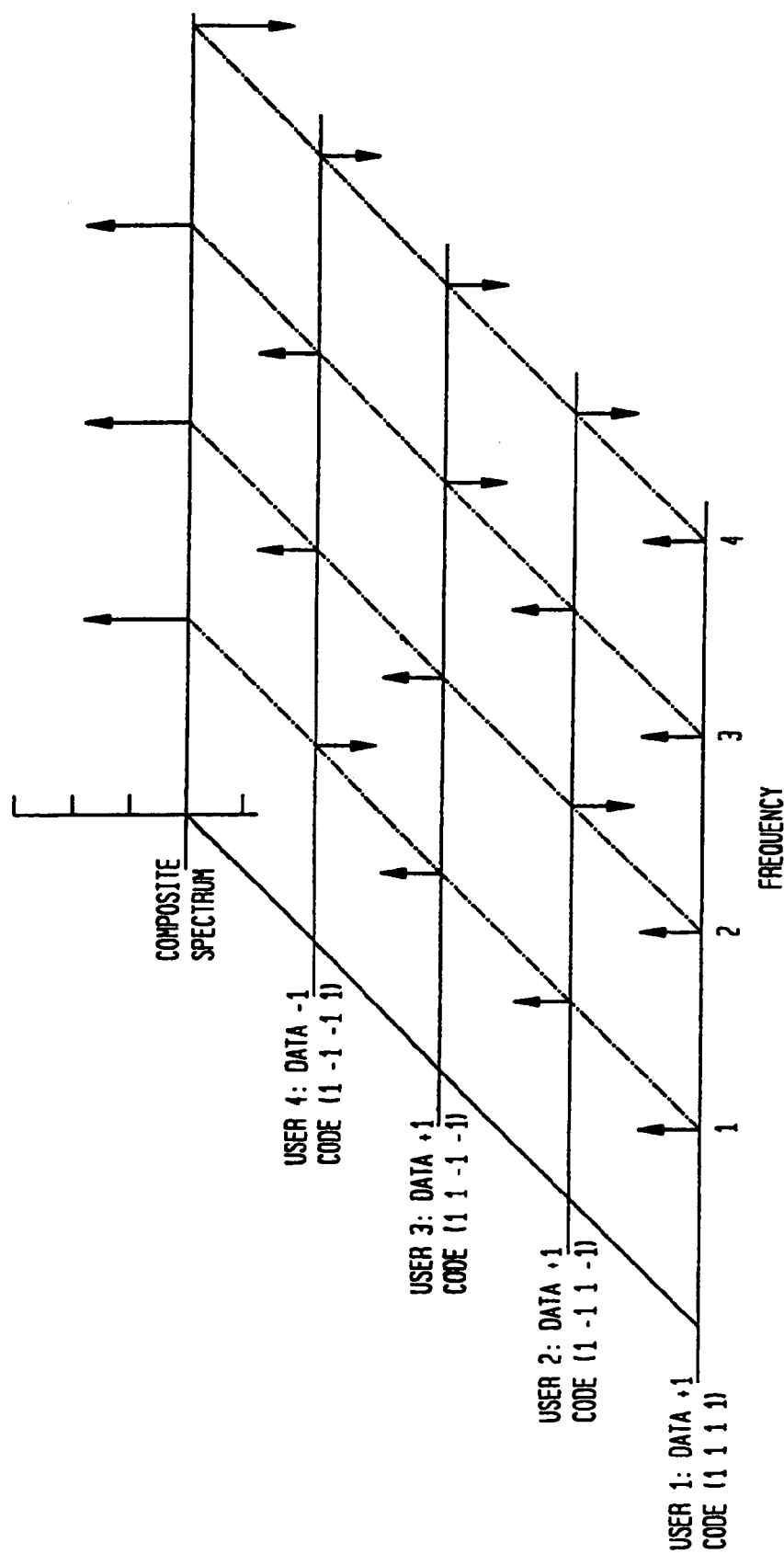
FIG. 3 is a simplified representation of the use of a discrete multitone stacked carrier signal format.

In an aspect of this invention, bandwidth efficiency is increased by spreading the signal over a set of weighted tones, with each user being assigned a specific set of tones and weights. This technique, is depicted in FIG. 3. In this FIGURE, identical data is sent over the four tones identified as 1, 2, 3, and 4. User 1 is to be sent a "+1." User 2 is to be sent a "+1." User 3 is to be sent a "+1." User 4 is to be sent a "−1." The same tones are used to send information to the four different users by using different "weights" for each user. These weights may be viewed as user-specific codes, and we may refer to them as weights, codes or weight-codes. In this heuristic example, the amplitude of a particular tone is obtained by multiplying the data value by the weight-code value for that combination of user and tone. For example, the weight-code of the second user is [1—1 1—1], meaning that for the second user the amplitude of the first tone is the data value times +1, the value for the second tone is the data value times −1, etc. For example, the value of the second tone for the second user is the data value, +1, multiplied by the weight-code value for the second user's second tone, −1, to yield a −1, as shown in the second position of the second line. This process is called "spreading" since it effects the spreading of the data across the tone set.

The various tone values are added to obtain the composite spectrum, shown on the last line of the FIGURE, that is then transmitted. Upon receipt of the spread data, the data is "despread", i.e., the data to be sent to the various users is obtained by multiplying the composite spectrum by the inverse of a particular user's weight-code. This can be performed simultaneously for all users by using appropriate matrix techniques.

It is helpful to bear in mind the difference between this "discrete multitone stacked carrier (DMT-SC)" technique and well known embodiments of the classical spread spectrum technique. In DIRECT SEQUENCE SPREAD SPECTRUM, each data symbol is multiplied by a series of code pulses. This spreads the data over a much wider region of the spectrum. In FREQUENCY HOP SPREAD SPECTRUM, the data is transmitted over different regions of the spectrum during different time slots, in accordance with a pre-defined hopping code. In the DMT-SC used in this invention, the signal is modulated by a set of weighted discrete frequencies, not over a continuous broad frequency range, as in direct sequence.

It should be appreciated, that although depicted in this example as a set of real numbers, the spreading codes advantageously comprise a vector wherein each vector is a complex number.

Matrix Representation of the "Coding" Process

Figure 4:
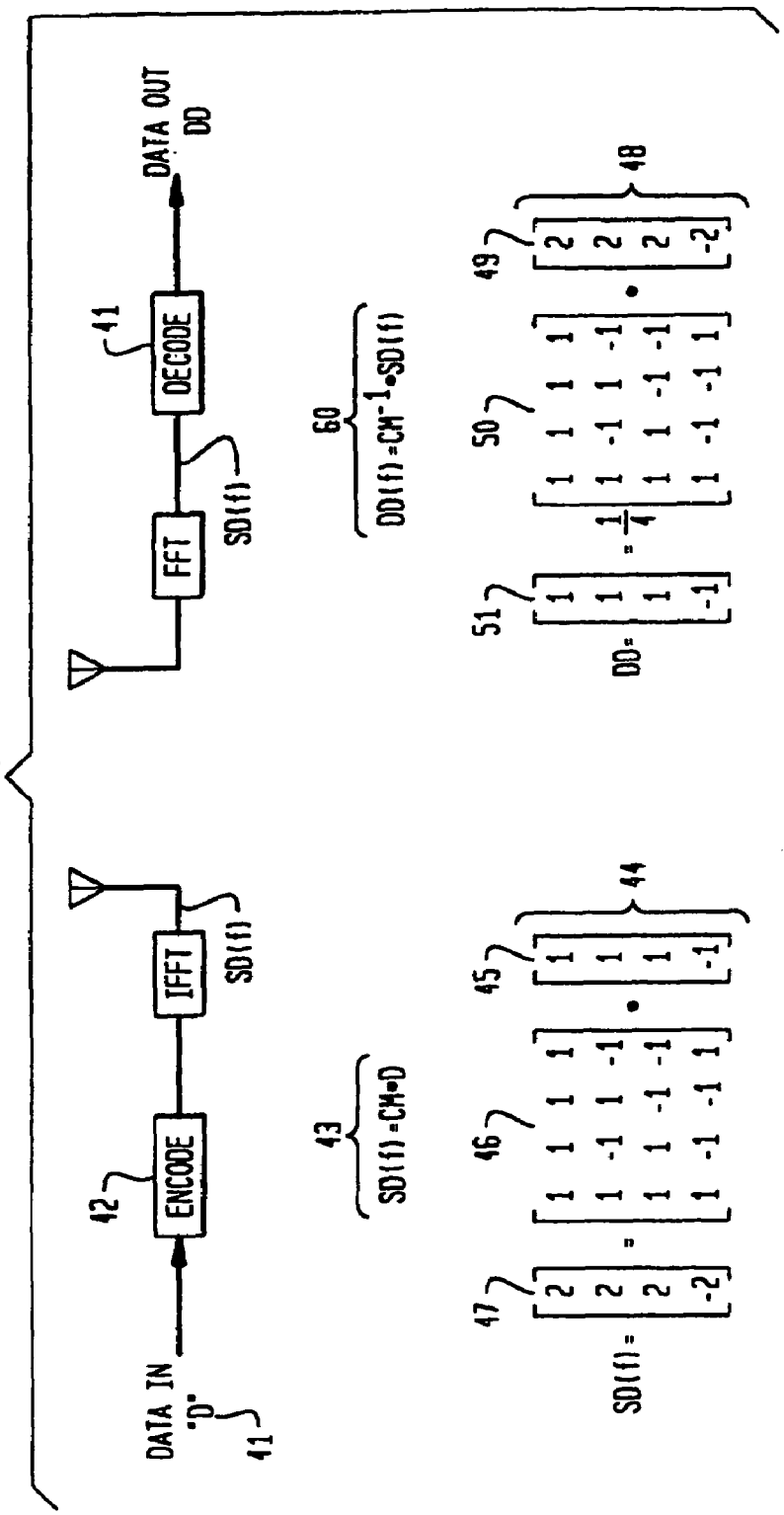
FIG. 4 is a simplified representation of the matrix formalism used in an implementation of the invention.

Exemplary, high level equipment arrangements used in the "spreading" and "despreading" is represented schematically in FIG. 4. In this FIGURE, 41 is the data, D, that is to modulate a DMT-SC signal. At 42, the various DMT-SC carriers are encoded as depicted previously in FIG. 3. The mathematical description of the spreading operation is shown in formula 43, where SD is the "spread data," CM is the "code matrix," and D is the "data." The detailed matrix operation is shown in formula 44, where 45 is the data vector array representing the data of FIG. 3, 46 is the code matrix of that FIGURE, and 47 is the composite spectrum or spread data vector array.

When the spread data, SD, is received, it is "despread" by means of the vector operation shown in 60, where SD is the received "spread data," CM-1 is the inverse of the code matrix and DD is the "despread data," that, as required, is reflective of the original data. This vector operation is shown in detail in 48, where 49 is the received spread data, 50 is the inverse of the code matrix, and 51 is the despread data. It is important to note for the discussion in the next section on the effects of SDMA, that the size of this code matrix is determined by the total number of tones that are used.

As will be discussed below in the section on "Specific Details of the Invention," it is not necessary to use orthogonal codes. In fact, in most embodiments of this invention the codes are usually only linearly independent, and the effects of cross talk between users with different codes is treated using a "code nulling" process that results automatically from the practice of one aspect of this invention.

Use of SDMA in "Coded" Multitone Transmission

An important aspect of the invention involves the realization that the mathematical description of a certain processed spectrally processed signals, such as DMT-SC signals, is analogous to the mathematical description of a signal spatially processed by a multi-element adaptive antenna array. Accordingly, the mathematical description of such spectrally processed signals may simultaneously describe spatial processing by a multi-element adaptive antenna array by simply increasing the size of the DMT-SC matrix to take into account the number of antenna elements in the antenna array. The dimensionality of the combined "spectra/spatial matrix" that comprises the spreading weights by which each tone is multiplied, is then equal to the number of tones multiplied by the number of energized antenna elements.

As noted in the Summary of the Invention, the mathematical formalism that describes an aspect of this invention treats both code and antenna aspects of the received signal similarly. The signal processing may therefore automatically result not only in codes that have minimal cross talk with other coded signals, but also in the formation of beams that yield minimal interference from users illuminated by different beams. These advantages are usually derived separately and are known as code nulling and null steering respectively. They will be explained in greater detail below in the section on "Specific Details of the Invention."

Channel Response, Equalization, and Signal Extraction

Figure 5:
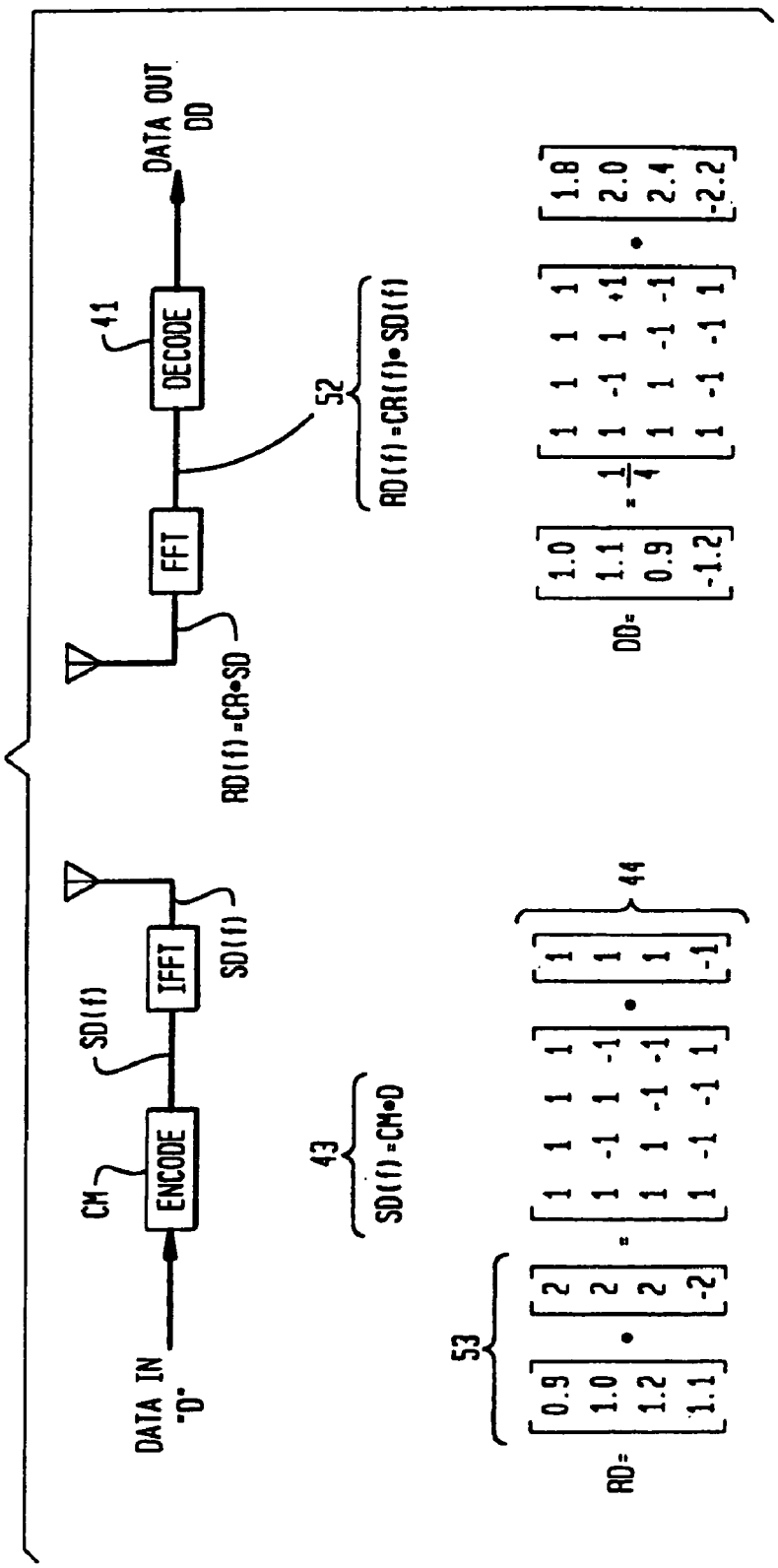
FIG. 5 is a simplified representation of the matrix formalism, used in an implementation of the invention, that includes the effects of channel response.

The discussion to this point has not involved any description of the effects of channel response. Distortions due to the channel response can be introduced into the formalism by means of a "channel response" matrix, shown in FIG. 5. In this FIGURE, the received data "RD", shown in 52, is no longer equal to the spread data as in FIG. 4, but is now distorted by a channel response "CR.". The received data is then the product of the spread data and the channel response, as shown in 52. This effect is shown in 53, with the exemplary numbers used in FIG. 3. As shown, the despread data, 54, now do not have the original data values, but rather values that are distorted by the channel response. In order to correct this distortion, the code despread matrix must include terms that "equalize" the channel distortion.

In an embodiment of the invention, this channel response vector is determined by transmitting a pilot signal and noting its distortion by the channel ("pilot driven equalization"). In another embodiment, the effect of channel response is "equalized" by simply adaptively calculating a "despread matrix" that maximizes the ratio of signal-to-noise-and-interference associated with the transmitted data (data driven equalization). The calculated optimum system parameters may include a mathematical representation of the channel response. These channel response parameters may then be used by either the base or the remote to "equalize" the channel distortion. These parameters may be used by the either side of the link because, at least for short periods of time, the channel is reciprocal in time. Of course, these calculations may be equally well done at some more central location rather than at the remote. What is central to this aspect of the invention is that certain calculations can be reused. Accordingly, despread weights used on the receive signals can be reused, with only minimal modifications, to spread signals on the next transmission—a process called retrodirectivity. Additionally, it may be possible to reuse, at the remotes, the weights that are calculated at the base station.

Of course, the calculation of optimum system parameters, and the adaptive extraction of the data associated with each user from the combined signal, is done taking into account all of the system signals that are seen by the base and transmitted by the base. Accordingly, the remotes may calculate their own despread weights to take into account the interfering signals that they receive, which are not received by the base station. Simplification may be achieved by using a fixed beam pattern for the remotes, rather than calculating beam weights, since the remote knows where the fixed base is and need not reoptimize its beam weights once its beam pattern is fixed.

Modulation Formats

Figure 2:
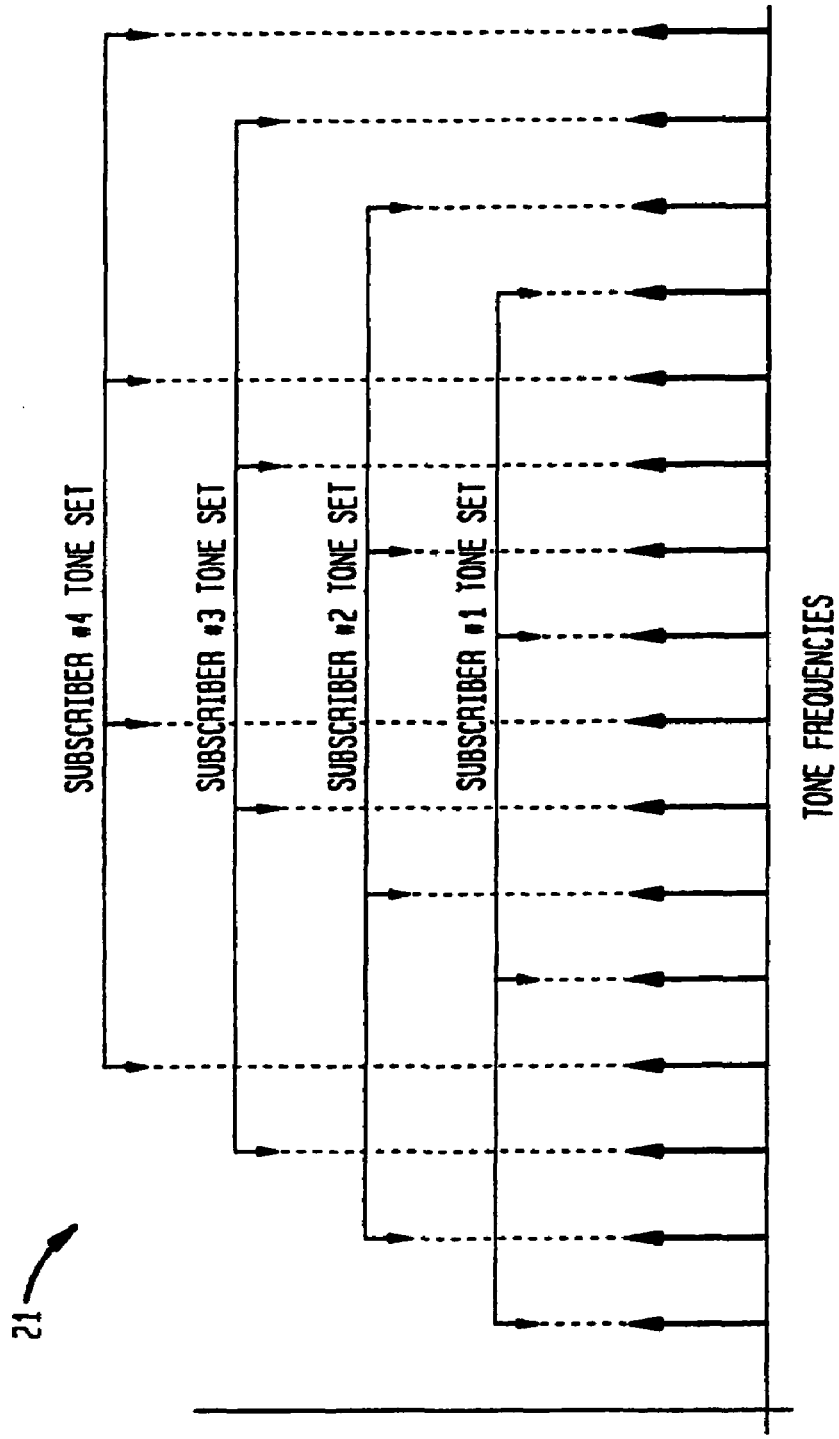
FIG. 2 is a simplified representation of multitone transmission.

Although, to this point, we have shown the signal as either zeros or ones, it is clear that the carrier may be modulated in any one of a number of signal modulation formats, such as higher order QAM. In such an exemplary format, the composite spectrum will be as shown heuristically in FIG. 6. In this FIGURE, the tone sets, as shown in FIG. 2, are displayed on the x-axis. The different codes used for the various tone sets are shown on the z-axis. Finally, the constellations associated with QAM modulation are shown on the y-axis as circles. The particular constellation point that is energized is represented by a closed circle. The composite spectrum, obtained by "collapsing" the z-axis, is shown x-z dimension. The blur represents the composite of all of the energized constellations of a particular tone.

Time Division Duplex

Figure 7:
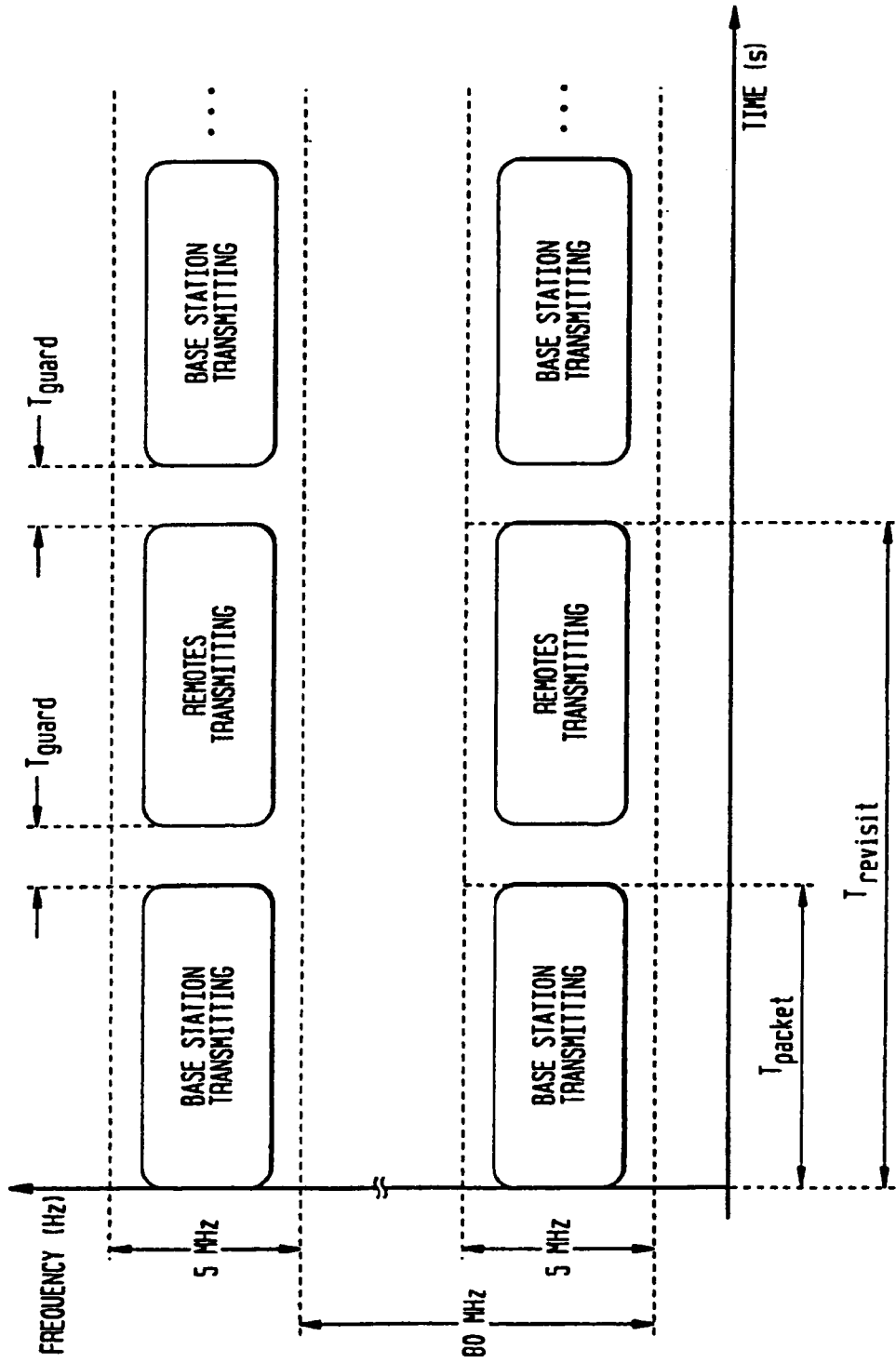
FIG. 7 is a timing diagram that illustrates the general time division duplex signal and protocol used in an embodiment of the invention.

In an embodiment of the invention, the bandwidth-efficient transmission techniques used in the invention are combined in a Time Division Duplex (TDD) configuration, i.e., a configuration in which the channel is divided into time slots with uplink and downlink transmission occurring alternately in adjoining time slots. A simplistic TDD configuration is shown in FIG. 7. As shown in the FIGURE, during alternate time slots, information is sent uplink (from base station to remote) and then downlink (remote to base station). The guard time is selected to allow for the delay time due to multi-path. All remotes and base stations may be synchronized so that all remotes transmit at the same time and then all base stations transmit at the same time. Well known GPS techniques may be used for such synchronization.

As indicated above, the use of TDD, and the assumption of a channel response that varies slowly compared to a TDD period, permits the interchangeable use of spread and despread weights, at least during contiguous receive and transmit cycles at a given location. Likewise it may be possible to reuse, at a second location, the larger part of the "spread/despread matrix" calculated at a first location. For example, it may be possible to use at the remotes the weights—from which each users information can be extracted—that were calculated at a base station during a previous TDD period by maximizing the signal-to-noise-and-interference ratio for the signals received at the base. In this embodiment, the base sends to its remotes their appropriate "channel equalized codes" or "weights" using the TDD format. The remotes may perform at least some weight recalculation, but may rely on some of the weight analysis performed at the base station. In this way the larger part of the calculation may be done at the base stations or at some other location removed from the remote locations. This reduces the cost and complexity of the more numerous remotes considerably.

Of course, to implement this alternate embodiment of the invention, optimization parameters must be relatively constant during the time period of one uplink and one downlink time slot. Thereafter newly calculated optimization parameters may be determined, and sent to the remotes, on a periodic basis.

Bandwidth on Demand

As noted above, the invention is particularly well adapted to providing variable bandwidth on demand. The provision of such additional bandwidth is effected by simply assigning more tones or codes to the requesting user, or by transmitting in a higher order modulation format.

Exemplary Details of the Invention

The Analogy Between DMT-SC and Adaptive Antenna Array Processing

Figure 14:
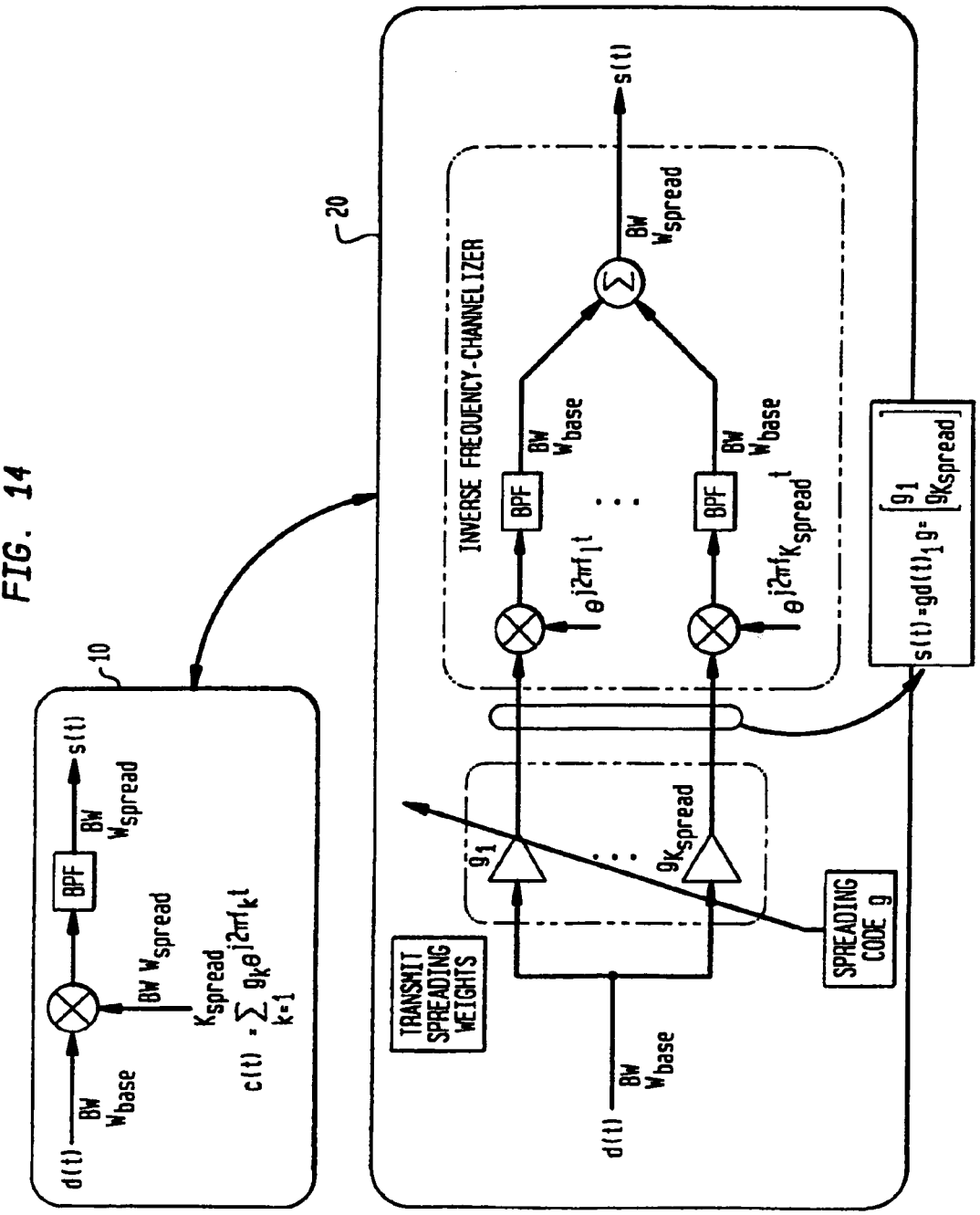
FIG. 14 is a schematic representation of an inverse frequency channelized spreader implementation.

The aspect of this invention that involves the use of spectral multiple access techniques that are mathematically analogous to the mathematical description of adaptive antenna array signals can be better understood in the context of heuristic FIG. 14. In that FIGURE, 10 is the mathematical description of Discrete Multitone Stacked Carrier (DMT-SC). In 10, a baseband signal, d(t) is multiplied by a spreading code comprising a set of tone frequencies and associated carrier weights, $g_k$. It should be appreciated that this is different than Direct Sequence Spread Spectrum where the baseband signal is multiplied by a PN code, rather than by a set of weighted carriers. The expression of 10 can be rewritten in block form, as in 20. Here the weighting operation associated with $g_k$ has been separated from the exponential operation, that we characterize in the FIGURE as an "inverse frequency channelizer", for example an inverse FFT. In a point central to this aspect of the invention, applicants have recognized that this representation is analogous to that of an adaptive antenna array—where a baseband signal is multiplied by an aperture vector.

Figure 15:
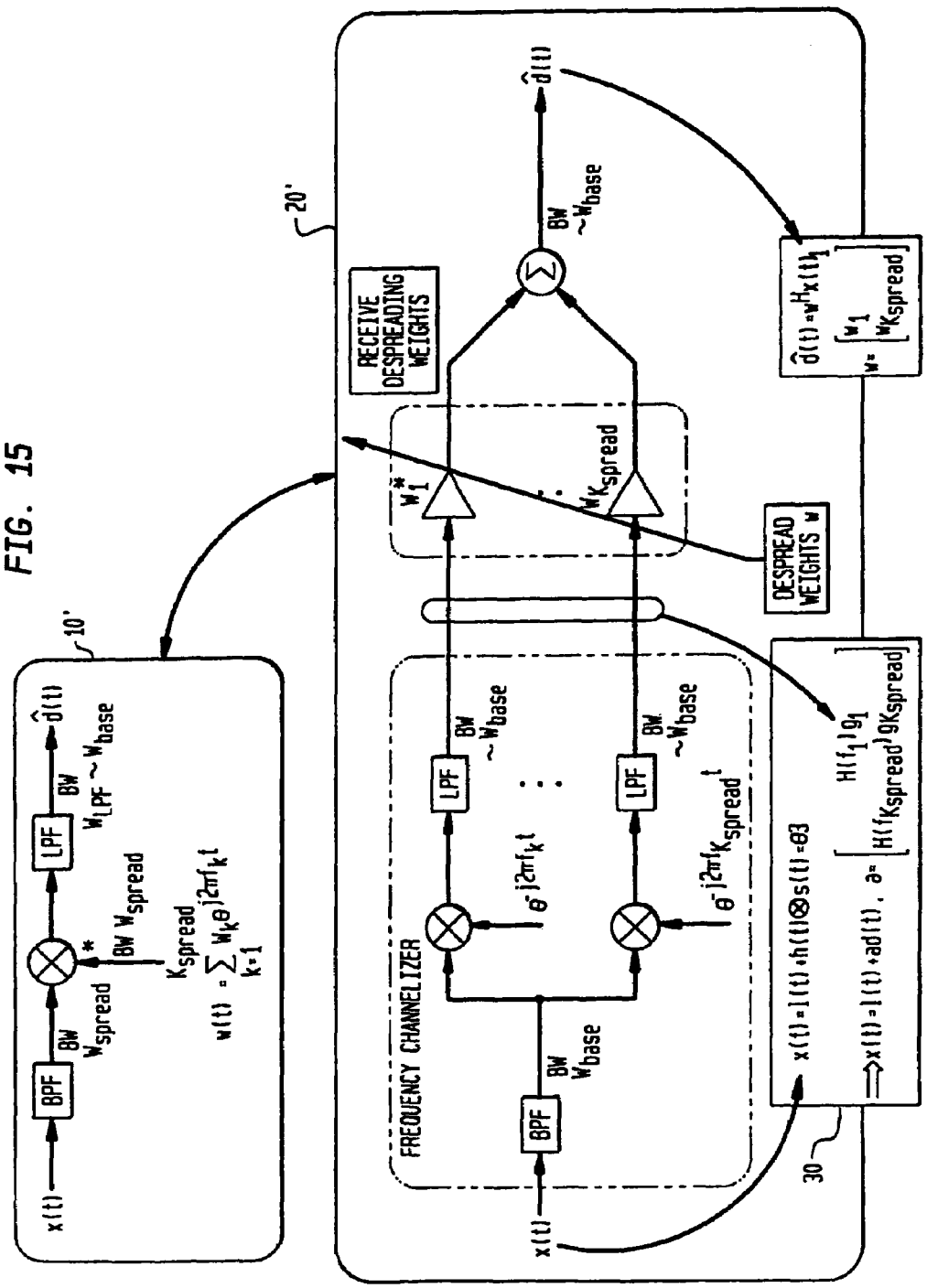
FIG. 15 is a schematic representation of a frequency channelized despreader implementation.

The DMT-SC despreading operation is shown in heuristic FIG. 15 and it also is found by applicants to be analogous to similar expressions for adaptive antenna array processing. In 10, a wideband signal x(t) is passed through a bandpass filter, BPF, and then multiplied by a despreading code, w(t) nominally the inverse of the spreading code of FIG. 15, to get the original signal, d(t). By calculating the despreader weights appropriately, for example to maximize signal to noise, we can automatically correct for channel distortion and other interfering signals. In 20, the despreading operation is again separated from the exponential coefficients, as in FIG. 14. Here the received signal, x(t) is represented as equal to the sum of an interference term, i(t) and the transmitted signal, s(t) multiplied by a distortion term h(t). From FIG. 14, the transmitted signal s(t) is equal to g times d(t), giving equation 30 in FIG. 15. Applicants have recognized that this equation is analogous to that describing the output of an adaptive antenna array.

In accordance with an aspect of this invention, this analogy between DMT-SC and adaptive antenna array processing leads to the possibility of combining both spatial and spectral expressions in one mathematical expression that can be solved in one unified spectral/spatial calculation. This also leads to the further discovered analogy between null steering in adaptive antenna arrays and code nulling in CDMA in general, and in DMT-SC in particular. In accordance with another aspect of the invention, instead of setting the despread weights to previously estimated spectral spreading and beam steering weights, we adaptively calculate the despread weights to maximize some general measure of signal quality—either characteristics measured directly from the channel or obtained from a blind adaptive operation or a combination of the two.

Time Division Duplex

The TDD signaling protocol used in an embodiment of the airlink is depicted in FIG. 7. It should be noted that two 5 MHz frequency bands separated by 80 MHz are depicted in FIG. 7. In one embodiment, the same data is transmitted over both 5 MHz bands to reduce multi-path fading effects. The 80 MHz separation between the two bands ensures that the same multi-path fade does not interfere with both bands. In addition, the 5 MHz frequency band is divided into four 1 MHz sub-bands, with the lower and upper 500 Hz of each 5 MHz band being designated as guard bands. The four 1 MHz sub-bands in the lower 5 MHz band are matched with corresponding sub-bands in the upper 5 MHz band. So, for example, the first sub-band in the lower 5 MHz band shares is duplicated in the first sub-band in the upper 5 MHz band, etc.

In one preferred embodiment, the transmission period from the base station to the remotes and from the remotes to the base station ($T_{symbol}$) is approximately equal to 340 microseconds. The guard time ($T_{guard}$) between transmission and reception is approximately 35 microseconds, in one embodiment, while the total revisit time ($T_{revisit}$) is approximately 750 microseconds. As has been mentioned, and as will be discussed in greater detail below, it is important that $T_{revisit}$ be less than the amount of time in which significant changes are likely to occur over the air channel, in order to ensure that essentially the same channel characteristics are observed within any selected interval of length $T_{revisit}$.

The guard time, $T_{guard}$, between the forward and reverse bursts must be sufficiently large to allow significant attenuation of multi-path reflections. Base-to-base interference necessitates sufficient guard time between forward and reverse transmission bursts. In an embodiment of the invention four forward bursts are transmitted without any intervening reverse bursts and then four reverse bursts are transmitted. The guard time between the four bursts is much smaller than the guard time at the end of the four bursts. This reduces the base-to-base interference.

High Level View of the Signal Processing

Figure 8:
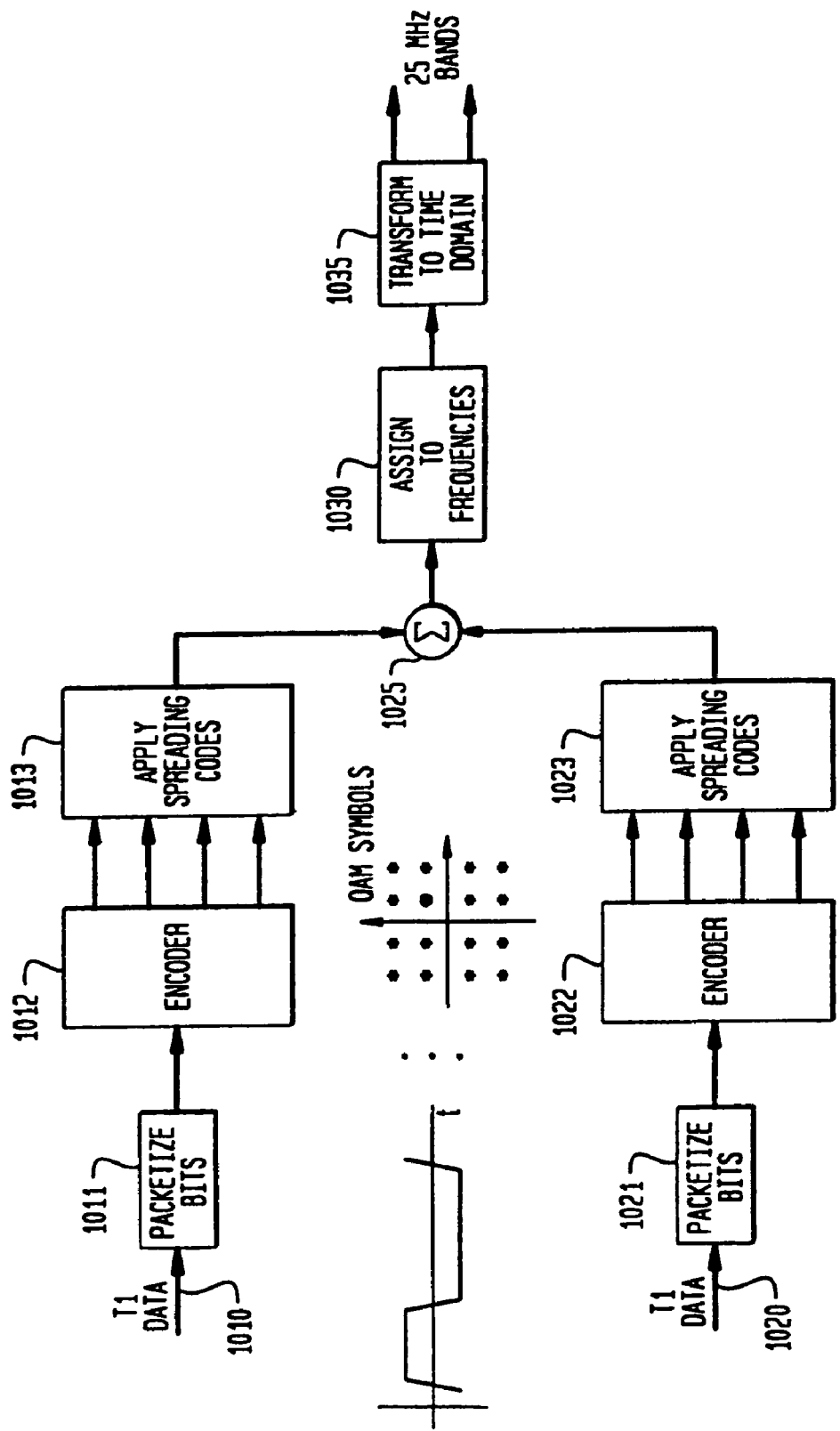
FIG. 8 is a signal processing flow diagram that depicts the main signal processing steps used in an embodiment of the invention to provide for high bandwidth efficiency.

FIG. 8 is a signal flow diagram that generally illustrates the signal processing steps performed in one embodiment of the invention on an audio, video, voice or data signal transmitted over the air interface between the base station and the remotes. As shown in FIG. 8, a signal (that may comprise audio, video, voice or data) is supplied from a communication link to an input terminal 1010. This signal is then packetized in digital format as indicated by a block 1011. The signal is packetized so that the entire signal can be sent in a single packet during the transmission time $T_{packet}$. As indicated within block 1012, the packetized signal is subsequently quadrature amplitude modulation (QAM) encoded and error encoded (using, for example, well known Reed-Solomon and/or trellis encoding techniques). Of course, it should be understood that in other advantageous embodiments of the invention, binary phase shift keying (BPSK) or M-ary phase shift keying (MPSK) may be employed as an alternative modulation technique to QAM.

The mapper 1012 outputs a complex number representative of an n-bit binary value based upon the mapping scheme. For example, if 16 QAM is used, then the encoder 1012 will output a four-bit binary value, one of 16 possible values since $2^4=16$. Likewise if 256 QAM is used, then the encoder 1012 will output one of 256 complex values representing an eight-bit binary value since $2^8=256$. The bits that enter the mapper may have been forward error correction encoded to protect against channel errors.

The encoded signal is then spread over a portion of the frequency band as indicated within a block 1013. In accordance with an embodiment of the invention, the DMT-SC spreading technique is used to spread the encoded signal over several frequency tones within the total frequency spectrum. The method used to spread the encoded carrier signal is described in greater detail immediately below with reference to the signal processing flow diagram of FIG. 9.

Parallel Data Transmission Using Multitones

The division and transmission of a signal over a number of carriers—Parallel Transmission—is discussed, for example, in a paper entitled "Analysis and Simulation of a Digital Mobile Channel Using Orthogonal Frequency Division Multiplexing," by Leonard J. Cimini, Jr., IEEE Transactions on Communications Vol. Com 33, No. 7, July 1985. Briefly, Parallel Transmission is a signal processing technique that converts a serial data stream into a parallel data stream, and modulates different discrete carrier tones with each of the parallel data streams.

For example, consider a set of carriers (called a tone set) that includes four tones. A serial data stream is then divided into four parallel data streams by taking every fourth symbol and assigning it to a particular one of the tones. So, for example, the first, fifth, and ninth symbols are assigned to the first tone; the second, sixth, and tenth symbols are assigned to the second tone, etc. Accordingly, the first tone in the tone set will be set to an amplitude and phase corresponding to the symbol values output onto the first parallel data stream, the second tone in the tone set will be set to an amplitude and phase corresponding to the symbol values output onto the second parallel data stream, etc. In a particularly advantageous embodiment of the invention, the spacing between the tones is carefully selected to provide orthogonal frequency division multiplexing (OFDM).

Figure 9:
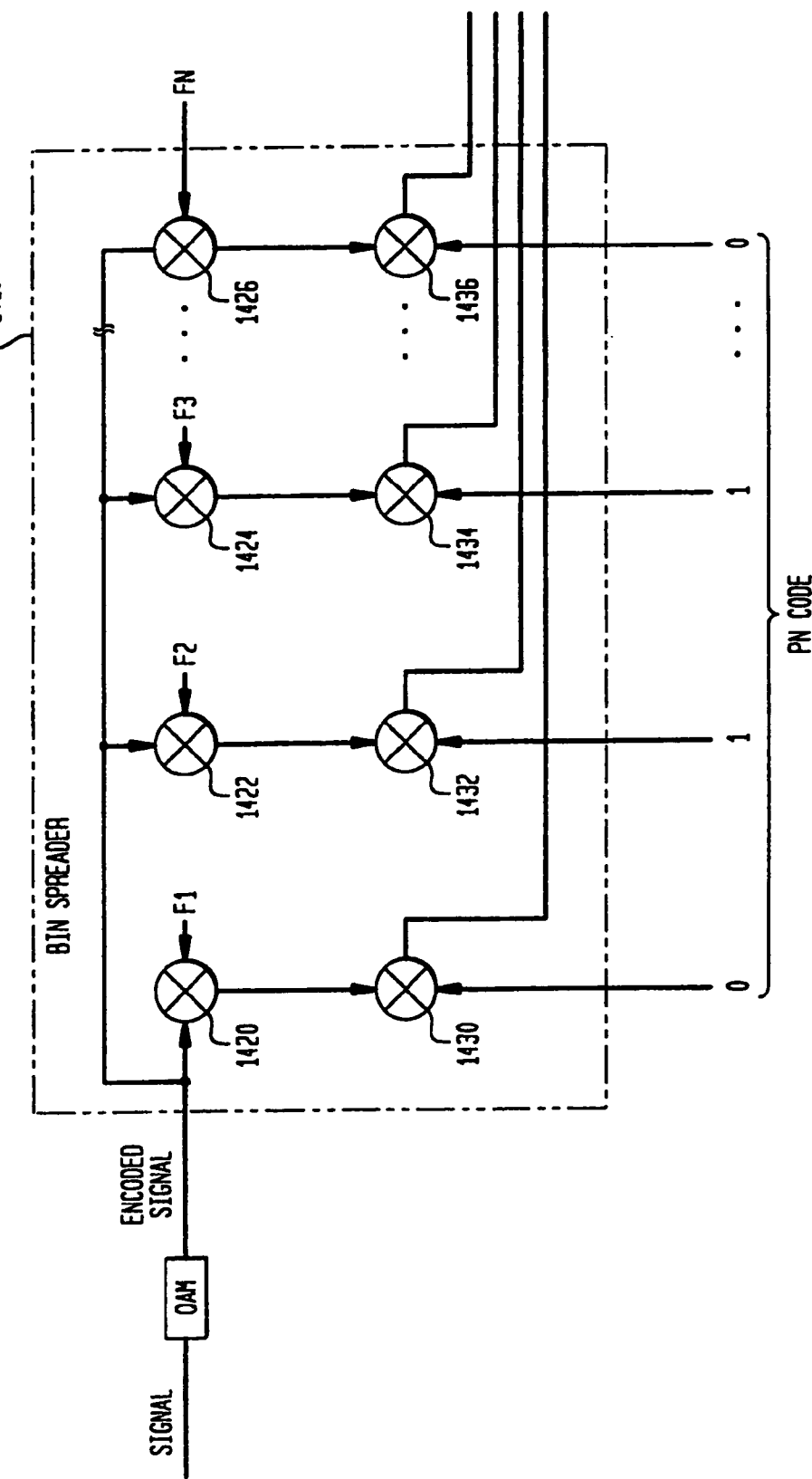
FIG. 9 is a signal processing flow diagram that illustrates a method used to spread the encoded carrier signal.

A PN code method of implementing such a modulation scheme, is depicted in FIG. 9 As indicated above, the data in the parallel data streams may be the same or different data. The major advantage of this technique is that it can be shown that such a processed signal is effectively the Fourier transform of the original data stream, and that a bank of coherent demodulators is effectively an inverse Fourier transform. In an aspect of the invention, these technique is used to obtain the calculational advantages of FFT and IFFT processing DMT-SC Details In an exemplary embodiment of the invention, the total bandwidth allocation for the airlink is 10 MHz. in the range of 1850 to 1990 MHz. The total bandwidth is divided into two 5 MHz bands called the Lower RF band and the Upper RF band. The separation between the lowest frequency in the Lower RF Band and the lowest frequency in the Upper RF Band-(DF) is 80 MHz. The base frequency ($f_{base}$) for the network is defined as the lowest frequency of the Lower RF Band.

The Lower and Upper RF Bands are further subdivided into sub-bands. The first and last 0.5 MHz of each band are designated as guard bands and are hence unused. The remaining 4 MHz in each band is then subdivided into 4 Sub-bands sequentially numbered from 0 to 3. Each Sub-band contains a set of frequencies in the Lower RF Band and another set of frequencies in the Upper RF Band. The extension L indicates the set within the Lower RF Band and U indicates the set within the Upper RF Band.

In one embodiment there are a total of 2560 frequency tones equally spaced in the 8 MHz of available bandwidth. There are 1280 tones in each Band, and 640 tones in each Sub-band (320 frequencies in the lower band and 320 frequencies in the upper band). The spacing between the tones (Df) is simply 8 MHz divided by 2560 that translates to 3.125 KHz. The tones may be further organized into Tone Sets each with four tones, and Tone Partitions, each with 20 Tone Sets. Alternatively the tones may be organized into Tone Clusters each with 20 tones, and Traffic Partitions, each with 4 Tone Clusters. A traffic channel requires at least one traffic partition. Control and access channels may be interspersed among the traffic channels in the 5 MHz slots. As will be discussed further below, data is redundant over a tone set.

The organization of the tones also permits standardization of tone assignments to users so as to permit the contemplated calculations in an orderly fashion. For example, each user may be assigned only multiples of traffic partitions. The division of the total transmission band into sub-bands also allows for lower sampling rates and less intensive DSP requirements (since the processed band is spread over a significantly smaller bandwidth). In addition, the partitions provide a convenient division for reducing the dimensionality of received vectors. This could be accomplished by combining selected tone set values (i.e., the corresponding tone set values in each cluster set). Although this involves a reduction in the number of degrees of freedom, such a tradeoff can be advantageous in systems wherein the maximum number of degrees of freedom are not necessary to accurately decode the data. Thus, by reducing the dimensionality of the tone set vector, the processing cost is significantly reduced.

As indicated above, to ensure that the signals modulated onto the separate tones do not mutually interfere by overlapping with other tones the tones set are spaced at intervals of 1/T, the symbol rate. Of course, some distortion occurs during transmission so that some interference may occur which may be removed with additional error correcting techniques.

The Use of DMT-SC

As noted above, the signals may be initially spread over assigned tones using appropriate codes or weights. These codes may be orthogonal within a given spatial cell, and may be randomly assigned to the same tone bins within adjacent spatial cells. Thus, spreading codes may be reused in adjacent spatial cells and also may have a random correlation between adjacent spatial cells. Although the initial code assignments made by the base station may be orthogonal, it will be understood that in response to the weight adjustments made during adaptive equalization, the spreading codes will typically evolve, or adapt, to non-orthogonal codes after the communications network has been active for some time. As will be discussed in greater detail below, the criterion for the spreading codes used within a given spatial cell is advantageously linear independence rather than orthogonality. The random correlation of spreading codes in adjacent spatial cells is compensated for by means of an automatically implemented code nulling technique that nulls out correlated portions of the transmitted signals using linear weighting.

Once the spreading codes associated with the DMT-SC modulation technique have been assigned to the encoded data signals, as represented by the block 1013 of FIG. 8, the processed signals are linearly summed, as indicated by a summing block 1025. A similar signal processing procedure is used on other incoming signals as indicated by the blocks 1021–1023, that correspond to the blocks 1011–1013. These signals are summed within the summer 1025 and assigned to carrier frequencies within the 5 MHz sub-bands shown in FIG. 7, as indicated by a block 1030.

As noted above, during the course of adaptive equalization, the codes typically become non-orthogonal in order to maximize the SINR throughout the overall communications network 100. However, in order to retain the maximum number of degrees of freedom throughout the communications system 100, it is preferable to maintain linear independence of the complex spreading vectors throughout a given spatial cell. Linearly independent complex vectors are those that cannot be expressed as a sum or scalar multiple of any combination of the other complex vectors in the system. Thus, by preserving linear independence among the spreading codes, a matrix set of linear equations can be derived that allows each of the system variables (i.e., data symbols) to be uniquely decoded. Insofar as the spreading codes become more linearly dependent, the ability to discriminate amongst data symbols becomes more difficult. However, in some applications, band pass filter values are established in the beginning and thereafter the system must operate within those constraints.

The spread signals are linearly added on a carrier-by-carrier basis to obtain the overall DMT-SC waveform. In order to despread this signal, the received signal is detected and converted into matrix form. The received vector is multiplied by a scaling factor (that is proportional to the number of bits in the spreading code), and a matrix comprised of the spreading codes. The resultant vector provides the despread data symbols as an output. From this example, it can be induced that as many data bits can be distinctly despread as there are bits in the spreading codes, so long as the spreading codes remain linearly independent Returning to the spreading of the data, once the encoded, spread-spectrum signals have been assigned to the frequency carrier bands, the signal may be transformed from the discrete frequency domain to the analog time domain using an inverse fast Fourier transform (IFFT) and an analog to digital converter. By using an IFFT and an FFT to provide for OFDM, multiple modulators are not required, as is well known in the art. This is because the calculations relating to the DMT-SC modulation technique are less intensive in the frequency domain than in the time domain. For this reason, the bulk of the signal processing is preferably performed in the frequency domain (with the exception of the modem operations of, for example, encryption, filtering, etc.) and is transformed to the time domain as one of the last steps before transmission.

Depending upon bandwidth considerations, signals from the same user are assigned one or more spreading codes and one or more traffic partitions. The assignment of different spreading codes and additional traffic partitions to provide additional bandwidth for a requesting user unit (a unit that communicates via one of the remotes) is particularly elegant (in comparison with bandwidth allocation using TDMA) from an implementation standpoint. This is because the allocation of new spreading codes and tone sets is mathematically simple and merely requires a numerical change to the despreading vector (for the reassignment of a new tone set) or an increase or decrease of the bandwidth of a bandpass filter on the receiving side (for the reassignment of a new tone set).

Advantages Associated with DMT-SC

The use of DMT-SC is highly advantageous in the system of the present invention. For example, the use of DMT-SC allows the channel characteristics to be evaluated at discrete points that can be exactly represented in matrix form as a complex vector. Thus, because selected tones within each tone set can be designated as pilots distributed throughout the frequency band, a simple evaluation of a finite number of complex values results in an accurate channel estimation. Furthermore, theoretically, the channel distortion can be compensated at the discrete tone frequencies by a simple complex conjugate multiplication. That is, since discrete tones are used, it is not necessary to know the entire channel response between the tones since the channel only affects operations at the exact points of the tone set frequencies. If the channel is defined at these discrete points, the received tones need only be multiplied by the appropriate complex, amplitude and phase to equalize the channel. This means that exact equalization is accomplished by a simple complex multiplication. This channel equalization calculation may be subsumed in the calculation of despread/spread weights that improve or optimize characteristics of the signal such as the signal to noise and interference ratio.

Also, the use of DMT-SC ensures that the equalization of antenna array time dispersion is very simple. In multiple element antenna arrays, a time delay is observed between receptions of a waveform by the spatially separated sensors when the wave impinges on the array. In a very wide band system, this delay creates dispersion. However, by using DMT-SC, the dispersion can be represented by discrete values of a scaleable vector since the response is only evaluated at discrete points of the frequency.

Furthermore, each user on the system could operate with a different QAM (or other M-ary) constellation size. This is because the symbols are not spread over the entire bandwidth as in direct sequence spread spectrum. Rather, in DMT-SC the symbols are spread over frequency bins of various sizes so that each user can have the optimum size QAM constellation (i.e., the highest order allowable in a given SINR). This increases the overall system capacity since the system is not restricted to the lowest common denominator (i.e., the QAM or M-ary constellation size at which all channels can operate). In addition, at lower constellation sizes a lower signal-to-noise ratio is required to demodulate the signal, and this lower signal-to-noise ratio requirement can be used to extend the range of the base station that provides additional system flexibility.

The use of DMT-SC modulation also provides several unexpected advantages when used in combination with certain communication technologies. First of all, since DMT-SC spreading allows for flexible spreading bandwidths and gain factors (i.e., a given signal can be spread over as much bandwidth as desired), it is particularly advantageous for exploiting the spectral diversity of the channel. That is, since the channel has certain bands with better response than other bands, signals can be selectively spread over the more desirable bands.

In addition, DMT-SC also allows for the use of code-nulling to greatly improve the reuse capacity of the communication link beyond the reuse capacity of conventional CDMA. Since DMT-SC is used instead of direct sequence or frequency hopping, selected portions of the spreading code can be nulled within the despreader. Thus, only those portions of the spreading code which are not common with the interfering spreading codes will be despread. Furthermore, DMT-SC is particularly advantageous when implemented within a variable bandwidth system since the allocation of bandwidth is highly flexible in such a system, and can be implemented by the appropriate assignment of additional tones to the requesting user. In summary, DMT-SC provides a solution that nulls the interfering signals.

Finally, DMT-SC is advantageous as applied to a multi-element antenna array system where matrix calculations comprise the bulk of the processing operations. As is well known in the art, as the dimensionality of a matrix grows, the calculation operations necessary to invert the covariant matrix increases as the cube of the matrix dimensionality. Thus, the processing power increases as the cube of the matrix dimensionality and, consequently, so does the cost of the processing circuitry. Thus, in order to avoid skyrocketing costs, it is advantageous to limit the dimensionality of the matrices used to perform the spreading and despreading calculations. Since in a multi-element antenna array system it is sometimes desirable to change the number of antenna sensor elements to enhance the beam forming capability of the system, such a system would normally incur an increase in matrix dimensionality (since each sensor corresponds to an element in the matrix). However, in a DMT-SC system, if sensors are added to the antenna array, the dimensionality of the matrix can be preserved by reducing the number of tones in each tone set.

This preservation of matrix dimensionality is possible because the mathematical formalism used when performing amplitude and phase weighting of the signal on each of the sensors is substantially similar to the formalism used when performing amplitude and phase weighting of each of the tones in a tone set. Thus, an analogy exists between the multiple sensors in an antenna array and the multiple tones in a tone set. Consequently, the same matrix can be used to determine weights for both sensor elements and tones, so that if the number of sensor elements increases, the number of tones can be decreased to compensate (i.e., preserve the same matrix dimensionality), and vice versa. Furthermore, essentially the same SINR is preserved in such a system since the degrees of freedom lost in the number of tones is regained in the number of beams. In contrast, direct sequence spread spectrum could not change the number of tones as beams are added since there are no tones to add or subtract. Thus, the cost of such a system would increase enormously relative to the cost of the system of the present invention as capacity is increased. Specifically, the cost of the present invention increases approximately proportionally with the capacity, while the cost of another system using, for example, direct sequence spread spectrum, increases as the cube of the capacity.

Once the signal has been DMT-SC modulated, the signal is output to the antenna for transmission. DMT-SC enables the appropriate signals to be directed to the appropriate user units (i.e., by means of antenna beam-forming discussed below).

Beam Forming

In accordance with one aspect of the present invention, adaptive antenna arrays are used in conjunction with a beam forming algorithm to achieve spatial diversity within each spatial cell and implement SDMA. That is, signals output by the antennas are directionally formed by selectively energizing different antenna sensors with different signal gains so that remote terminals in one portion of a spatial cell are able to communicate with the base station while other remote terminals in a different portion of the spatial cell may communicate with the same base station, even if they are using the same tone set and code. It should be understood that in the fixed implementation of the current invention, i.e., where the remote access terminals do not move substantially during communication with the base station, usually staying within a spatial cell during communication, the beam forming algorithm used in the airlink need not account for mobile remote units leaving and entering the spatial cell. In one advantageous embodiment, each spatial cell is partitioned into four sectors where each sector transmits and receives over one of the four sub-band pairs.

As set forth above, the beam forming method of the present invention, like the use of codes, should not be conceived as separate from the overall adaptive equalization method of the present invention. Rather, the method used to selectively energize the antenna sensors (during transmission) or selectively weight the signals received on the different sensor elements (during reception) is subsumed into the overall method used to maximize SINR. The relation of the beam forming method to the overall maximization of SINR method will be described in greater detail below.

Code-Nulling

The use of spread-spectrum technology (particularly DMT-SC) and directional antennas within the preferred airlink of the present invention allows for several error cancellation benefits, including effects that are analogous to code nulling and null steering, by means of linear weighting in code and space.

Code-nulling is used to discriminate between non-orthogonal signals emanating from adjacent spatial cells. Again, the code-nulling method should be understood in the context of the maximization of SINR method of the present invention. That is, the code-nulling method should be considered as the portion of the method that maximizes SINR with respect to the code domain. This way of understanding the code-nulling method will be described in further detail with respect to FIG. 10.

It should be understood that if signals generated within the same spatial cell or beam all have orthogonal spreading codes, code-nulling is typically not necessary since the orthogonality is sufficient to ensure that there is no cross modulation. However, as mentioned above, the spreading codes used within a particular spatial cell may not be orthogonal, although they are preferably linearly independent. Furthermore, the transceivers within the neighboring spatial cells may employ spreading codes that have a random correlation with the spreading codes used in the local spatial cell.

By adjusting the spreading weights associated with each communications channel the base station is able to crosscorrelate these signals on the same tone set to subtract out interference due to "neighboring" signals. In one embodiment, the base station has the spreading codes used to spread different signals assigned to the same tone set, so that this information can be used to initially calculate the appropriate weights for nulling out interference from other codes.

As discussed above, when the spreading codes used to spread distinct data signals are orthogonal, the spread data can be precisely recovered during despreading. However, when the spreading codes are not orthogonal (as is the case with spreading codes that are used in neighboring spatial cells), cross modulation may result so that the data signals are not able to be precisely distinguished by simple despreading (i.e., despreading without code-nulling).

In order to compensate for this phenomenon, code-nulling weights are used in the despreader. By nulling out the cross modulation present in the received signal, the appropriate values of the data bits are output by the receiver. As long as the complex spreading weights are linearly independent, and the SNR is sufficiently high, the exact symbol values can be discriminated by this method. It will be appreciated that the code-nulling procedure above is inherently implemented during derivation of the overall weights that maximize the SINR.

Null-Steering

Figure 12:
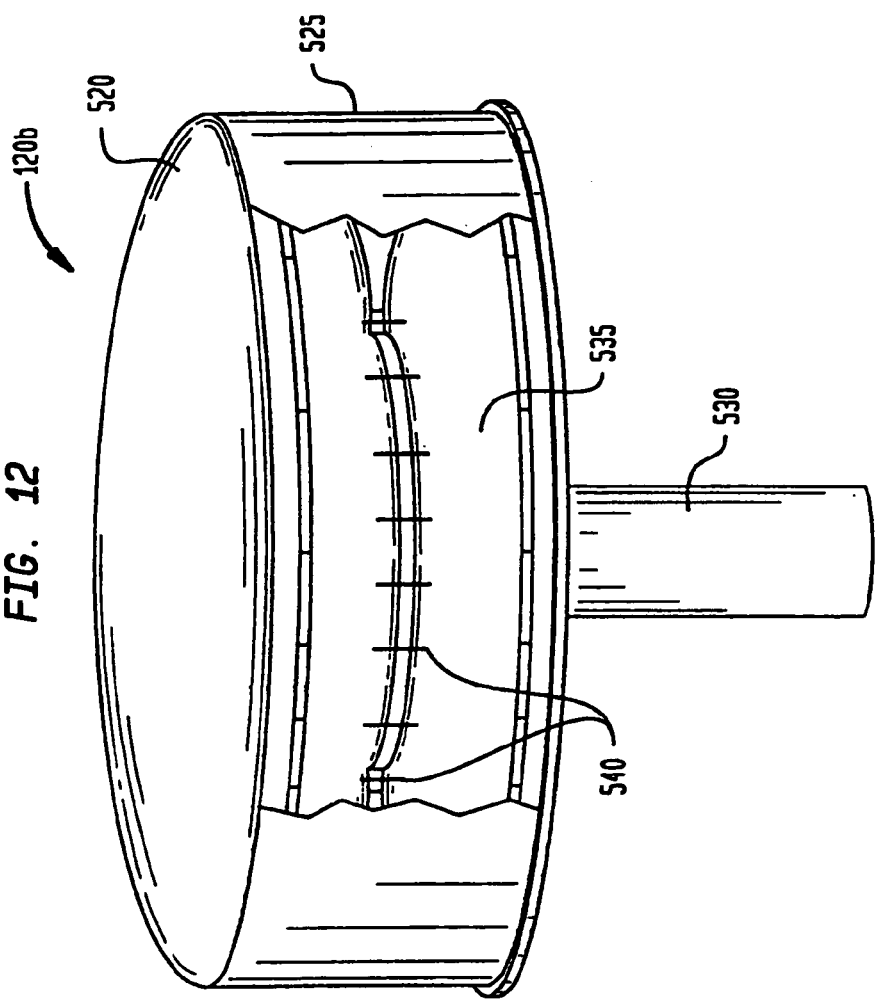
FIG. 12 is a perspective cut away view showing a second embodiment of a base station antenna.
Figure 11:
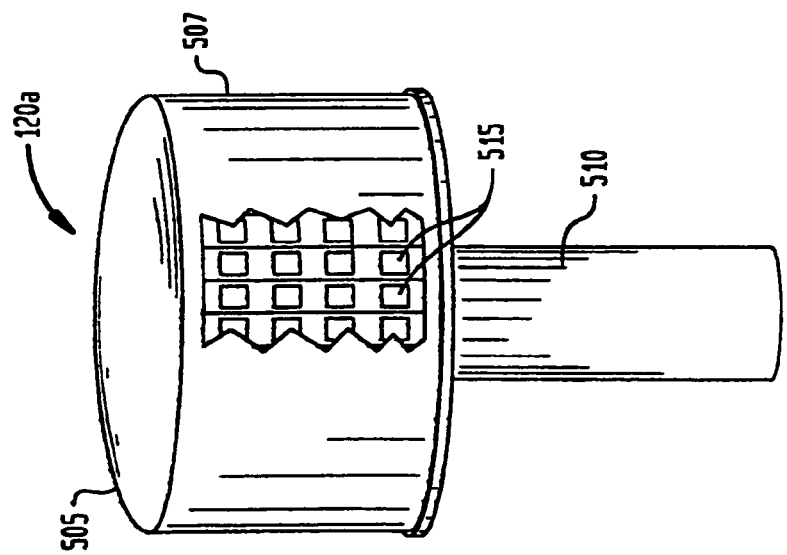
FIG. 11 is a perspective cut away view showing an embodiment of a base station antenna.

In addition to code-nulling, an exemplary directional antenna shown in FIGS. 11 and 12 with no spectral spreading, forms signals including null regions (i.e., regions where the antenna attenuates incoming signals or where there is a very low antenna gain). These null regions can be formed in a pattern so that the nulls are directed towards known interferers (e.g., interfering signal sources or interfering multi-path reflectors). In this manner, interfering signals are de-emphasized in the spatial domain. As will be discussed in greater detail below, the use of null-steering in conjunction with code-nulling is highly advantageous.

In accordance with one aspect of the present invention, significant processing time and sophistication can be saved since significant similarity exists between the methods for performing null-steering and code-nulling. Specifically, the mathematical formalism used to achieve null-steering is analogous to the formalism used to achieve code-nulling. According to this analogy, just as the tones in a tone set are multiplied by complex weights to alter the amplitude and phase of the tones, so are the gain and relative phase of signals output and received by the antenna elements altered by a set of multiplicative weights. This multiplication by complex weights can be expressed in a matrix form for both code nulling—a spectral concept—and null steering—a spatial concept. Thus, the calculations performed in the spectral code domain correspond formally to the calculations performed in the spatial domain. Consequently, null steering can be performed in a system using code-nulling simply by adding an extra dimension to the matrices used for calculating the complex weights and multiplying the signals by these weights.

Figure 10:
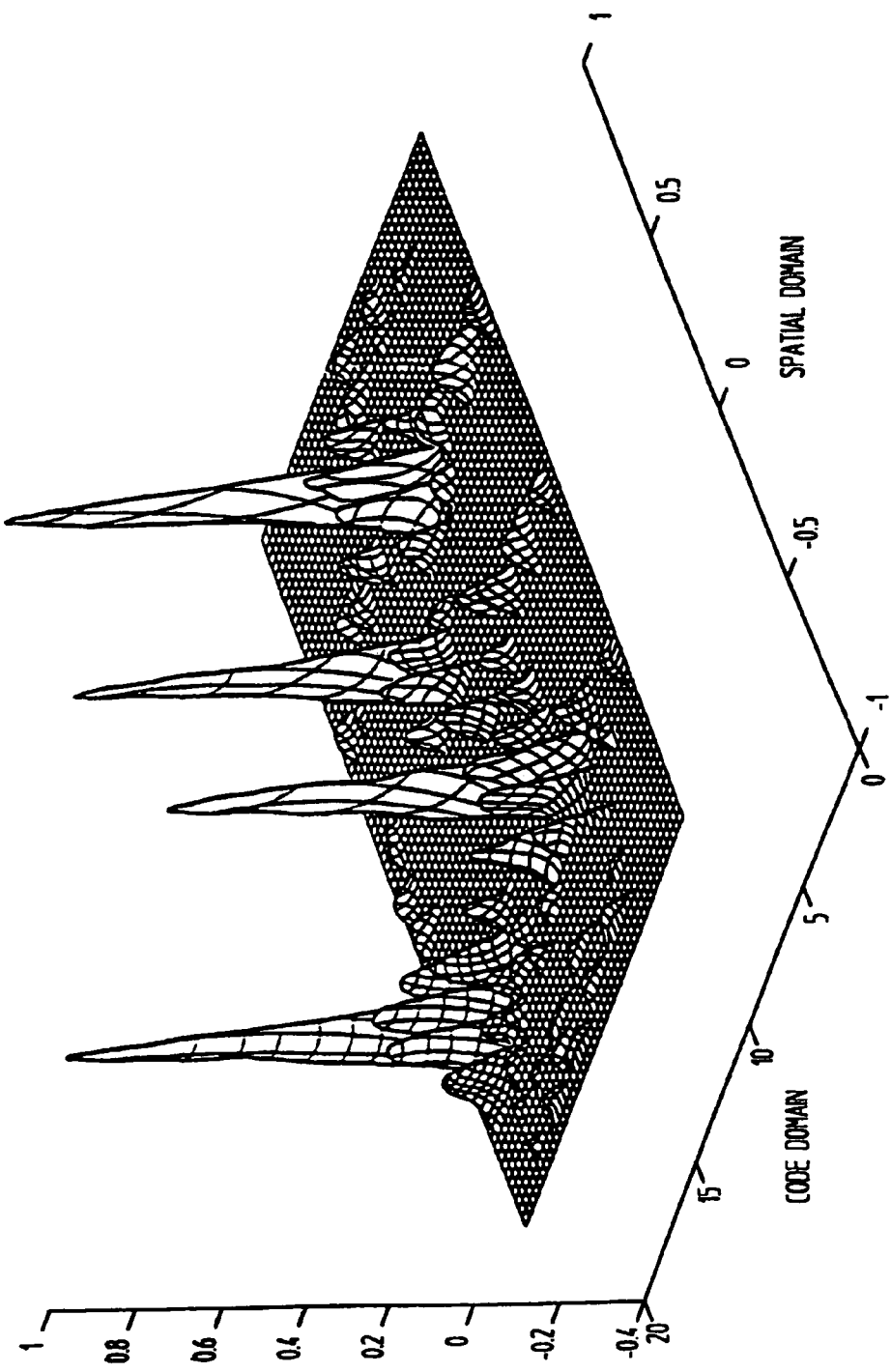
FIG. 10 is a three-dimensional plot of the signal to interference plus noise ratio versus code weights and spatial weights applied to the transmitted and received signals.

FIG. 10 generally depicts how weights calculated in both the code and spatial domain are used to maximize the SINR. It should be noted that FIG. 10 is primarily a conceptual representation and is not meant to convey the actual processing steps that occur in the method of maximizing SINR. As shown in FIG. 10, a three dimensional graph plots the relationship among code, space, and SINR. Specifically, the code and spatial domains are shown in one plane, while the SINR is plotted perpendicular to the plane defined by the code and spatial domains. The SINR is plotted on a scale of 0 to 1 where a value of 0 indicates that the signal consists entirely of noise and interference while a value of 1 indicates that the signal consists entirely of the signal of interest.

The code domain axis of the graph represents the various weighting values that can be applied to each of the tones, while the spatial domain axis of the graph represents the weighting values that can be applied to each of the antenna elements. As can be seen from the plot of FIG. 10, certain weights applied in the correct combination of code and spatial values result in SINR values near 1 so that optimal signal detection is achieved by calculating the code and spatial weights that converge to the "peaks" depicted in FIG. 10. The method of altering the code and spatial domain weights so that convergence to the peak SINR is achieved is described in greater detail below with reference to the method of maximizing SINR section. The invention combines spatial and spectral spreading and despreading to optimally remove interference from the received signals.

Figure 13:
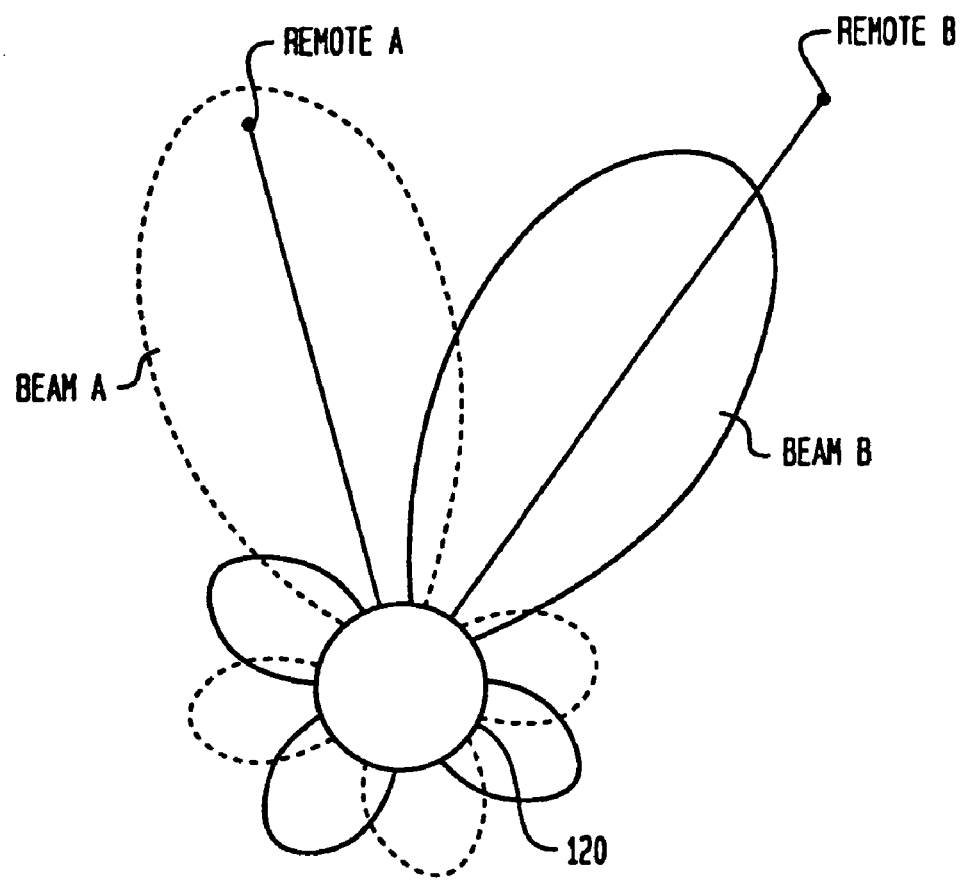
FIG. 13 graphically depicts the null steering aspect of the present invention.

Returning to the null steering procedure that forms a portion of the method for calculating weights in the spatial domain, the null steering method, illustrated schematically in FIG. 13, provides for increased user capacity for each base station. As depicted in FIG. 13, a first beam, "beam A," is directed by the antenna 120 using beam-forming techniques, over a particular spatial region (i.e., the signal strength is significant in the depicted region enclosed by solid lines). A second beam, "beam B," is directed by the antenna 120 over a different spatial region (enclosed by the dashed line in FIG. 13). Both signals include sidebands, that normally would generate interference within the adjacent signal space, and null regions between the main beam and the sidebands. Of course, it will be appreciated that more complicated beam patterns may be employed having several sidebands and null regions.

In accordance with one embodiment of the invention, the null regions of beams A and B are positioned in the direction of each of the interfering transceivers (e.g., transceivers operating on the same tone set and/or code as the intended transceiver). Thus, as depicted in FIG. 13, while beam A is directed towards remote A (since remote A is the intended receiver) the null of beam A is directed towards remote B (since remote B is an interferer). Similarly, beam B is directed towards remote B (since remote B is the intended receiver) while the null of beam B is directed towards remote A (since remote A is an interferer). A similar weighting scheme is observed when the remotes are transmitting and the base station is receiving. The same null-steering principle also may be applied to reduce the interference due to neighboring base stations.

It should be noted here that multi-path reflectors may also be treated as interfering signal sources so that null regions can be positioned to null out signals from these reflectors. However, in one embodiment, if the reflectors are not significantly time varying, the reflected interferers are not nulled. Rather the reflected signals are advantageously phase shifted to provide constructive interference so that the SINR is increased.

The null resolution (i.e., the closeness in degrees of the nulls) which the antenna arrays are capable of providing is dependent upon several factors. Two main factors are the spacing of the antenna sensor elements and the S/N ratio of the incoming signal. For instance, if the aperture size is sufficiently large (e.g., if the sensor elements are sufficiently far apart) then a better null resolution will result. Also, if the S/N ratio of the received signal of interest is high enough, then the signal of interest could actually be placed partially within a null (so that some gain of the signal is lost, but the overall ratio between the gain null on the interferer and the gain null on the signal of interest allows for effective cancellation of the interferer and detection of the signal of interest). For example, if 15 dB of gain is necessary to close the link for a given channel, and the S/N ratio of the signal of interest is 30 dB, while the S/N ratio of the interferer is 60 dB, then if a null of −70 dB is placed on the interferer, while the signal of interest is in the same null at about −15 dB, then the interferer will have a net −10 dB gain and the signal of interest will have a net 15 dB gain so that the interferer is canceled and the link is closed. Thus, a higher S/N ratio allows the nulls to be placed closer to the signals of interest so that a higher null resolution is achieved. It should be noted here that, in accordance with one advantageous embodiment of the invention, the depth of a given null is proportional to the strength of the interferer that is to be canceled. In addition, due to the frequency diversity provided by the system, nulls can be positioned relatively close to each other if the steering vectors (associated with the code weights) of two interfering remotes are sufficiently distinct to provide the necessary processing gain to close the communications link.

Figure 16:
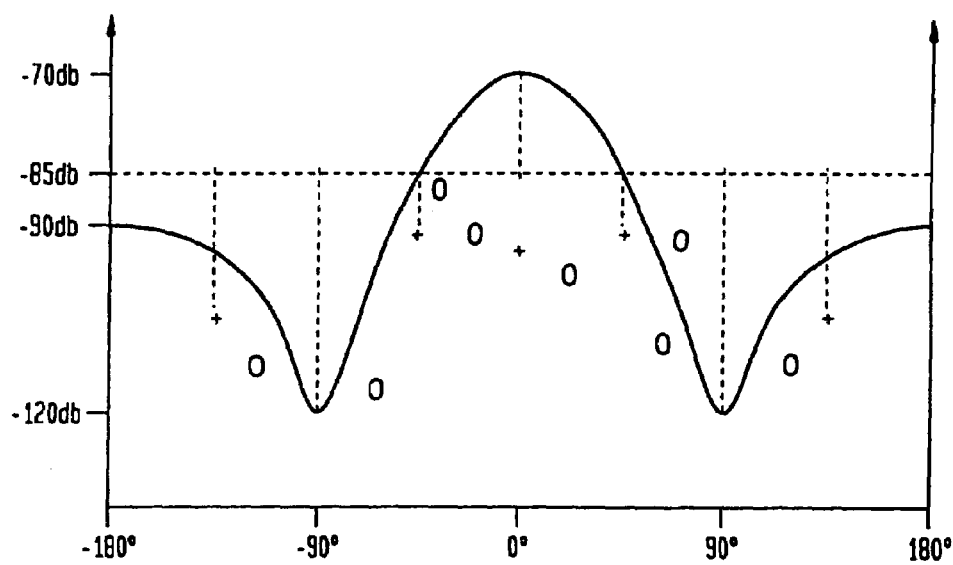
FIG. 16 is a plot of antenna gain versus angular direction.

In an alternate embodiment, the remote terminals also include directional antennas in one preferred embodiment so that the remote terminals are also capable of null steering. FIG. 16 is a graph plotting antenna gain (measured in decibels) versus direction (measured in degrees). A number of base stations are represented in FIG. 16 by crosses, while other remotes (having non-orthogonal codes) are represented by small circles.

In the worst case scenario, the remote is located equidistant from three base stations (i.e., on a vertex of a hexagonal spatial cell). This case is represented in FIG. 16 by the presence of three crosses that transmit with substantially equivalent signal strength. These base stations are shown at approximately 0, 90°, and −90° from the zero direction of the remote antenna.

Normally, each of the base stations would be received at the same level (i.e., at −85 dB) so that substantial interference would result between the three base stations when received at the remote. However, due to the beam forming weights applied by the directional antenna of the remote, the interfering base stations (i.e., the stations at ±90°) are attenuated by approximately 50 dB (i.e., 120 dB minus 70 dB) relative to the intended base station (i.e., the base station at 0°). Thus, due to the fact that the beam from the receiving remote antenna is formed to have maximum gain at the intended base station, and to have minimum gain (nulls) at the strongest interfering base stations, the remote terminals are able to more easily discriminate between the signal of interest and interfering signals. That is, by means of beam forming and null-steering employed at the remote terminals a much higher signal-to-interference plus noise ratio (SINR) can be obtained in much the same manner as with the base stations.

It should be noted here that the remote terminals may also employ code nulling. In an alternate embodiment, initial code nulling weights are calculated within the base station and transmitted to the remote terminals. The remote terminals subsequently adapt the transmitted weights to maximize the SINR as required by the particular interference environment of each remote. By calculating the initial weights and sending these to the remote terminals, much of the intensive calculations need not be performed within the remotes. Thus, the remote terminals can be made more cost effectively.

In one aspect of the invention—referred to as "retrodirectivity"—the base stations adapt the spreading and despreading weights used within the base stations for transmitting and receiving signals in order to maximize the overall SINR within the communications network 100. In an alternate embodiment, this may be performed, for example, by monitoring the average bit error rate (BER) throughout the communication network 100 and modifying the spreading weights at each of the base stations, as well as each of the remote terminals, to decrease the BER.

Despread Weight Adaptation Algorithm

In one embodiment of the present invention, during the traffic establishment phase, a series of pilot tones having known amplitudes and phases, are transmitted over the entire frequency spectrum. The pilot tones are at a known level (e.g., 0 dB), and are spaced apart by approximately 30 KHz to provide an accurate representation of the channel response (i.e., the amplitude and phase distortion introduced by the communication channel characteristics) over the entire transmission band. To compensate for the channel distortion, a complex inverse (having an amplitude component and a phase component) of the channel response is calculated and multiplied by the incoming signals. This initializes the weights during the traffic establishment phase.

In certain cases, where the channel induced fade is too deep to provide an adequate signal-to-noise ratio, the tone clusters where these deep nulls occur are excised (i.e., discarded so as to not factor into the signal during despreading).

Since the channel response varies over time, the set of complex conjugate compensation weights are periodically recalculated to insure an accurate channel estimation.

Another method of channel equalization involves equalizing the channel effects (due, for example, to noise and known interferers) by data directed methods. That is, rather than transmitting a known training signal (such as a set of pilot tones), weights are applied to the received signal so as to detect a selected property of the data signal. For example, if a PSK modulation technique is used on the data, a constant power modulus is expected in the received signal. Alternately, in a QAM signal, the data will be detected in an amplitude-phase signal constellation plane to have substantially concentric rings. Thus, if the channel is equalized in such a manner as to obtain the desired signal characteristics, there is a high probability that the transmitted symbols will be accurately decoded at the receiver. This general techniques is referred to as a property restoral technique. In one embodiment of the invention the property that is restored is the finite alphabet of the QAM or M-PSK symbol.

Of course, it will be appreciated by those skilled in the art that although the channel equalization method used in accordance with the invention is conceptually separable from other signal weighting and decoding methods of the present invention (discussed below), the channel equalization method may implicitly include multiple cancellation and despreading methods. Therefore, the adaptive channel equalization method of the present invention used to maximize the SINR should not be considered as a separate method from the additional methods described below that refer to interference cancellation and signal despreading and decoding methods. Rather, the adaptive channel equalization method of the present invention should be understood to encompass a plurality of the below described methods.

Reciprocity and Retrodirectivity

TDD is particularly advantageous in the practice of this invention since with the use of TDD the linear weighting coefficients used to compensate for channel interference during transmission and reception of the encoded signals need not be re-calculated within a station. The short time duration between transmission and reception by the base station, the fact that the transmission and reception occurs in the same frequency band and only slightly separated in time (TDD), and the fact that the remote access terminals are stationary with respect to the base stations assures that the channel is approximately reciprocal. That is, the properties of the air channel between the base and the remote terminals (i.e., those properties that introduce distortion in the transmitted signal) are substantially the same for both reception and transmission. Thus, substantially the same weights can be used at a station for both despreading a signal at reception and for spreading a signal at transmission. In accordance with this retrodirectivity principle, the base station can perform most of the computation for transmission spreading weights when it computes the despreading weights on reception. The transmission spreading weights are merely scalar multiples of the reception despreading weights. Similarly, in accordance with this retrodirectivity principle, the remote station can perform most of the computation for its transmission spreading weights when it computes its despreading weights on reception.

In an alternate embodiment of the invention, the base station can transmit the weights to the remote stations to be used in the next reception at the remote station. In this manner, processing is reduced within the remote stations since a large portion of the intensive calculations are performed solely within the base station. Thus, instead of being prohibitively sophisticated, the remote terminals can be made at a suitable size and at a reasonable expense.

Because each remote terminal stands in a different spatial relation to the other remotes and bases within the communications network, each remote terminal advantageously uses equalization weights that are individually set to maximize the SINR of signals transmitted to and received from the base station to which the remote is assigned. This may be accomplished in different ways. For instance, the base station may pre-emphasize the signals sent to the remote by a calculated set of weights. Since the pre-emphasis approximately compensates for channel distortion, the remote need not perform weight adjustment calculations that are as intensive as those calculated by the base station. Thus, the remotes need not include prohibitively sophisticated processing circuitry to implement this feature of the invention.

In one aspect of the invention optimum transmit weights are calculated based on the signals received at the base station. This is called retrodirectivity. When retrodirective adaptive equalization is used to determine the set of weights used in both reception and transmission, network-wide retrodirective adaptive equalization is accomplished. Thus, the channel characteristics throughout the entire system are accounted for in accordance with this aspect of the present invention.

Of course, as with other aspects of the invention, it will be appreciated that the reciprocity and system-wide retrodirective aspects of the present invention may also have application in a mobile environment. Specifically, if the time duration between transmission and reception in the TDD system is made sufficiently small, the channel may also be reciprocal for mobile transceivers so that the same principles set forth above apply in the mobile environment.

Zone Control

In a particularly preferred embodiment of the invention, a zone controller could be used to minimize the risk of interference between remote terminals that are near one another in adjacent spatial cells. According to this aspect of the invention, the zone controller is informed of the locations of each of the remotes and base stations within an assigned zone. Those remote terminals that are likely to interfere are assigned different codes and tone sets to minimize the risk of interference.

Bandwidth-on-Demand

Figure 17:
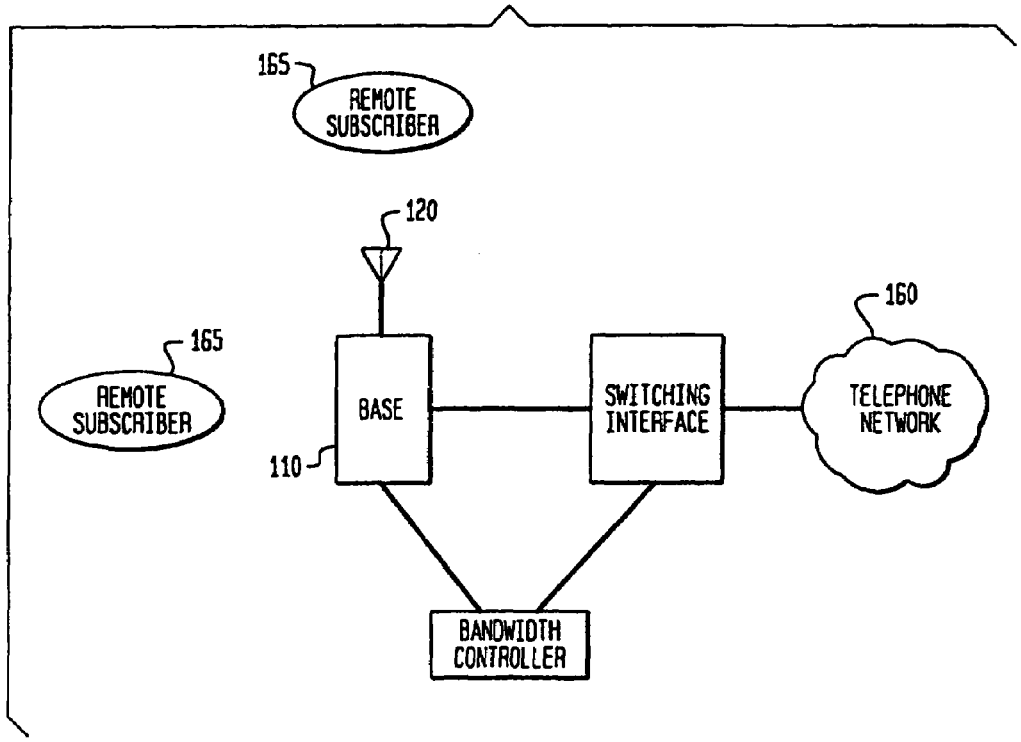
FIG. 17 is a highly simplified block diagram that illustrates one particular application of the highly bandwidth-efficient communications network of the present invention.

In accordance with one aspect of the present invention, bi-directional communication is established between multiple remote user units and a telephone network via the high-bandwidth base station on a user-by-user basis. Each remote user unit upon activation, initiates communication with the high-bandwidth base station by indicating to one of the remote terminals, included within the remote user unit, the amount of bandwidth desired by the remote user unit. The remote terminals communicate with the base station via a control channel through the air (i.e., the airlink). The high-bandwidth base station then sends information concerning the requested bandwidth to a central bandwidth controller, shown in FIG. 17, that determines whether or not the requested bandwidth can be allocated to the requesting remote user unit. In this manner, bandwidth is dynamically allocated based upon the type of user unit and the kind of data that is to be transmitted. As indicated above varying amounts of bandwidth may be assigned by allocating additional tone sets to the requesting user.

A Specific Embodiment of the Invention

The following description is a specific embodiment of the invention that includes many aspects of the description provided above. However, it should not be interpreted to limited the scope of the invention in any way Frequency Definitions The total bandwidth allocation for the airlink of this specific embodiment of the invention is 10 MHz in the range of 1850 to 1990 MHz. The total bandwidth is divided into two 5 MHz bands called the lower RF band and the upper RF band. The separation between the lowest frequency in the lower RF band and the lowest frequency in the upper RF band (DF) is 80 MHz. The base frequency ($f_{base}$) for this embodiment is defined as the lowest frequency of the lower RF band. FIG. 18 shows the possible operational bands for this embodiment.

Figure 19:
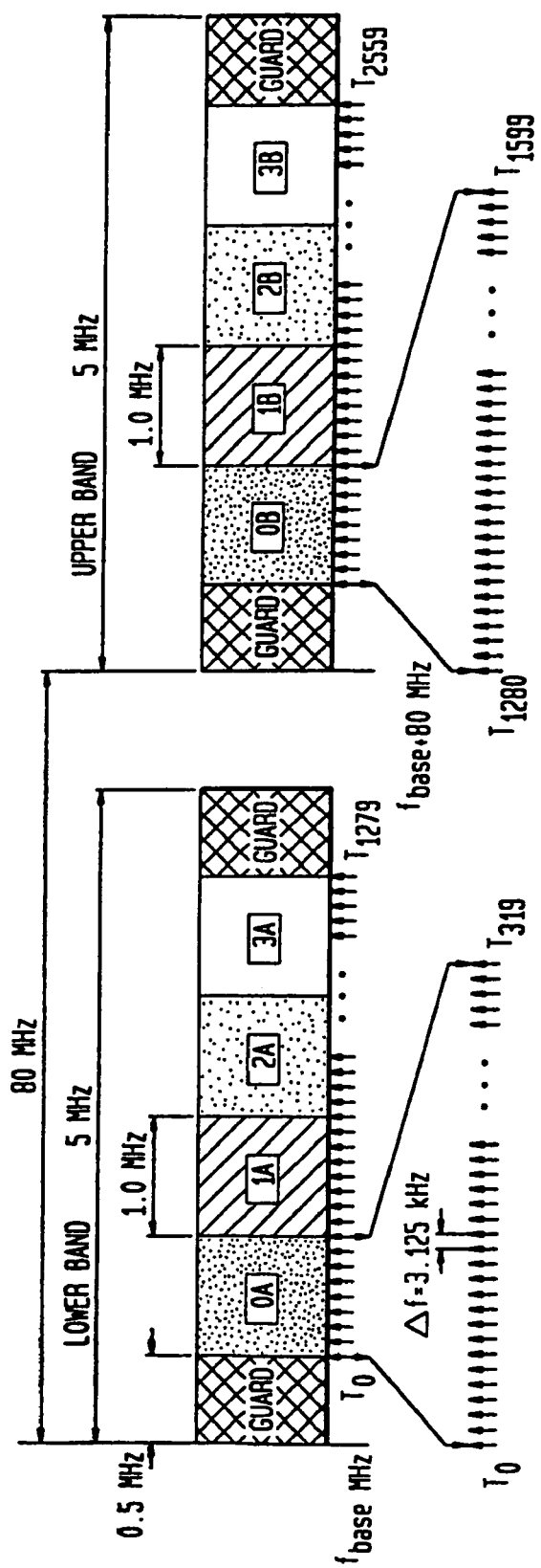
FIG. 19 shows the RF Band/Sub-band organization of the airlink of a specific embodiment of the invention.

The lower and upper RF bands are further subdivided into sub-bands as shown in FIG. 19. The first and last 0.5 MHz of each RF band are designated as guard bands and are hence unused. The remaining 4 MHz in each RF band is subdivided into four sub-bands sequentially numbered from 0 to 3. Furthermore, the suffix "A" indicates a sub-band within the lower RF band and "B" indicates a sub-band within the upper RF band. The sub-bands are paired with each sub-band pair containing one sub-band from the lower RF band and another from the upper RF band.

There are a total of 2560 tones (carriers) equally spaced in the 8 MHz of available bandwidth. There are 1280 tones in each band. The spacing between the tones (Df) is thus MHz divided by 1280, or 3.125 kHz.

Figures 20, 21:
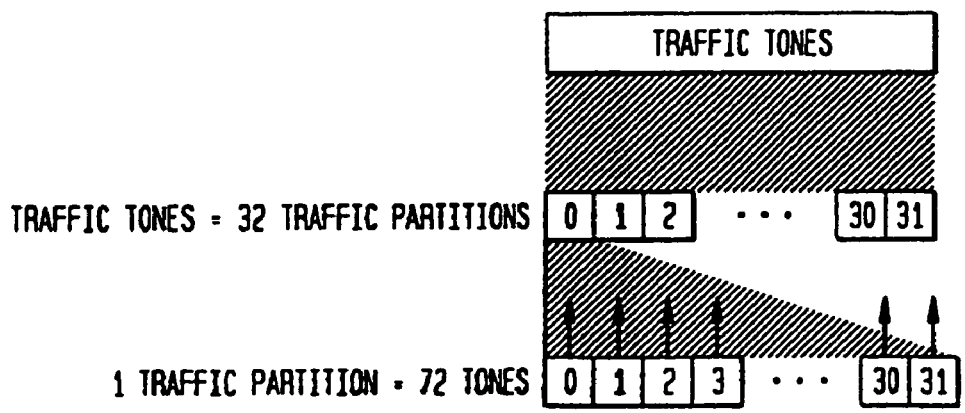
FIG. 20 shows the tones within each sub-band of a specific embodiment of the invention
FIG. 21 shows the traffic partitions in a specific embodiment of the invention

The total set of tones are numbered consecutively form 0 to 2559 starting from the lowest frequency tone. $T_i$ is the frequency of the ith tone:

$T_i = f_{base} + f_{guard} + Df/2 + (i)(Df)$ for $0 \leq i \leq 1279$ $T_i = f_{base} + DF + f_{guard} + Df/2 + (i)(Df)$ for $1280 \leq i \leq 2559$ where $f_{base}$ is the base frequency defined in Table 2.3, $f_{guard}$ is 0.5 MHz, Df is 3.125 kHz, and DF is 80 MHz. Equivalently, the relationship may be expressed as:

$T_i = f_{base} + 500 + (i + \frac{1}{2})(3.125 \text{ kHz})$ for $0 \leq i \leq 1279$ $T_i = f_{base} + 80500 + (i + \frac{1}{2})(3.125 \text{ kHz})$ for $1280 \leq i \leq 2559$ Each sub-band pair contains 640 tones (320 frequencies in the lower band, and 320 in the upper band). The mapping of tones to each sub-band is shown in FIG. 20. The set of 2560 tones is the tone space. The tones in the tone space are used to transmit two types of data: traffic data and overhead data. The tones used for transmission of traffic are the traffic tones, and the rest are the overhead tones.

In an alternate embodiment of the invention, the tones can be distributed over three or four sub-bands that are separated by large frequency gaps, to increase immunity from interference or fading that may occur in any one of the sub-bands.

Traffic Tones

The traffic tones are divided into 32 traffic partitions denoted by $P_0$ to $P_{31}$. (In this embodiment a traffic channel requires at least one traffic partition.) Each traffic partition contains 72 tones as shown in FIG. 21. Tone mapping into the ith traffic partition ($P_i$) is shown in Table 2.5.

Overhead Tones

The overhead tones are used for the following channels

Forward Channels:

The Common Link Channel (CLC) used by the base to transmit control information to the Remote Units;

The Broadcast Channel (BRC) used to transmit broadcast information from the Base to all Remote Units; and The Remote Unit Synchronization Channel (RSC) used by the base, for example, to transmit pilot signals, frame synchronization information.

Reverse Channels:

The Common Access Channels (CACs) is used to transmit messages from the Remote Unit to the Base; and The Delay Compensation Channel (DCC) used to adjust a Remote Units TDD timing.

For each sub-band pair, there is one grouping of tones assigned to each channel. These groups of tones are referred to by the name of their channels and their sub-band pair index (0, 1, 2, or 3). For instance, the CLC channel in sub-band pair 2 is denoted by $CLC_2$.

There are two different CACs in each sub-band pair: $CAC_{i,0}$, and $CAC_{i,1}$, where i is the sub-band pair index. The two channels may be used as either solicited (SCAC) or unsolicited (UCAC). The allocation of tones to each of these channels for the ith sub-band pair is shown in FIG. 23. Indices are provided for all tones within a given channel. The absolute tone index within the tone space can be determined by the relationships shown in FIG. 23. For instance:

For the forward channel, the 13th tone in the CLC channel in sub-band pair 2, is denoted by $CLC_2(13)$ and its absolute tone index is:

$LC_2(13) = T_{320 \cdot 2 + 1460} = T_{2100}$

For the reverse channel, the 13th tone in the first CAC channel in sub-band pair 2, is denoted by $CAC_{2,0}(13)$ and its absolute tone index is the same as above.

Figure 24:
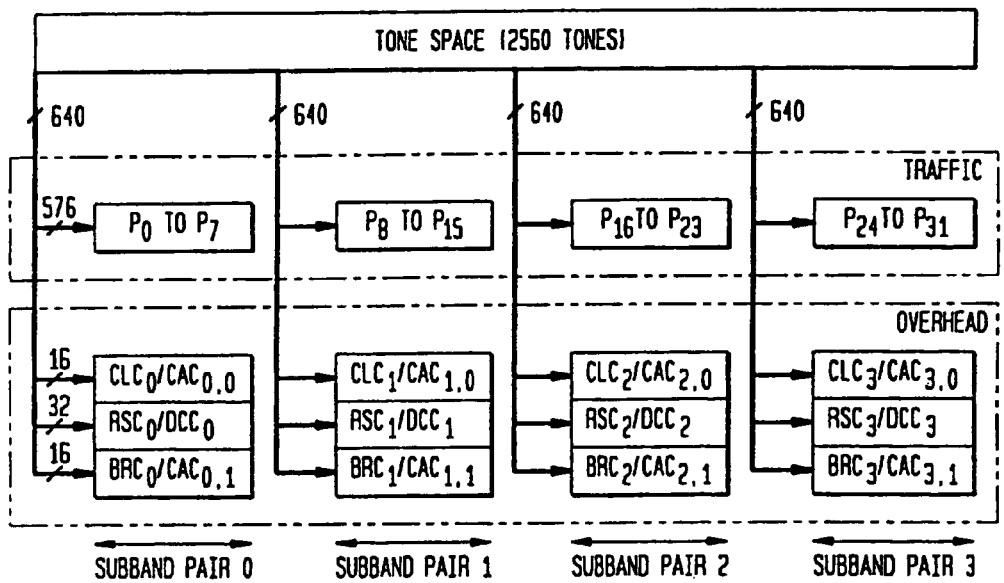
FIG. 24 shows the Division of Tone Space to Traffic and Overhead Tones

FIG. 24 provides a pictorial representation of the division of the tone spaces into different tone groupings Time Definitions TDD is used by Base and the Remote Unit to transmit data and control information in both directions over the same frequency channel. Transmission from the Base to the Remote Unit are called forward transmissions, and from the Remote Unit to the Base are called reverse transmissions.

Figure 25:
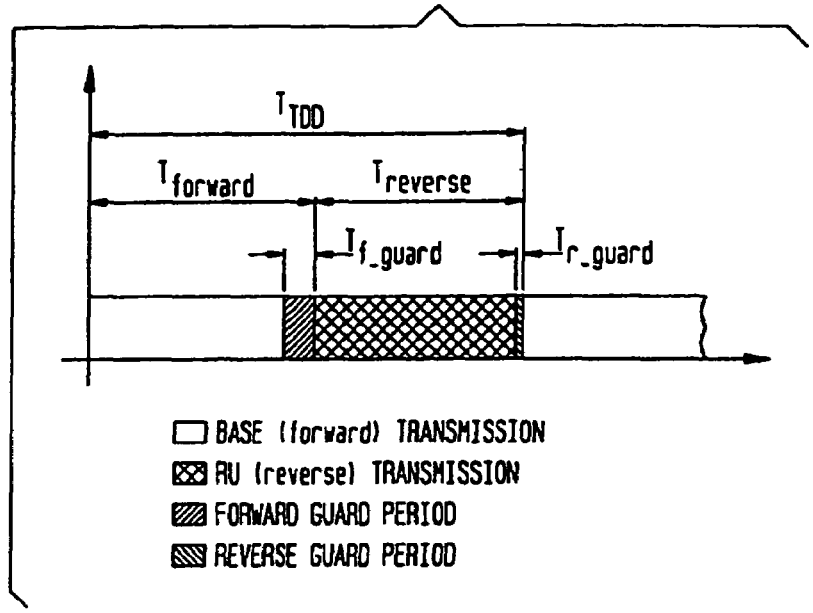
FIG. 25 shows the time Division Duplex format for Base and Remote Unit Transmissions

As shown in FIG. 25, the duration of a forward transmission is $T_{forward}$, and the duration of a reverse transmission is $T_{reverse}$. The time between recurrent transmissions from either the Remote Unit or the Base is TTD, the TDD period. A guard period of duration $T_{f\text{-}guard}$ is inserted between the forward and reverse transmissions, and a guard period of duration $T_{r\text{-}guard}$ is inserted between the reverse and forward transmissions.

Figure 26:
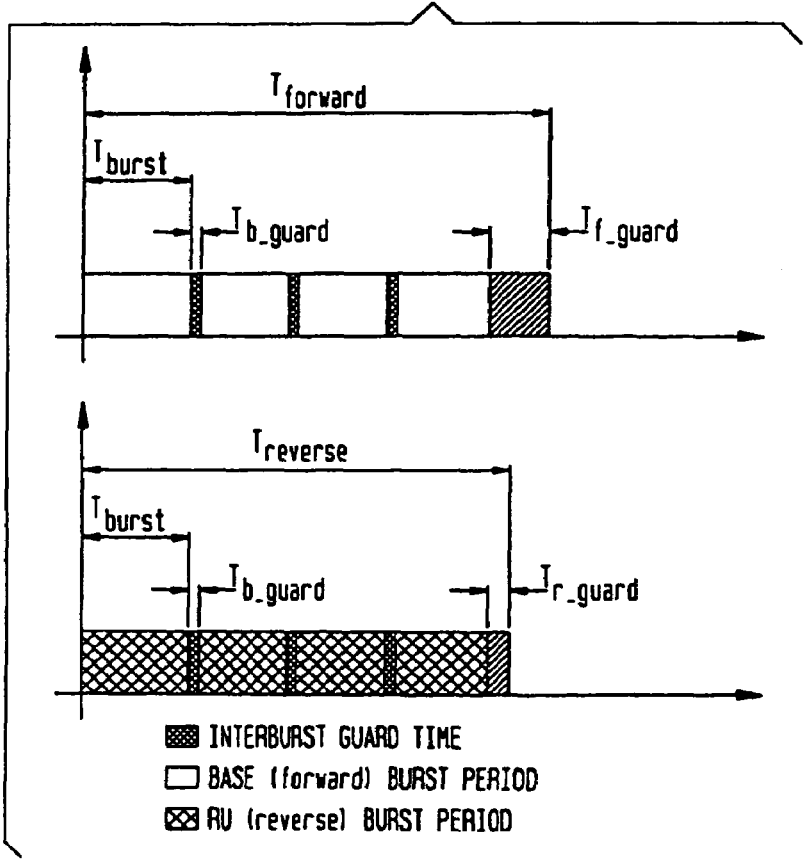
FIG. 26 shows Details of the Forward and Reverse Channel Time Parameters
Figures 27, 28:
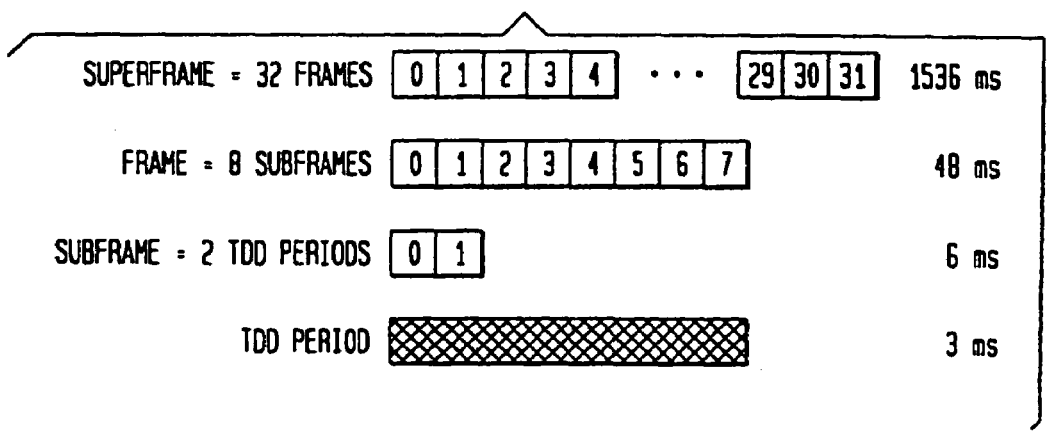
FIG. 27 shows the TDD Parameter Values
FIG. 28 shows the Physical Layer Framing Structure

As shown in FIG. 26, in every TDD period, there are four consecutive transmission bursts in each direction. Data is transmitted in each burst using multiple tones. The burst duration is $T_{burst}$. A guard period of duration $T_{b\text{-}guard}$ is inserted between each burst. FIG. 27 shows the values of the TDD parameters.

In addition to synchronizing and conforming to the TDD structure defined in the last section, both the Base and the Remote Unit must synchronize to the framing structure. The framing structure is shown in FIG. 28. The smallest unit of time shown in this figure is a TDD period. Two TDD periods make a subframe, eight subframes make a frame, and 32 frames make a superframe.

Frame synchronization is performed at the superframe level. The frame and subframe boundaries are determined from the superframe boundary.

Figure 29:
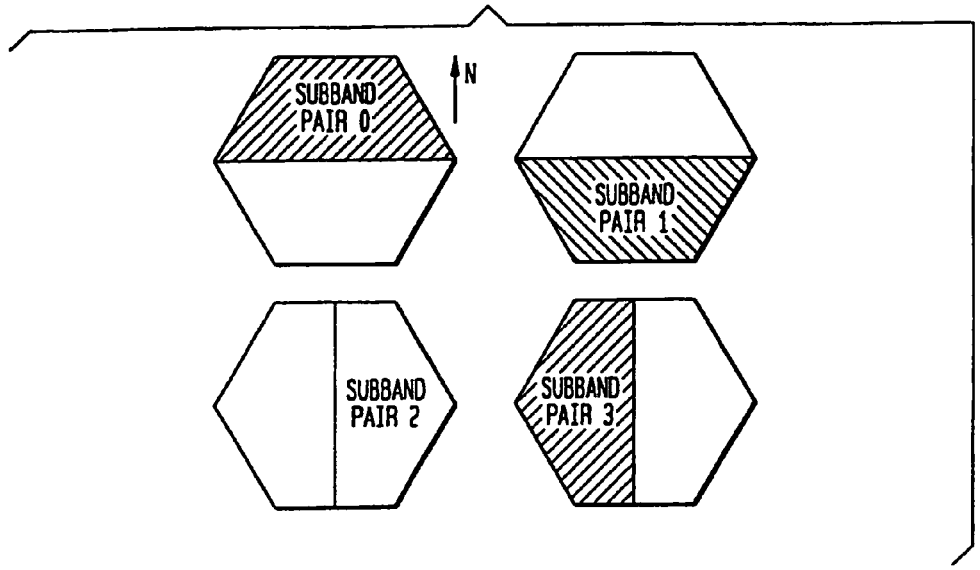
FIG. 29 shows the Phase A Sub-band Pair Assignment Within a Spatial cell
Figure 30:
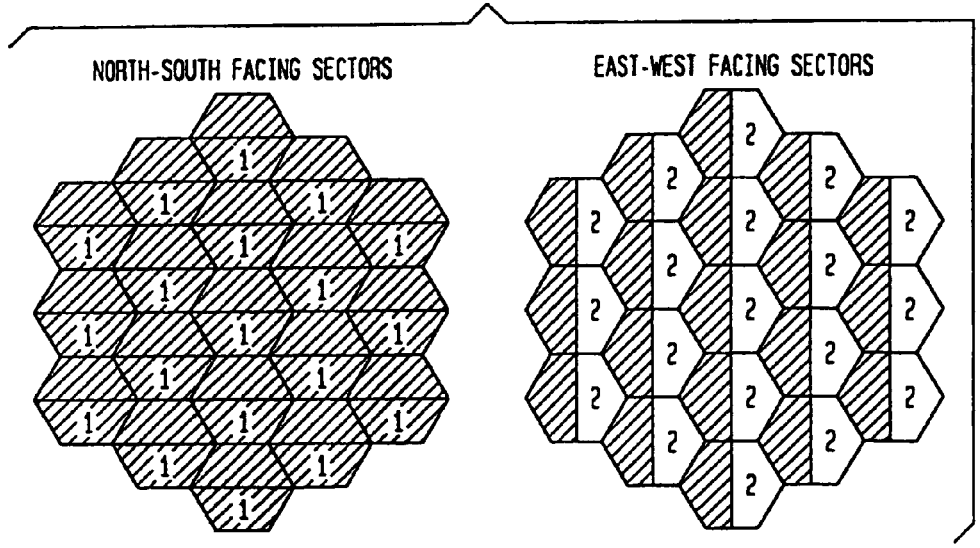
FIG. 30 shows the Phase-A Sub-band Pair Assignment Across Spatial cells

In this embodiment we could potentially reuse all available frequencies in every spatial cell. However, initially a reuse factor of 2 is used. Each Remote Unit is assigned to a Sub-band Pair depending on its location within the spatial cell and the traffic loading of the Sub-band Pair. As shown in FIG. 29 each Remote Unit may be assigned two of the four sub-band pairs depending on its location. For example, an Remote Unit in the north-eastern part of the spatial cell in FIG. 29 can be assigned Sub-band Pair 0 or Sub-band Pair 2. Of course this reuse strategy reduces capacity to half of the maximum potential capacity. The same Sub-band Pair assignment is used in all spatial cells as shown in FIG. 30.

Forward Channel Format

The physical layer has three possible implementations based on the desired range (or quality) of transmission. The physical layer manages the trade-offs between bandwidth efficiency (bits/symbol) and transmission coverage by providing three modes of operation:

High capacity mode (short range): 3 bits/symbol
Medium capacity mode (medium range): 2 bits/symbol
Low capacity mode (long range): 1 bits/symbol Each mode employs different details in the coded modulation scheme and, hence, somewhat different formats. Nevertheless, there is abundant symmetry, redundancy, and common elements for the three modes.

High Capacity Mode

Figure 31:
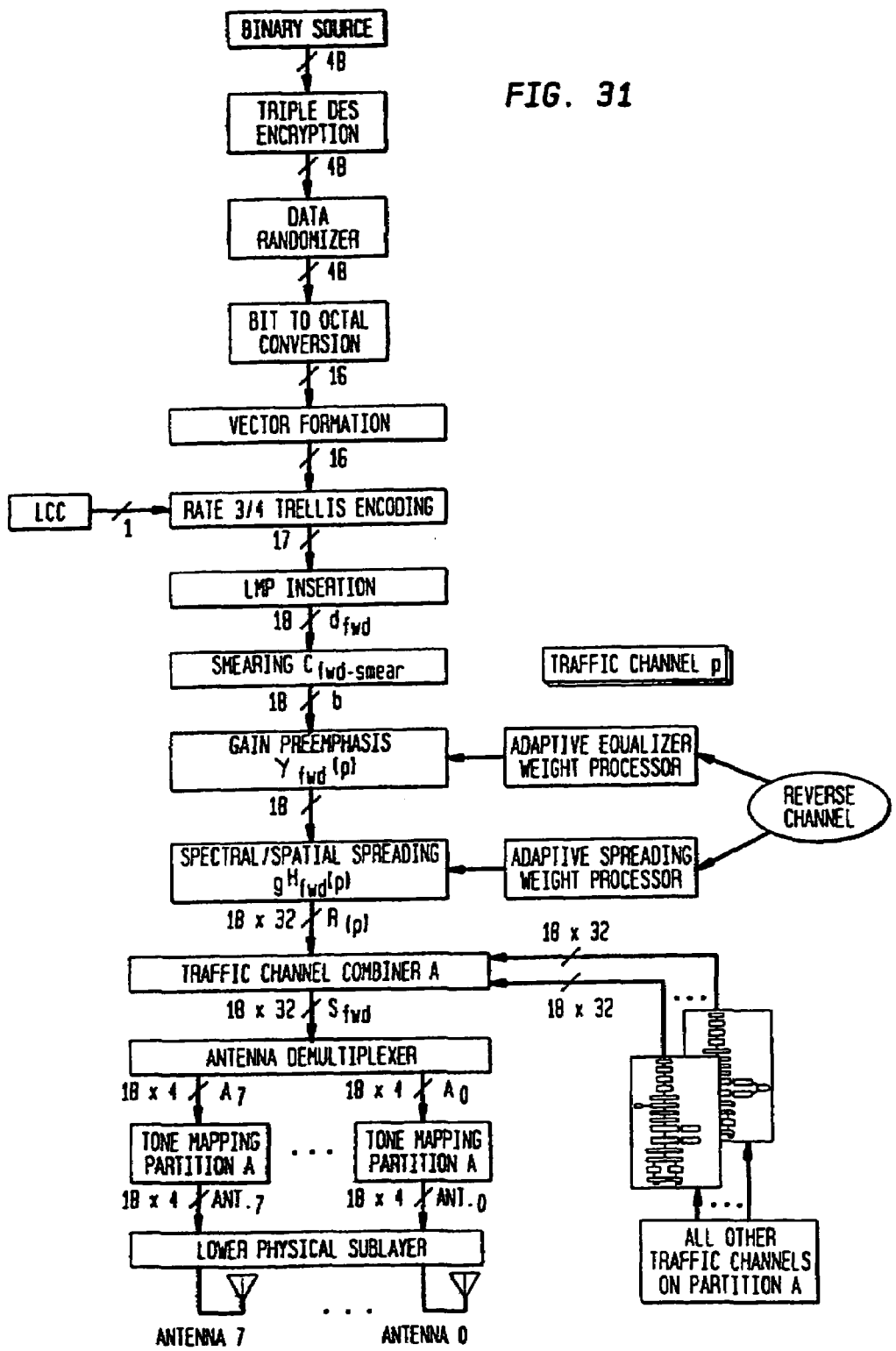
FIG. 31 is a Functional Block Diagram for the Upper Physical Layer of Base Transmitter for High Capacity Mode

In high capacity mode, one traffic partition is used in one traffic channel. In medium and low capacity modes, two and three traffic partitions are used, respectively. The Base transmits information to multiple Remote Units in its spatial cell. This section describes the transmission formats for a 64 kbits/sec traffic channel, together with a 4 kbps Link Control Channel (LCC) from the Base to a single Remote Unit. The block diagram for the upper physical layer of the Base transmitter for high capacity mode is shown in FIG. 31, which shows data processing for one forward channel burst. (The boundary between the upper and the lower physical layers is where the baseband signals are translated into frequency tones. The lower physical layer can then be regarded as the common element of the various modes and directions of transmission.) The large shaded area shows the processing required for one traffic channel at the Base. The remainder of the diagram shows how various traffic channels are combined. The details of each block in the diagram are discussed throughout this section.

The binary source delivers data to the Base transmitter at 64 kbits/sec. This translates to 48 bits in one forward transmission burst.

The information bits are encrypted according to the triple data encryption standard (DES) algorithm.

The encrypted bits are then randomized in the data randomization block. The bit to octal conversion block converts the randomized binary sequence into a sequence of 3-bit symbols. The symbol sequence is converted into 16 symbol vectors. (In this description, the term vector generally refers to a column vector. A vector is generally complex unless otherwise stated. Generally, column vectors are denoted by bold lower-case characters, while row vectors are denoted by the same characters with a transpose operation, denoted by a superscript T. Another widely used vector form used here is a conjugate transpose vector referred to here as Hermetian.) One symbol from the LCC is added to form a vector of 17 symbols.

The 17-symbol vector is trellis encoded. The trellis encoding starts with the most significant symbol (first element of the vector) and is continued sequentially until the last element of the vector (the LCC symbol). This process employs convolutional encoding that converts the input symbol (an integer between 0 and 7) to another symbol (between 0 and 15) and maps the encoded symbol to its corresponding 16QAM (or 16PSK) signal constellation point. The output of the trellis encoder is therefore a vector of 17 elements where each element is signal within the set of 16 QAM (or 16PSK) constellation signals. (The term signal will generally refer to a signal constellation point.)

A link maintenance pilot signal (LMP) is added to form an 18-signal vector, with the LMP as the first elements of the vector. The resulting (18×1) vector $d_{fwd}$ is pre-multiplied by a (18×18) forward smearing matrix $C_{fwd\text{-}smear}$ to yield a (18×1) vector b.

Vector b is element-wise multiplied by the (18×1) gain preemphasis vector $g_{fwd}(p)$ to yield another (18×1) vector, c, where p denotes the traffic channel index and is an integer in the range [0, $M_{base}$] where $M_{base}$ is the maximum number of traffic channels that can simultaneously be carried over one traffic partition. Vector c is post-multiplied by a (1×32) forward spatial and spectral spreading vector $g^H_{fwd}(p)$ to yield a (18×32) matrix R(p). The number 32 results from multiplying the spectral spreading factor 4 and spatial spreading factor 8. The 18×32 matrices corresponding to all traffic channels carried (on the same traffic partition) are then combined (added) to produce the resulting 18×32 matrix $S_{fwd}$.

The matrix Sfwd is partitioned (by groups of four columns) into eight (18×4) submatrices ($A_0$ to $A_7$. (The indices 0 to 7, corresponds to the antenna elements over which these symbols will eventually be transmitted.) Each submatrix is mapped to tones within one traffic partition (denoted by partition A in FIG. 31) according to the mapping discussed in FIG. 22 and sent to the lower physical layer.

The lower physical layer places the baseband signals in discrete Fourier transfer (DFT) frequency bins where the data is converted into the time domain and sent to its corresponding antenna elements (0 to 7) for transmission over the air. The details of the lower physical layer are discussed below.

Figure 32:
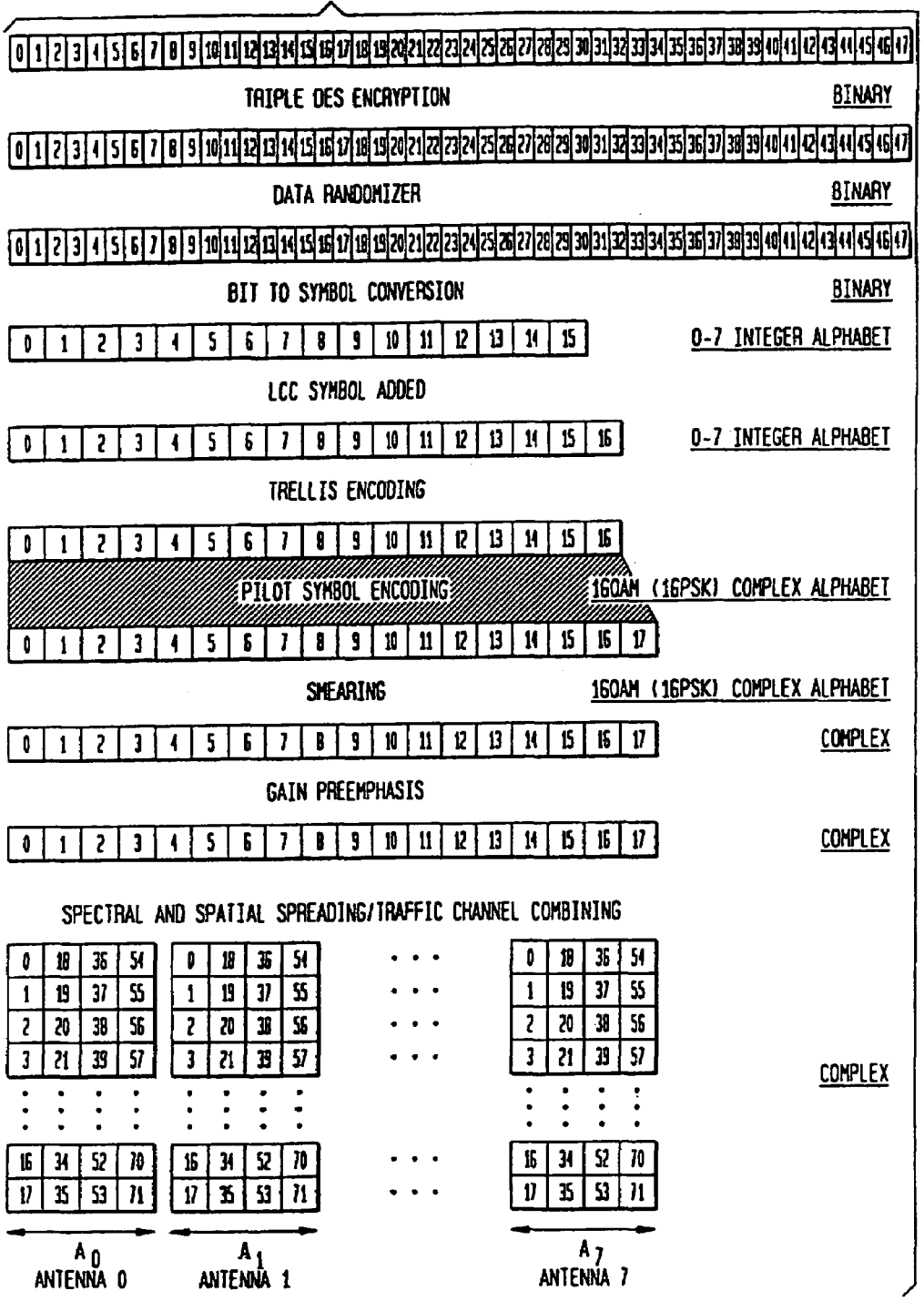
FIG. 32 is a Data Transformation Diagram for the High Capacity Forward Channel Transmissions

This process is repeated from the start for the next 48 bits of binary data to be transmitted in the next forward transmission burst. The various steps in the transformation of binary data are shown in FIG. 32. To keep the diagram simple, the spreading and traffic channel combiner functions are shown in one step.

Medium Capacity Mode

Figure 33:
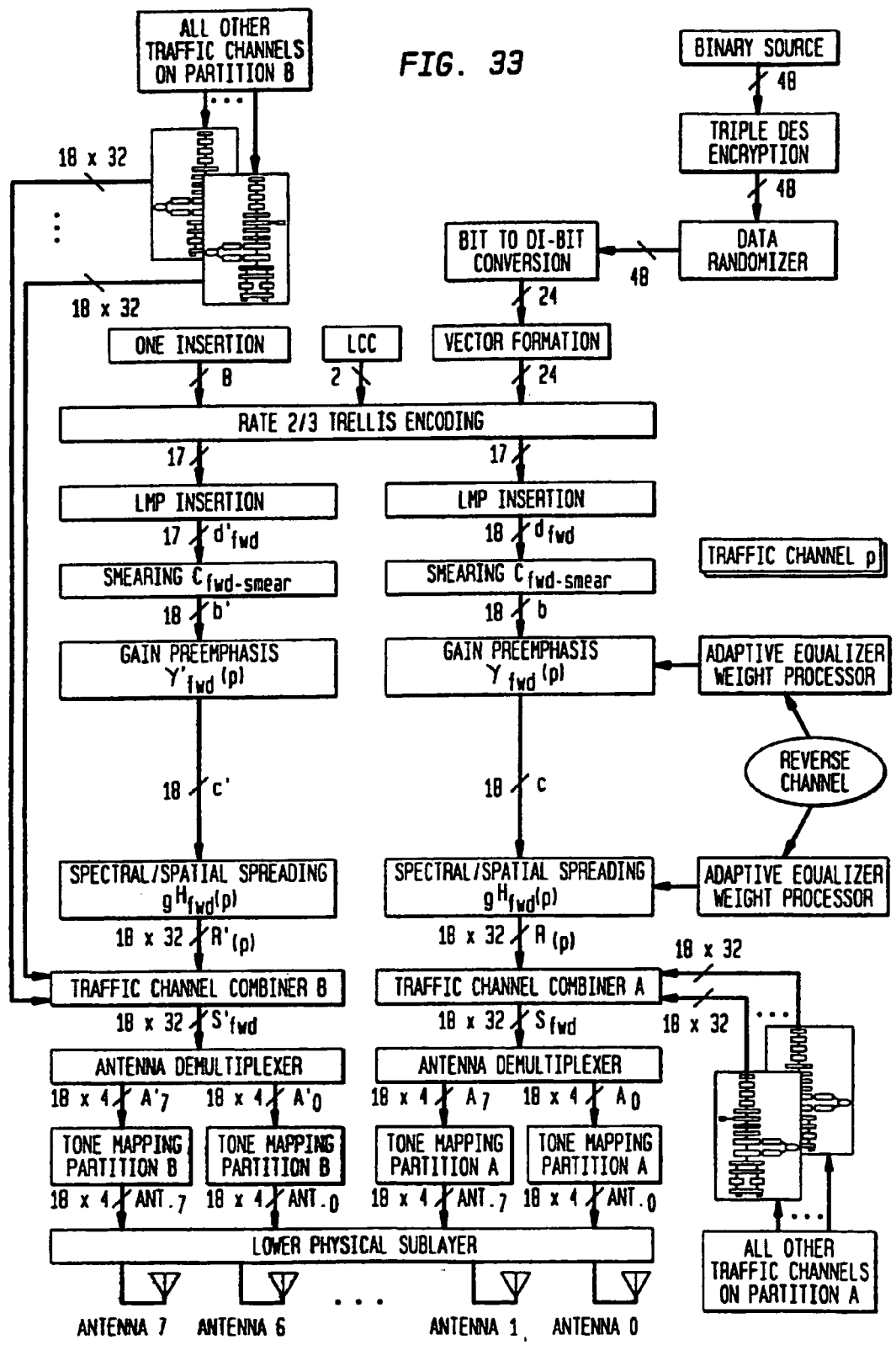
FIG. 33 is a Functional Block Diagram for the Upper Physical Layer of Base Transmitter for Medium Capacity Mode

The block diagram for the upper physical layer of the Base transmitter for the medium capacity mode is shown in FIG. 33. The primary difference between the transmission formats for high and medium capacity modes is the use of different trellis encoding schemes. In medium capacity mode, an 8QAM (or 8PSK) rate 2/3 trellis encoder (compared to a 16QAM or 16PSK rate 3/4 bits in one forward transmission burst, two traffic partitions (A and B) are used.

The binary source delivers binary data to the Base transmitter at 64 kbits/sec. For one forward channel burst, this translates to 48 bits. The information bits are encrypted according to the triple DES algorithm. The encrypted bits are then randomized in the data randomization block. The bit to-bit conversion block converts the randomized binary sequence into a sequence of 2-bit symbols. The symbol sequence is converted into 24 symbol vectors. Two symbols from the LCC are added, and eight ones are inserted at the end of the sequence to form a vector of 34 symbols. (The two symbols for the LCC carry only three bits of LCC information. The least significant bit, LSB, of the second LCC symbol is always set to one.)

The 34-symbol vector is trellis encoded. The trellis encoding starts with the most significant symbol (first element of the vector) and is continued sequentially until the last element of the vector (the second LCC symbol). This process employs convolutional encoding that converts the input symbol (an integer between 0 and 3) to another symbol (between 0 and 7) and maps the encoded symbol to its corresponding 8 QAM (or 8PSK) signal constellation point. The output of the trellis encoder is therefore a vector of 34 elements where each element is a signal within a set of 8QAM (or 8PSK) constellation signals.

The 34-element vector is divided into two 17-element vectors. An LMP is added to each of the vectors to form two 18-element vectors $d_{fwd}$ and $d'_{fwd}$, where the LMP is the first element of these vectors. Each resulting vector is pre-multiplied by a (18×18) forward smearing matrix $C_{fwd-smear}$ yield another two (18×1) vector b and b'. Vectors b and b' are then element-wise multiplied by two (18×1) gain preemphasis vectors $g_{fwd}(p)$ and $g'_{fwd}(p)$ to yield two (18×1) vectors c and c', where p denotes the traffic channel index. Each vector is post-multiplied by its corresponding (1×32) Forward Spatial and Spectral spreading Vector ($g^H_{fwd}(P)$ or ($g'^H_{fwd}(p)$)) to yield two (18×32) matrices R(p) and R'(p).

The various 18×32 matrices corresponding to all traffic channels carried on traffic partition A are combined to produce the 18×32 matrix $S_{fwd}$. Similarly, matrices from those traffic channels carried on Traffic Partition B are combined to produce the 18×32 matrix $S'_{fwd}$.

Matrix $S_{fwd}$ is partitioned (by groups of four columns) into eight (18×4) submatrices ($A_0$ to $A_7$). Each submatrix is mapped into tones within partition A according to the mapping discussed in FIG. 22 and is sent to the lower physical layer. Similarly, matrix $S'_{fwd}$ is partitioned into eight (18×4) submatrices ($A'_0$ to $A'_7$). Each submatrix is mapped into tones with partition B according to the mapping discussed in FIG. 22 and is sent to the lower physical layer.

The lower physical layer places the baseband signals in DFT frequency bins where the data is converted into the time domain and sent to its corresponding antenna element (0 to 7) for transmission over the air.

Figure 34:
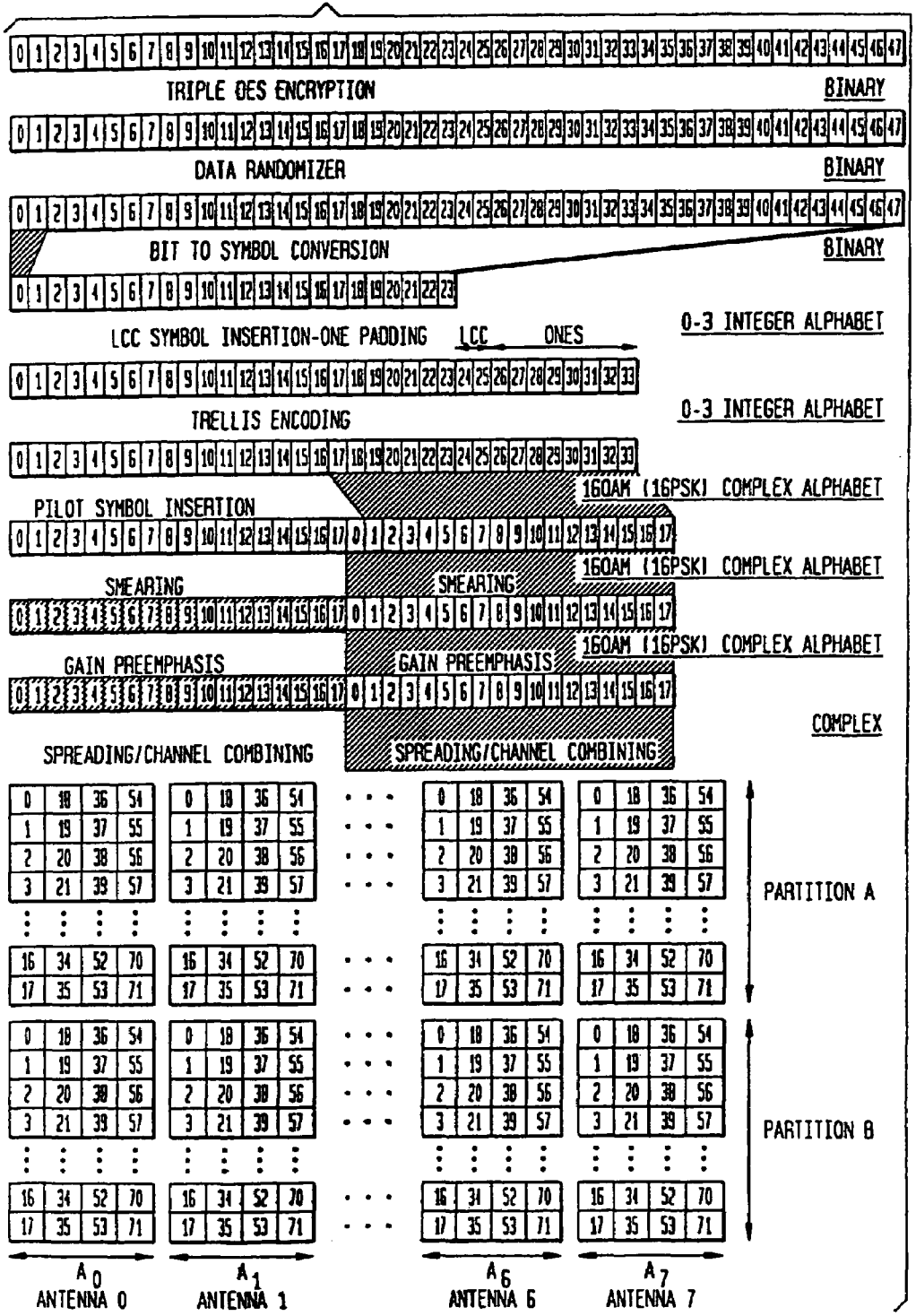
FIG. 34 is a Data Transformation Diagram for the Medium Capacity Forward Channel Transmissions

This process is repeated from the start for the next 48 bits of binary data to be transmitted in the next forward channel transmission burst. The various steps in the transformation of binary data are shown in FIG. 34. To keep the diagram simple, the spreading and traffic channel combiner functions are shown in one step.

Figure 35:
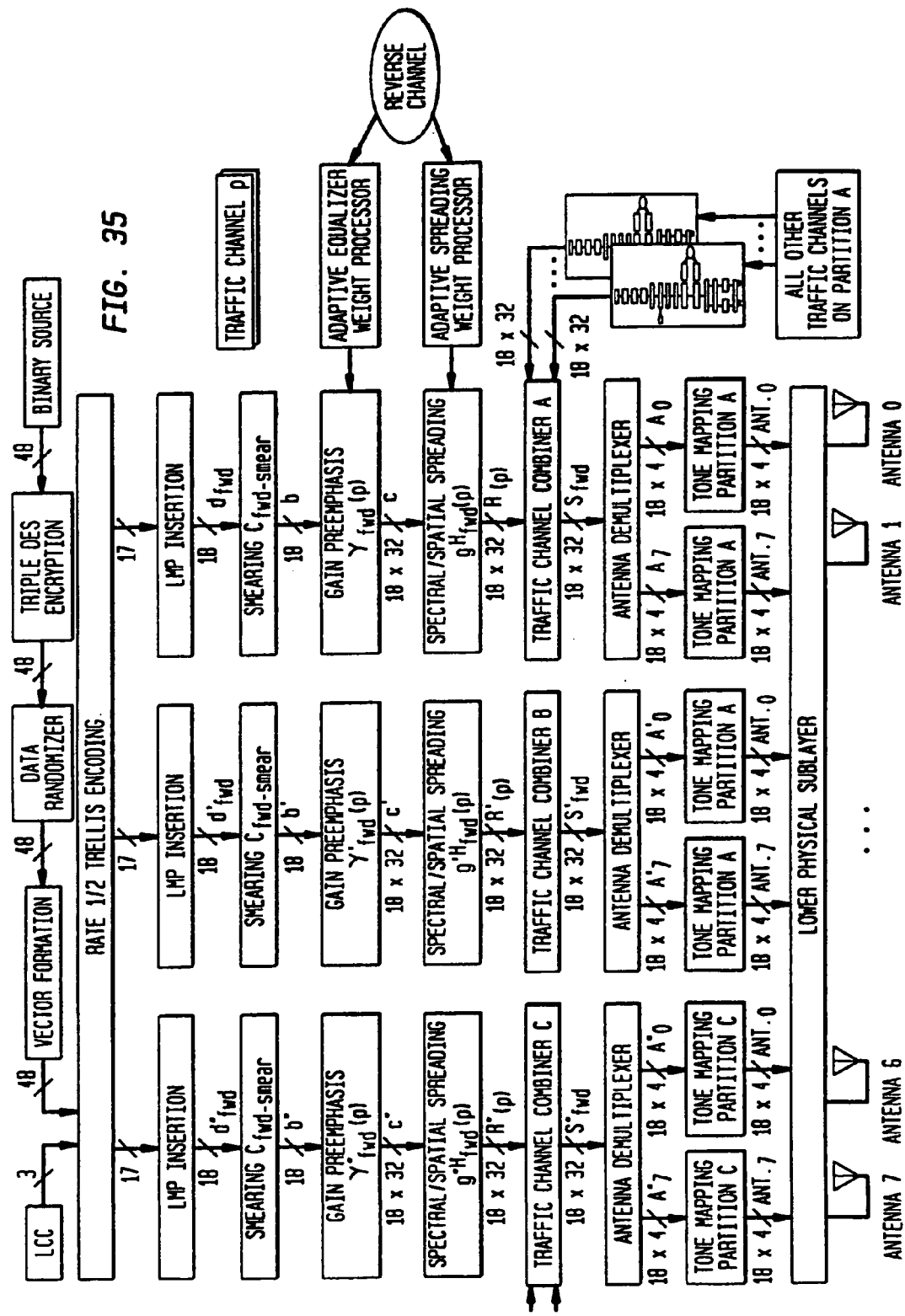
FIG. 35 is a Functional Block Diagram for the Upper Physical Layer of Base Transmitter for Low Capacity Mode

The block diagram for the upper physical layer of the Base transmitter for low capacity mode is shown in FIG. 35.

Low Capacity Mode

The primary difference between the transmission formats for high and low capacity modes is the use of different trellis encoding schemes. In low capacity mode, a rate 1/2 trellis encoder (compared to a rate 3/4 encoder for high capacity mode) is employed. To transmit 48 bits in one forward transmission burst, three Traffic Partitions (A, B, and C) are used.

The binary source delivers binary data to the Base transmitter at 64 kbits/sec. For one forward channel burst, this translates to 48 bits. The information bits are encrypted according to the Triple DES algorithm. The encrypted bits are then randomized in the data randomization block. The 48 bits are formed into a vector. Three symbols from the LCC are then added to form a vector of 51 symbols. The 51-symbol vector is trellis encoded. The trellis encoding starts with the most significant symbol (first element of the vector) and is continued sequentially until the last element of the vector (the third LCC symbol). This process employs convolutional encoding that converts the binary input symbol (0 or 1) to another symbol (0, 1, 2, or 3) and maps the encoded symbol to its corresponding QPSK signal constellation point. The output of the trellis encoder is therefore a vector of 51 elements where each element is a signal within the set of QPSK constellation signals.

The 51-element vector is divided into three 17-element vectors. An LMP is added to each of the vectors to form three 18-element vectors $d_{fwd}$, $d'_{fwd}$, and $d''_{fwd}$, where the LMP is the first element of these vectors. Each resulting vector is pre-multiplied by a (18×18) forward smearing matrix $C_{fwd-smear}$ to yield another three (18×1) vectors b, b', and b''. Vectors b, b', and b'' are then element-wise multiplied by their respective (18×1) gain preemphasis vectors $g_{fwd}(p)$, $g'_{fwd}(p)$, and g'' to yield three (18×1) vectors c, c', and c'', where p denotes the traffic channel index. Each vector is post-multiplied by its corresponding (1×32) forward spatial and spectral spreading vector ($g^H_{fwd}(p)$, $g'^H_{fwd}(p)$, or $H''^H_{fwd}(p)$) to yield three (18×32) matrices R(p), R'(p), and R'' (p).

The various 18×32 matrices corresponding to traffic channels carried on traffic partition A are combined to produce the 18×32 matrix $S_{fwd}$. Similarly, matrices from those traffic channels carried on traffic partitions B and C are combined to produce two 18×32 matrices, $S'_{fwd}$ and $S''_{fwd}$, respectively. Matrix $S_{fwd}$ is partitioned (by groups of four columns) into eight (18×4) submatrices (A0 to A7). Each submatrix is mapped into tones within partition A according to the mapping discussed in FIG. 22 and is sent to the lower physical layer. Matrix $S'_{fwd}$ is partitioned into eight (18×4) submatrices ($A'_0$ to $A'_7$). Each submatrix is mapped-into tones within partition B and is sent to the lower physical layer. Similarly, matrix $S''_{fwd}$ is partitioned into eight (18×4) submatrices ($A''_0$ to $A''_7$). Each submatrix is mapped into tones within partition C and is sent to the lower physical layer. The lower physical layer places the baseband signals in DFT frequency bins where the data is converted into the time domain and sent to its corresponding antenna element (0 to 7) for transmission over the air.

Figure 36:
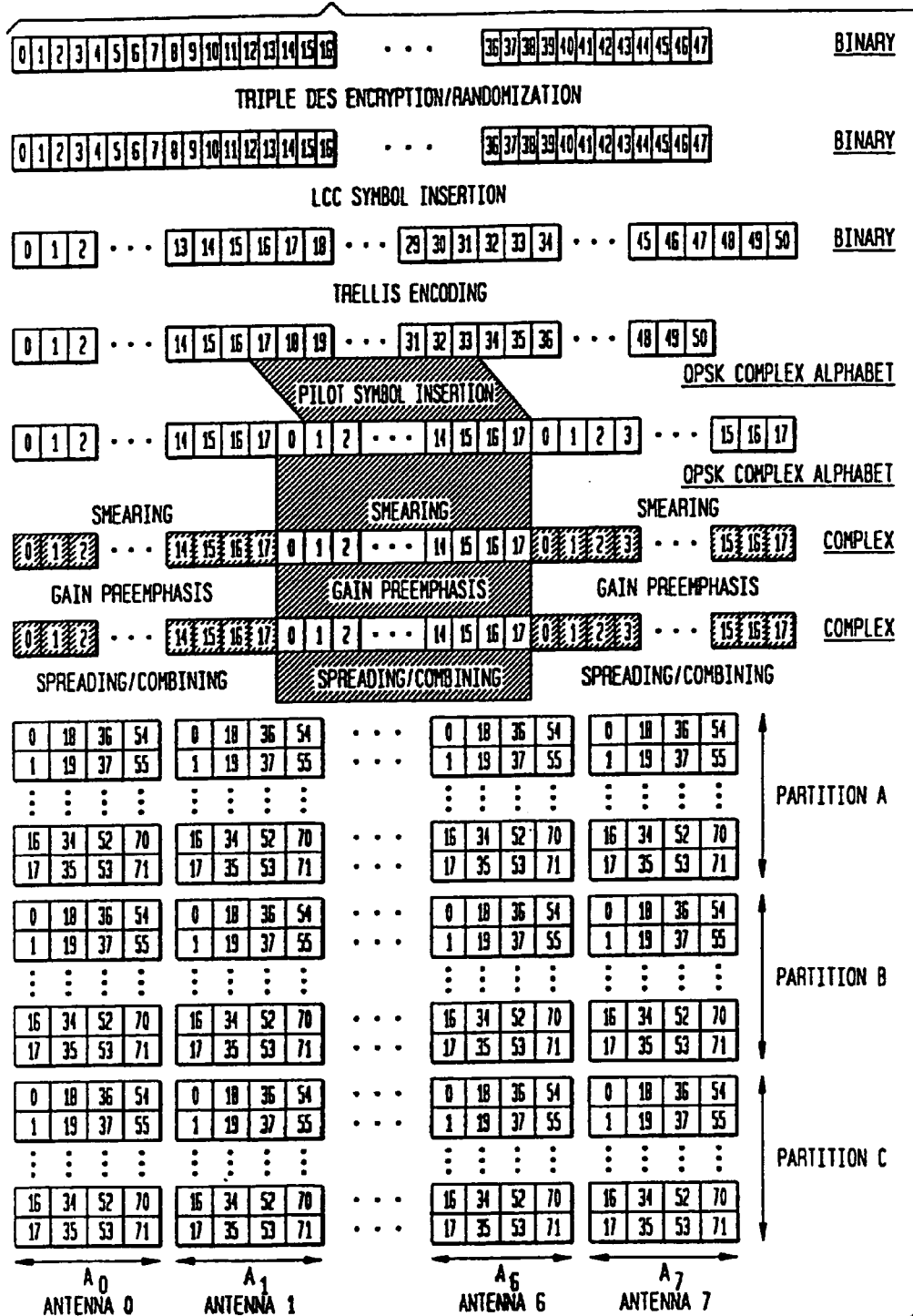
FIG. 36 is a Data Transformation Diagram for the Low Capacity Forward Channel Transmissions

This process is repeated from the start for the next 48 bits of binary data to be transmitted in the next forward channel transmission burst. The various steps in the transformation of binary data are shown in FIG. 36. To keep the diagram simple, the spreading and traffic channel combiner functions are shown in one step. Similarly, the encryption and randomization functions are also shown in one step.

Encryption/Decryption

Figure 37:
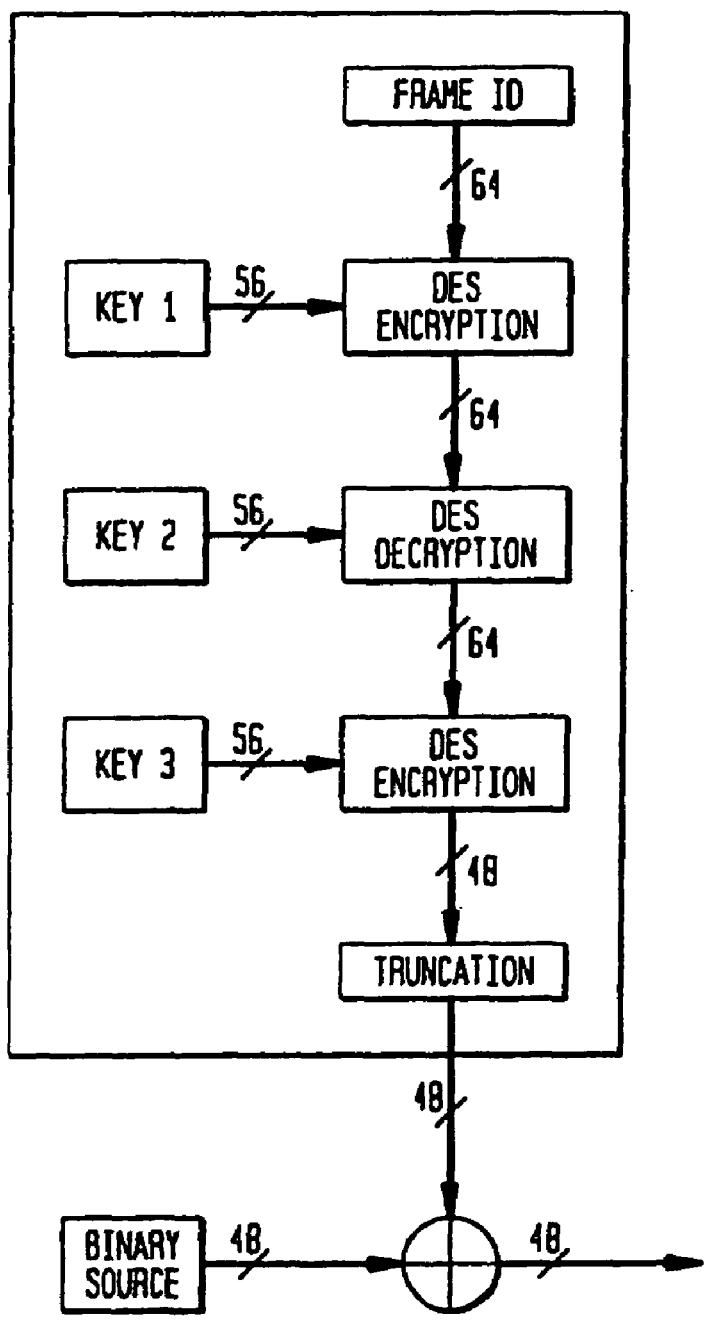
FIG. 37 is a representation of the Triple DES Encryption Algorithm

The 64 kbps binary source delivers bits to the encryption module 48 bits at a time. The encryption function is a three-stage cascade of the DES algorithm as shown in FIG. 37.

Trellis Encoding/Decoding

The trellis encoding technique consists of convolutional encoding followed by a signal mapping. The three modes of the physical layer use different trellis codes. For high capacity mode, there are two possible signal constellations: 16PSK and 16QAM.

Figure 38:
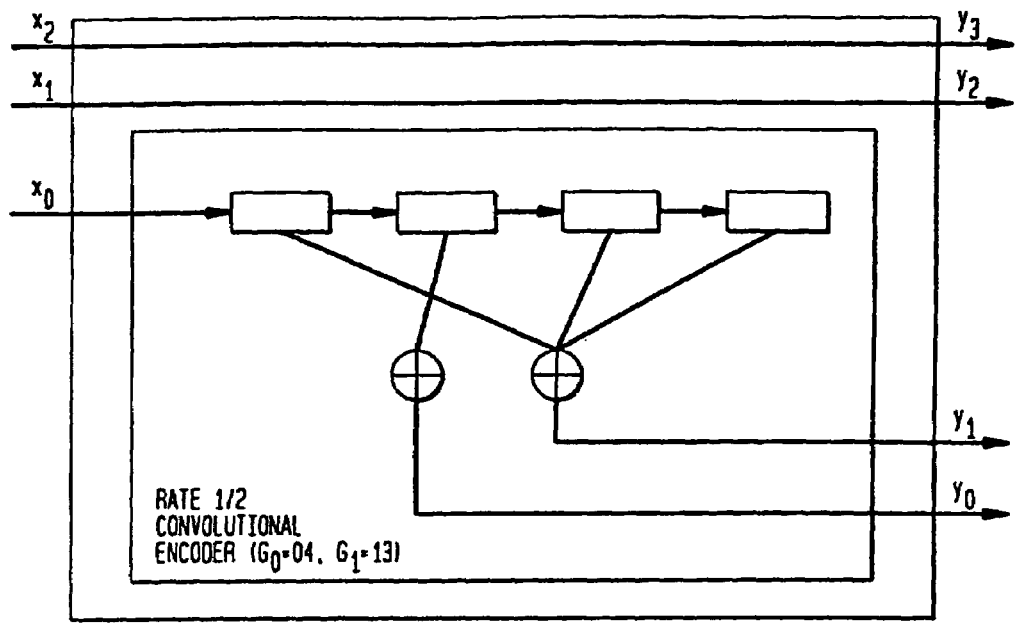
FIG. 38 depicts a Feed Forward Shift Register Implementation of Rate 3/4, 16PSK Trellis Encoder for High Capacity Mode

The rate 3/4 convolutional encoder for the 16 PSK constellation is shown in FIG. 38. The convolutional encoder employs an 8-state $(k=4)^{14}$ rate 1/2 mother encoder that encodes one bit out of a 3-bit input symbol, and passes the remaining bits uncoded.

The rate 1/2 convolutional encoder for the 16PSK constellation may be described by the generator polynomials ($G_0=04$, $G_1=13$), in octal representation. Equivalently, the polynomial representation is:

$G_o=D$ $G_1=D^3+D^2+1$

Figure 39:
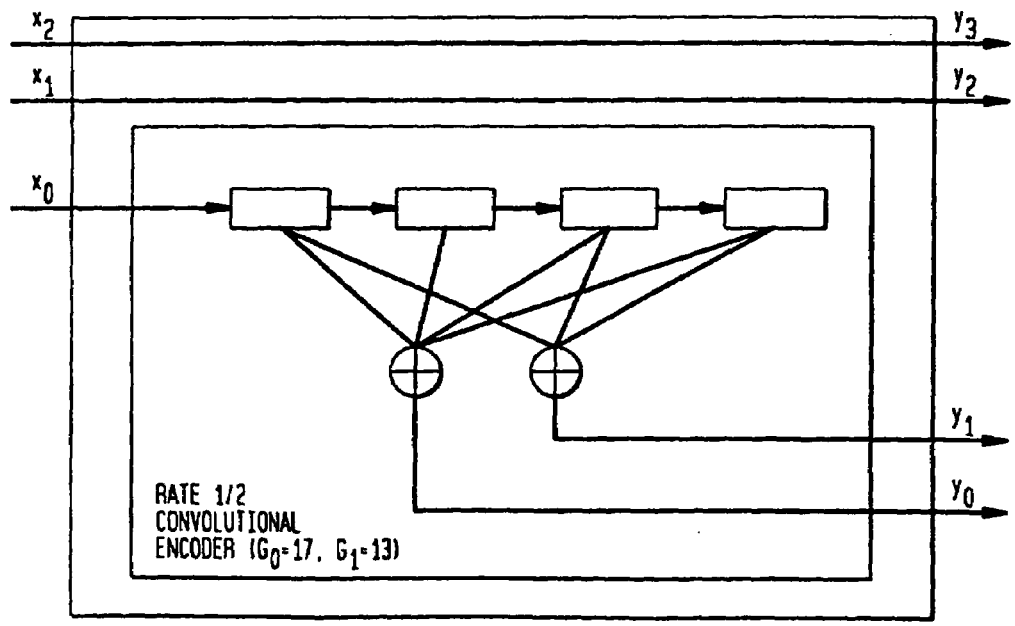
FIG. 39 depicts a Feed Forward Shift Register Implementation of Rate 3/4, 16QAM Trellis Encoder for High Capacity Mode

The rate 3/4 convolutional encoder for the 16QAM constellation is shown in FIG. 39. The convolutional encoder employs an 8-state (k=4) rate 1/2 mother encoder that encodes one bit out of a 3-bit input symbol, and passes the remaining bits uncoded.

The rate 1/2 convolutional encoder for the 16QAM constellation may be described by the generator polynomials ($G_0=17$, $G_1=13$), in octal representation. Equivalently, the polynomial representation is:

$G_0=D^3+D^2+D+1$ $G_1=D^3+D^2 1$

The two highest-order bits of the input symbol ($x_2,x_1$) are passed through uncoded to form the two highest-order bits of the output symbol ($Y_3, Y_2$). The lowest-order bits of the input symbol ($x_0$) enters the rate 1/2 mother encoder (shown as the shaded box) to produce two lowest-order bits of the output symbol ($y_1,y0$).

The next step in the trellis encoding process is to map the output symbol onto a signal in the 16QAM (or 16PSK) constellation. The particular mappings for the 16QAM and 16PSK constellations are shown in FIG. 40.

Figure 40:
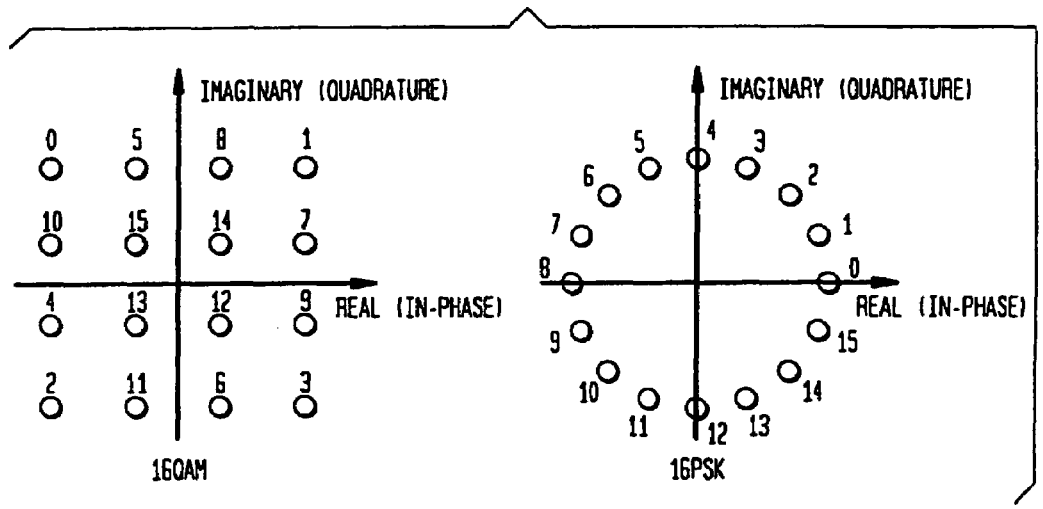
FIG. 40 shows the Signal Mappings for Rate 3/4, 16QAM and 16PSK Trellis Encoding Schemes Employed in High Capacity Mode

The resulting trellis encoder output is one of 16 possible complex numbers within the 16QAM (or 16PSK) constellation shown in FIG. 40. The actual value of each constellation point (signal) is shown in FIG. 41. The points on the constellation have been chosen so that the average energy of the signal is 1.

Figure 42:
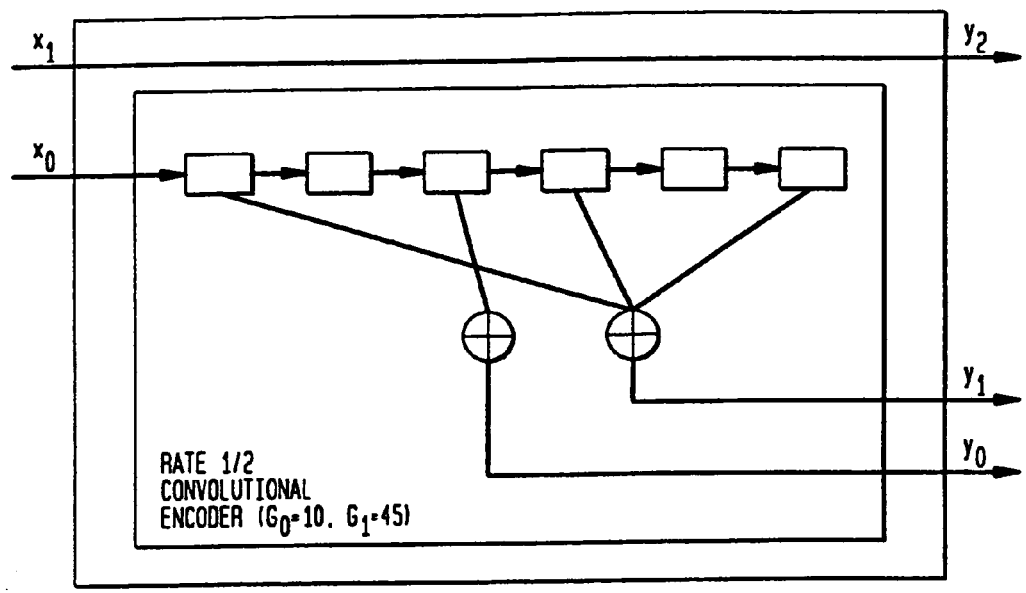
FIG. 42 depicts a Feed Forward Shift Register Implementation of Rate 2/3, 8PSK Trellis Encoder for Medium Capacity Mode

In medium capacity mode, a rate 2/3 trellis code with either 8QAM or 8PSK signal mapping is employed. The convolutional encoder for the 8PSK constellation is shown in FIG. 42. It employs a 32 state (k=6) rate 1/2 mother encoder that encodes one bit out of a 2-bit input symbol, and passes the remaining bit uncoded. The rate 1/2 convolutional encoder may be described by the generator polynomials ($G_0=10$, $G_1=45$), in octal representation. Equivalently, the polynomial representation is:

$G_0=D^2$ $G_1=D^5+D^3+D^2+1$

Figure 43:
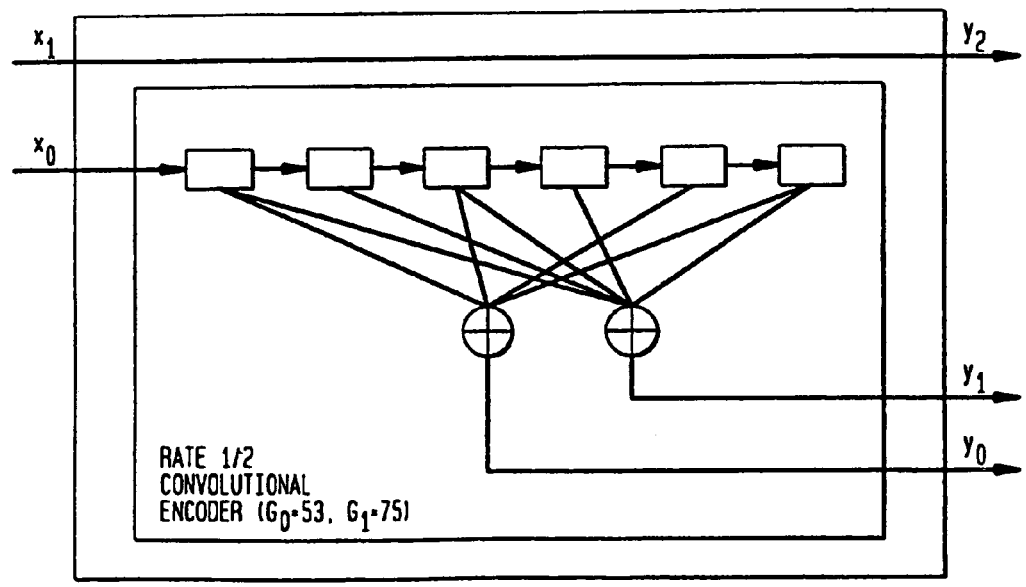
FIG. 43 depicts a Feed Forward Shift Register Implementation of Rate 2/3 8QAM Trellis Encoder for Medium Capacity Mode

The convolutional encoder for the 8QAM constellation is shown in FIG. 43. It employs a 32-state (k=6) rate 1/2 mother encoder that encodes one bit out of a 2-bit input symbol, and passes the remaining bit uncoded. The rate 1/2 convolutional encoder may be described by the generator polynomials ($G_0=53$, $G_1=75$), in octal representation. Equivalently, the polynomial representation is:

$G_0=D^5+D^4+D^2+1$ $G_1=D^5+D^3+D^2+1$

The highest-order bit of the input symbol ($x_1$) is passed through uncoded to form the highest-order bit of the output symbol ($y_2$). The lowest-order bit of the input symbol ($x_0$) enters the rate 1/2 mother encoder to produce the two lowest-order bits of the output symbol ($y_1,y0$).

Figures 44, 45:
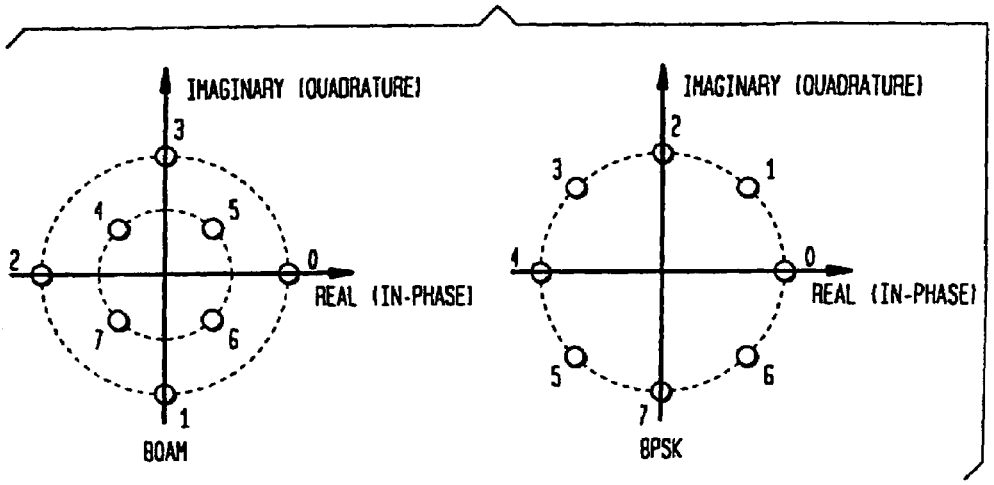
FIG. 44 shows the Signal Mappings for Rate 2/3, 8QAM and 8PSK Trellis Encoding Schemes Employed in Medium Capacity Mode
FIG. 45 shows the Signal Mappings for Rate 2/3, 8QAM and 8PSK Trellis Encoding Schemes Employed in Medium Capacity Mode

The next step in the trellis encoding process is to map the output symbol onto a signal in the 8QAM (or 8PSK) constellation. The particular mappings for the 8QAM and 8PSK constellations are shown in FIG. 44. The resulting trellis encoder output is one of eight possible complex numbers within the 8QAM (or 8PSK) constellation shown in FIG. 44. The actual value of each constellation point (signal) is shown in FIG. 45. The points of the constellation have been chosen so that the average energy of the signal is 1.

Figure 46:
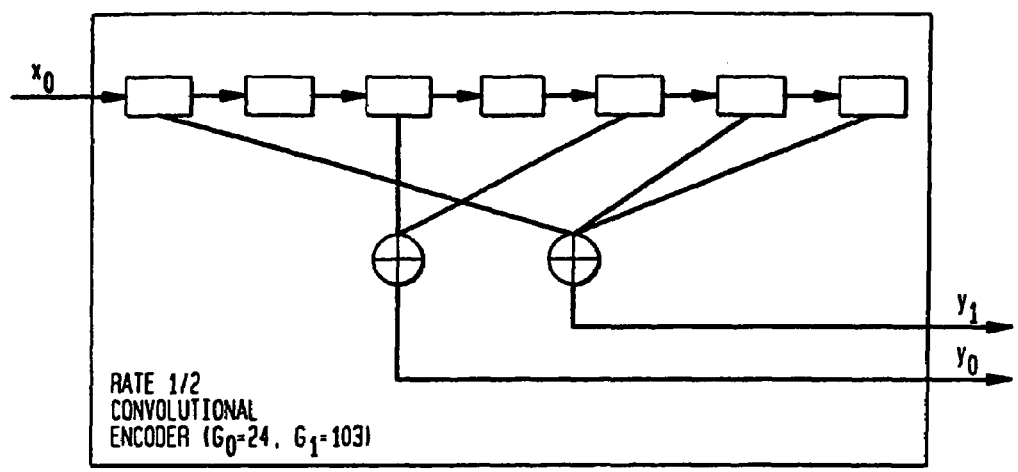
FIG. 46 depicts a Feed Forward Shift Register Implementation of Rate 1/2 Convolutional Encoder for Low Capacity Mode

In low capacity mode, the de facto standard rate 1/2 encoder, shown in FIG. 46, together with QPSK mapping is employed. The only bit of the input symbol ($x_0$) enters the rate 1/2 mother encoder to produce the two bits of the output symbol ($y_1,y_0$).

Figure 47:
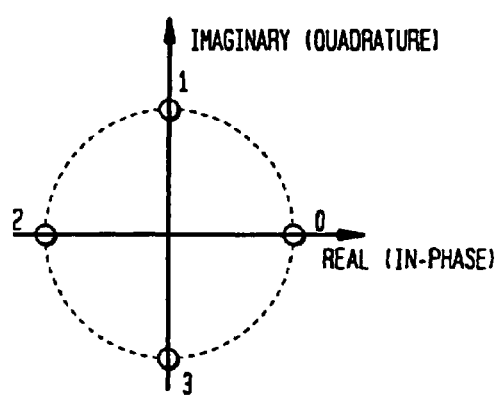
FIG. 47 shows the Signal Mapping for Rate 1/2, QPSK Pragmatic Trellis Encoding Scheme Employed in Low Capacity Mode

The next step in the trellis encoding process is to map the output symbol onto a signal in the QPSK constellation. The particular mapping for the QPSK constellation is shown in FIG. 46 referred to by natural mapping. The resulting trellis encoder output is one of four possible complex numbers within the QPSK constellation shown in FIG. 47. The actual value of each constellation point (signal) is shown in FIG. 48. The points on the constellation have been chosen so that the average energy of the signal is one.

Cluster Smearing/Desmearing

This section defines the smearing matrix $C_{fwd-smear}$. The input to the smearing block is the (18×1) vector $d_{fwd}$. The output of the smearing operation (vector b) can then be described by the matrix multiplication of $d_{fwd}$ and the (18×18) smearing matrix $C_{fwd-smear}$. That is $b=C_{fwd-smear}d_{fwd}$ $C_{fwd-smear}$ is the constant valued matrix shown below:

$$\begin{bmatrix} 1 & 0 & 0 & 0 & 0 & 0 & 0 & 0 & 0 & 0 & 0 & 0 & 0 & 0 & 0 & 0 & 0 & 0 \\ \alpha & \beta\delta 0 & 0 & 0 & 0 & 0 & 0 & 0 & 0 & 0 & 0 & 0 & 0 & 0 & 0 & 0 & 0 & 0 \\ \alpha & 0 & \beta\delta 1 & 0 & 0 & 0 & 0 & 0 & 0 & 0 & 0 & 0 & 0 & 0 & 0 & 0 & 0 & 0 \\ \alpha & 0 & 0 & \beta\delta 2 & 0 & 0 & 0 & 0 & 0 & 0 & 0 & 0 & 0 & 0 & 0 & 0 & 0 & 0 \\ \alpha & 0 & 0 & 0 & \beta\delta 3 & 0 & 0 & 0 & 0 & 0 & 0 & 0 & 0 & 0 & 0 & 0 & 0 & 0 \\ \alpha & 0 & 0 & 0 & 0 & \beta\delta 4 & 0 & 0 & 0 & 0 & 0 & 0 & 0 & 0 & 0 & 0 & 0 & 0 \\ \alpha & 0 & 0 & 0 & 0 & 0 & \beta\delta 5 & 0 & 0 & 0 & 0 & 0 & 0 & 0 & 0 & 0 & 0 & 0 \\ \alpha & 0 & 0 & 0 & 0 & 0 & 0 & \beta\delta 6 & 0 & 0 & 0 & 0 & 0 & 0 & 0 & 0 & 0 & 0 \\ \alpha & 0 & 0 & 0 & 0 & 0 & 0 & 0 & \beta\delta 7 & 0 & 0 & 0 & 0 & 0 & 0 & 0 & 0 & 0 \\ \alpha & 0 & 0 & 0 & 0 & 0 & 0 & 0 & 0 & \beta\delta 8 & 0 & 0 & 0 & 0 & 0 & 0 & 0 & 0 \\ \alpha & 0 & 0 & 0 & 0 & 0 & 0 & 0 & 0 & 0 & \beta\delta 9 & 0 & 0 & 0 & 0 & 0 & 0 & 0 \\ \alpha & 0 & 0 & 0 & 0 & 0 & 0 & 0 & 0 & 0 & 0 & \beta\delta 10 & 0 & 0 & 0 & 0 & 0 & 0 \\ \alpha & 0 & 0 & 0 & 0 & 0 & 0 & 0 & 0 & 0 & 0 & 0 & \beta\delta 11 & 0 & 0 & 0 & 0 & 0 \\ \alpha & 0 & 0 & 0 & 0 & 0 & 0 & 0 & 0 & 0 & 0 & 0 & 0 & \beta\delta 12 & 0 & 0 & 0 & 0 \\ \alpha & 0 & 0 & 0 & 0 & 0 & 0 & 0 & 0 & 0 & 0 & 0 & 0 & 0 & \beta\delta 13 & 0 & 0 & 0 \\ \alpha & 0 & 0 & 0 & 0 & 0 & 0 & 0 & 0 & 0 & 0 & 0 & 0 & 0 & 0 & \beta\delta 14 & 0 & 0 \\ \alpha & 0 & 0 & 0 & 0 & 0 & 0 & 0 & 0 & 0 & 0 & 0 & 0 & 0 & 0 & 0 & \beta\delta 15 & 0 \\ \alpha & 0 & 0 & 0 & 0 & 0 & 0 & 0 & 0 & 0 & 0 & 0 & 0 & 0 & 0 & 0 & 0 & \beta\delta 16 \end{bmatrix}$$

where, $a = (r_{LMP}/(1+r_{LMP}))^{1/2}$ $b = (1/(1+r_{LMP}))^{1/2}$ and $r_{LMP}$ is the ratio of pilot to data power that is a physical layer provisionable parameter whose value is nominally set to one.

Gain Preemphasis

This section discusses the gain preemphasis matrix $g_{fwd}(p)$ shown in FIG. 31. The input to the gain preemphasis block is the (18×1) vector b. The output of the gain preemphasis operation (Vector c) is the element-wise multiplication of vector b and the gain preemphasis vector $g_{fwd}(p)$:

$c = b \cdot g_{fwd}(p)$ where • represents element-wise vector multiplication. The elements of $g_{fwd}(p)$ are derived using information received at the Base. The derivation of these weights are implementation dependent.

Spectral and Spatial Spreading

This section defines the (1×32) forward spatial and spectral spreading vector $g^H_{fwd}(p)$ shown in FIG. 31. The input to the spectral and spatial spreading block is the 18-element vector c. The output of the spectral and spatial spreading operation, (18×32) matrix R(p), is the matrix multiplication of c and the (1×32) spectral and spatial spreading vector $g^H_{fwd}(p)$:

$R(p) = c g^H_{fwd}(p)$ where, $g^H_{fwd}(p) = [g_0 g_1 g_2 \ldots g_{30} g_{31}]$ The elements of vector $g^H_{fwd}(p)$ are transmit spreading weights calculated throughout the transmission. The algorithm for the derivation of these weights is implementation dependent. However, to clarify the procedure, a specific algorithm for the derivation of these weights is described below.

The Base derives its new weights based on the most recent data received on the reverse channel. The transmit weights are a scaled version of the received weights using eight antenna inputs with four receive frequencies per antenna. The receive weight vector $W^H_{rev}(p)$ has 32 elements ($w_0 - W_{31}$) that are mapped to spatial and spectral components as shown in FIG. 49.

For the Base traffic establishment procedure, the transmit weights ($g_0 - g_{31}$) are calculated according to the following equation:

$g^H_{fwd}(p) = a_{fwd}(n) h(k_{fwd} w^H_{rev}(p))$ where $k_{fwd}$ is the Base transmission constant, $a_{fwd}(n)$ is the Base gain ramp-up factor for the nth packet, and h(.) is a function that limits the norm of its argument to 23 dBm $h(v) = v$ for $\|v\|^2 < 23$ dBm $h(v) = 23$ dBm (scale factor) $(v/\|v\|^2)$ otherwise For the Base steady-state procedure, receive weights are adaptively calculated using the following equation:

$w_{rev}(p) = R^{-1}_{xx} r_{xy}$ where $w_{rev}(p)$ is the (32×1) weight vector;

$r_{xy}$ is an estimate of the (32×1) cross-correlation vector of the received (32×1) vector x and the despread data y, multiplied by an estimate of the channel equalization weights; and $R^{-1}_{xx}$ is an estimate of (32×32) inverted auto-correlation matrix of the received vector x. ($R^{-1}_{xx}$ may be computed using the Recursive Modified Gramm-Schmidt (RMGS) algorithm.)

$r_{xy}$ is cross-correlated against the despread data after a resmearing step and a gain pre-emphasis reapplication step.

The receive weights ($w_0$–$w_{31}$) are mapped to spatial and spectral components according to the mapping shown in FIG. 49. The transmit weights ($g_0$–$g_{31}$) are a scaled version of the receive weights. The scaling is made according to the following equation:

$$g^H_{fwd}(p)=k_{fwd}w^H_{rev}(p)$$

where $k_{fwd}$ is the Base steady-state transmission constant.

Correlation estimates are computed over eight reverse-channel bursts. The new despreading weights are applied to eight reverse channel burst with no delay. The spreading weights are applied to eight forward channel bursts after an 4-burst delay. Correlation estimates are made using an exponentially averaged block summation. The exponential decay constant is provisionable with a nominal value of 0.7.

An illustrative flowchart of an embodiment of the adaptive solution of spectral and spatial weights is shown in FIG. 85.

Forward Control Channel Transmission Format

Figure 50:
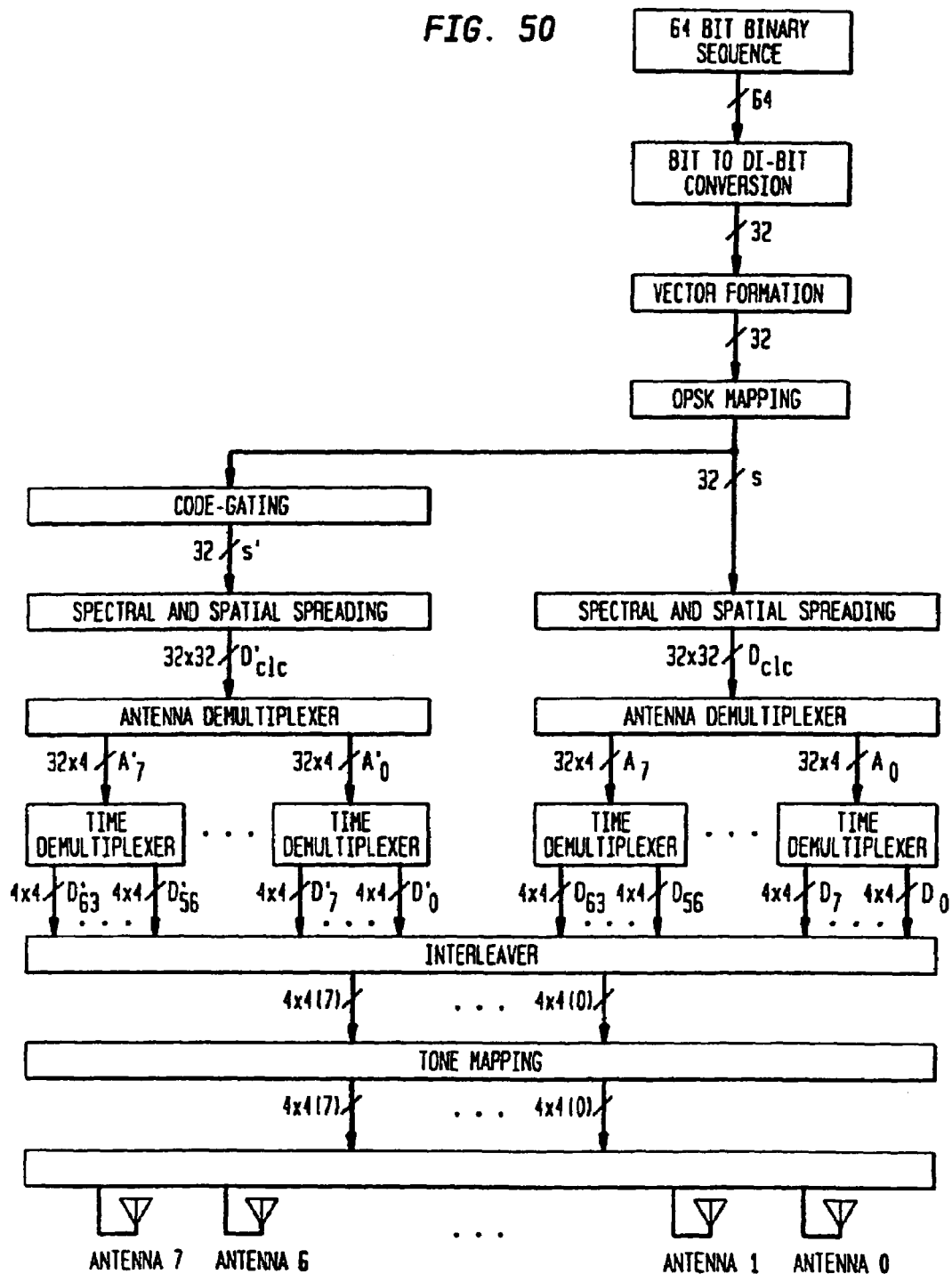
FIG. 50 is a Block Diagram Representation of CLC Physical Layer Format
Figure 51:
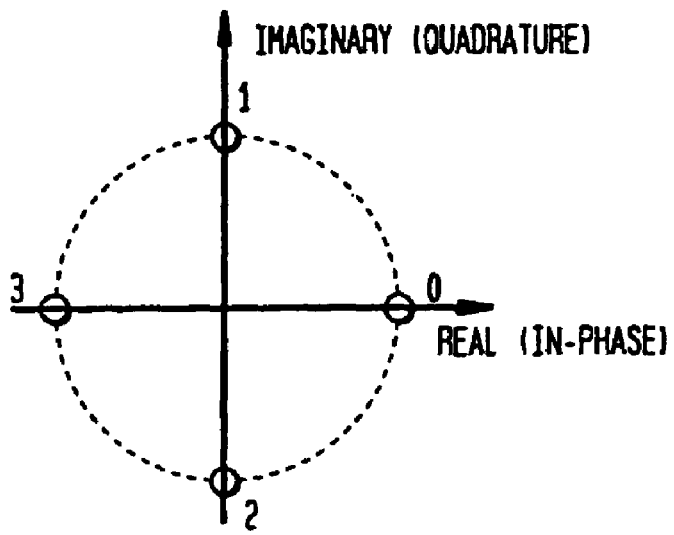
FIG. 51 shows the QPSK Signal Mapping for the CLC Channel

The block diagram for the physical layer of the Common Link Channel (CLC) channel transmissions is shown in FIG. 50. A CLC message is a 64-bit binary sequence. The bit to di-bit conversion block converts the binary sequence into a sequence of 2-bit symbols of length 32. The vector formation block converts the symbol sequence into a (32×1) vector. Each element of the resulting vector is mapped into its corresponding signal in the QPSK signal constellation to form another (32×1) vector, s. The mapping for the QPSK signal is shown in FIG. 51.

The resulting vector is passed through two parallel paths. In the first path, the vector s is sent directly for spectral and spatial spreading that involves post-multiplying it by the (1×32) spreading vector $g^H_{clc}$:

$$g^H_{clc}=[g0\,g1\,g2\,\ldots\,g30\,g31]$$

($g^H_{clc}$ is discussed further below.) The resulting (32×32) matrix is $D_{clc}$. Matrix $D_{clc}$ is then sent to the antenna demultiplexer where it is partitioned (by groups of 4 columns) into eight (32×4) submatrices $A_0$ to $A_7$. The elements of these matrices will ultimately be transmitted on antennas 0 to 7, respectively.

In the second path, the vector s is code-gated. The code-gating operation is described by the element-wise multiplication of the (32×1) vector s with a (32×1) code-gating vector $Y_{clc}$. The resulting (32×1) vector is S':

$$s'=s\cdot i_{clc}$$

The vector $i_{clc}$ is described below.

The resulting (32×1) vector s' is sent for spectral and spatial spreading that involves post-multiplying it by the (1×32) spectral and spatial spreading vector $g^H_{clc}$. The resulting (32×32) matrix is $D'_{clc}$. Matrix $D'_{clc}$ is then sent to the antenna demultiplexer where it is partitioned (by groups of 4 columns) into eight (32×4) submatrices $A'_0$ to $A'_7$. Each of these matrices ($A_0$ to $A_7$) and ($A'_0$ to $A'_7$) is then sent to a time demultiplexer where it is further partitioned (by groups of 4 rows) into eight (4×4) submatrices. This yields 128 (4×4) matrices ($D_0$ to $D_{63}$) and ($D'_0$ to $D'_{63}$).

The transmission of one 64 bit CLC message requires 16 forward channel bursts or 4 TDD periods. In each of these bursts, eight (one for each antenna) of the (4×4) matrices are mapped onto tones and sent to the lower physical layer for transmission over the air. The interleaving and tone mapping functions are described herein.

The vector $g_{clc}$ is defined as the Kronecker product of a (8×1) spatial spreading vector d and a (4×1) spectral spreading vector f:

$$g_{clc}=\mathrm{kron}(d,f)$$

where d, is given by $$\begin{vmatrix} d_0 \\ d_1 \\ d_2 \\ d_3 \\ d_4 \\ d_5 \\ d_6 \\ d_7 \end{vmatrix}$$

and f is given by $$\begin{vmatrix} f0 \\ f1 \\ f2 \\ f3 \end{vmatrix}$$

The resulting vector $g_{clc}$ is given by:

$$\begin{vmatrix} \delta 0 f 0 \\ \delta 0 f 1 \\ \delta 0 f 2 \\ \delta 0 f 3 \\ \delta 1 f 0 \\ \vdots \\ \delta 07 f 2 \\ \delta 07 f 3 \end{vmatrix}$$

The $g_{clc}^H$ is the conjugate transpose of $g_{clc}$.

The spreading vector f is a column of the (4×4) Hadamard matrix $H_4$, that may be chosen randomly by the Base.

The spreading vector d is the kth column of the (8×72) CLC Spatial Spreading Weights Table. The column index k is provided by the MAC layer through the parameter CLC beam.

A (N×N) Hadamard matrix denoted by $H_N$ is obtained by the following recursion: $H_{2n}$ equals $$\begin{vmatrix} Hn & Hn \\ Hn & Hn \end{vmatrix}$$

where $H_0$ is initialized at 1. For instance, the 4×4 Hadamard matrix ($H_4$) is:

$$\begin{vmatrix} 1 & 1 & 1 & 1 \\ 1 & -1 & 1 & -1 \\ 1 & 1 & -1 & -1 \\ 1 & -1 & -1 & 1 \end{vmatrix}$$

The code-gating vector $i_{clc}$ is:

$$i_{clc} = b_{clc} \cdot h_{clc}.$$

where the vector $h_{clc}$ is the 0th column of the (32×32) Hadamard matrix ($H_{32}$), that is the all ones vector and the ith element of the (32×1) vector $b_{clc}$ is given by:

$$b_{clc} = e^{j2\pi i k_{\text{offset}}/32}$$

The $k_{\text{offset}}$ (an integer between 0 and 31) is the Base station offset code (BSOC) for the transmitting Base.

Interleaving

There are 16 burst in every CLC transmission (burst 0 to burst 15). For each antenna, the interleaver outputs one of the 16 possible (4×4) matrices in each burst. FIG. 52 shows the order of the transmission used by the interleaver.

Tone Mapping

There are 128 (4×4) matrices to be mapped onto tones for transmission over the air. FIG. 53 shows the mapping of a (4×4) matrix at the output of the interleaver into tones. The absolute tone indices can be obtained using FIG. 23.

The Broadcast Channel

Figure 54:
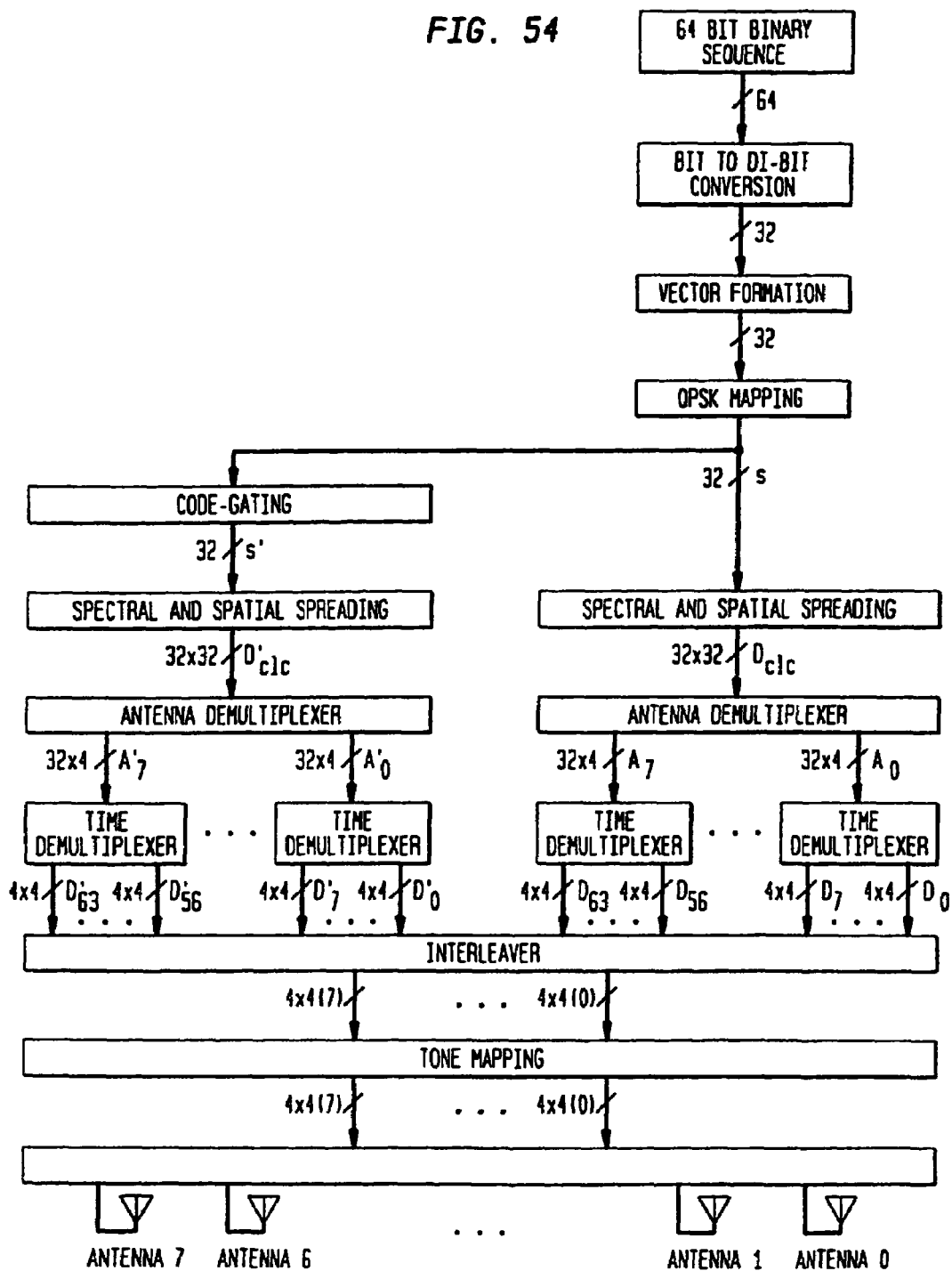
FIG. 54 is a Block Diagram Representation of BRC Physical Layer Format

The block diagram for the physical layer of BRC channel transmissions is shown in FIG. 54. The block diagram is very similar to that for the CLC shown in FIG. 50. However, for the sake of completeness, and to point out the small differences, the details of the BRC transmission format are included in this section.

The primary differences between the CLC and the BRC transmissions on the forward channel are:

The Base uses all our BRC channels (in the four sub-band pairs) while for the CLC, channel selection is based on its operating sub-band pair The Base forms 10 spatial beams (activated sequentially) to cover all the RUs in one hemisphere, that means that the time to broadcast a BRC message is ten times as long as transmission of a CLC message A BRC message is a 64-bit binary sequence. The bit to di-bit conversion block converts the binary sequence into a sequence of 2-bit symbols of length 32. The vector formation block converts the symbol sequence into a (32×1) vector. Each element of the resulting vector is mapped into its corresponding signal in the QPSK signal constellation to form another (32×1) vector s. The mapping for the QPSK signal is identical to that for the CLC shown in FIG. 51.

The resulting vector is passed through two parallel paths. In the first, path, the vector s is sent directly for spectral and spatial spreading that involves post-multiplying it by the (1×32) spectral and spatial spreading vector $g_{brc}^{H}$.

$$g^{H}_{brc} = [g0 g1 g2 \ldots g30 g31)$$

The $g_{brc}^{H}$ is discussed below.

The resulting (32×32) matrix is $D_{brc}$. Matrix $D_{brc}$ is then sent to the antenna demultiplexer where it is partitioned (by groups of four columns) into eight (32×4) submatrices $A_0$ to $A_7$. The elements of these matrices will ultimately be transmitted on antennas 0 to 7, respectively.

In the second path, the vector s is code-gated. Code-gating is described by the element-wise multiplication of the (32×1) vector s with a (32×1) code-gating vector $i_{brc}$. The resulting (32×1) vector is s':

$$s' = s \cdot Y_{brc}$$

The vector $Y_{brc}$ is described below.

The resulting (32×1) vector s' is sent for spectral and spatial spreading, that involves post-multiplying it by the (1×32) spreading vector $g_{brc}^{H}$. The resulting (32×32) matrix is $D'_{brc}$. Matrix $D'_{brc}$ is then sent to the antenna demultiplexer where it is' partitioned (by groups of four columns) into eight (32×4) submatrices $A'_0$ to $A'_7$. Each of these matrices ($A_0$ to $A_7$) and ($A'_0$ to $A'_7$) is then sent to a time demultiplexer where they are further partitioned (by groups of four rows) into eight (4×4) submatrices. This yields 128 (4×4) matrices ($D_0$ to $D_{63}$) and ($D'_0$ to $D'_{63}$).

For one spatial beam, the transmission of one 64-bit BRC message requires 16 forward channel bursts or four TDD periods. In each of these bursts, eight (one for each antenna) of the (4×4) matrices are mapped onto tones and sent to the lower physical layer for transmission over the air. The interleaving and tone mapping functions are described herein.

This process is repeated 10 times to provide 10 spatial beams with different directions so that all the RUs in a spatial cell can detect the broadcast message. The details of the beam sweeping are described below. The duration of a BRC transmission is therefore 160 bursts of 40 TDD periods.

The vector $g_{brc}$ is defined as the Kronecker product of a (8×1) spatial spreading vector d and a (4×1) spectral spreading vector f:

$$g_{brc} = \text{kron}(d, f)$$

where d, is given by $$\begin{vmatrix} d_0 \\ d_1 \\ d_2 \\ d_3 \\ d_4 \\ d_5 \\ d_6 \\ d_7 \end{vmatrix}$$

and f is given by $$\begin{vmatrix} f0 \\ f1 \\ f2 \\ f3 \end{vmatrix}$$

The resulting vector $g_{brc}$ given by:

$$\begin{bmatrix} \delta 0 f 0 \\ \delta 0 f 1 \\ \delta 0 f 2 \\ \delta 0 f 3 \\ \delta 1 f 0 \\ \vdots \\ \delta 07 f 2 \\ \delta 07 f 3 \end{bmatrix}$$

The $g_{brc}^H$ is the conjugate transpose of $g_{brc}$. The spreading vector f is a column of the (4×4) Hadamard matrix $H_4$, that may be chosen randomly by the Base. The spreading vector d is a column of the BRC Spatial Spreading Weights Table that will be described in the next release of this document. The Base transmits simultaneously on all the sub-band pairs; for each sub-band pair, 10 different spatial beams are formed and activated sequentially to cover at the RUs in the spatial cell.

The code-gating vector $i_{brc}$ is:

$$i_{brc} = b_{brc} h_{brc}$$

where the vector $h_{brc}$ is the 0th column of the (32×32) Hadamard matrix ($H_{32}$), that is the all ones vector and the ith element of the (32×1) vector $b_{clc}$ is given by:

$$b_{brc} = e^{j2\pi i k_{\text{offset}}/32}$$

The $k_{offset}$ (an integer between 0 and 31) is the BSOC for the transmitting Base.

For every spatial beam, there are 16 bursts in every BRC transmission (burst 0 to burst 15). For each antenna, the interleaver outputs one of the 16 possible (4×4) matrices in each burst. The interleaving rule is identical to the CLC interleaving rule shown in FIG. 52. There are a total of spatial beams. This process is therefore repeated sequentially ten times, once for every spatial beam.

For every spatial beam, there are 128 (4×4) matrices to be mapped onto tones for transmission over the air. FIG. 55 shows the mapping of a (4×4) matrix at the output of the interleaver into tones. The absolute tone indices can be obtained using FIG. 23.

Figure 56:
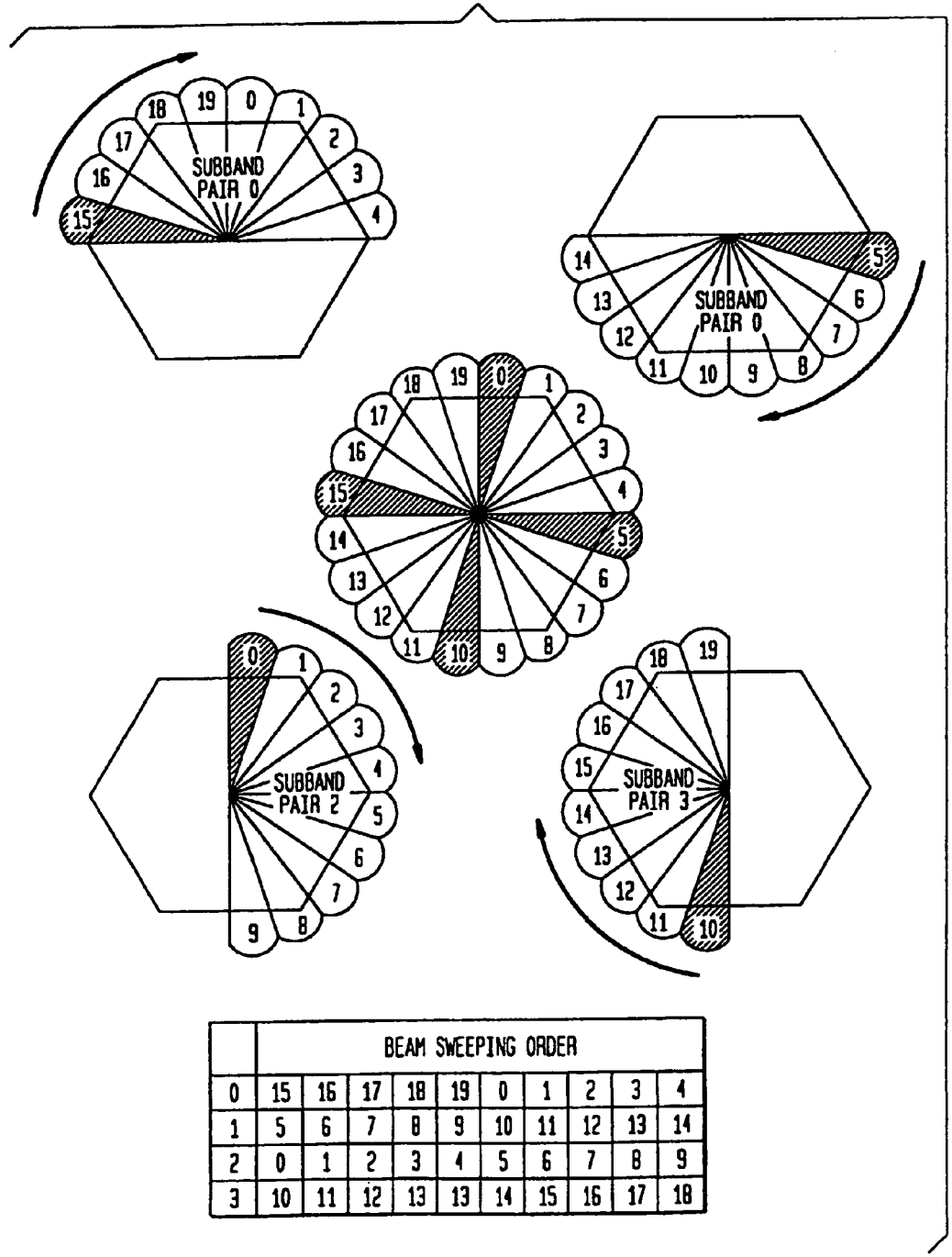
FIG. 56 is a representation of a Broadcast Channel Beam Sweep

Broadcast channel signals are spatially beamformed and transmitted sequentially via ten predetermined team patterns per sub-band pair. This results in four broadcast channel signals (one per sub-band pair) that are simultaneously swept through each spatial cell. This is shown in FIG. 56.

Each BRC message requires 40 TDD intervals or 120 ms to transmit. New BRC message may only be started on even frame boundaries. Each of the four sub-band pairs transmits the same BRC message at the same time and the BRC beam sweeps are synchronous within a spatial cell and for all Bases within a this embodiment system. BRC beams are swept in a clockwise pattern.

Reverse Channel Format

As for the forward channel transmissions, there are three different possible implementations of the physical layer. We refer to these modes as:

High capacity mode (short range): 3 bits/symbol
Medium capacity mode (medium range): 2 bits/symbol
Low capacity mode (long range): 1 bit/symbol.

High Capacity Mode

Figure 57:
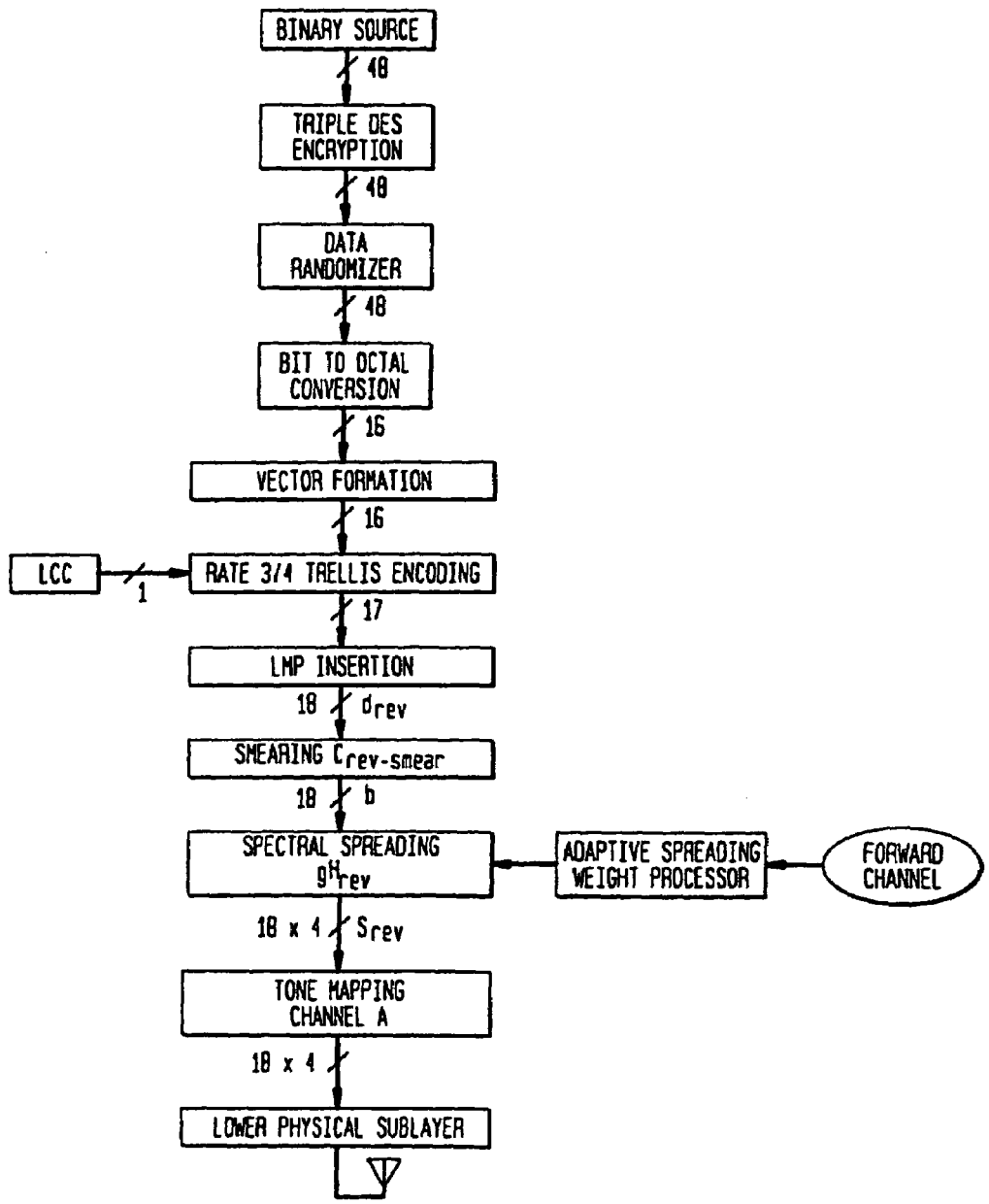
FIG. 57 is a Functional Block Diagram of the Upper Physical Layer of Remote Unit Transmitter for High Capacity Mode

The block diagram for the upper physical layer of the Remote Unit transmitter for high capacity mode is shown in FIG. 57.

The binary source delivers binary data to the Remote Unit transmitter at 64 kbits sec. For one reverse channel burst, this translates to 48 bits. The information bits are encrypted according to the triple DES algorithm. The encrypted bits are then randomized in the data randomization block.

The bit to octal conversion block converts the randomized binary sequence into a sequence of 3-bit symbols. The symbol sequence is converted into 16-symbol vectors. One symbol from the LCC is added to form a vector of 17 symbols.

The 17-symbol vector is trellis encoded. The trellis encoding starts with the most significant symbol (first element of the vector) and is continued sequentially until the last element of the vector (the LCC symbol). This process employs convolutional encoding that converts the input symbol (an integer between 0 and 7) to another symbol (between 0 and 15) and maps the encoded symbol to its corresponding 16QAM (or 16PSK) signal constellation point. The output of the trellis encoder is therefore a vector of 17 elements where each element is a signal within the set of 16QAM (or 16PSK) constellation signals.

A LMP signal is added to form an 18-signal vector, with the LMP as the first element of this vector. The resulting vector $d_{rev}$ is pre-multiplied by a (18×18) reverse smearing matrix $C_{rev\text{-}smear}$ to yield a (18×1) vector b. Vector b is post-multiplied by a (1×4) reverse spreading vector $g^H_{rev}$ to yield a (18×4) matrix $S_{rev}$. Elements of matrix $S_{rev}$ are mapped to tones within traffic partition A according to the mapping discussed in FIG. 22 and are sent to the lower physical layer. The lower physical layer places the baseband signals in their corresponding DFT frequency bins where the data is converted into the time domain and sent for transmission over the air.

Figure 58:
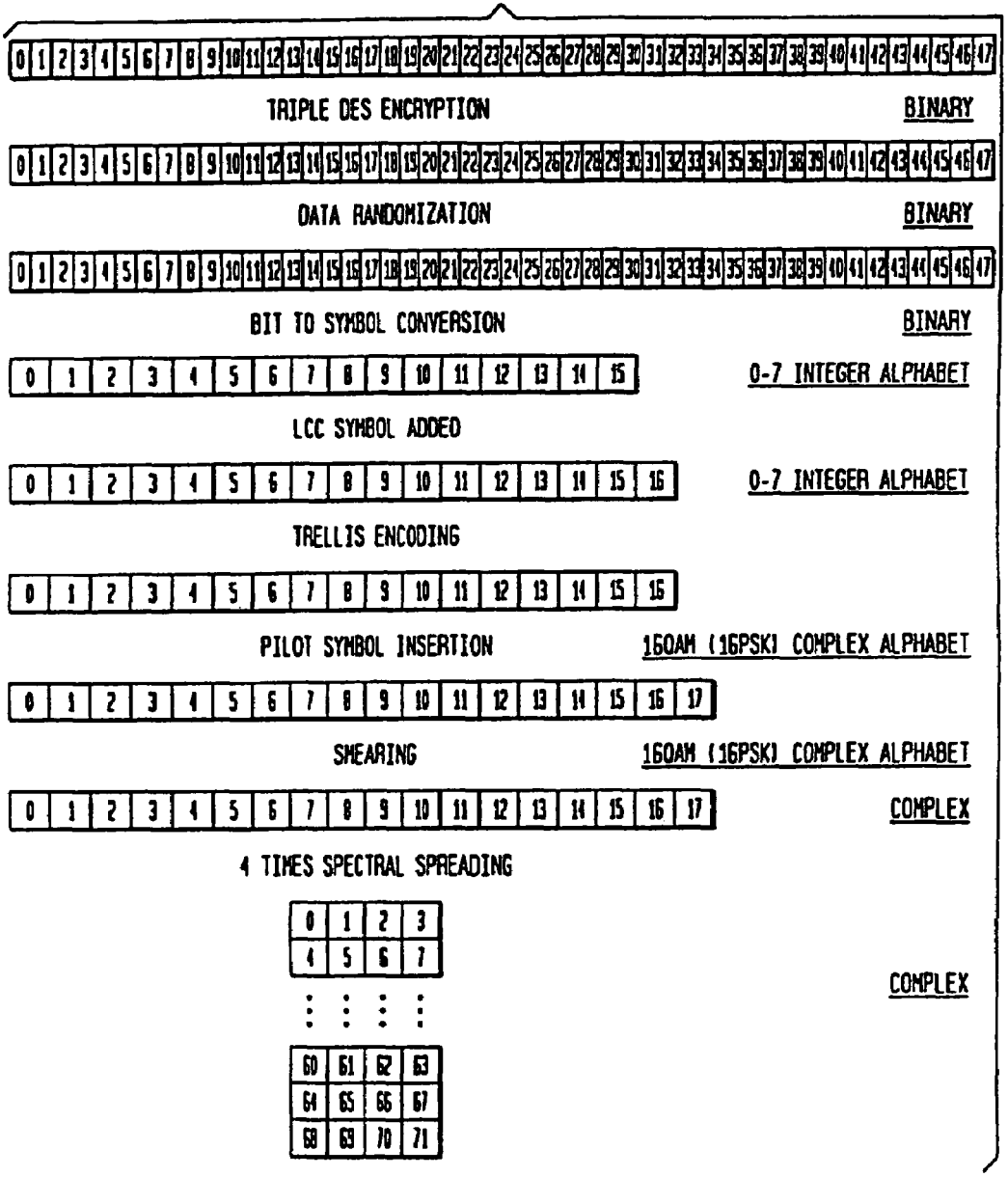
FIG. 58 is a Data Transformation Diagram for the High Capacity Reverse Channel Transmissions

This process is repeated from the start for the next 48 bits of binary data to be transmitted in the next reverse channel transmission burst. The various steps in the transformation of binary data are shown in FIG. 58.

Medium Capacity Mode

Figure 59:
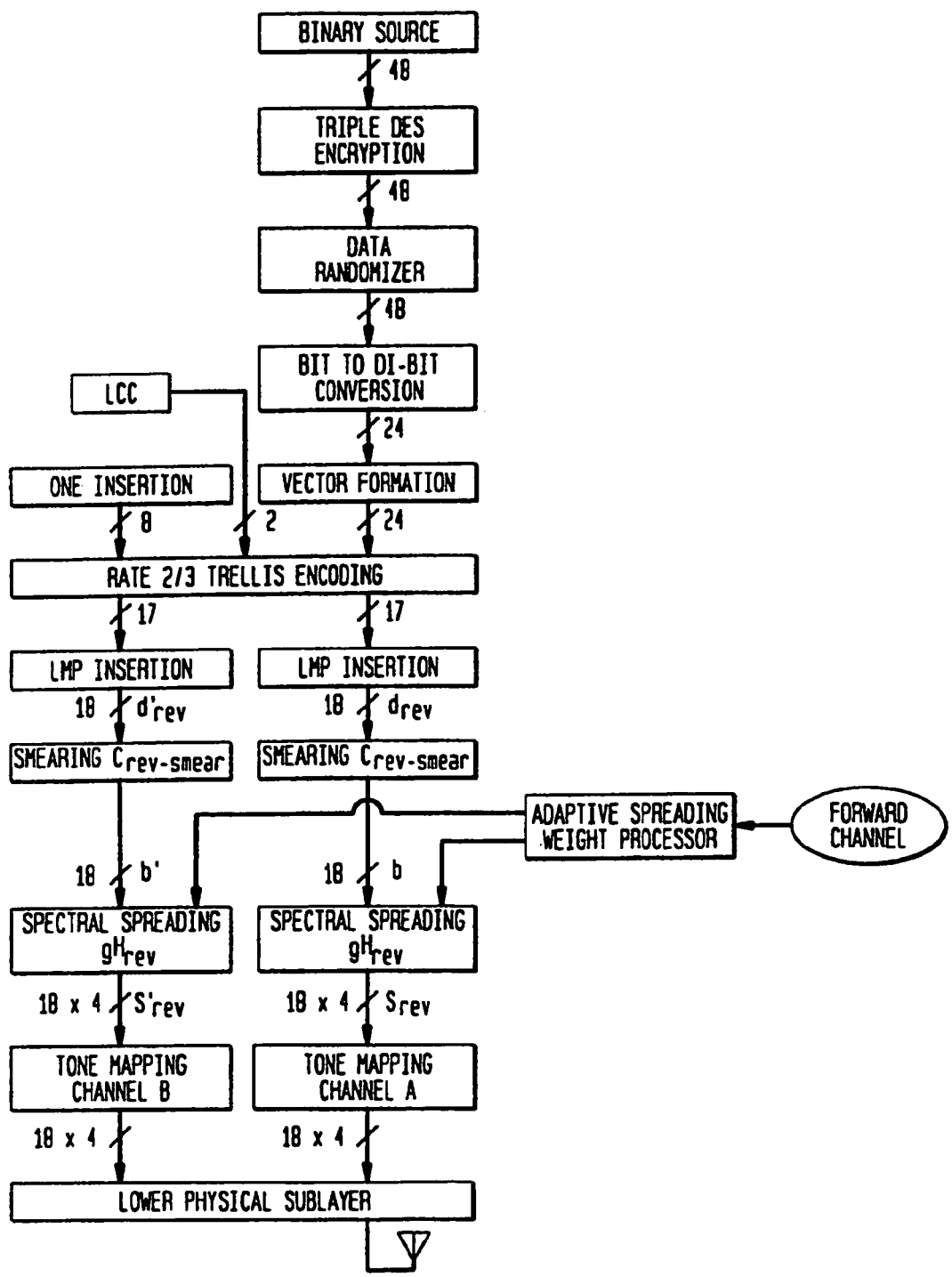
FIG. 59 is a Functional Block Diagram for the Upper Physical Layer of Remote Unit Transmitter for Medium Capacity Mode

The block diagram for the upper physical layer of the Remote Unit transmitter for medium capacity mode is shown in FIG. 59.

The binary source delivers binary data to the Remote Unit transmitter at 64 kbits/sec. For one reverse channel burst, this translates to 48 bits. The information bits are encrypted according to the triple DES algorithm. The encrypted bits are then randomized in the data randomization block. The bit to di-bit conversion block converts the randomized binary sequence into a sequence of 2-bit symbols. The symbol sequence is converted into 24 symbol vectors. Two symbols from the LCC are added, and eight ones are inserted at the end of the sequence to form a vector of 34 symbols.

The 34-symbol vector is trellis encoded. The trellis encoding starts with the most significant symbol (first element of the vector) and is continued sequentially until the last element of the vector (the second LCC symbol). This process employs convolutional encoding that converts the input symbol (an integer between 0 and 3) to another symbol (between 0 and 7) and maps the encoded symbol to its corresponding 8 QAM (or 8PSK) signal constellation point. The output of the trellis encoder is therefore a vector of 34 elements where each element is a signal within the set of 8QAM (or 8PSK) constellation signals.

The 34-element vector is divided into two 17-element vectors. An LMP is added to each of the vectors to form two 18-signal vectors $d_{rev}$ and $d'_{rev}$ with the LMP as the first element of these vectors. Each resulting vector is pre-multiplied by a (18×18) reverse smearing matrix $C_{rev\text{-}smear}$ to yield another two (18×1) vectors b and b'. Each vector is post-multiplied by its corresponding (1×4) reverse spreading vector ($g^H_{rev}$ or $g'^H_{rev}$) to yield two (18×4) matrices $S_{rev}$ and $S'_{rev}$. Elements of matrix $S_{rev}$ are mapped to tones within traffic partition A according to the mapping discussed in FIG. 22 and are sent to the lower physical layer. Similarly, elements of matrix $S'_{rev}$ are mapped to tones within traffic partition B and are sent to the lower physical layer. The lower physical layer places the baseband signals in DFT frequency bins where the data is converted into the time domain and sent for transmission over the air.

Figure 60:
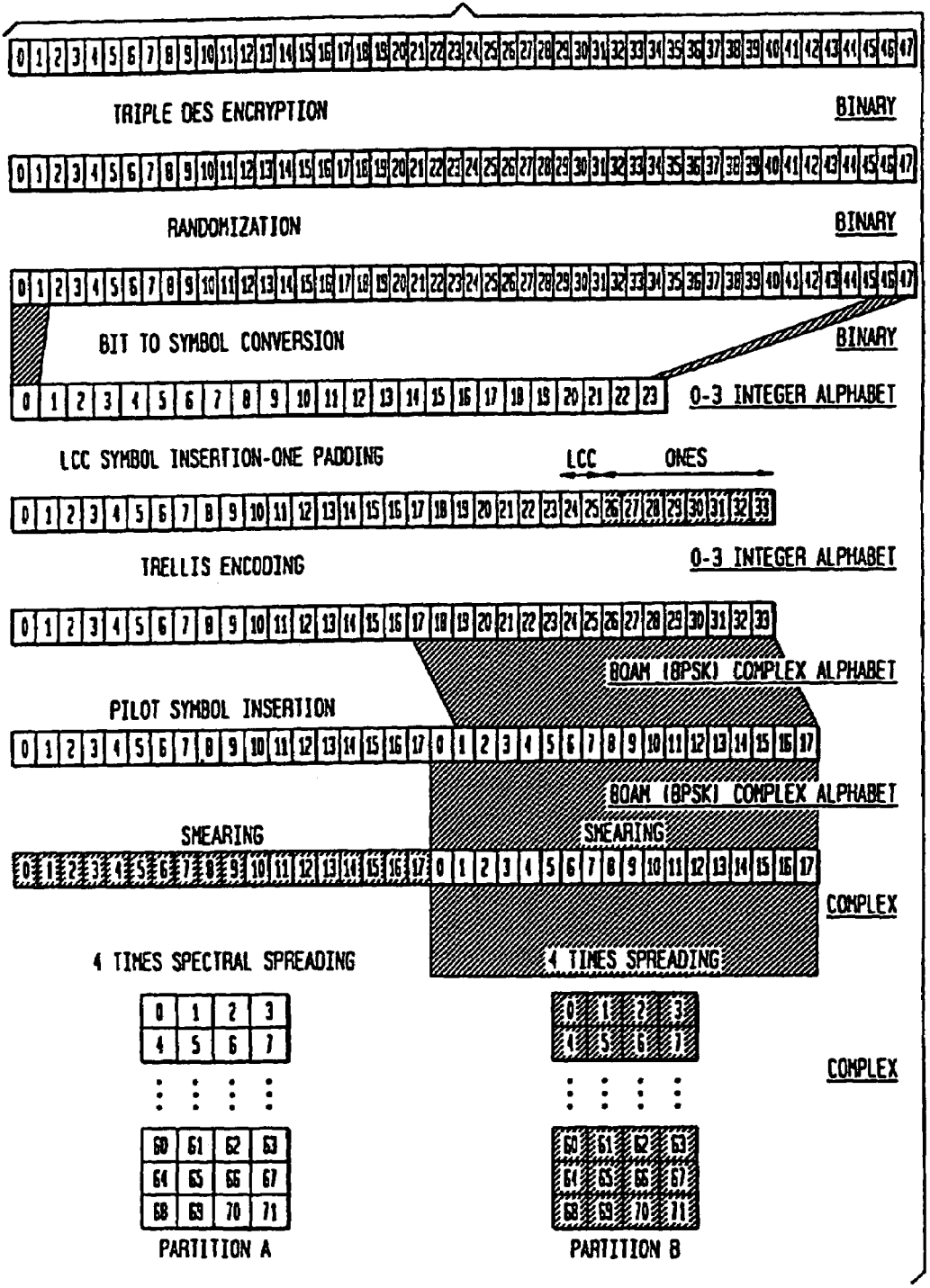
FIG. 60 is a Data Transformation Diagram for the Medium Capacity Reverse Channel Transmissions

This process is repeated from the start for the next 48 bits of binary data to be transmitted in the next reverse channel transmission burst. The various steps in the transformation of binary data are shown in FIG. 60.

Low Capacity Mode

Figure 61:
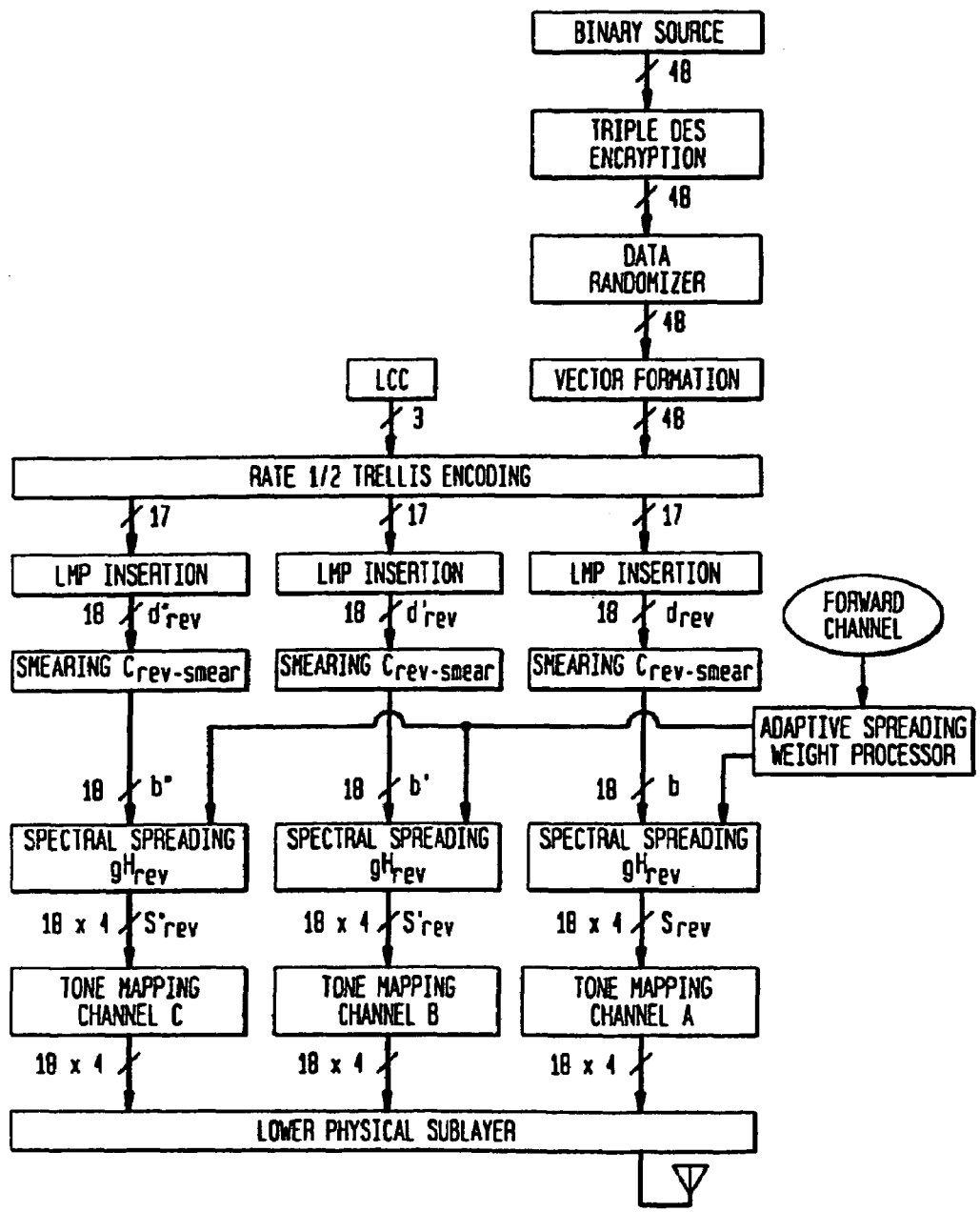
FIG. 61 is a Functional Block Diagram for the Upper Physical Layer of Remote Unit Transmitter for Low Capacity Mode

The block diagram for the upper physical layer of the Remote Unit transmitter for low capacity mode is shown in FIG. 61. The binary source delivers binary data to the Remote Unit transmitter at 64 kbits/sec. For one reverse channel burst, this translates to 48 bits. The information bits are encrypted according to the triple DES algorithm. The encrypted bits are then randomized in the data randomization block. The 48 bits are formed into a vector, and three bits from the LCC are added to form a vector of 51 bits.

The 51-bit vector is trellis encoded. The trellis encoding starts with the most significant bit (first element of the vector) and is continued sequentially until the last element of the vector (the third LCC bit). This process employs convolutional encoding that converts the binary input symbol (0 or 1) to another symbol (0, 1, 2, or 3) and maps the encoded symbol to its corresponding QPSK signal constellation point. The output of the trellis encoder is therefore a vector of 51 elements where each element is a signal within a set of QPSK constellation signals. The 51-element vector is divided into three 17-element vectors. An LMP is added to each of the vectors to form three (18×1) vectors $d_{rev}$, $d'_{rev}$, and $d''_{rev}$, with the LMP as the first element of these vectors. Each resulting vector is pre-multiplied by a (18×18) reverse smearing matrix $C_{rev\text{-}smear}$ to yield another three (18×1) vectors b, b', and b''. Each vector is post-multiplied by its corresponding (1×4) reverse spreading vector ($g^H_{rev}$, $g'^H_{rev}$, or $g''^H_{rev}$) to yield three (18×4) matrices $S_{rev}$, $S'_{rev}$ and $S''_{rev}$. Elements of matrix $S_{rev}$ are mapped to tones within traffic partition A according to the mapping discussed in FIG. 22 and are sent to the lower physical layer. Similarly, elements of matrices $S'_{rev}$ and $S''_{rev}$ are mapped to tones within traffic partition B and C, respectively, and are sent to the lower physical. The lower physical layer places the baseband signals in their corresponding DFT frequency bins where the data is converted into the time domain and sent for transmission over the air.

Figure 62:
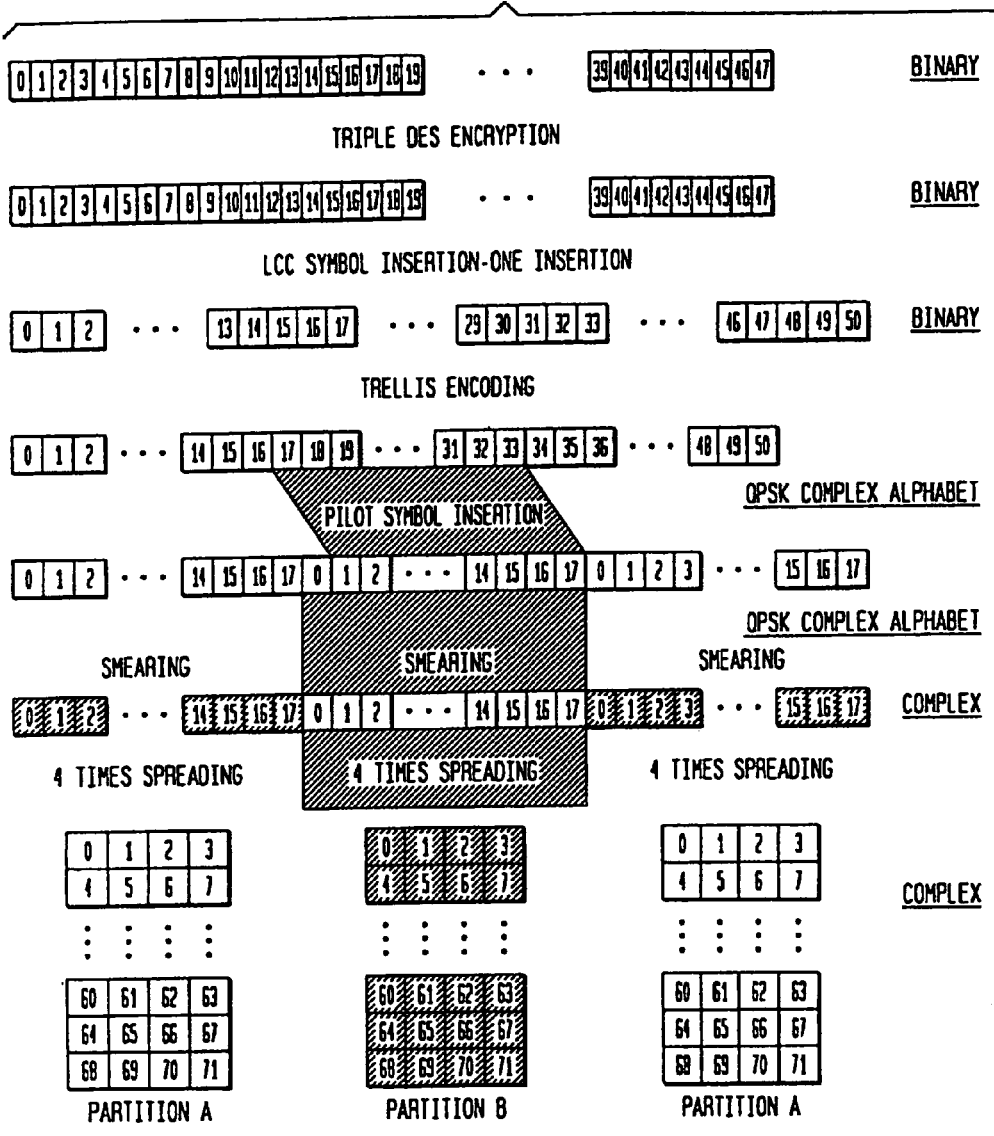
FIG. 62 is a Data Transformation Diagram for the Low Capacity Reverse Channel Transmissions

This process is repeated from the start for the next 48 bits of binary data to be transmitted in the next reverse channel transmission burst. The various steps in the transformation of binary data are shown in FIG. 62.

The encryption function is identical to that for the forward channel described herein.

The trellis encoding schemes for all three capacity modes are identical to those for the forward channel described herein.

This section specifies the smearing matrix $C_{rev\text{-}smear}$. The input to the smearing block is the (18×1) vector $D_{rev}$. The output of the smearing operation (vector b) can then be described by the matrix multiplication of $d_{rev}$ and the (18×18) smearing matrix $C_{rev\text{-}smear}$. That is $$b = C_{rev\text{-}smear} d_{rev}$$

$C_{fwd\text{-}smear}$ is the constant valued matrix shown below:

$$\begin{bmatrix} 1 & 0 & 0 & 0 & 0 & 0 & 0 & 0 & 0 & 0 & 0 & 0 & 0 & 0 & 0 & 0 & 0 & 0 \\ \alpha & \beta\delta 0 & 0 & 0 & 0 & 0 & 0 & 0 & 0 & 0 & 0 & 0 & 0 & 0 & 0 & 0 & 0 & 0 \\ \alpha & 0 & \beta\delta 1 & 0 & 0 & 0 & 0 & 0 & 0 & 0 & 0 & 0 & 0 & 0 & 0 & 0 & 0 & 0 \\ \alpha & 0 & 0 & \beta\delta 2 & 0 & 0 & 0 & 0 & 0 & 0 & 0 & 0 & 0 & 0 & 0 & 0 & 0 & 0 \\ \alpha & 0 & 0 & 0 & \beta\delta 3 & 0 & 0 & 0 & 0 & 0 & 0 & 0 & 0 & 0 & 0 & 0 & 0 & 0 \\ \alpha & 0 & 0 & 0 & 0 & \beta\delta 4 & 0 & 0 & 0 & 0 & 0 & 0 & 0 & 0 & 0 & 0 & 0 & 0 \\ \alpha & 0 & 0 & 0 & 0 & 0 & \beta\delta 5 & 0 & 0 & 0 & 0 & 0 & 0 & 0 & 0 & 0 & 0 & 0 \\ \alpha & 0 & 0 & 0 & 0 & 0 & 0 & \beta\delta 6 & 0 & 0 & 0 & 0 & 0 & 0 & 0 & 0 & 0 & 0 \\ \alpha & 0 & 0 & 0 & 0 & 0 & 0 & 0 & \beta\delta 7 & 0 & 0 & 0 & 0 & 0 & 0 & 0 & 0 & 0 \\ \alpha & 0 & 0 & 0 & 0 & 0 & 0 & 0 & 0 & \beta\delta 8 & 0 & 0 & 0 & 0 & 0 & 0 & 0 & 0 \\ \alpha & 0 & 0 & 0 & 0 & 0 & 0 & 0 & 0 & 0 & \beta\delta 9 & 0 & 0 & 0 & 0 & 0 & 0 & 0 \\ \alpha & 0 & 0 & 0 & 0 & 0 & 0 & 0 & 0 & 0 & 0 & \beta\delta 10 & 0 & 0 & 0 & 0 & 0 & 0 \\ \alpha & 0 & 0 & 0 & 0 & 0 & 0 & 0 & 0 & 0 & 0 & 0 & \beta\delta 11 & 0 & 0 & 0 & 0 & 0 \\ \alpha & 0 & 0 & 0 & 0 & 0 & 0 & 0 & 0 & 0 & 0 & 0 & 0 & \beta\delta 12 & 0 & 0 & 0 & 0 \\ \alpha & 0 & 0 & 0 & 0 & 0 & 0 & 0 & 0 & 0 & 0 & 0 & 0 & 0 & \beta\delta 13 & 0 & 0 & 0 \\ \alpha & 0 & 0 & 0 & 0 & 0 & 0 & 0 & 0 & 0 & 0 & 0 & 0 & 0 & 0 & \beta\delta 14 & 0 & 0 \\ \alpha & 0 & 0 & 0 & 0 & 0 & 0 & 0 & 0 & 0 & 0 & 0 & 0 & 0 & 0 & 0 & \beta\delta 15 & 0 \\ \alpha & 0 & 0 & 0 & 0 & 0 & 0 & 0 & 0 & 0 & 0 & 0 & 0 & 0 & 0 & 0 & 0 & \beta\delta 16 \end{bmatrix}$$

where, $$a = (r_{LMP}/(1+r_{LMP}))^{1/2}$$

$$b = (1/(1+r_{LMP}))^{1/2}$$

$r_{LMP}$ is the ratio of pilot to data power that is a physical layer provisionable parameter whose value is nominally set to one.

The $d_i$s are elements of the cluster scrambling vector $d_{smear}$ that is unique to the Remote Unit. $d_{smear}$ is a 17-element vector that is used to ensure that the smeared data from one user received in a particular traffic partition at the Base is uncorrelated with other users within the same traffic partition in the local spatial cell and adjacent spatial cells. $d_{smear}$ is given by:

$$\begin{vmatrix} d_0 \\ d_1 \\ \vdots \\ d_{15} \\ d_{16} \end{vmatrix} \begin{vmatrix} e^{j\phi(0)} \\ e^{j\phi(1)} \\ \vdots \\ e^{j\phi(15)} \\ e^{j\phi(16)} \end{vmatrix}$$

or $$\begin{vmatrix} e^{j\phi(0)} \\ e^{j\phi(1)} \\ \vdots \\ e^{j\phi(15)} \\ e^{j\phi(16)} \end{vmatrix}$$

The ith element of $d_{smear}$ has the form $e^{jf}_{smear}$ where $f_{smear}(i)$ is a real number between 0 and 2p generated by a pseudo-random number generator creating unique sequences for each Remote Unit. The details of the pseudo-random number generator are implementation dependent and need not be known at the Base.

Spectral Spreading

This section defines the (1×4) reverse spectral spreading vector $g^H_{rev}$ shown in FIG. 57. The input to the spectral spreading block is the (18×1) vector b. The output of the spectral and spatial spreading operation, (18×4) matrix $S_{rev}$, is the matrix multiplication of b and the (1×4) Spectral spreading vector $g^H_{rev}$:

$$S_{rev} = b g^H_{rev}$$

where, $$g^H_{rev} = [g0 g1 g2 \ldots g30 g31]$$

The elements of vector $g^H_{rev}$ are transmit spreading weights calculated throughout the transmission. The algorithm for the derivation of these weights is implementation dependent. However, to clarify the procedure a specific algorithm for the derivation of these weights is described below.

The Remote Unit derives its new transmit weights based on the most recent data received on the forward channel. The transmit weights are a scaled version of the received weights using four receive frequencies for a single antenna.

Figures 63, 65:
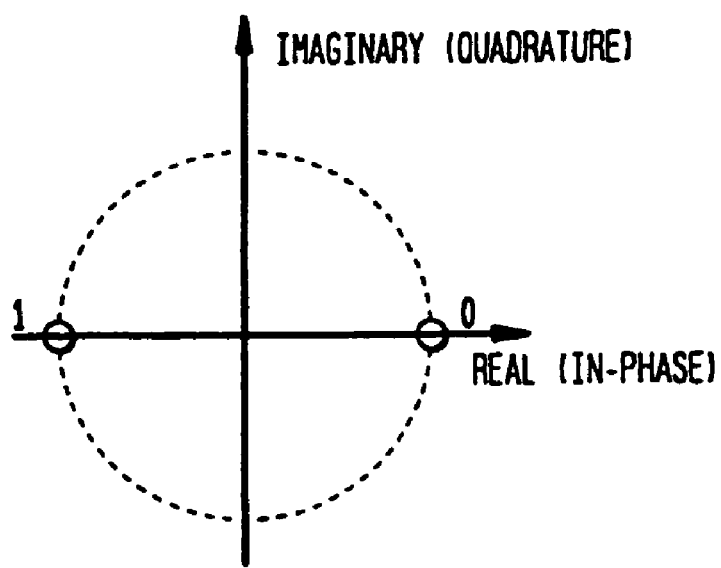

The receive weight vector $w^H_{fwd}$ has four elements ($w_0$–$w_3$) that are mapped to spectral components as shown in FIG. 63.

For the Remote Unit traffic establishment procedure, the transmit weights ($g_0$–$g_3$) are calculated according to the following equation:

$$g^H_{rev}(p) = a_{rev}(n) p_{rev} w^H_{fwd}$$

where $a_{fwd}(n)$ is the Base gain ramp-up factor for the nth packet and where $p_{rev}$ is the Remote Unit power management factor defined by the equation below:

$$p_{rev} = l_p k_{fwd} + (1-1_p) k_{rev}(p_{loss}(n,p)/\|(w_{fwd}(p))\|)$$

where, $1_p$ is the exponential decay or "forget factor" nominally set to 0.97

$p_{loss}$ is the reciprocal of the Base-Remote Unit channel gain measured using the Remote Unit Synchronization Pilot (RSP) tones $k_{rev}$ is the target Base receive power (nominally −103 dBm)

n is the burst index p is the link index

For the Remote Unit traffic establishment procedure, the receive weights are adaptively calculated using the following equation:

$$w_{fwd} = R^{-1}_{xx} r_{xd}$$

where $w_{fwd}$ is the (4×1) receive weight vector $r_{xd}$ is an estimate of the (4×1) cross-correlation vector of the received (4×1) vector x and the LMP (or the desired data) d $R^{-1}_{xx}$ is an estimate of the (4×4) inverted auto-correlation matrix of the received vector x For the Remote Unit steady-state procedure, receive weights are adaptively calculated using the following equation:

$$w_{fwd} = R^{-1} xx rxy$$

where $w_{fwd}$ is the (4×1) weight vector $r_{xy}$ is an estimate of the (4×1) cross-correlation vector of the received (4×1) vector x and the despread data y $R^{-1}_{xx}$ is an estimate of the (4×4) inverted auto-correlation matrix of the received vector x The receive weights ($w_0$–$w_3$) are mapped to spectral components according to the mapping shown in FIG. 63. The transmit weights ($g_0$–$g_3$) are a scaled version of the receive weights. The scaling is made according to the following equation:

$$g^H_{rev}(p) = p_{rev} w^H_{fwd}$$

where $p_{rev}$ is the Remote Unit power management factor defined earlier.

Correlation estimates are computed over four forward-channel burst. The new despreading weights are applied to four forward channel bursts with no delay. The spreading weights are applied to eight reverse channel bursts after an 8-burst delay. Correlation estimates are made using an exponentially average block summation. The exponential decay constant is provisional with a nominal value of 0.7.

Reverse Control Channel Transmission Format

Figure 64:
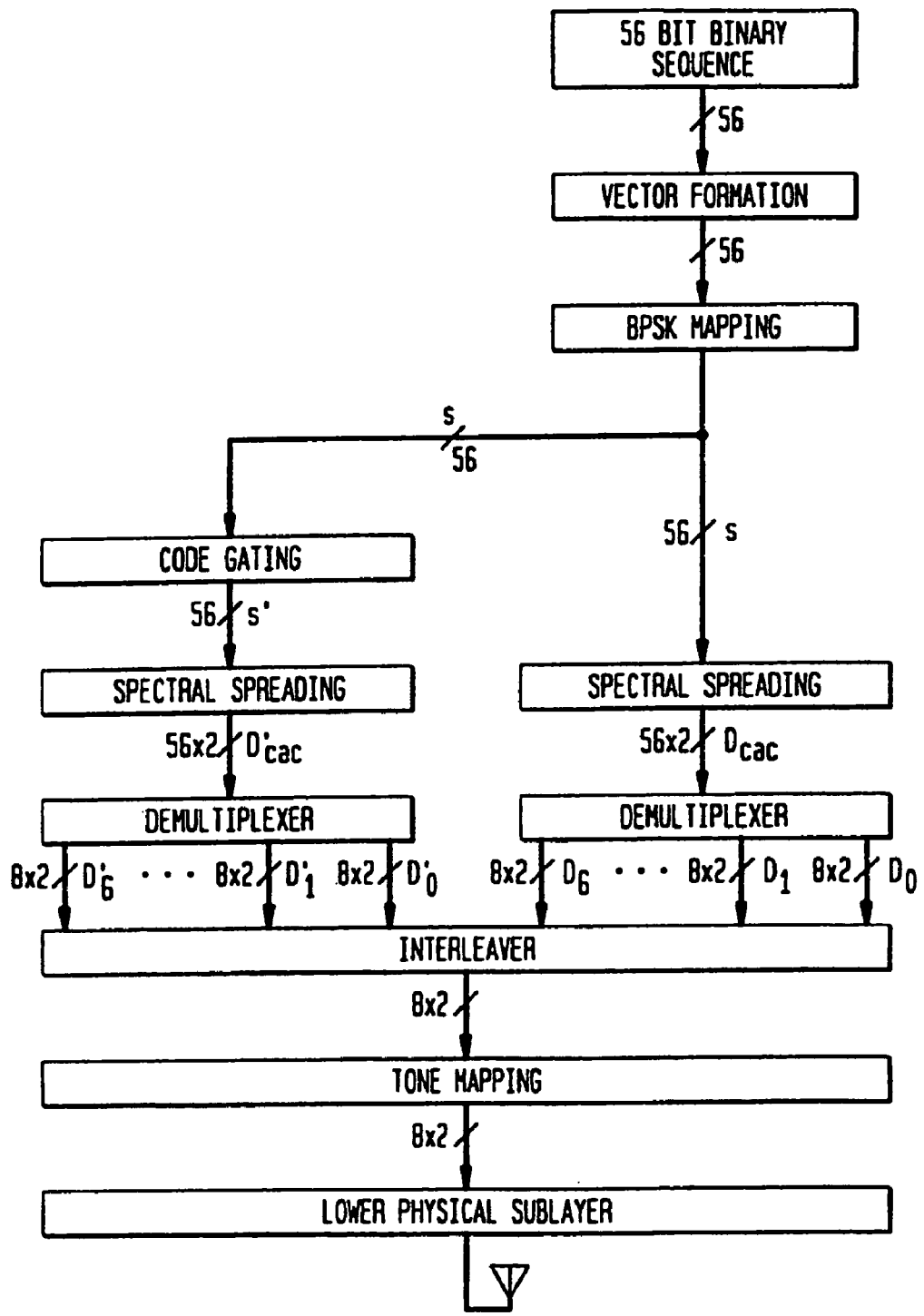
FIG. 64 is a Block Diagram Representation of the CAC Physical Layer Format

The block diagram for the physical layer of the solicited and unsolicited Common Access Channel (CAC) channel transmissions is shown in FIG. 64.

A CAC message is a 56-bit binary sequence composed of a training sequence, information bits, and CRC parity bits.

The vector formation block converts the binary sequence into a (56×1) vector. Each element of the resulting vector is mapped into its corresponding signal in the BPSK signal constellation to form another (56×1) vector s. The mapping for the BPSK signal is shown in FIGS. 65 and 65A.

The resulting vector is passed through two parallel paths. In the first path, the vector s is sent directly for spectral spreading that involves post-multiplying it by the (1×2) spectral spreading vector $g_{cac}^H$:

$$g_{cac}^H = [1\ 1]$$

The resulting (56×2) matrix is $D_{cac}$ given by:

$$\begin{vmatrix} s(0) & s(0) \\ s(1) & s(1) \\ \ldots & \ldots \\ s(54) & s(54) \\ s(55) & s(55) \end{vmatrix}$$

Where s(k) is the kth element of vector s. Matrix $D_{cac}$ is then sent to the demultiplexer where it is partitioned (by group of eight rows) into seven (8×2) submatrices $D_0$ to $D_6$.

In the second path, the vector s is code-gated. The code-gating operation is described by the element-wise multiplication of the (56×1) vector s with a (56×1) code-gating vector $Y_{cac}$. The resulting (56×1) vector is s':

$$s' = s \cdot i_{cac}$$

The vector $i_{cac}$ is described below.

The resulting (56×1) vector s' is sent for spectral spreading that involves post-multiplying it by the (1×2) spectral spreading vector $g_{cac}^H$. The resulting (56×2) matrix is $D'_{cac}$:

$$\begin{vmatrix} s'(0) & s'(0) \\ s'(1) & s'(1) \\ \ldots & \ldots \\ s'(54) & s'(54) \\ s'(55) & s'(55) \end{vmatrix}$$

where s'(k) is the kth element of vector s'. Matrix $D'_{cac}$ is then sent to the demultiplexer where it is partitioned (by groups of eight rows) into seven (8×2) submatrices $D'_0$ to $D'_6$.

The transmission of one 56 bit CAC message requires 14 reverse channel bursts. In each of these burst, one of the 14 (8×2) matrices is mapped onto tones and sent to the lower physical layer for transmission over the air. The interleaving and tone mapping functions are described below.

The code-gating vector $i_{cac}$ is:

$$i_{cac} = b_{cac} \cdot h_{cac}$$

and $$b_{cac}(l) = e^{j2\pi i k_{offset}/56}$$

where $b_{cac}(i)$ is the ith element of the (56×1) vector $b_{cac}$. The $k_{offset}$ is the BSOC for the receiving Base, that ranges between 0 and 31. Every Remote Unit is assigned a pair of code keys: the solicited CAC code key and the unsolicited CAC code key. The code keys are integer numbers between 0 and 63.

The 56 elements of the vector $h_{cac}$, are the first 56 elements of the kth column of the (64×64) Hadamard matrix ($H_{64}$), where k is the value of the solicited or the unsolicited code key for the transmitting Remote Unit depending on the type of CAC transmission. For instance, if, for a given Remote Unit, the solicited code key is the number 13, and the unsolicited code key is the number 15:

In SCAC transmissions, elements of the vector $h_{cac}$ are the first 56 elements of the $13^{th}$ column of the (64×64) Hadamard matrix In UCAC transmissions, elements of the vector $h_{cac}$ are the first 56 elements of the $15^{th}$ column of the (64×64) Hadamard matrix There are 14 burst in every CAC transmission (burst 0 to burst 13). The interleaver outputs one of the 14 possible (8×2) matrices ($D_0$ to $D_6$) or ($D'_0$ to $D'_6$), in each burst. FIG. 66 shows the order of the transmission used by the interleaver. There are two CACs in each sub-band pair. The Remote Unit will use one of these channels depending on the CAC ID parameter received from its MAC layer. If the CAC ID is 0, the $CAC_{i,0}$ is selected; if the CAC ID is 1, the $CAC_{i,1}$ is selected. FIG. 67 shows the mapping of the (8×2) matrix at the output of the interleaver into tones.

Lower Physical Layer Format

Figure 68:
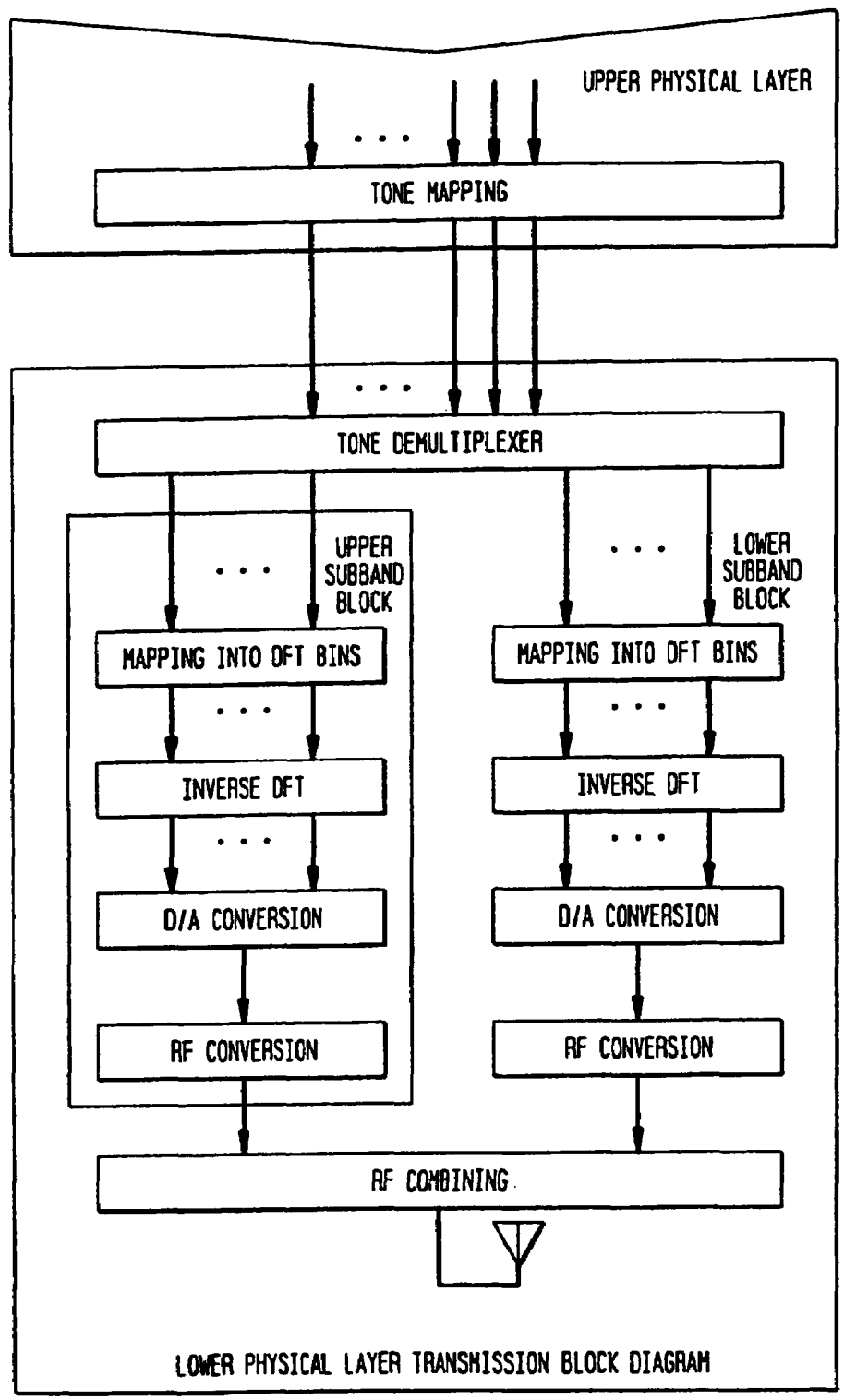
FIG. 68 is a Functional Block Diagram for the Lower Physical Layer of Base Transmitter

The transmitter for the lower physical layer of this embodiment is functionally described by the block diagram in FIG. 68. The lower physical layer functionality is identical in forward and reverse channels.

In the forward channel, for traffic channel transmissions, the process shown in FIG. 68 is performed in parallel eight times for eight different antenna elements. Furthermore, the Base may combine data intended for various users into the same DFT bin to reduce processing requirements. It is possible to further reduce the processing by simultaneously transmitting traffic and control information (at the Base or the Remote Unit) as they are carried on non-overlapping frequency tones. These techniques, however, are implementation dependent and do not change the functional characteristics of the DFT operation. As shown in FIG. 68, complex baseband signals enter the tone mapping block, where they are assigned into tones according to a unique mapping to either a traffic or a control channel.

The tone-mapped complex signals are complex signals are demultiplexed into lower sub-band and upper sub-band tones, and are placed into their corresponding DFT bins. The remaining DFT bins are filled with zeros and the inverse DFT operation is performed, thereby transforming the data into the time domain. The discrete time-domain samples are then converted into an analog signal, converted to the appropriate RF frequency, and transmitted over the antenna.

Figure 70:
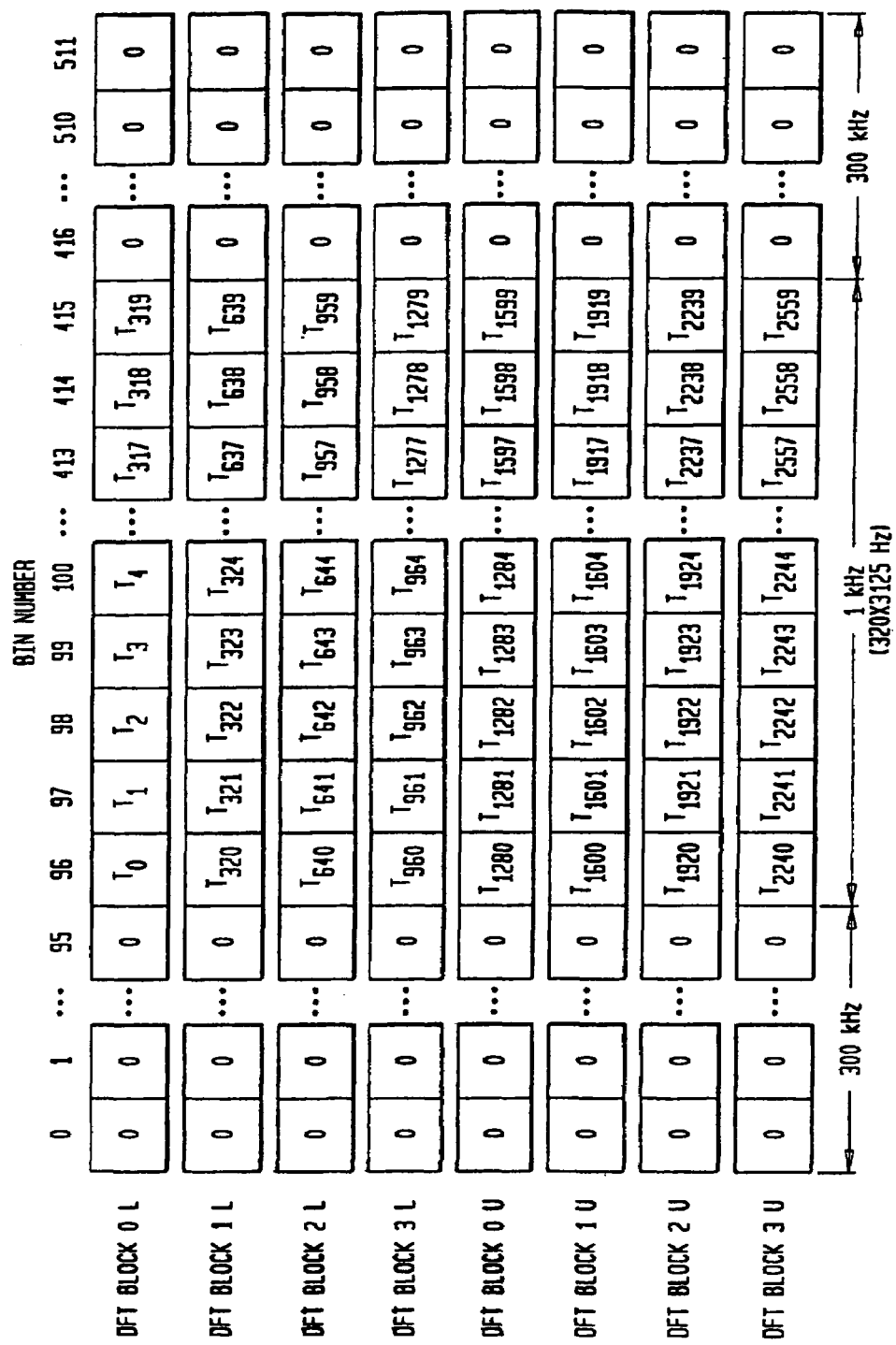
FIG. 70 shows Tone Mapping into DFT Bins

As there are four sub-band pairs, there are four pairs of DFT blocks, where each DFT block spans one MHz of usable bandwidth. The spacing between the adjacent bins in one DFT block is 3.125 kHz. Each DFT block has 512 bins of which only 320 bins are used. Tone mapping into corresponding DFT bins in each DFT block are shown in FIG. 69. FIG. 70 depicts tone mapping pictorially. As shown, the frequency span of one DFT block is 1.6 MHz where only 1 MHz is used for data transmission. The relationship between tones and the actual frequency for each bin is explained herein.

The inverse DFT operation is carried out to convert the baseband signals into time domain. The mathematical representation of the operation is:

$$x(n) = SX(k) e^{j2\pi nk/512}$$

where X(k) is the complex baseband signals in the frequency domain (the contents of the kth bin of a DFT block), and x(n) is the nth real-valued component of the time-domain sample. The inverse DFT operation may be carried out using Inverse Fast Fourier Transform (IFFT) techniques.

The baseband transmit signals obtained after the IDFT operation must be real. The real-valued time-domain sample outputs are then converted to the proper RF frequency and the appropriate analog waveform for transmission.

Airlink Physical Layer Power Output Characteristics

The power output characteristics of Base transmissions on the forward channel are different from that of the Remote Unit transmissions on the reverse channel.

The forward channel transmission from a Base to a given Remote Unit is maintained at a fixed power level during the duration of a connection. The power level is determined by the Base radio management entity (RME) prior to the start of the connection using a power management algorithm.

A forward RF channel transmission is initiated by a 180 ms ramp-up period (240 forward channel bursts) during the traffic establishment period. The ramp-up starts after a connection is established between the Base and a given Remote Unit. The data transmitted during this period are known link maintenance pilots. The maximum (steady state) power is reached after 240 channel bursts (180 msec) and maintained throughout the connection.

The following equation shows the forward channel ramp-up schedule relative to the steady state power, $$a_{fwd}(n) = (1 - e^{-5(8[n/8])}/(1 - e^{-5}))^2$$

for n<240

$a_{fwd}(n) = 1$ otherwise where n is the forward channel burst number relative to the start of the transmission.

The reverse channel transmissions from a Remote Unit to its Base is adaptively varied to ensure that the received power from all RUs at their Base is maintained at a relatively constant level. The Remote Unit power management algorithm is implementation dependent. One example of the algorithm is discussed in the Section on the Reverse Channel Format A reverse RF channel transmission is initiated by a 180 ms ramp-up period (240 reverse channel bursts) during the traffic establishment period. The ramp-up starts after a connection is established between the Remote Unit and its Base. The data transmitted during this period are known LMPs. The maximum (steady state) power is reached after 240 reverse channel bursts (180 msec).

The following equation shows the reverse channel ramp-up schedule relative to the steady state power, $$a_{rev}(n) = (1 - e^{-5(8[n/8])}/(1 - e^{-5}))^2$$

for n<240

$a_{rev}(n) = 1$ otherwise where n is the reverse channel burst number relative to the start of the transmission.

A "Proof-of-Concept" Embodiment

The signal processing procedure described generally above can be implemented in a "proof-of-concept" embodiment by circuitry within the high-bandwidth base station 110 and the radio access stations 187, 192. In addition, the dynamic bandwidth allocation method of the present invention is implemented in a "proof-of-concept" embodiment within the circuitry of the communications network 100 depicted below.

Figure 71:
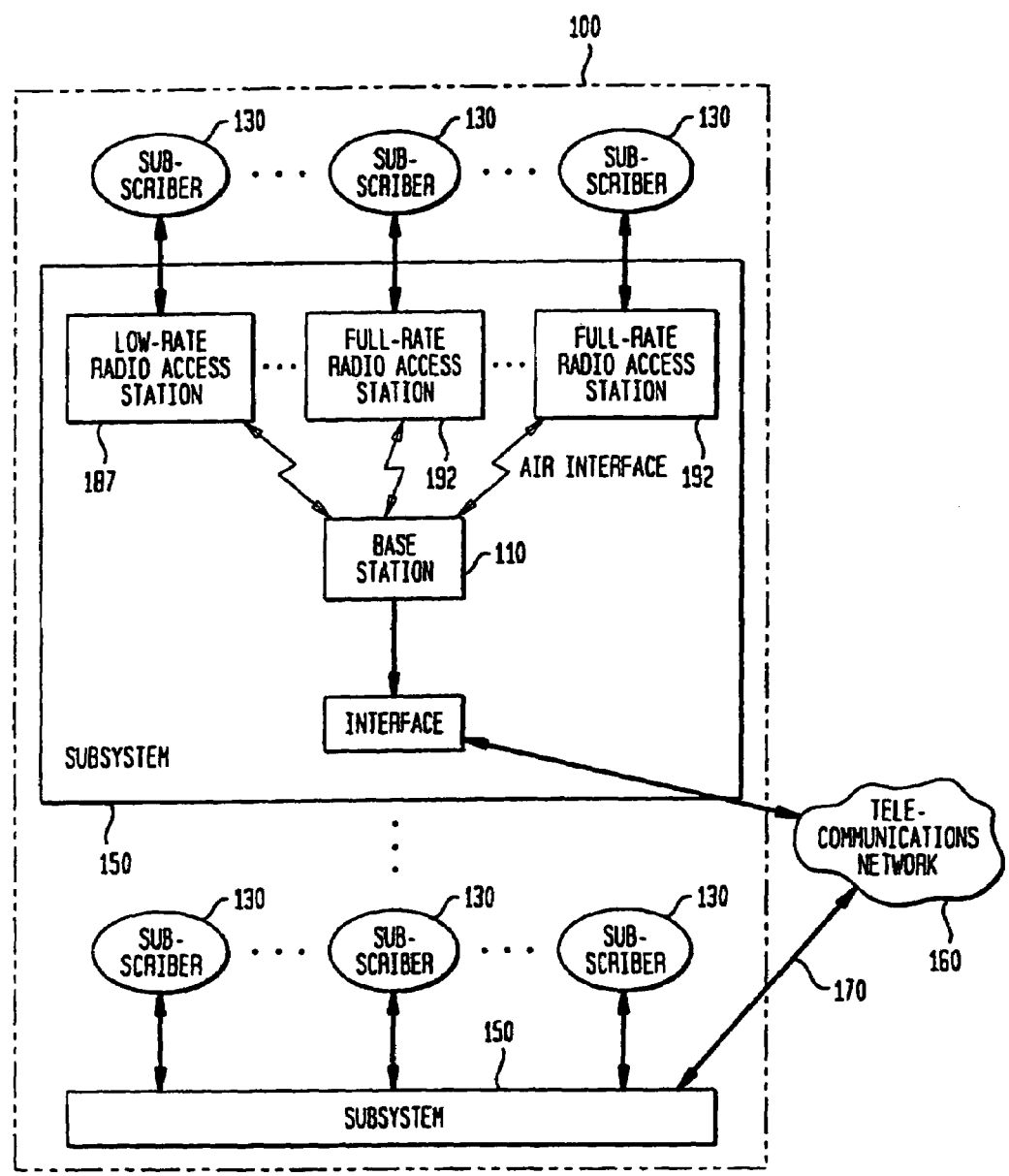
FIG. 71 is a block diagram that illustrates the main structural and functional elements of the bandwidth on demand communications network of the present invention.

FIG. 71 is a schematic block diagram showing the main structural elements of one implementation of the high bandwidth efficiency, bandwidth-on-demand communications network 100. Specifically, the communications network 100 is shown to include a plurality of full-rate, high-bandwidth, radio access stations 192 as well as a low-rate, high-bandwidth radio access station 187. Typically, a full-rate, high-bandwidth radio access station 192 is able to provide for communication between a base station 110 and a large number of subscribers 130, while the low-rate, high-bandwidth radio access station 187 is able to provide for communication with the base station 110 only one or a few subscribers 130 at a time.

The subscribers 130 communicate with the full-rate or low-rate, high-bandwidth radio access stations 192, 187 via a cable or other communication link. The high-bandwidth radio access stations 192, 187, in turn, communicate bidirectionally with the base station 110 via wireless communications channels to form an air-link. The structure and operation of the base station 110 as well as the structure and operation of the full and low-rate, high-bandwidth radio access stations 192, 187, will be discussed in greater detail below with reference to FIGS. 72 and 73.

The base station 110 together with the full and low-rate, high-bandwidth radio access stations 192, 187 together comprise a subsystem 150. The subsystem 150 communicates bidirectionally with a telecommunications network 160 via a land line 170 that may, for example, comprise a copper cable or a fiber-optic connection. Alternatively, the link 170 may comprise a microwave link. The telecommunications network 160 may include for example, the public switched telephone network, a mobile telephone switching office (MTSO), a private data network, a modem bank or a private branch exchange, as is well known in the art.

Figure 74:
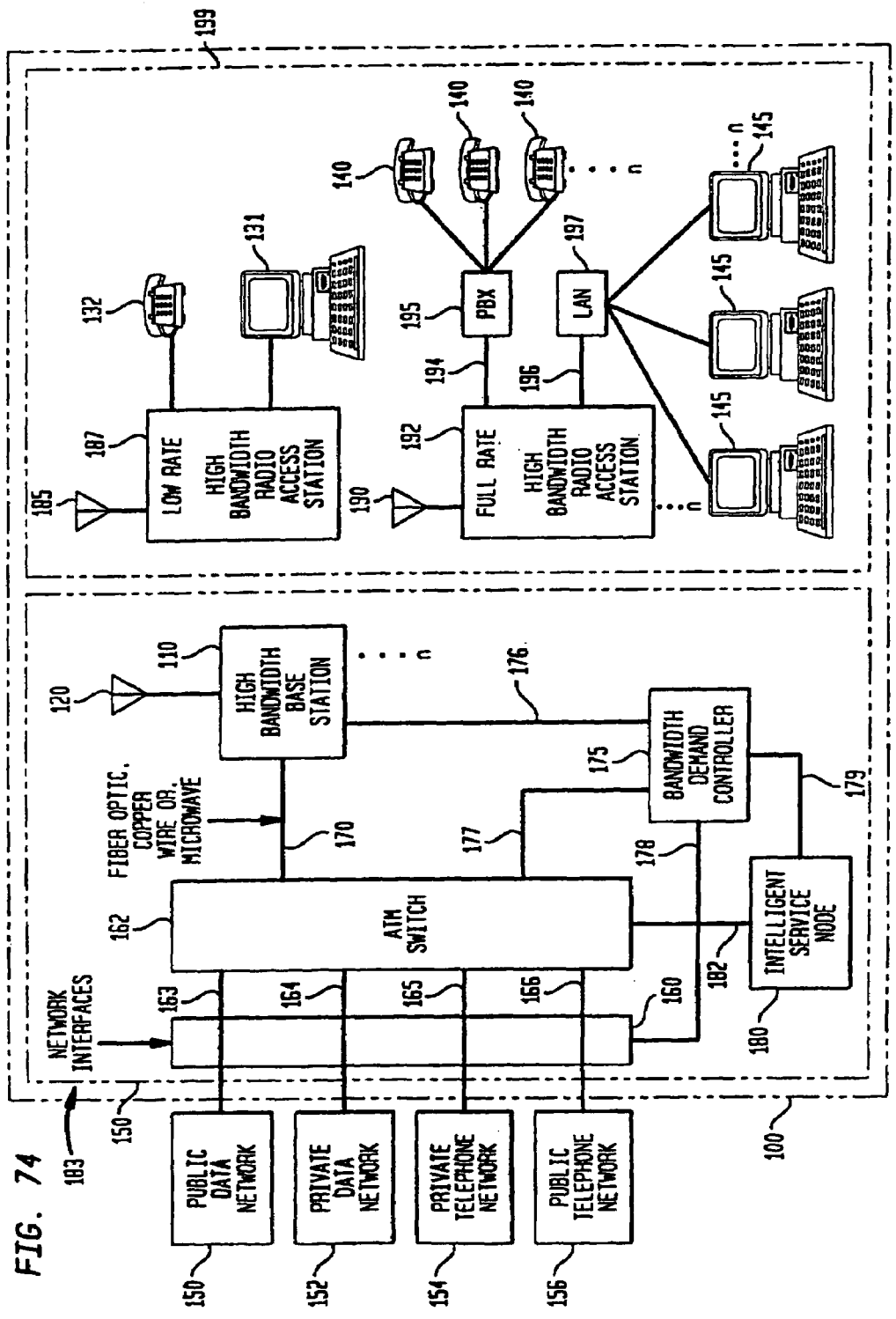
FIG. 74 is an overall system schematic block diagram that shows the main structural and functional elements of one implementation of the highly bandwidth-efficient communication system in greater detail.

FIG. 74 is a simplified schematic block diagram that shows the main functional and structural elements of the bandwidth-on-demand communications network 100 in greater detail. The communications network 100 is shown in FIG. 74 to connect a plurality of the subscriber units (e.g., the computer 131, the telephone 132, a plurality of telephones 140 in communication with a public switching network, or a plurality of computer terminals 145 within a local area network) to public or private data or telephone networks 150–156. Public data network 150, the private data network 152, the private telephone network 154, and the public telephone network 156 communicate with an asynchronous telecommunications multiplexer (ATM) 162 over lines 163, 164, 165, and 166, respectively, via a plurality of network interfaces, designated generally by a block 160. The asynchronous telecommunications multiplexer 162 acts as a multiplexing switch and connects with the high-bandwidth base station 192 via the communications link 170, that advantageously comprises a fiberoptic link, a copper wire, or a microwave transmission link. The high-bandwidth base station 110 provides radio frequency output signals to the receiving stations via the antenna 120.

A bandwidth demand controller 175 communicates with the high-bandwidth base station 110, asynchronous telecommunications manager switch 162, and the network interfaces 160 via lines 176, 177 and 178, respectively. The bandwidth demand controller 175 also communicates with an intelligent service node 180 via a line 179. The intelligent service node 180 communicates with the ATM switch 162 via a line 182. The above-described elements of the bandwidth on demand communications network 100 comprise the telecommunications network side 183 of the bandwidth-on-demand communication system 100. The telecommunications network side 183 communicates with the low rate high-bandwidth radio access station 187 via an antenna 185 or the full rate high band width radio access station 192 via an antenna 190. The radio access station 187 connects to a plurality of the subscriber units including the telephone 132 and the computer 131. The radio access station 192 is configured to communicate with multiple subscribers 140 via a public switching network 195 that connects to the radio access station 192 via a communications link 194. The full rate radio access station 192 further connects to the computer terminals 145 via a local network 197 that connects to the radio access station 192 via communication link 196. Each of the subscriber units 131, 132, 140 and 145, together with the elements 185–197 of the communications system 100, comprise a subscriber network side 199 of the bandwidth-on-demand communications system 100.

The high-bandwidth base station 110 in association with the bandwidth demand controller 175, and the high-bandwidth radio access stations 187, 192 that communicate with the high-bandwidth base station 110 via an air link, are the heart of the bandwidth on demand communication system 100. Although only a single high-bandwidth base station 100 is depicted in FIG. 74, it will be understood that a plurality of high-bandwidth base stations are advantageously included within the high-bandwidth communication system 100. Each of the high-bandwidth base stations 110 is capable of supporting from one to hundreds of simultaneous bi-directional users. Each user may request in advance, or optionally, during the course of communications, an amount of bandwidth from 8 kilobits to 1.544 megabits per second. Furthermore, each high-bandwidth base station 110 may have one or multiple transmitting and receiving antennas 120. The high-bandwidth base stations 110 are high-bandwidth radio transceivers, that, with their associated antennas 120, may be located on towers, on top of buildings, inside buildings, or in other convenient locations.

A bandwidth controller 175 is associated with the high-bandwidth base stations 110. The bandwidth demand controller 175 provides intelligence to monitor information transmitted to the base stations 110 from the radio access stations 187, 192. Specifically, the information transmitted from the high-bandwidth radio access stations 187, 192 are converted to intelligence within the bandwidth demand controller 175 in order to instruct the base stations 110 how much bandwidth to provide a given radio access station 187, 192. Although shown in FIG. 74 as a separate element from the high-bandwidth base station 110, the bandwidth demand controller 175 may be integral to a base station 110, may be attached locally to a base station 110, or may be remote and connected to a base station 110 via the communication link 176. The bandwidth demand controller 175 further acts as a central bandwidth controller that insures that the bandwidth appropriated at each communication link throughout the communications network 183 is consistent with the bandwidth assigned to a particular channel on the high-bandwidth base station 110. Thus, the bandwidth demand controller 175 controls bandwidth allocated within the asynchronous telecommunications multiplexer switch 162, and the network interfaces 160. Additionally, the bandwidth demand controller 175 communicates bandwidth information to the intelligent service node 180 that is used to manage the delivery of the user data to the appropriate network 150–156. The intelligent service node 180 can control the ATM switch 162 to manage bandwidth changes and the network interfaces 160.

The high-bandwidth radio access stations 187, 192, as shown in FIG. 74, are exemplary of a plurality of high-bandwidth radio access stations that are included within the bandwidth on demand communication system 100. One or more of the high-bandwidth radio access stations 187, 192 are capable of communicating with one or more high-bandwidth base stations 110 utilizing the air interface. In addition, each of the radio access stations 187, 192 is capable of supporting one or more interfaces such as the connections between the telephone 132 and the standard computer 131, as well as the telephone network interface (PBX) 195 and the computer network comprising the terminals 145 and the LAN 197. The high-bandwidth radio access stations 187, 192 have the capability to interpret bandwidth needs of the devices connected to the radio access stations 187, 192, and communicate these bandwidth needs via the air interface and the base station 110, to the bandwidth demand controller 175. Advantageously, the bandwidth demand controller 175 can further communicate these bandwidth demands to the ATM switch 162 or the intelligent service node 180, and the network interfaces 160.

In operation, one of the connected subscriber units (e.g., the computer 131, the telephone 132, the PBX 195, or the LAN 197) requests bandwidths via a connection to one of the high-bandwidth radio access stations 187, 192. The radio access station 187, 192 transmits a request for access and bandwidth to the high-bandwidth base station 110 via the antenna 185, 190, the air interface, and the antenna 120. The request for access is made via a communications control channel available to all subscribers within the area of use. If two subscribers simultaneously request connection, then a random accessing protocol is employed to determine which unit is first granted control of the communications control channel.

The high-bandwidth base station 110 communicates all bandwidth requests to the bandwidth demand controller 175. The bandwidth demand controller performs an allocation of the requested bandwidth and advantageously arranges system resources within the telecommunications network side 183 (including the intelligent service node 180, the ATM switch 162, and the network interfaces 160). Once the bandwidth demand controller 175 determines the amount of bandwidth available for allocation, and compares this with the requested bandwidths, the bandwidth demand controller 175 either immediately allocates the requested bandwidth, or begins a negotiation process using the available amount of bandwidth. This bandwidth negotiation occurs between the bandwidth demand controller and the radio access station 187, 192 through the base station 110 and the air interface.

Thus, the radio access station 187, 192 either receives an acknowledgment that the bandwidth requested is available, and subsequently begins transmitting data, or the radio access station 187, 192 receives an offer of less bandwidth from the bandwidth demand controller 175. If an offer of less bandwidth is transmitted to the high-bandwidth radio access station 187, 192, the radio access station 187, 192 determines whether the connected device or network can effectively operate with the offered bandwidth. If the connected device or network can effectively operate with the offered bandwidth, the radio access station 187, 192 begins transmitting data at the offered bandwidth. However, if the radio access station 187, 192 determines that the offered bandwidth is not adequate for operation of the connected device or network, the radio access station 187, 192 notifies the connected device or network that access is not available, and further notifies the bandwidth demand controller 175 (via the base station 110 and the air interface) that the offered bandwidth will not be used by the radio access station 187, 192.

If a suitable bandwidth is available, the bandwidth controller allocates this bandwidth to establish a communications channel with the requesting subscriber. Thus, for example, the telephone subscriber unit 132 may indicate that a data rate of 8 Kb per second is required (that corresponds to a particular bandwidth) while the computer subscriber unit 131 may indicate that a total transmission rate of 128 Kb per second (corresponding to another given bandwidth) in order to establish effective communications with the high-bandwidth base station 110. If the communications network 100 is unable to provide the requested amount of bandwidth, a negotiations process commences wherein the high-bandwidth base station 110 transmits an alternative bandwidth, that is less than the requested bandwidth, to the requesting subscriber unit via the radio access station 187. The requested subscriber unit then indicates to the high-bandwidth base station 110 whether or not the allocated bandwidth is suitable for the communications needs of the subscriber unit.

As will be described in greater detail below, the bandwidth demand controller 175 allocates bandwidth by assigning one or more frequency tone set and one or more spreading code to the subscriber unit in accordance with a pre-defined bandwidth allocation procedure. Each tone set and spreading code increases bandwidth by an additional factor. In one advantageous embodiment, bandwidth can be allocated in amounts as small as 8 Kbits/sec to as large as 1.544 Mbits/sec to define the communications channel.

Once a communications channel is established for the requesting subscriber 130, data representing either human voice communications or computer-to-computer communications in digital form, is transmitted between the high-bandwidth base station 110 and the high-bandwidth radio access station 187, 192. As will be described in greater detail below, the digitally encoded signal contains forward error correction together with signal spreading and other modulation techniques.

All data received by the high-bandwidth base station 110 from all communicating radio access stations 187, 192 are multiplexed into an asynchronous telecommunications multiplexed data stream and transmitted, via the communication link 170, to the ATM switch 162. At the ATM switch 162, the data stream is switched (i.e., demultiplexed) with the optional assistance of the intelligent service node 180 to the appropriate network interfaces 160, and from there onto the appropriate network 150–156.

As will be discussed in further detail below, the bandwidth demand controller 175 also controls bandwidth allocation for the network interfaces 160 and the ATM switch 162. In this manner, the bandwidth allocated throughout an entire communications link (i.e., from a subscriber to a data or telephone network) can be flexibly assigned according to the needs of each subscriber unit. Furthermore, the preferred embodiment assures that the bandwidth through the air interface and the bandwidth through the land line connections are appropriately matched.

When a device or network connected to a high-bandwidth radio access station 187, 192 no longer requires bandwidth, the radio access station 187, 192 ceases transmission to the base station 110, and notifies the bandwidth demand controller that the bandwidth is now released for reallocation.

The "Proof-of-Concept Embodiment"—Remote Terminal Hardware

Figure 72:
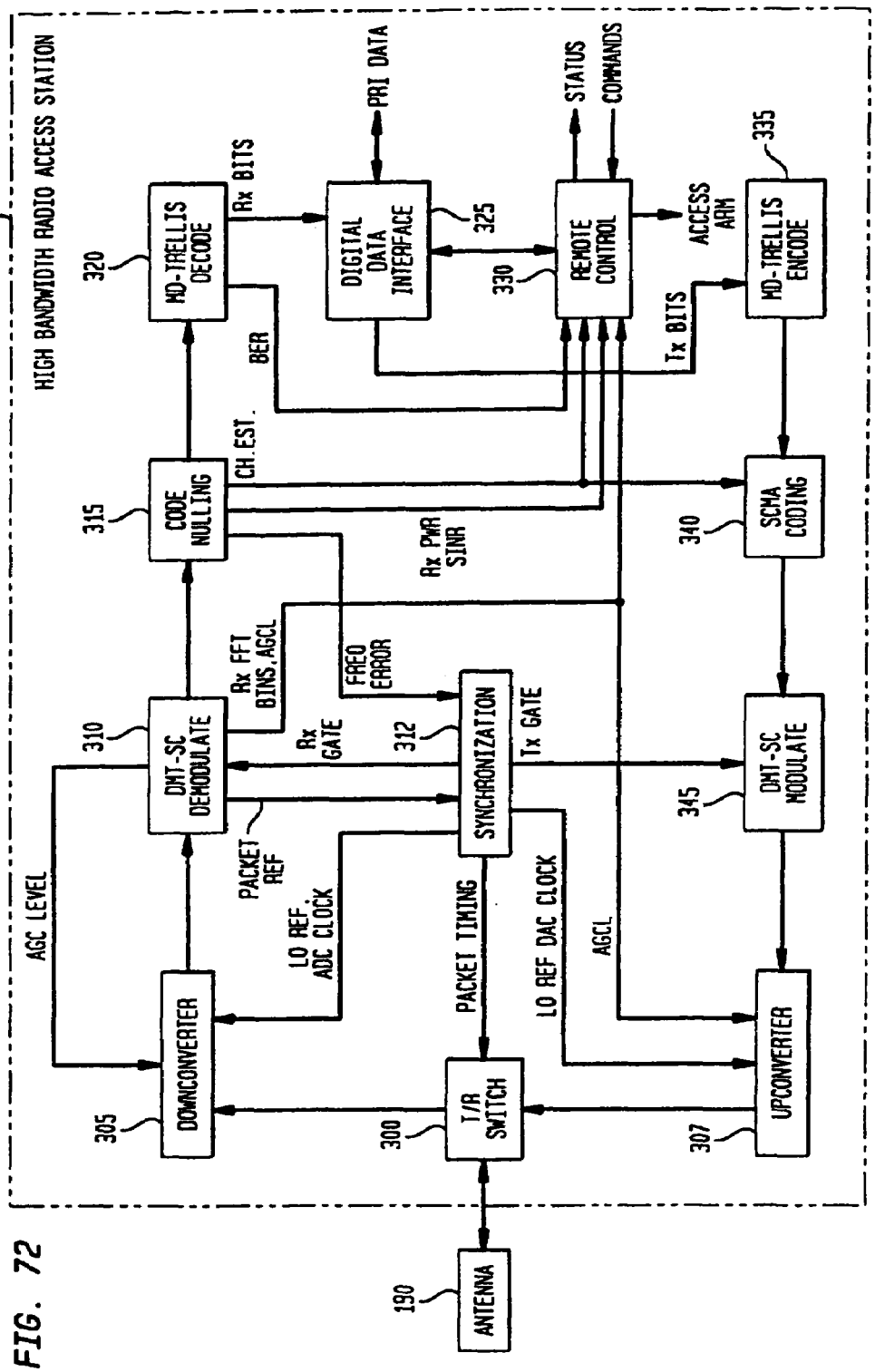
FIG. 72 is a functional block diagram that illustrates the main functional elements of the high bandwidth remote access station.

FIG. 72 is a functional block diagram that shows the main functional elements of the full-rate, high-bandwidth radio access station 192. It should be understood, for purposes of the present description, that the full-rate, high-bandwidth radio access station 192 described herein is substantially identical in structure and operation to the low-rate, high-bandwidth radio access station 187, with the exception that the low-rate, high-bandwidth radio access station 187 provides communication access for only a single subscriber 130. As shown in FIG. 72, the full-rate, high-bandwidth radio access station 192 comprises a transmit receive switch 300 that connects bidirectionally with the antenna 120. The structure and operation of the antenna 120 will be described in greater detail below with reference to FIGS. 6 and 7. The transmit and receive switch 300 connects to a down converter 305 when in the receive mode and an up converter 307 while in a transmit mode. The transmit/receive switch 300 further receives synchronization and packet timing data from a synchronization circuit 312.

The down converter 305 receives the radio signals from the antenna 120 via the switch 300. In addition, the down converter 305 receives a local oscillator reference as well as an analog-to-digital converter clock from the synchronization circuit 312. The down converter 305 communicates with a demodulator 310 that, in turn, provides a feedback of automatic gain control level to the down converter 305. The demodulator 310 communicates bidirectionally with the synchronization circuit 312 and also provides an output to a code-nulling circuit 315. The code-nulling circuit 315 provides a frequency error signal to the synchronization circuit 312, and also communicates with a multidimensional trellis decoder 320. The multidimensional trellis decoder 320 connects to a digital data interface 325. The digital data interface 325 communicates bidirectionally with a remote control circuit 330. The remote control circuit 330 receives inputs from the demodulator circuit 310, the code-nulling circuit 315, and the multidimensional trellis decoder 320. The control circuit 330 further transmits status signals and receives command signals from the base station 110 (see FIG. 74). Finally, the remote control circuit 330 outputs axis parameters to a multidimensional trellis encoder 335, that also communicates with the digital interface 325. The multidimensional trellis encoder 335 communicates with a SCMA coding circuit 340. The SCMA coding circuit 340 further receives an input from the code-nulling circuit 315. The SCMA coding circuit 340 outputs signals to a modulator circuit 345 that also receives an input from the synchronization circuit 312. Finally, the modulation circuit 345 together with the synchronization circuit 312 provide inputs to the up converter 307. The up converter 307 outputs the data signal to the transmit receive switch 300 while the transmit receive switch is in the transmit mode. This signal is output over an error interface to the multiple subscribers 130 via the antenna 120.

In operation, once it is the proper time to receive a data packet, the transmit/receive switch 300 switches the antenna 190 into the down converter 305. The down converter 305 takes the signal at the transmission frequency (see, e.g., about 2 gigaHertz), and translates this to the proper frequency for digitization. The DMT-SC demodulator then performs a fast Fourier transform (FFT) and presents the individual frequency bins to the code-nulling network 315. As discussed briefly above, the code-nulling network 315 applies code-nulling weights to the despreading codes in order to cancel interference due to transmissions having non-orthogonal spreading codes. The code-nulling network 315 also despreads the demodulated signal provided by the DMT-SC demodulator 310 and produces output demodulated symbols.

The demodulated symbols are provided as an input to the multi-dimensional trellis decoder 320 in order to decode the symbols in accordance with pragmatic Viterbi decoding methods. Receive bits are provided at the output of the multidimensional trellis decoder 320. The receive bits pass through a digital data interface 325 that, in one embodiment, serves as a data interface for a T1 link.

On the transmit side, data to be transmitted enters the digital data interface 325 via the T1 link and enters the multidimensional trellis encoder 335 for trellis encoding. It will be understood, of course, that other kinds of error encoding and symbol encoding such as Reed-Solomon error coding, and QAM or BPSK symbol encoding are performed within the encoder 335. The encoded symbols enter the spreading circuit 340 wherein the spreading code together with the appropriate code weights are applied to the input symbols. The spread symbols are DMT-SC modulated as represented within the block 345 and the resulting signal is translated to the high frequency band via the up-converter 307. The transmit/receive switch 300 is then switched to connect the up converter 307 to the antenna 190 so that the modulated and encoded data signal is transmitted via the antenna 190.

Immediately after one of the radio access terminals 187, 192 has been installed and is just coming on-line for the first time, the radio access station 187, 192 does not have information regarding the location of the assigned base station 110. Furthermore, the remote access station 187, 192 does not have information concerning the interference resulting from other transmitters and reflectors within the environment of the remote station 187, 192. Thus, each remote, upon initialization, must "learn" the location of the base station as well as the location of different interferes and reflectors within the immediate environment of the remote. Because the remote installer points the remote antenna array in the direction of the nearest base station 110, the strongest signal received by the remote is generally from around the 0° direction. The remote subsequently fine tunes, or adaptively adjusts the beam forming so as to obtain the maximum SINR for the signal received from the nearest base station 110.

When the radio access station 192 transmits to the base 110, the base station 110 expects to receive each of the signals transmitted from the remotes at the same power level. Thus, a gain control level is reported to the remote control 330 within the radio access station 192 from the DMT-SC demodulator 310. This automatic gain control level (AGCL) is also transmitted from the DMT-SC modulator 310 to the up-converter 307 so that the gain of the power amplifier (not shown within the up-converter 307) can be adjusted. In this manner, the base stations 110 can assure that the signal transmitted from the remote access terminals 187, 192 arrive at the base station 110 at the proper level.

The radio access stations 187, 192 also have to perform synchronization. That is, although the remote access terminals 187, 192 are preprogrammed to operate within a TDD system, the specific information concerning the distinction between the transmit and receive packages as well as the exact timing of the packet transfer still must be determined by the radio access stations 187, 192 when a radio access station first comes on line. Subsequently, the remote terminals 187, 192 must acquire frequency synchronization for the DMT-SC signals so that the remotes are operating at the same frequency and phase as the base station 110. For this reason, the DMT-SC demodulator 310 generates a packet reference that is utilized by the synchronization circuitry 312 to establish the basic transmit/receive timing (i.e., the packet timing for the T/R switch 300). In addition, the packet timing is provided as a receive gate to the demodulator 310 and as a transmit gate to the modulator 345 so that the remote access station 187, 192 transmits and receives at the appropriate intervals.

Within the code-nulling network 315, measurements are taken on the waveform to determine the frequency error. The measured frequency error is provided to the synchronization circuitry 312 so that the radio access station 187, 192 can come into frequency and phase lock with the base station 110. This synchronization information is transmitted from the synchronization circuitry 312 to the up-converter 307 and the down-converter 305 as a local oscillator reference and also as a digital-to-analog converter clock (or conversely, an analog-to-digital converter clock).

The code-nulling network 315 also estimates the characteristics of the multitask channel (i.e., the frequency response of the multipath channel). The channel estimates are provided to the spreading circuitry 340 so that the preemphasis function can be performed to adaptively equalize the multipath channel. Furthermore, the code-nulling network 315 provides an estimate of the received power and the SINR to the remote control circuitry 330. In addition, an estimate of the bit error rate (BER) is provided from the multidimensional trellis decoder 320 to the remote control circuitry 330. These parameters are used by the remote control circuitry 330 to control the flow of data via the digital data interface 325 with the subscriber (e.g., a PBX or a LAN). Furthermore, status signals based upon these input parameters to the remote control circuitry 330 are also transferred to the subscribers. The status signals indicate to the subscribers whether or not the radio access terminal is operating properly.

When the radio access terminals 187, 192 first dials onto the network 100 (i.e., the remote is trying to establish connection with the base) the base provides the remote 187, 192 with a set of access parameters that includes, for example, the appropriate starting codes to use, which tone sets to receive and transmit on, etc., so that a communication channel is set up between the base station 110 and the remote station 187, 192.

FIGS. 21A and 21B depicts the digital architecture within the remote access terminals 187, 192. The remote digital architecture includes an interface card 2100 that communicates bidirectionally with a layer processing accelerator (LPA) card 2110 as well as a transmitting LPA card 2120.

The interface card 2100 (shown in greater detail in FIG. 76 below) includes an ETHERNET interface card, a global positioning system (GPS) interface and other control interfaces. The ETHERNET interface communicates bidirectionally with a monitoring computer such as an Apple Macintosh, while the GPS interface derives timing data for synchronization purposes from the base station transmission, while the control interface outputs printer control bits for controlling the tuner. The interface card 2100 further includes three digital signal processing chips that, advantageously comprise PMS320C40 digital signal processing chips ("C40s") available from Texas Instruments. In addition, a Viterbi decoder as well as a T1 and an integrated services digital network (ISDN) interface are included on the interface card 2100 to provide an interface between the T1 communication link as well as the ISDN communication link with the subscribers.

Figures 75, 75A:
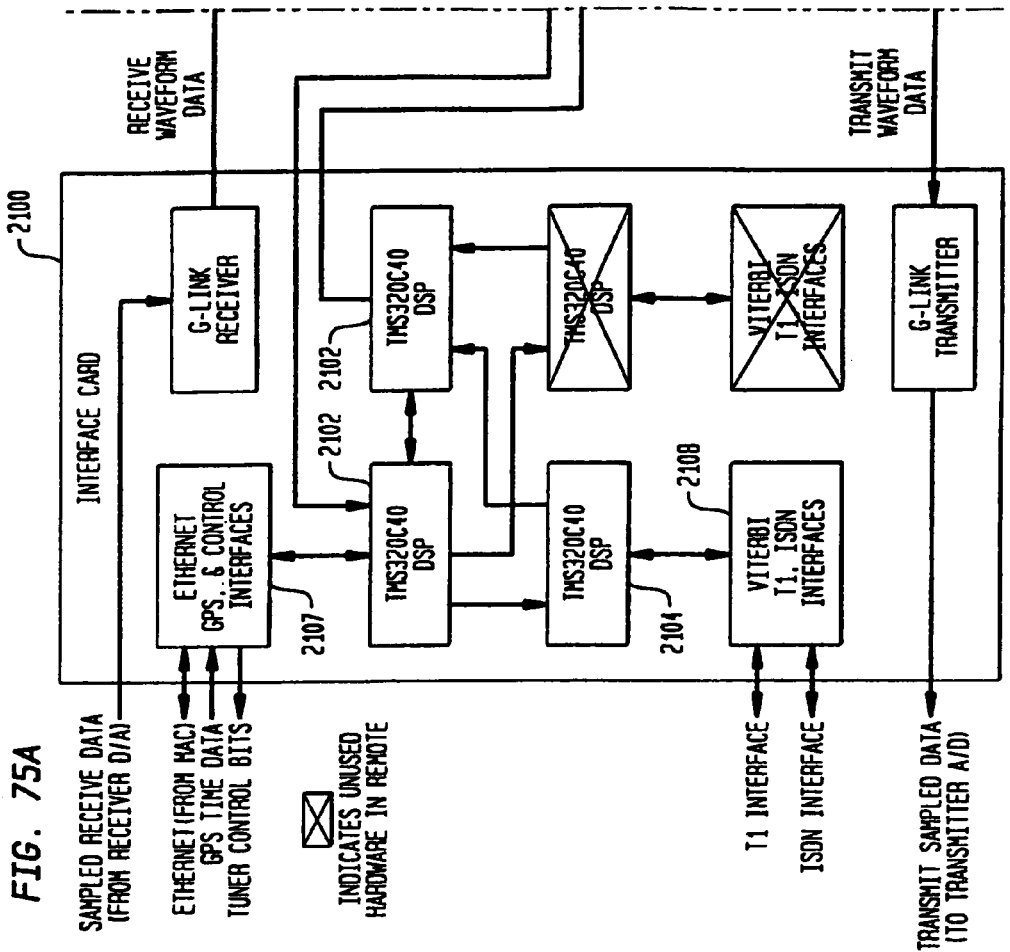
FIG. 75A depict the digital architecture within an exemplary remote access terminal.

As shown in FIG. 75A, the interface card 2100 further includes an additional PMS320C40 digital signal processing chip as well as an additional Viterbi, T1, ISDN interface that are crossed out. This is to indicate that these chips, although physically present on the interface card 2100, are not used within the remote digital subsystem although the same interface card is typically used in the base station 110. This is done because it is less expensive to manufacture a single interface card for both the base station 110 and the remotes 187, 192 rather than providing a specific card for the remotes and bases.

Finally, the interface card 2100 includes a G-link receiver that receives sampled data from the receiver digital-to-analog converter and a G-link transmitter that transmits sample data to the transmitter analog-to-digital converter.

Figure 75B:
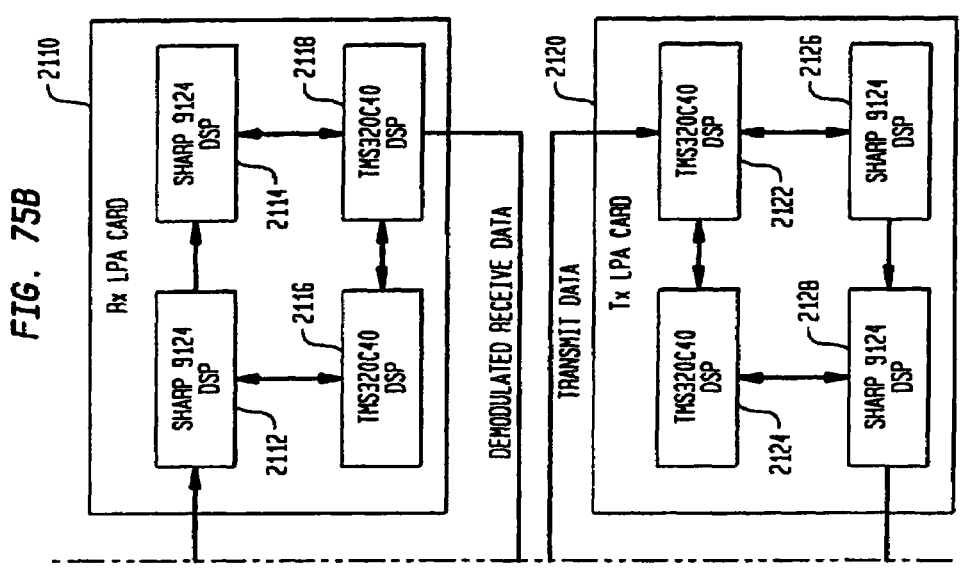
FIG. 75B depict the digital architecture within an exemplary remote access terminal.

The sample data received from the digital-to-analog converter passes through the G-link receiver within the interface card 2100. The G-link receiver provides the received waveform data to a receiving LPA card 2110 (FIG. 75B). The LPA card 2110 will be described in greater detail below with reference to FIGS. 77A–77D. Briefly, the receiving LPA card 2110 includes a pair of SHARP LH9124 ("9124s") digital signal processing chips 2112, 2114, as well as a pair of Texas Instruments TMS320C40 digital signal processing chips 2116, 2118.

The receiving LPA card 2110 demodulates the received data and provides the demodulated data to one of the TMS320C40 DSP chips within the interface card 2100. After further digital signal processing, the data is decoded and then transmitted to the subscriber via the T1 interface. Of course, it will be understood that if the radio access terminal comprises one of the low-rate radio access terminals 187, then a suitable communications link other than a T1 link will connect to the interface card 2100.

When data is to be transmitted, information supplied by the T1 interface, or other communication link, enters the interface card 2100, as shown in FIG. 75A, and passes through a series of digital signal processing chips within the interface card 2100. The transmit data output from the interface card 2100 enters a transmit LPA card 2120, that has a substantially similar architecture to the received LPA card 2110. The transmit LPA card 2120 converts the transmit data into transmit waveform data suitable to be sent to the transmitter analog-to-digital converter via the G-link transmitter within the interface card 2100.

Figure 76:
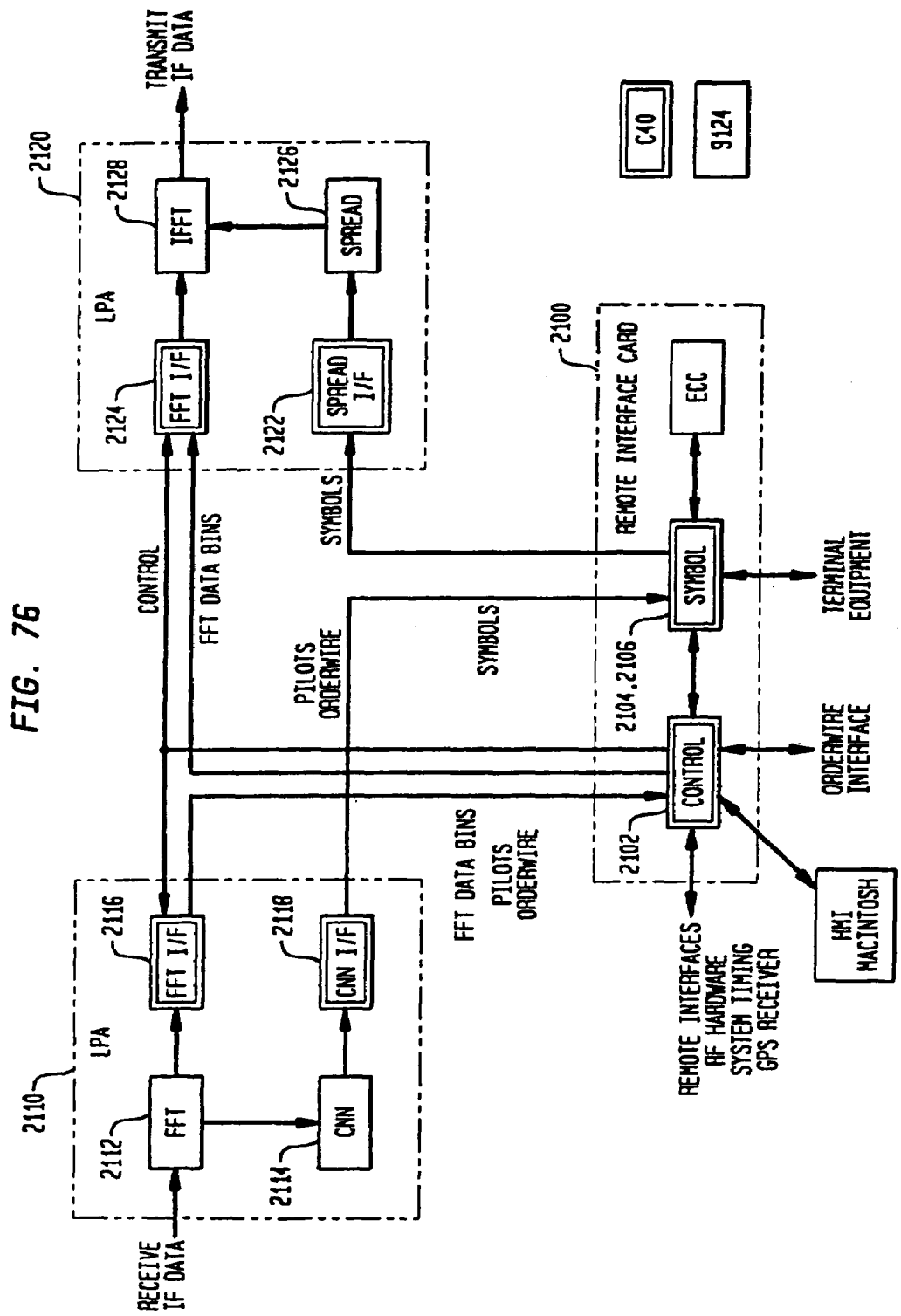
FIG. 76 is a software block diagram that indicates the general processing steps performed by each of the digital signal processing chips within the digital signal processing architecture of FIGS. 75A and 75B.
Figure 77A:
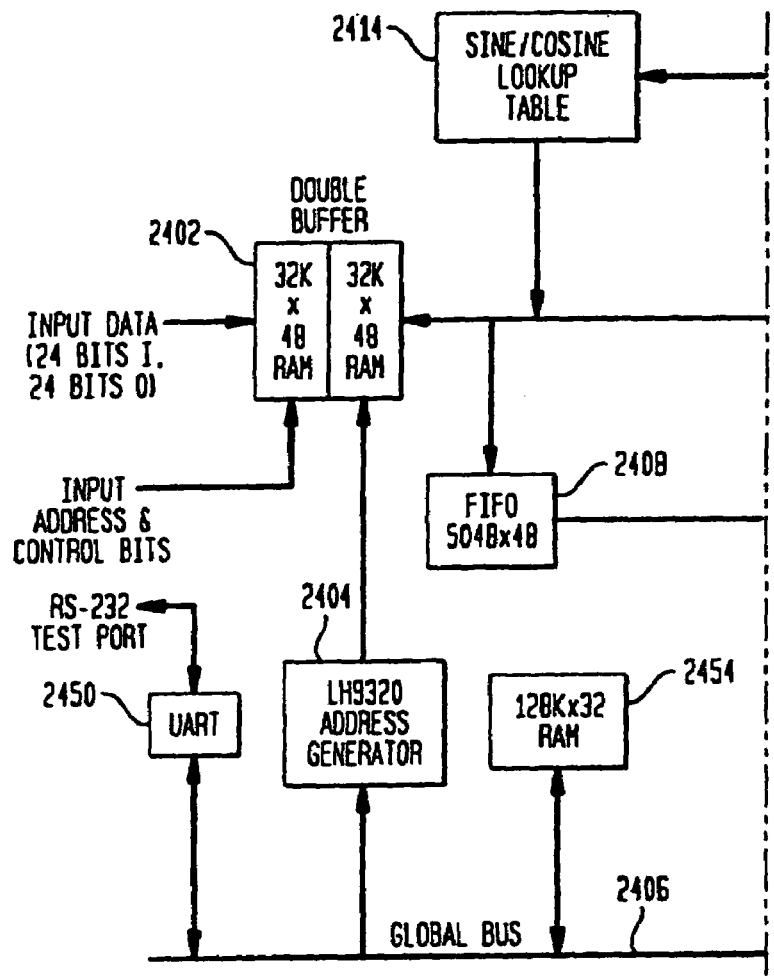
FIGS. 77A–77D are block diagrams that show in detail the digital architecture of the LPA cards of FIGS. 75A and 75B.
Figure 77:
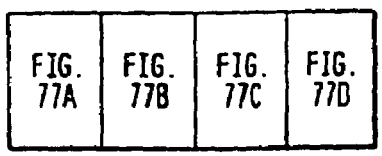
Figure 77B:
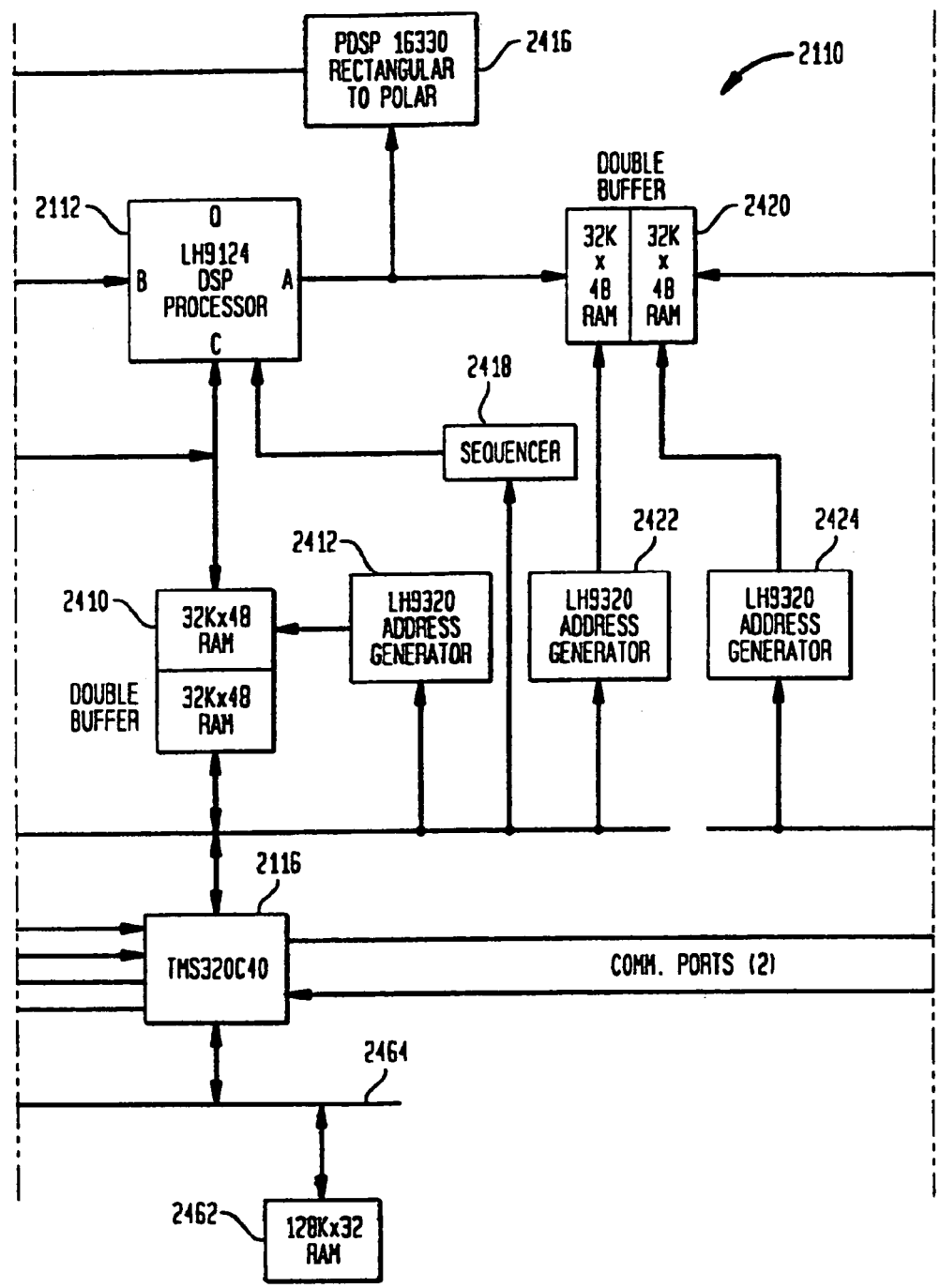
Figure 77C:
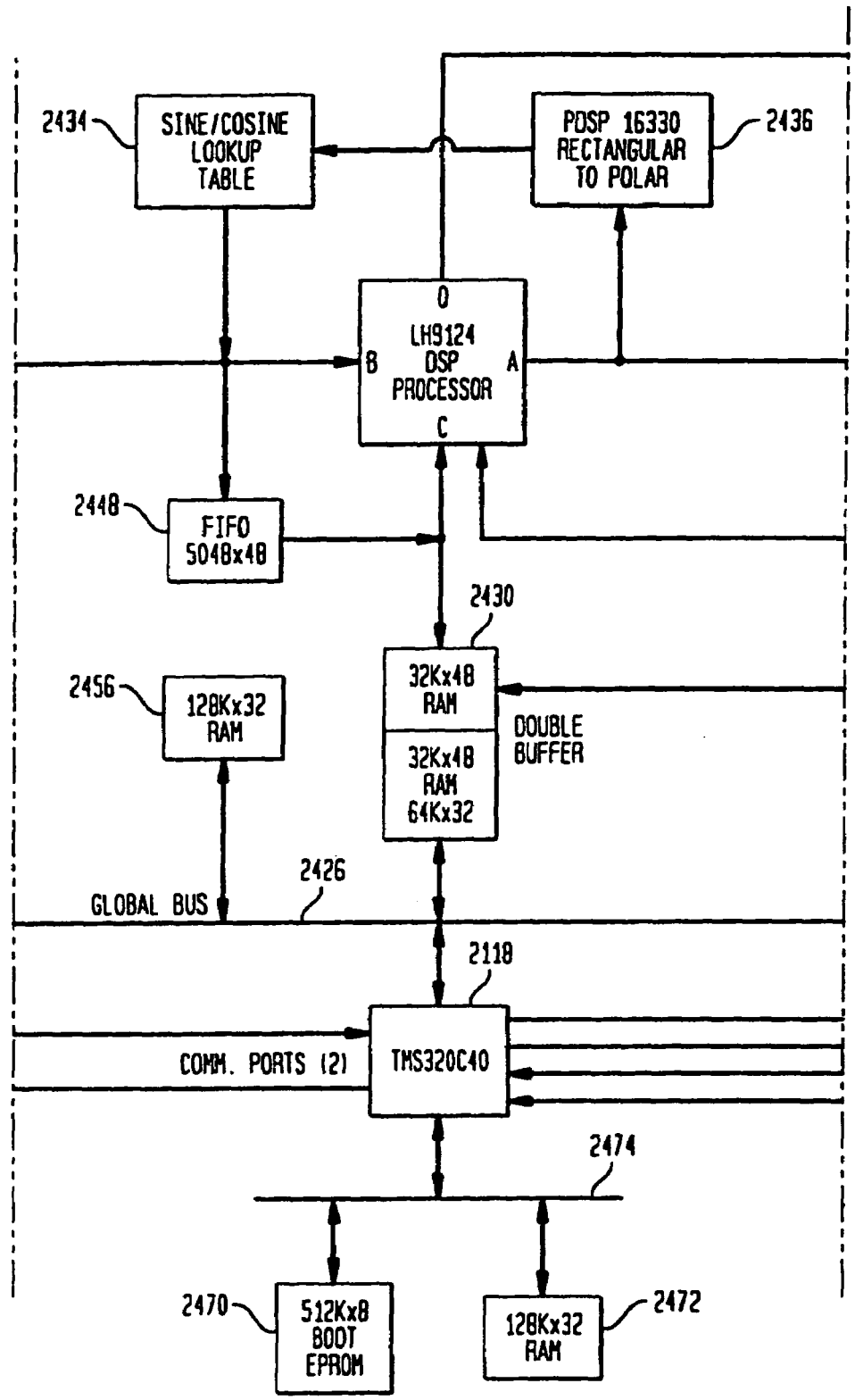
Figure 77D:
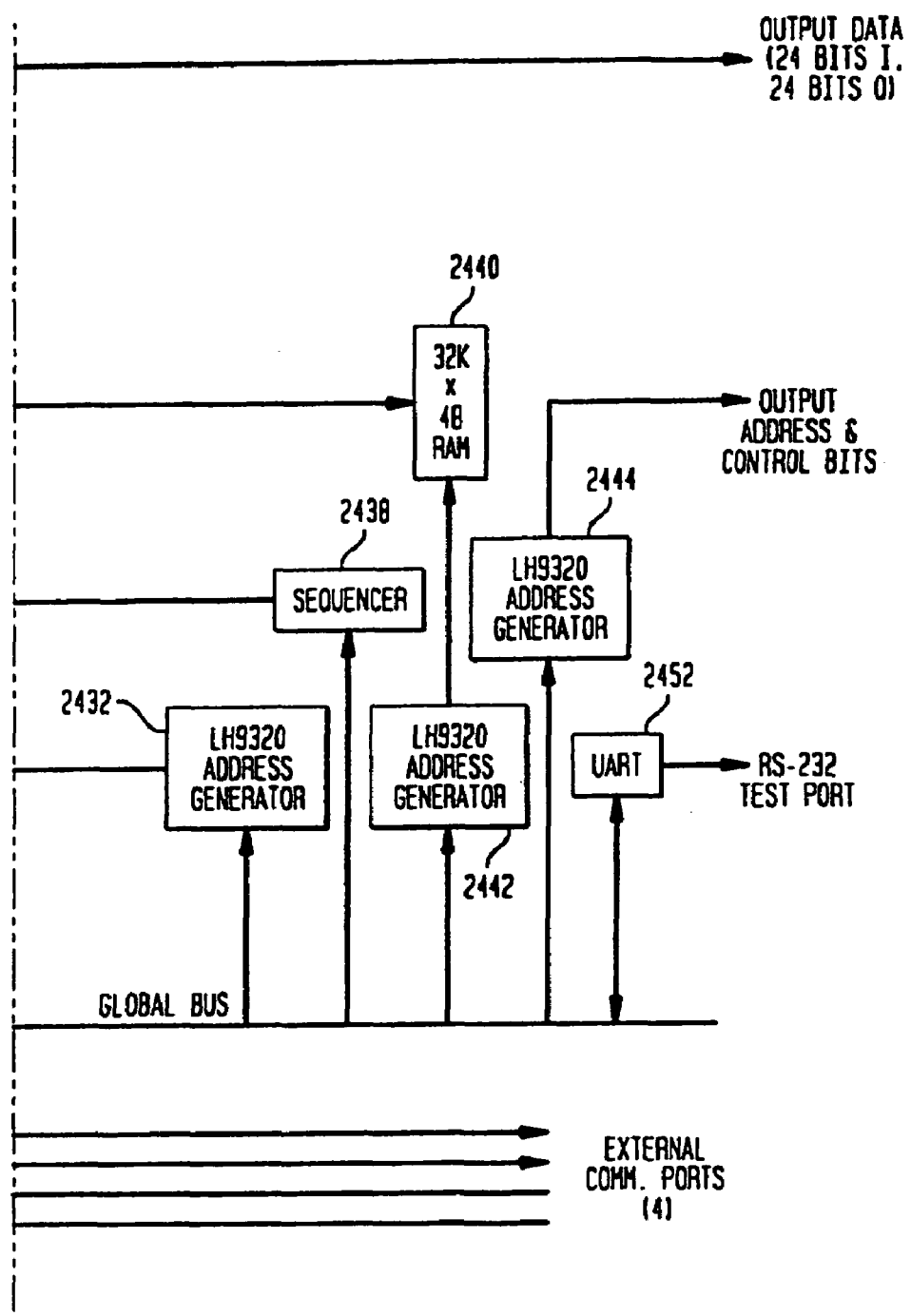

FIG. 76 is a software block diagram that indicates the general processing steps performed by each of the digital signal processing chips within the digital signal processing architecture of the radio access terminals 187, 192. Specifically, control signals are generated by the TMS320C40 digital signal processing chips 2102, 2106, while the symbol modulation (e.g., including trellis coded, Reed-Solomon, and QAM, BPSK, or M-ARY modulation) is performed by the digital signal processing chips 2104, 2106.

Within the receiving LPA, the 9124 digital signal processor 2112 in conjunction with the C40 digital signal processor 2116 perform the operations relating to the fast Fourier transform. The 9124 digital signal processor 2114 in conjunction with the C40 digital signal processor chip 2118 perform the processing steps relating to the code-nulling and adaptive equalization aspects of the present invention. In like manner, within the transmitting LPA 2120, the C40 digital signal processing chip 2124, together with the 9124 digital signal processing chip 2128, perform the digital signal processing steps relating to the inverse fast Fourier transform (IFFT), while DSP chips 2122 and 2126 perform the signal spreading operations used to provide modulation in accordance with the present invention.

Figure 78A:
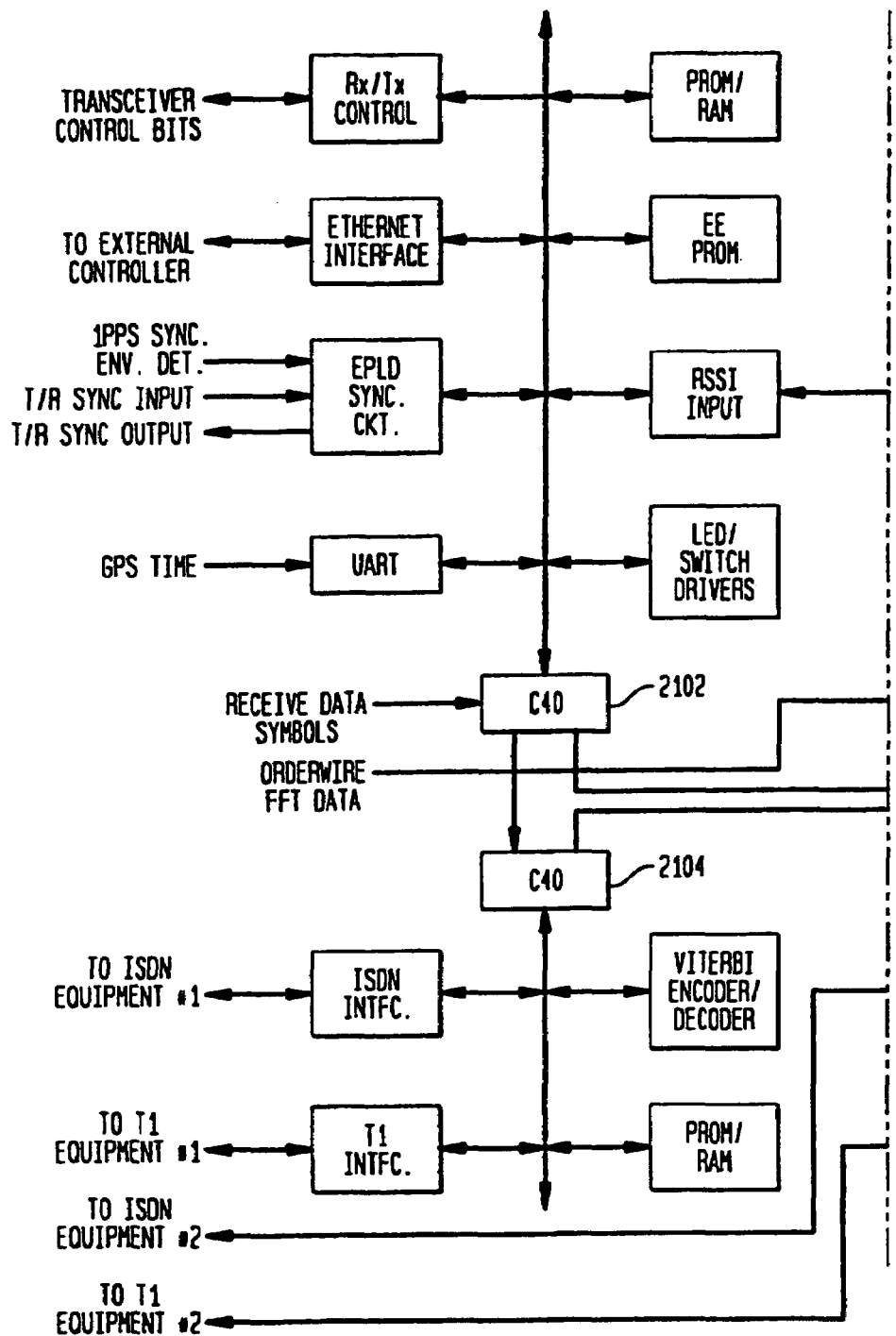
FIGS. 78A–78C are block diagrams that detail the digital architecture used to support the main digital signal processing chips on the interface card of FIGS. 75A and 75B.
Figure 78:
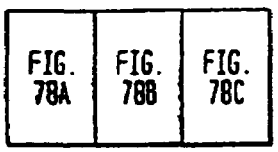
Figure 78B:
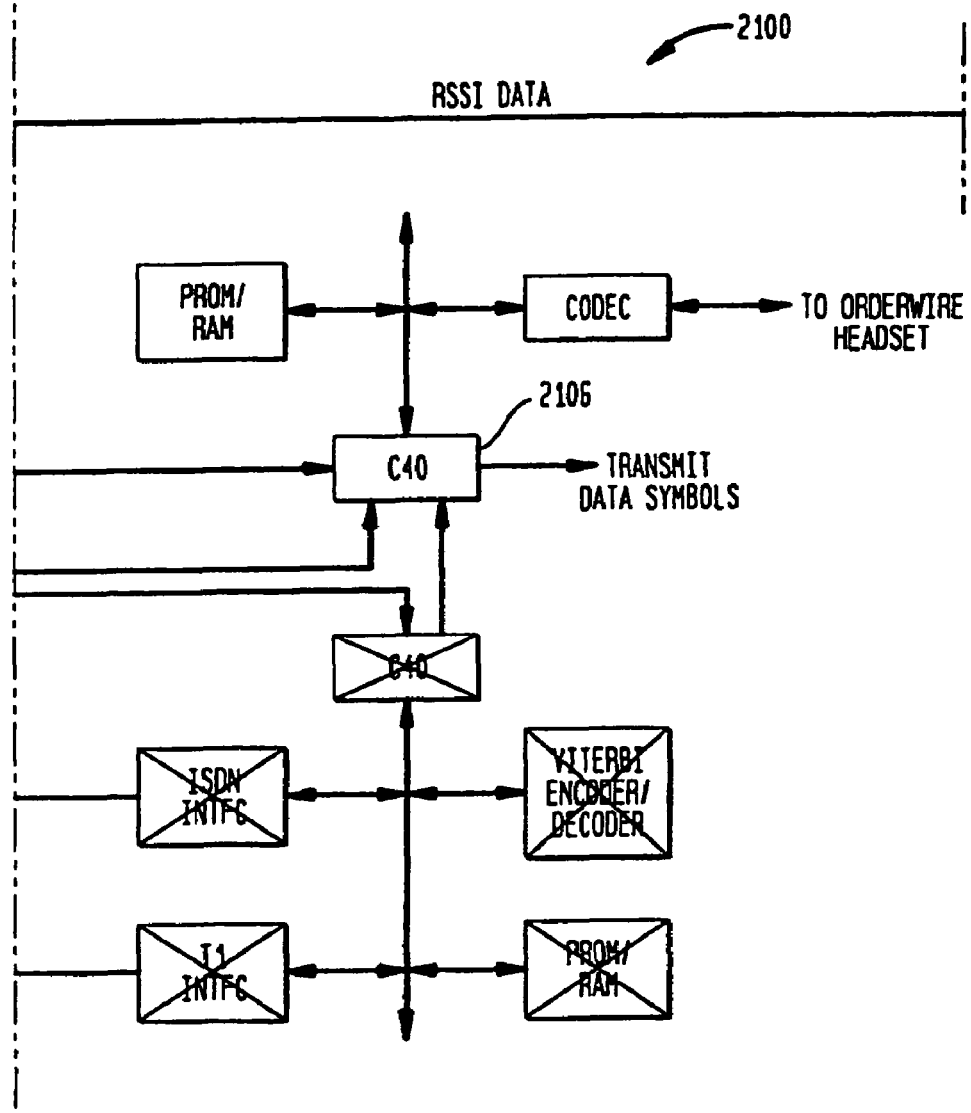
Figure 78C:
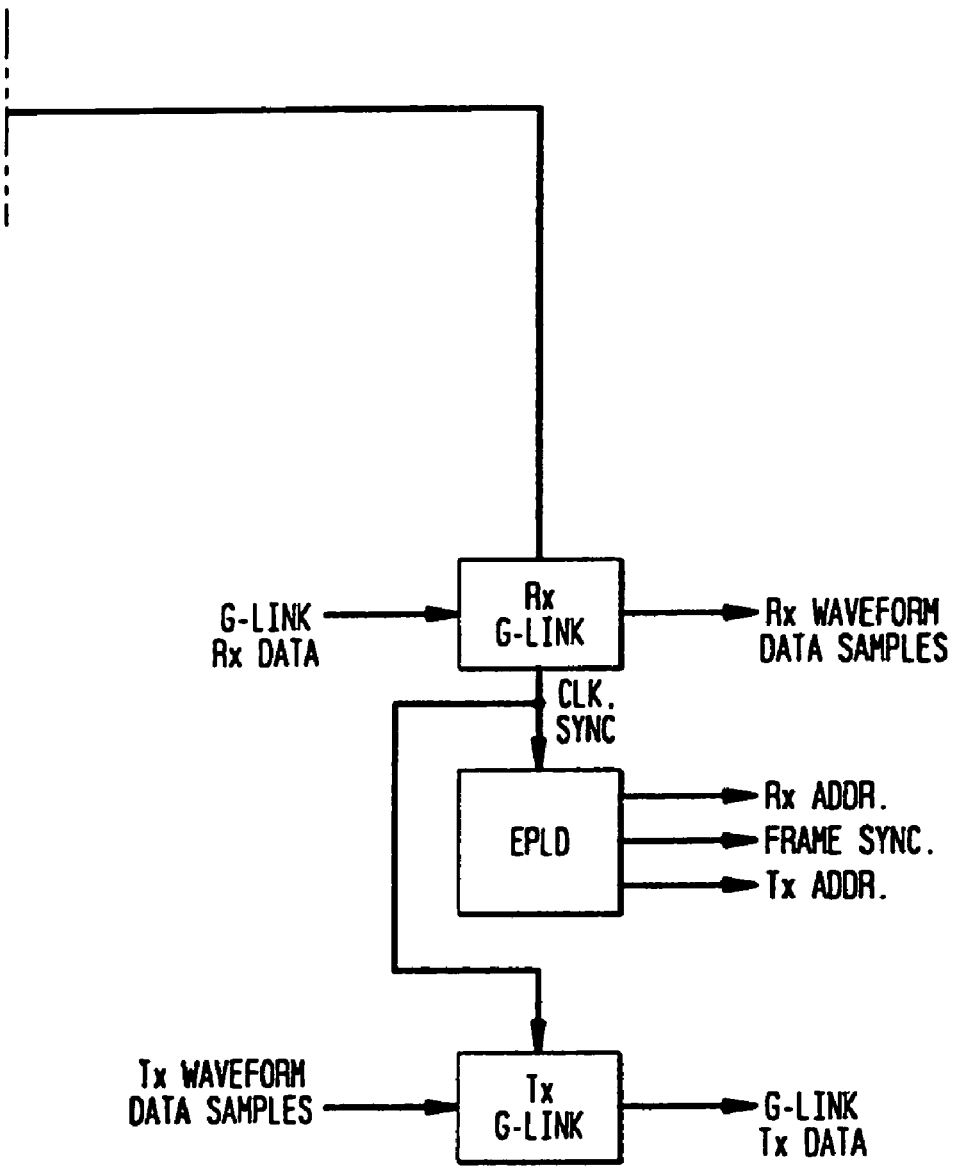
Figure 79B:
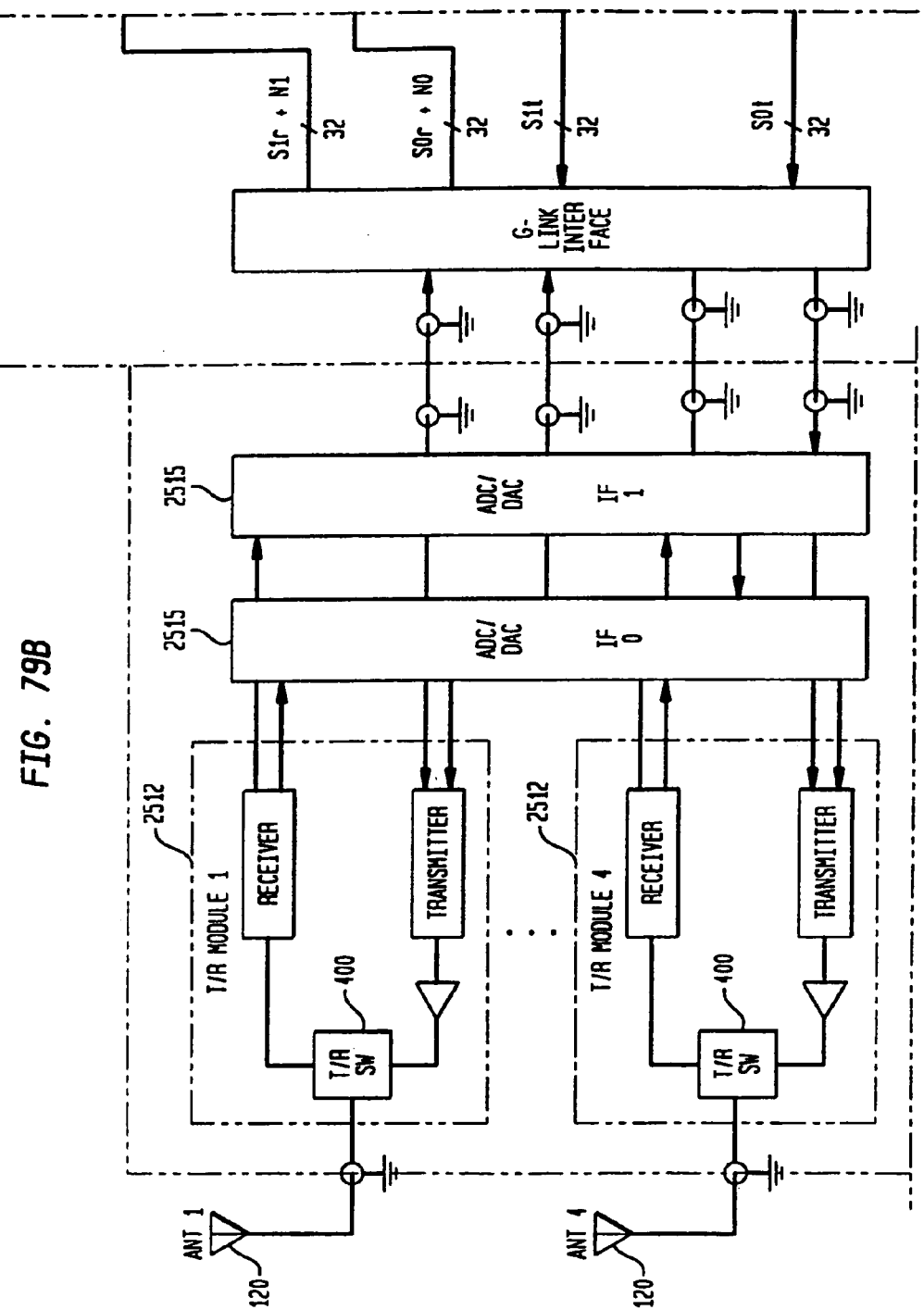
Figure 79C:
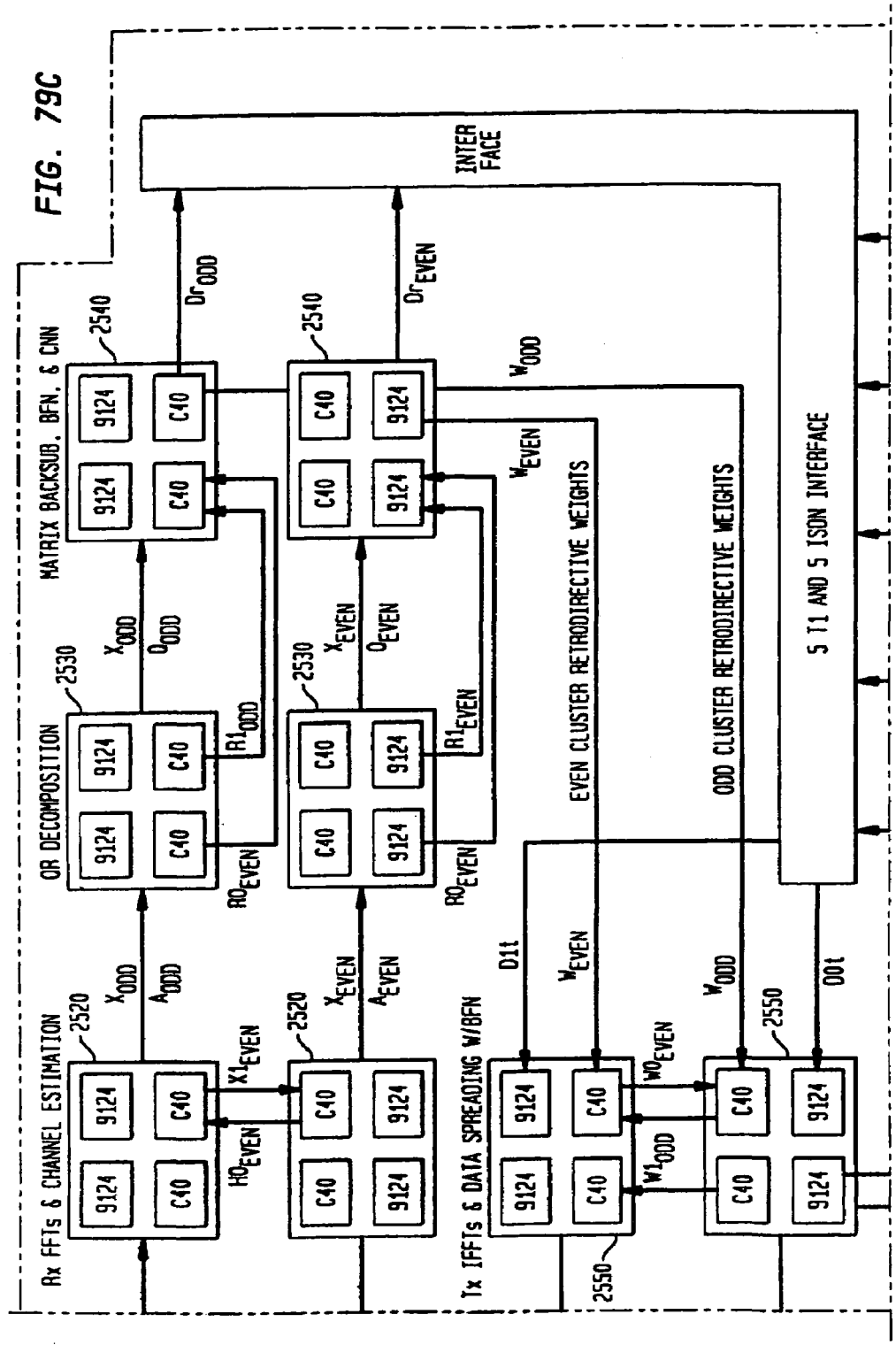
Figure 79D:
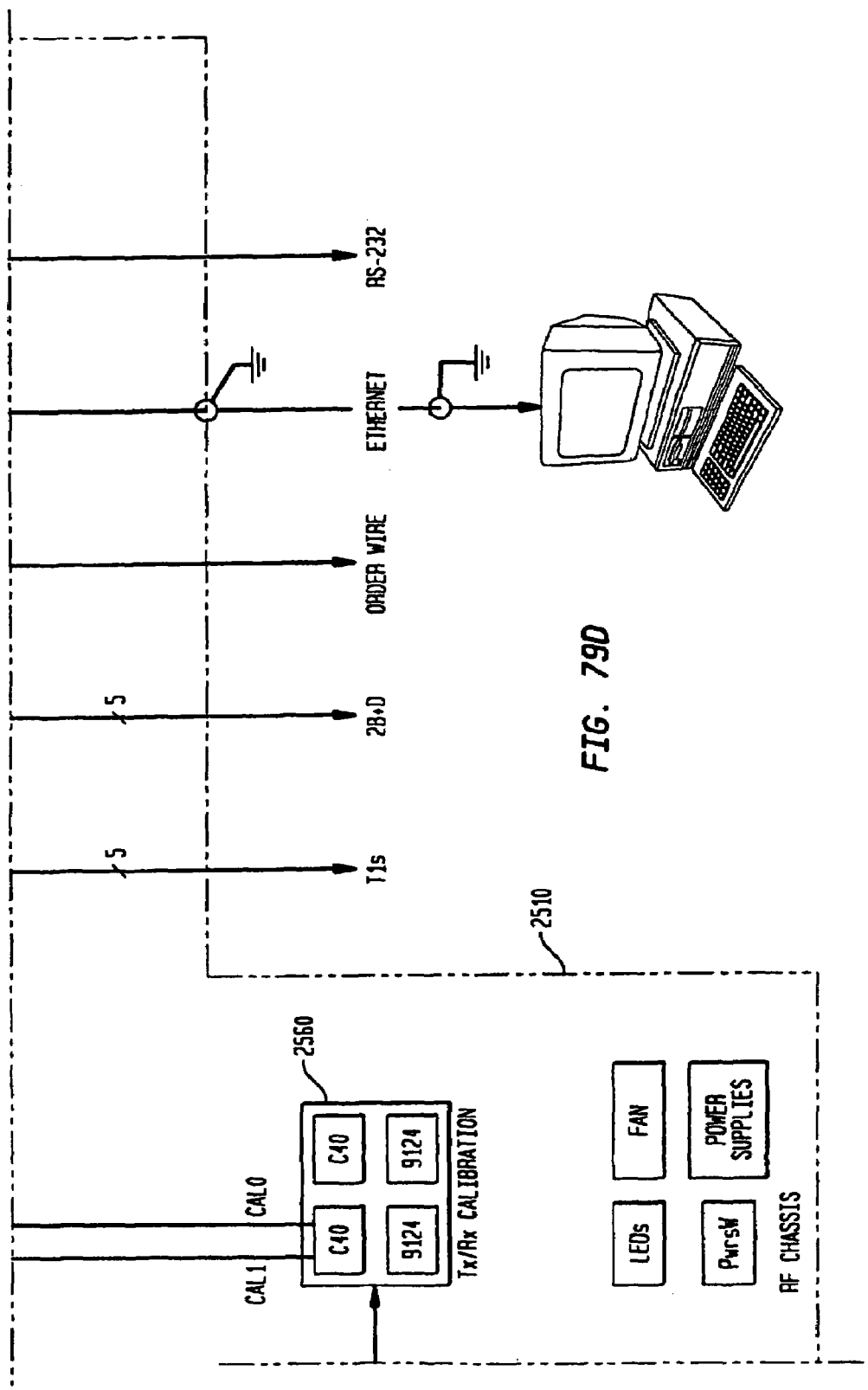

FIGS. 78A–78C are more detailed block diagrams showing the digital architecture used to support the main digital signal processing C40 chips on the interface card 2100 of the remote terminals 187, 192. Several interface support circuits are employed to precondition data received by the digital signal processing chip 2102. In particular, a receive/transmit control interface circuit, an ETHERNET interface circuit, an erasable programmable logic device (EPLD) synchronization circuit, and a universal asynchronous receiver/transmitter (UART) serve as an interface between the DSP chip 2102 and circuitry external to the interface card 2100. In addition, a programmable read-only memory (PROM)/random access memory (RAM), an electrically erasable PROM, a received signal strength indicator (RSSI) input circuit and a plurality of light-emitting diode (LED) switch drivers all communicate with the DSP chip 2102 via a common bus.

The C40 DSP chip 2104 is also supported by interface circuitry. Specifically, an integrated services digital network (ISDN) interface and a T1 interface provide a connection to ISDN and T1 equipment, while a supporting Viterbi encoder/decoder, as well as a PROM/RAM, provide digital signal processing support for the DSP chip 2104 via a common bi-directional bus.

In addition to receiving signals from the DSP chip 2104 and orderwire FFT data, the C40 DSP chip 2106 communicates bidirectionally with a PROM/RAM and a codec via a bi-directional common bus. The codec in communication with the DSP 2106 communicates bidirectionally with an orderwire headset.

The G-link receiver provides a clock synchronization signal to the G-link transmitter, as well as to an EPLD. In addition, the receiving G-link transmits RSSI data to the RSSI input in communication with the C40 DSP chip 2102. The EPLD that receives the synchronization signal from the receiving G-link circuit provides a receive address, a frame sync signal, and a transmit address as control outputs.

In operation, each of the DSP chips 2102, 2104, 2106 uses the local PROM/RAM for storage and retrieval of data and for use as a look-up table. The C40 DSP chip 2102 receives the RSSI input data to implement automatic game control (AGC). That is, an indication of the signal intensity is provided via the RSSI input to the DSP chip 2102 so that the remote terminal 187, 192 can automatically adjust the receive gain so that the signal is received at the appropriate level. The ETHERNET interface allows the remote terminal 187, 192 to transmit data out to a local computer or operator. The receive/transmit control interface circuit sends control bits to the radio frequency electronics of the remote terminal 187, 192 in order to control the RF electronics. The EPLD synchronization circuit receives an envelope detector output from the RF circuit within the receiver of the remote terminal 187, 192 in order to achieve TDD synchronization. The UART circuit provides for the input of a universal global positioning system (GPS) time clock for use by the remote terminals 187, 192. Finally, the electrically erasable PROM allows the radio access terminals 187, 192 to store information from test to test as a kind of statistical record.

The operations of the other support circuitry depicted in FIGS. 78A–78C are well known to those of ordinary skill in the art and need not be described in detail for a complete understanding of the present invention.

FIGS. 77A–77D are a more detailed block diagram of the LPA cards 2110, 2120 of the remote terminals 187, 192 that shows the support circuitry used to support the operation of the SHARP LH9124 DSP chips, as well as the TMS320C4 DSP chips from Texas Instruments. It should be understood that although FIGS. 77A–77D depict only the receiving LPA card 2110 that the architecture of the LPA card 2110 is substantially similar to that of the transmitting LPA card 2120 so that essentially the same description applies to both LPA cards. Input data in quadrature form (e.g., 24 In-phase bits and 24 Quadrature bits) are provided as an input to a double buffer 2402 via a 48-bit input bus. A first portion of the double buffer 2402 is controlled via input address and control bits, while a second portion of the double buffer 2402 is controlled via an address generator 2404. The address generator 2404 communicates with the TMS 320C40 DSP chip 2116 via a bus 2406.

The double buffer 2402 communicates with the SHARP LH9124 digital signal processing chip 2112 via a bi-directional bus and also supplies data as an input to a first in/first out (FIFO) buffer 2408. In one preferred embodiment, the FIFO comprises a 5K×48-bit buffer. The FIFO 2408 communicates with the DSP chip 2112, as well as with a double buffer 2410. Like the double buffer 2402, the double buffer 2410 advantageously comprises a pair of 32K×48-bit RAMs. Furthermore, the double buffer 2410 is under the control of the address generator 2412 that communicates with the buffer 2406. The double buffer 2410 communicates bidirectionally with the DSP chip 2116 via the bus 2406.

The SHARP DSP chip 2112 further receives input from a sine/cosine look-up table 2414. The sine/cosine look-up table 2414 receives input from a rectangular-to-polar converter 2416 that in one embodiment comprises a signal processing chip sold under Model Number PDSP16330 and available from GEC Plessey. Finally, the DSP chip 2112 receives sequencing data from a sequencer 2418, that also communicates with the bus 2406. The output of the digital signal processor chip 2112 is provided as an input to a double buffer 2420, that is substantially similar in structure to the double buffers 2402 and 2410. A first portion of the double buffer 2420 is under the control of an address generator 2422 that receives signals from the DSP chip 2116 via the bus 2406.

The second half of the LPA card 2110 is substantially similar in architecture to the first half described above. Specifically, input data in quadrature form (e.g., 24 In-phase bits and 24 Quadrature bits) are provided as an input to a second half of the double buffer 2420 from the first half of the buffer 2420. The second half of the double buffer 2420 is controlled via an address generator 2424. The address generator 2404 communicates with the TMS 320C40 DSP chip 2118 via a bus 2426.

The double buffer 2420 communicates with the SHARP LH9124 digital signal processing chip 2114 via a bi-directional bus and also supplies data as an input to a first in/first out (FIFO) buffer 2428. In one preferred embodiment, the FIFO 2428 comprises a 5K×48-bit buffer. The FIFO 2428 communicates with the DSP chip 2112, as well as with a double buffer 2430. Like the double buffer 2420, the double buffer 2430 advantageously comprises a pair of 32K×48-bit RAMs. Furthermore, the double buffer 2430 is under the control of the address generator 2432 that communicates with the buffer 2426. The double buffer 2430 communicates bidirectionally with the DSP chip 2118 via the bus 2426.

The SHARP DSP chip 2114 further receives input from a sine/cosine look-up table 2434. The sine/cosine look-up table 2434 receives input from a rectangular-to-polar converter 2436 that in one embodiment comprises a signal processing chip sold under Model Number PDSP16330 and available from GEC Plessey. Finally, the DSP chip 2114 receives sequencing data from a sequencer 2438, that also communicates with the bus 2426. The output of the digital signal processor chip 2114 is provided as an input to a buffer 2440, that advantageously comprises a 32K×48 RAM. The buffer 2440 is under the control of an address generator 2442 that receives signals from the DSP chip 2118 via the bus 2426.

The C40 DSP chips 2116 and 2118, respectively, receive GPS timing via UART circuits 2450, 2452. Furthermore, each of the DSP chips 2116, 2118 communicates with respective RAM chips 2454, 2456, that advantageously comprise 128K×32 random access memories.

The DSP chips 2116, 2118 further communicate with EPROMs 2460, 2470, respectively, and RAMs 2462, 2472, respectively, via local buses 2464, 2474, respectively. In one advantageous embodiment the EPROMs 2460, 2470 comprise a 512K×8 memory, while the RAMs 2462, 2472 comprise a 128K×32 RAM. A pair of internal communication ports provide for communication between the DSP circuits 2116, 2118, while two pair of input/output external communication ports connect to each of the DSP chips 2116, 2118.

In operation, the DSP chips 2116, 2118 employ the respective memories 2460, 2462, 2470, 2472 to perform processing associated with the fast Fourier transform and code spreading or code-nulling processing operations. Meanwhile, the double buffer 2402 collects input data symbols in quadrature. The double buffer 2402 is provided so that while data is being collected from one packet, data from the previous packet can be processed.

As can be seen from FIGS. 77A–77D, two substantially identical processing engines are provided separated by the double buffer 2420. In one advantageous embodiment each of the 9124 DSPs 2112, 2114 operate at a 40-mHz sample rate and include six multipliers so that data can be streamed through in substantially real time.

The "Proof-of-Concept Embodiment"—Base Station Hardware

Figure 73:
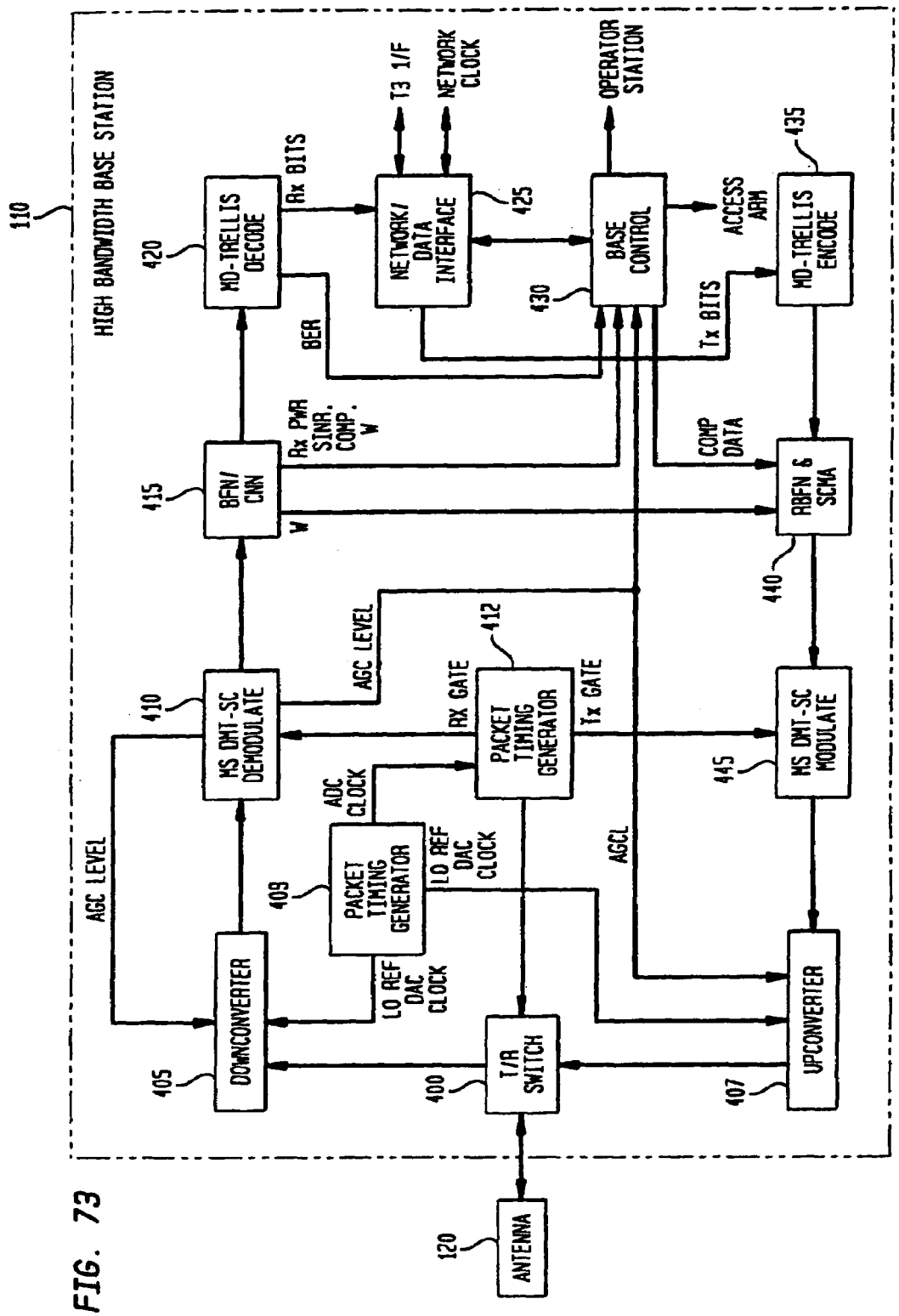
FIG. 73 is a functional block diagram that shows the main functional components of the high bandwidth base station.

FIG. 73 is a functional block diagram showing the main functional elements of the base station 110 shown in FIG. 74. As shown in FIG. 73, the base station 110 includes a transmit/receive switch 400 that communicates bidirectionally with a plurality of the antennas 120. While in the receive mode, the switch 400 communicates with a down converter 405, and in the transmit mode, the transmit receive switch 400 communicates with an up converter 407. The down converter 405 also receives inputs from a frequency reference circuit 409 and provides outputs to a demodulator 410. The demodulator 410 feeds back an automatic gain control level to the down converter 405 and also receives inputs from a packet timing generator 412. The packet timing generator 412 receives analog-to-digital converter clock inputs from the frequency reference circuit 409.

The demodulator 410 provides inputs to a beam forming and code-nulling circuit 415. The beam forming and code-nulling circuit 415 communicates with a multidimensional trellis decoder 420 that, in turn, communicates bidirectionally with a network/data interface circuit 425.

The network/data interface circuit 425 provides outputs to and receives inputs from the telecommunications network 160 (see FIG. 74). Furthermore, the network/data interface circuit 425 provides an output signal to the packet timing generator 412 and also communicates bidirectionally with a base control circuit 430. The base control circuit 430 receives inputs from the demodulator 410, the beam forming/code-nulling circuit 415, and the multidimensional trellis decoder 420. The base control circuit 430 also communicates bidirectionally with an operator station (not shown) within the telecommunications network 160.

The network/data interface circuit 425 communicates with a multidimensional trellis encoder 435. The multidimensional trellis encoder 435 provides an output to a retroactive beam forming network and SCMA circuit 440. The network 440 also receives inputs from the beam forming/code-nulling circuit 415 as well as the base control circuit 430. The retroactive beam forming and SCMA network 440 provides an output to a modulator 445 that also receives inputs from the packet timing generator 412. Finally, the modulator 445 together with the frequency reference circuit 409 provide inputs to the up converter 407, that in turn provides an output to the transmit/receive switch 400 while in the transmit mode. Signals provided by the up converter are transmitted to the various high-bandwidth radio access stations 192, 187 by means of the antennas 120.

The operation of a base station is substantially similar to the operation of the radio access station 187, 192. Specifically, the transmit/receive switch 400 switches the antenna array 120 into the down-converter 405. The down-converter 405 takes the signal at the transmission frequency (see, e.g., about 2 gigaHertz), and translates this to the proper frequency for digitization. The multi-sensor DMT-SC demodulator 410 then performs a fast Fourier transform (FFT) and presents the individual frequency bins to the beam forming/code-nulling network 415. As discussed briefly above, the code-nulling network 415 applies code-nulling and beam forming weights to the despreading codes in order to cancel interference due to transmissions having non-orthogonal spreading codes. The code-nulling network 415 also despreads the demodulated signal provided by the multi-sensor DMT-SC demodulator 410 and produces output demodulated symbols.

The demodulated symbols are provided as an input to the multi-dimensional trellis decoder 420 in order to decode the symbols in accordance with pragmatic Viterbi decoding methods. Receive bits are provided at the output of the multidimensional trellis decoder 420. The receive bits pass through a digital data interface 425 that, in one embodiment, serves as a data interface for a T3/SONET interface link.

On the transmit side, data to be transmitted enters the digital data interface 425 via the T3/SONET link and enters the multidimensional trellis encoder 435 for trellis encoding. It will be understood, of course, that other kinds of error encoding and symbol encoding such as Reed-Solomon error coding, and QAM or BPSK symbol encoding are performed within the encoder 435. The encoded symbols enter the beam-forming/code-spreading circuit 440 wherein the spreading code together with the appropriate beam forming and null-steering code weights are applied to the input symbols. The spread symbols are DMT-SC modulated as represented within the block 445 and the resulting signal is translated to the high frequency band via the up-converter 407. The transmit/receive switch 400 is then switched to connect the up converter 407 to the antenna array 120 so that the modulated and encoded data signal is transmitted via the antenna 120.

For synchronization of the base stations 110 all of the bases 110 are locked onto GPS time. In this manner, no matter how big the communications network 100 becomes, all of the base stations 110 always have the proper TDD synchronization. Thus, the base stations 110 always start transmitting at the same time and receiving at the same time. At the packet timing generator 409, the frequency reference is GPS derived and this is used to control the T/R switch 400. This is particularly advantageous because the timing does not have to be derived from the waveforms transmitted by several remotes. Since the remote terminals 187, 192 derive their synchronization timing from the base stations 110, the remotes will be synchronized to GPS time.

The packet timing generator 412 receives a clock signal from the timing generator 409 so that the packet timing generator 412 can supply transmit and receive gating signals to the modulator 445 and the demodulator 410, respectively.

In an alternative embodiment, it would be possible to establish a universal timing mechanism for all of the base stations 110 and the remote terminals 187, 192 provided from the network via the network interface 425. In such an embodiment, an specially defined ATM adaptation layer could be used to provide a clock to the interface 425. Management information and connection power control information could also be supplied over the T3 or SONET link. Such information could be provided to the base controller 430 that will send the proper signals out to the remotes 187, 192 through the wireless signaling network for connection set up and carry out other management functions.

It should further be noted that the down-converter 405 and up-converter 407 contain separate RF electronics that include slight imperfections so that they may not be perfectly matched. For this reason, a transmit/receive compensation is performed using additional compensation weights. The purpose of this compensation is to compensate for the differences in phase and amplitude introduced into the signals by the transmit and receive RF electronics. By applying the compensation weights, the same beam pattern is produced on the transmit side as on the receive side.

FIGS. 79A–79D are a schematic block diagram that depicts the overall digital signal processing architecture layout within the base stations 110. The base station 110 is laid out into a radio frequency chassis portion 2500 and a digital chassis portion 2510. The multiple element antenna array 120, that for ease of illustration is depicted in FIGS. 79A–79D as comprising four antennas, connects to corresponding transmit/receive modules 2512. Each transmit/receive module 2512 includes the transmit/receive switch 400, as well as a receiver, a transmitter, and an amplifier. It should be noted that in accordance with one advantageous aspect of the present invention, each antenna element is provided with an individual amplifier. By using this distributed amplifier configuration instead of one large amplifier to power the entire antenna array, power is saved. In addition, in the event of amplifier failure, only one of multiple antenna elements fails rather than the entire antenna array. Thus, the present invention provides for graceful degradation of signal quality in the event of an amplifier failure.

An analog-to-digital converter/digital-to-analog converter pair 2515 provides for analog-to-digital and digital-to-analog conversion of the received and transmitted signals. The digitized received signals enter the digital chassis 2510, while the digital transmit signals are provided as an output of the digital chassis 2510.

The digital chassis 2510 includes a G-link interface circuit that provides outputs to a plurality of receiver LPAs 2520 via a plurality of 32-bit busses. The LPAs 2520 perform the FFTs and channel estimation in parallel (e.g., one of the LPAs performs signal processing on each of the even symbols, while the other performs equivalent signal processing steps on the odd receive symbols).

The LPAs 2520 provide the processed signals to LPAs 2530, that are substantially similar in construction to the LPAs 2520 and the LPAs 2110 and 2120. The LPAs 2530 perform QR decomposition and output the decomposed signals to LPA cards 2540.

The LPA cards 2540 perform matrix operations involved in the null-steering and code-nulling procedures. The retro-directive weights calculated within the LPA cards 2540 are provided as inputs to LPA cards 2550 in the transmitter path for use during data spreading, beam forming, and generating IFFTs.

An additional LPA card 2560 is provided as a digital signal processing engine for the transmitter/receiver calibration (i.e., T/R compensation). The T/R calibration LPA card 2560 communicates with a probe antenna 2565 via a G-link interface, an analog-to-digital/digital-to-analog converter, and a transmit/receive calibration module 2570. The transmit/receive calibration module 2570 includes a receiver, a transmitter, a transmitting amplifier, and a transmit/receive switch. As described briefly above, the purpose of the probe antenna is to compensate for distortion due to the transmitter and receiver paths through the base station 110. That is, the transmit/receive modules 2512 introduce a certain amount of distortion and phase delay into the transmitted and received signal so that it is necessary to compensate for these distortions to provide an accurate production of the transmit and receive signals. The probe antenna path acts like a remote station so that when the base station 110 is transmitting from the antenna array 120, this information is received on the probe 2565. Conversely, when the probe antenna 2565 is transmitting, the antenna array 120 of the base station 110 is receiving the known signal transmitted by the probe antenna 2565. By signal processing performed within the transmit/receive calibration LPA card 2560, the differential amplitude and phase across the phase transmitter and receiver paths can be determined. Thus, the base station 110 can compensate for these distortions by means of the signals transmitted and received by the probe antenna 2565.

A global positioning system antenna 2580 receives GPS timing to provide a reference clock for each of the local oscillators within the base station 110. This ensures that accurate synchronization can be obtained throughout the entire wireless communication system 100.

Figure 6:
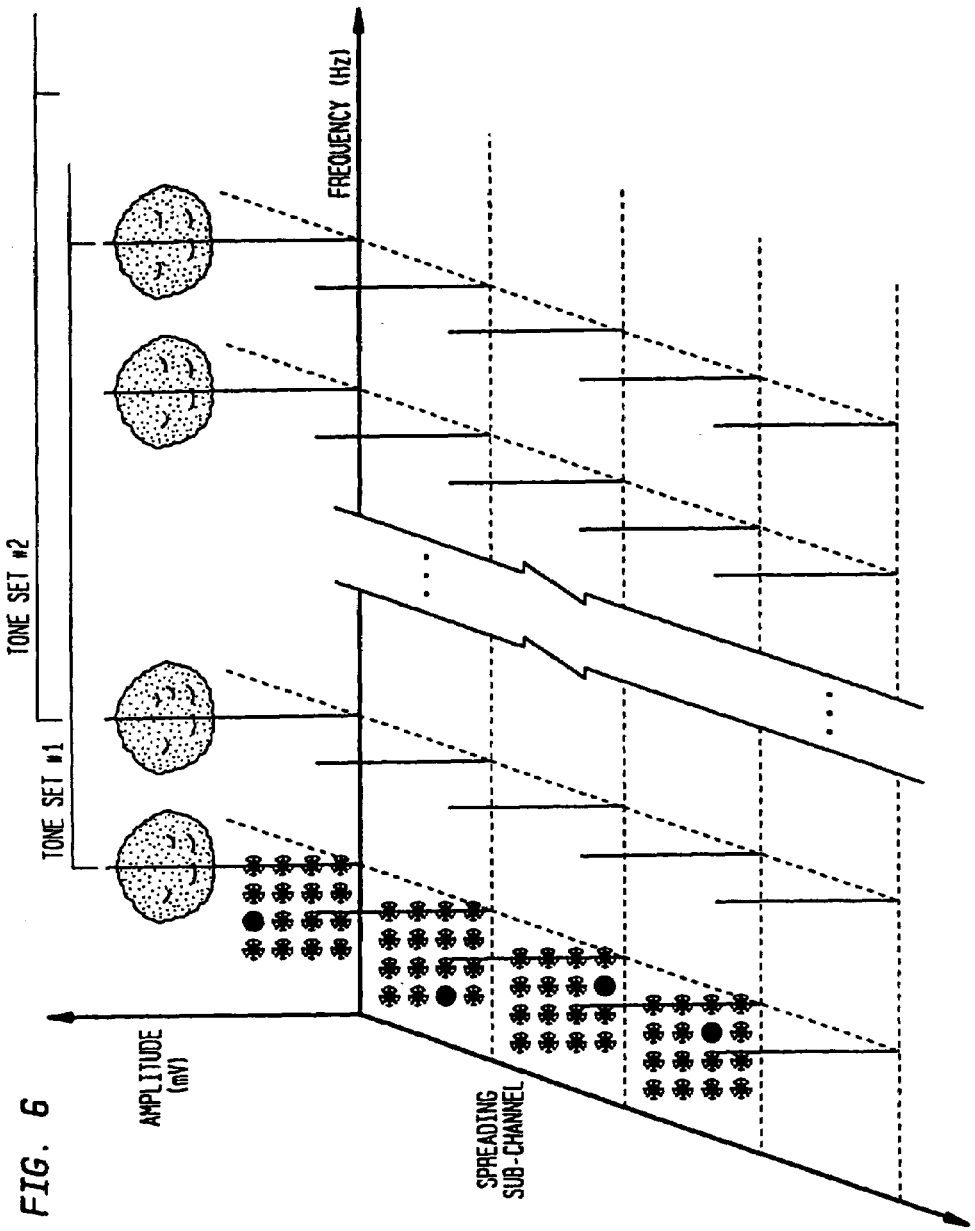
FIG. 6 is a simplified representation of DMT-SC using an exemplary higher order QAM modulation format.

FIGS. 6 and 7 show alternative embodiments of the directional antenna arrays 120 that may be used in the system of the present invention. A first embodiment of the base station antenna implementation is designated generally as 120*a*. The antenna 120*a* is a circular patch slot array antenna including a protective RADOME 505 available from RADIX Technologies, Inc. of Mountain View, Calif., a generally cylindrical housing 507, and a support pole 510. A plurality of multi-element vertical patch arrays 515 are depicted in cutaway in FIG. 6. Each of the patch arrays 515 are capable of directionally emitting radio frequency signals so as to provide beam forming capabilities necessary for the proper implementation of the present invention. In one embodiment, the height of the cylindrical portion 507 is approximately 18", while the diameter of the RADOME 505 is approximately 5–16".

In one advantageous embodiment, the antenna 120*a* includes a vertical stack of 4 microstrip patch antennas. Four of these stacks will respectively be oriented to cover four 90° quadrants. Thus, a total of 16 circumferential stacks of microstrip flared-notch antennas (where each vertical stack comprises eight notches) will be included on the base antenna 120*a*. For both the remote and base antennas, the preferred sensor element spacing is one-half wavelength.

FIG. 7 depicts a second implementation of the base station antenna of the present invention that is generally designated as 120*b*. The antenna 120*b* includes a RADOME 520, a generally cylindrical portion 525, and a support pole 530. The RADOME 520 is approximately 18–24" in diameter while the cylindrical portion 525 is approximately 14" in height. As shown in cutaway, the antenna 120*b* includes a flared circular horn configuration 535 as well as a plurality of monopole transmission elements 540. The monopole elements 540 may be used for beam forming purposes such as that that is necessary for the optimum operation of the present invention.

Figure 80A:
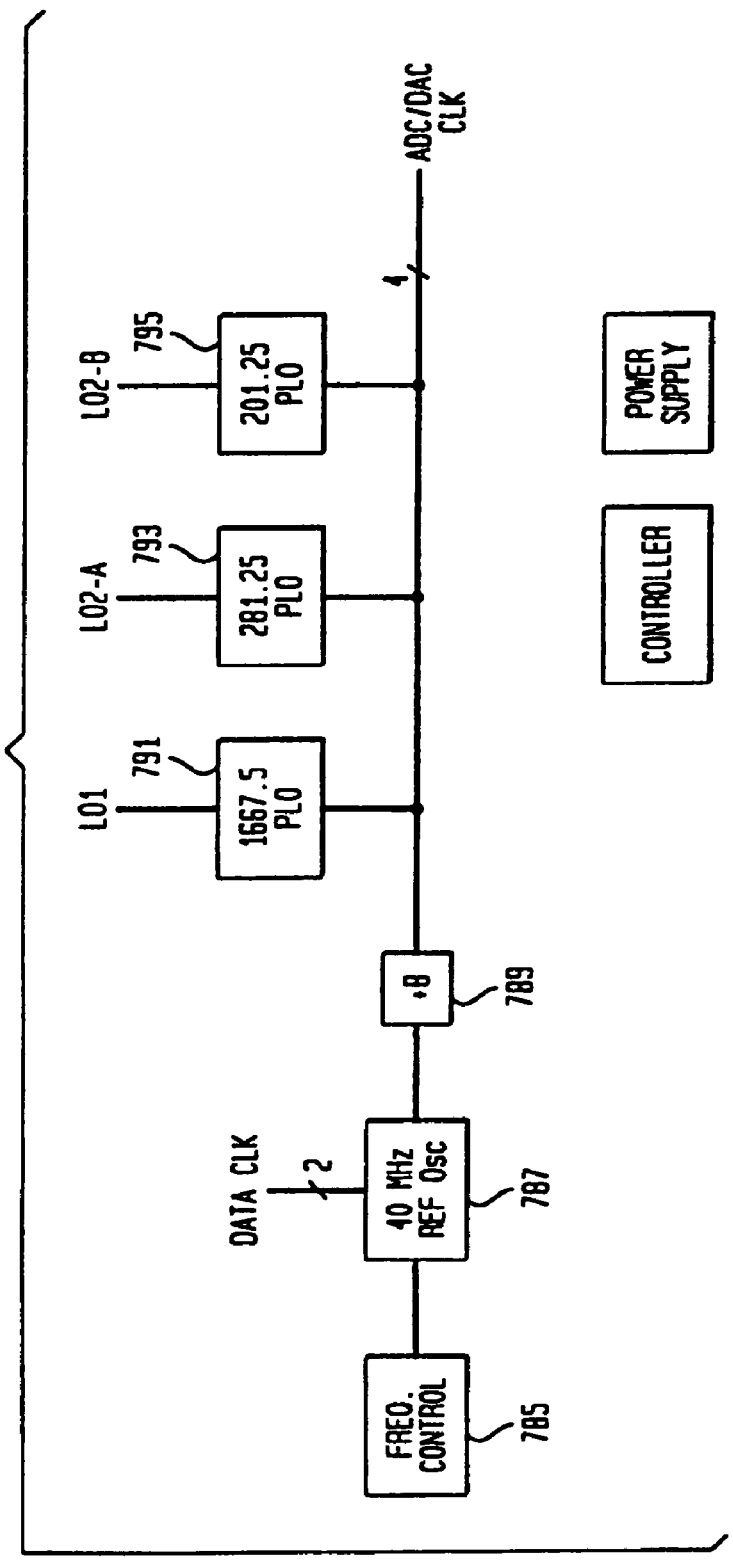
FIG. 80A is a schematic block diagram showing the main internal functional elements of the synchronization circuitry shown in FIG. 80.
Figures 1, 80:
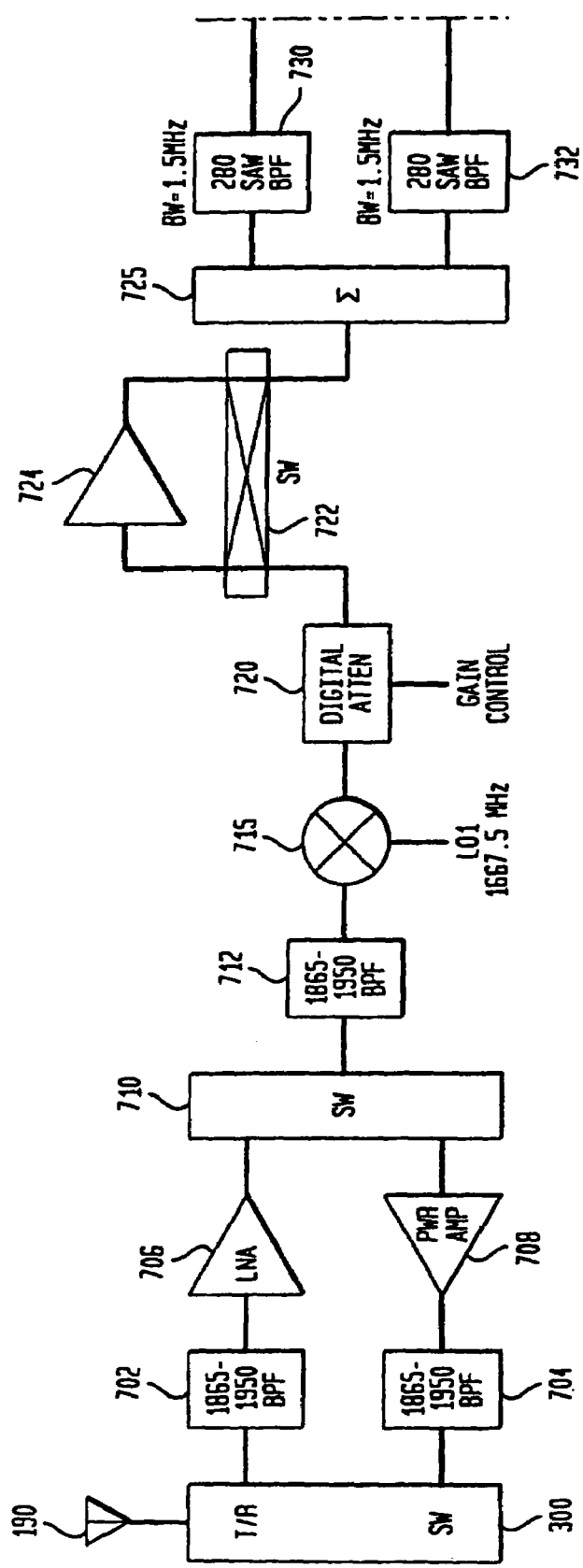
FIG. 80 is a schematic block diagram showing a dual band radio frequency transceiver that may advantageously be used in the high bandwidth remote access station shown in FIG. 74.
Figures 2, 80:
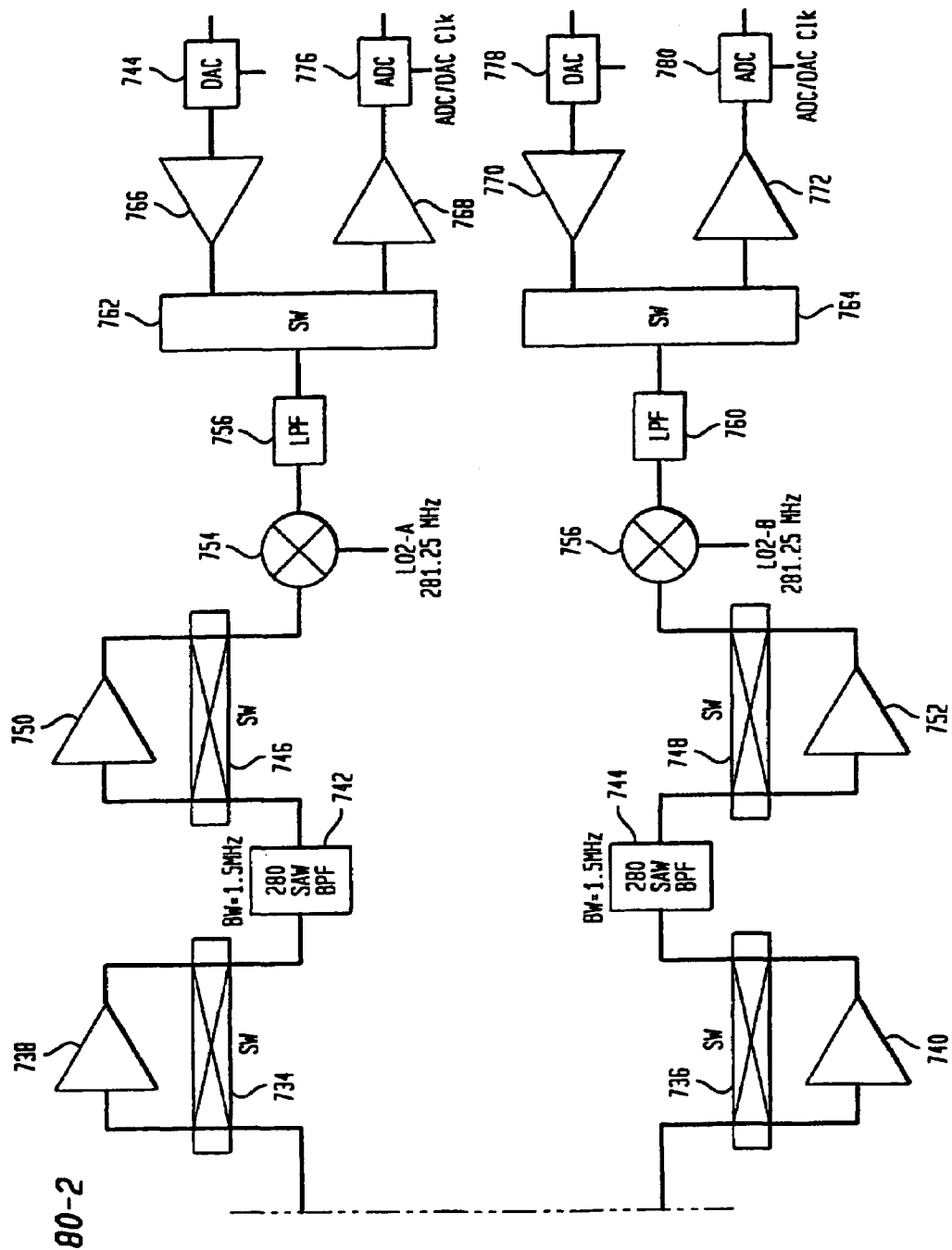

FIG. 80 is a transceiver block diagram showing the main structural elements of the down converter 305 depicted in FIG. 72. As shown in FIG. 80, the antenna 190 and the transmit/receive switch 300 connect to bandpass filters 702, 704 that, in turn, connect to amplifier 706, 708, respectively. The path through the filter 702 and the amplifier 706 constitutes the receive path that is part of the down converter 305, while the path that is through the amplifier 708 and the bandpass filter 704 constitutes part of the transmission pass that is a part of the up converter circuit 307. The output of the amplifier 706 and the input of the amplifier 708 connect to a switch 710. The switch 710 is used to switch between the transmission and receiving paths associated with the down and up converters 305, 307, respectively.

Although the up converter 307 and the down converter 305 are represented in FIG. 72 as functionally distinct blocks, it will be appreciated by one of ordinary skill in the art that the same structural elements may be used to perform the functions of both the up converter and the down converter in an architecture that reuses amplifiers and saw filters within the transmitter and receiver path. The switch 710 connects to a bandpass filter 712. In one advantageous embodiment, the bandpass filter 712 has a bandpass frequency between 1,865 MHz and 1,950 MHz. The bandpass filter 712 connects to a multiplier 715 that receives an input from a first local oscillator having an oscillation frequency of 1667.5 MHz. The multiplier 715 connects to a digital attenuator circuit 720 that receives a gain control input from the demodulator 310 (see FIG. 72). The digital attenuator 720 connects to an amplifier 724 via a switching circuit 722. The switching circuit 722 allows the amplifier 724 to be used bidirectionally in both the transmitter and receive paths. That is, when switched in a first direction, the output of the amplifier 724 connects to the digital attenuator circuit 720 while when switched in a second mode, the input of the amplifier 724 connects to the digital attenuation circuit 720. By using the same amplifier (i.e., the amplifier 724) in both the transmitter and receiver paths the same amplifier characteristics are observed in both paths so that transmission and reception compensation is greatly simplified. The switching network 722 further connects to a summing circuit 725.

When operating in a receiving mode, the summing circuit 725 acts as a signal splitter while, when in the transmitting mode, the summing circuit 725 acts to linearly add a pair of input signals. The summing circuit 725 connects to parallel amplification and filtering paths having corresponding elements. Specifically, one input to the summing circuit 725 comprises a saw bandpass filter 730 having a center frequency of 270 MHz and a bandwidth of 1.5 MHz. A corresponding saw bandpass filter 732 has a center frequency of 200 MHz and a bandwidth of 1.5 MHz. The bandpass filters 730, 732 connect, respectively, to amplifiers 738, 740 via switching networks 734, 736. Again, the switching networks 734, 736 insure that identical amplifier characteristics are observed in both the transmit and receive paths. The amplifiers 738, 740 advantageously provide an amplification factor. The switching circuits 734, 736 connect to corresponding saw bandpass filters 742, 744. The bandpass filter 742 has a center frequency of approximately 280 MHz and a bandwidth of 1.5 MHz, while the bandpass filter 744 has a center frequency of 200 MHz and a bandwidth of 1.5 MHz. The bandpass filters 742, 744 connect, respectively, to corresponding amplifiers 750, 752 via switching networks 746, 748. The amplifiers 750, 752 advantageously provide an amplification factor. The switching networks 746, 748 connect to corresponding multipliers 754, 756. The multiplier 754 receives a local oscillator input signal oscillating at 281.25 MHz, while the multiplier 756 receives a local oscillator input signal oscillating at approximately 201.25 MHz.

The multipliers 754, 756 connect to corresponding low pass filters 758, 760, that in turn connect to switches 762, 764, respectively. The switch 762 receives an input signal from an amplifier 766 and provides an output signal to an amplifier 768, while the switch 764 receives an input signal from an amplifier 770 and provides an output signal to an amplifier 772. The amplifiers 766 through 772 advantageously have an amplification factor. Amplifiers 766, 770 form a part of the transmission path, and therefore properly belong to the up converter 307, while the amplifiers 768, 772 belong to the reception path and therefore, properly belong to the down converter 305 of FIG. 72. The amplifiers 766, 770 connect to digital-to-analog converters 774, 778, respectively. The digital-to-analog converters 774, 778 also comprise a portion of the up converter 307 and receive a digital-to-analog clock pulse from the synchronization circuit 312. The amplifiers 768, 772 connect to analog-to-digital converters 776, 780, also comprise a portion of the down converter 305 that receive analog-to-digital converter clock inputs from the synchronization circuit 312 (see FIG. 72).

The inputs to the digital-to-analog converters 774, 778 are received from the modulation circuit 345, while the outputs of the analog-to-digital converters 776, 780 are provided as inputs to the demodulation circuit 310.

The operation of the up/down converter circuit depicted in FIG. 80 will first be described with reference to the received path and will next be described with reference to the transmission path. Within the received mode, signals picked up by the antenna 120 are transmitted to the switch 300 and passed through the bandpass filter 702 so as to attenuate any signals that are not within the frequency band of interest (i.e., frequencies between 1,865 MHz and 1,950 MHz). The filtered signals are then amplified by an amplification factor within the amplifier 706. The output of the amplifier 706 is provided as an input to the switch 710 that allows the amplified signal to be passed through the bandpass filter 712 that further filters out any undesired signals outside of the designated bandpass range.

Signals that are allowed to pass through the filter 712 are multiplied by the local oscillator frequency at 1,667.5 MHz within the multiplier 715. Thus, the multiplier 715 acts as a synchronous detector that may be used to cause a first down conversion of the signal from approximately the 2 GHz range down to the 200 to 300 MHz range. This down-converted signal is then attenuated by means of the digital attenuation circuit 720 and amplified with an amplification factor by means of the amplifier 724. The down-converted signal is then split within the signal splitter 725 so that one portion of the signal enters the saw bandpass filter 730 while an identical portion of the signal enters the saw bandpass filter 732.

The portion of the signal that enters the bandpass filter 730 is filtered to attenuate signals outside of the frequency range of 279.25 MHz and 280.75 MHz. This filtered signal is then amplified by a factor via the amplifier 738 and is then filtered again through the filter 742 having substantially identical characteristics to the filter 730. Once again, the filtered signal is amplified by the amplifier 750 with an amplification factor and this signal is input to the multiplier 754. The multiplier 754 acts as a synchronous detector that converts the signal output by the amplifier 750 to substantially a base band signal by multiplying the oscillator signal at 281.25 MHz. The base band signal is then passes through the low pass filter 758 and from there is supplied as an input to the amplifier 768 via the switch 762. The amplifier 768 amplifies the base band signal by a factor and this signal is then converted to digital data by means of the analog-to-digital converter 776.

The second portion of the signal output by the splitter 725 follows a substantially similar path to that followed by the first portion of the signal output by the splitter 725, with the exception that the second portion of the signal is filtered to pass bandwidths between 199.25 MHz and 200.75 MHz. Furthermore, this portion of the signal is synchronously detected within the multiplier 756 by means of a local oscillator signal at 201.25 MHz. In this manner, signals received by the antenna 120 are asynchronously detected, down-converted to the base band level, and digitized so as to provide digital information to be demodulated by the demodulator 310.

The transmission path for signals that are to be transmitted by the high-bandwidth base station 110 is substantially the same through the up converter as through the down converter with the exception that the order of the signal processing steps is reversed. Specifically, modulated digital signals serve as the inputs to digital-to-analog converters 774 and 778, so as to produce analog signals that are amplified by the amplifiers 766 and 770, respectively. The amplified analog signals pass through the switching circuits 762, 764 and are filtered by respective low pass filters 758, 760. Along the first path the analog signal is up-converted by modulation (i.e., multiplication) with the local oscillator signal at 281.25 MHz while the second signal is up-converted by modulation with an oscillator at 201.25 MHz. The first modulated signal is then amplified and filtered via the amplifiers 750, 738 and the filters 742, 730 so as to provide a well defined signal between 200 and 79.25 MHz and 280.75 MHz. The second signal is likewise amplified and filtered via the amplifiers 752, 740 and the filters 744, 732, so as to provide a well defined signal within the frequency range of 199.25 MHz and 200.75 MHz. The two signals that are output from the bandpass filters 730 and 732 are provided as inputs to the summing circuit 725. The summing circuit 725 linearly adds the two input signals, and these signals are amplified by the amplifier 724. The digital attenuation circuit 720 then attenuates the amplified output signal and the multiplier 715 further up converts this signal by multiplication with the oscillator frequency at 1,667.5 MHz. In this manner, the original input signals containing the communication information are up-converted to the transmission frequency range. The signal to be transmitted is then filtered between 1,865 and 1,950 MHz within the filter 712 and the signals amplified in the amplifier 708 after passing through the switch 710. The amplified transmission signal is further filtered within the bandpass filter 704 and this filtered and amplified signal is provided as an output to the antenna 120 via the transmission/receive switch 300.

FIG. 80A is a schematic block diagram showing the main internal functional elements of the synchronization circuitry 312. As shown in FIG. 80A, the synchronization circuit 312 includes a frequency controller 785 that connects to a 40 MHz reference oscillator 787 having a 2-bit input from a data clock (not shown). The 40 MHz reference oscillator 787 outputs a signal to a divide-by-eight binary counter 789 that, in turn, supplies the output signal references for local oscillators 791, 793 and 795. The local oscillator 791 provides the oscillation frequency at 1,667.5 MHz, while the oscillators 793, 795, respectively, provide the oscillation frequencies of 281.25 MHz and 201.25 MHz. Finally, the divide-by-eight binary counter 789 further provides a clock input pulse for each of the analog-to-digital and digital-to-analog converters 774 through 780.

Figure 81:
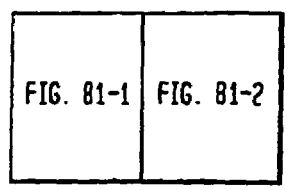
FIG. 81 is a schematic block diagram depicting a dual band radio frequency transceiver that may advantageously be implemented within the high bandwidth base station shown in FIG. 74.
Figures 1, 81:
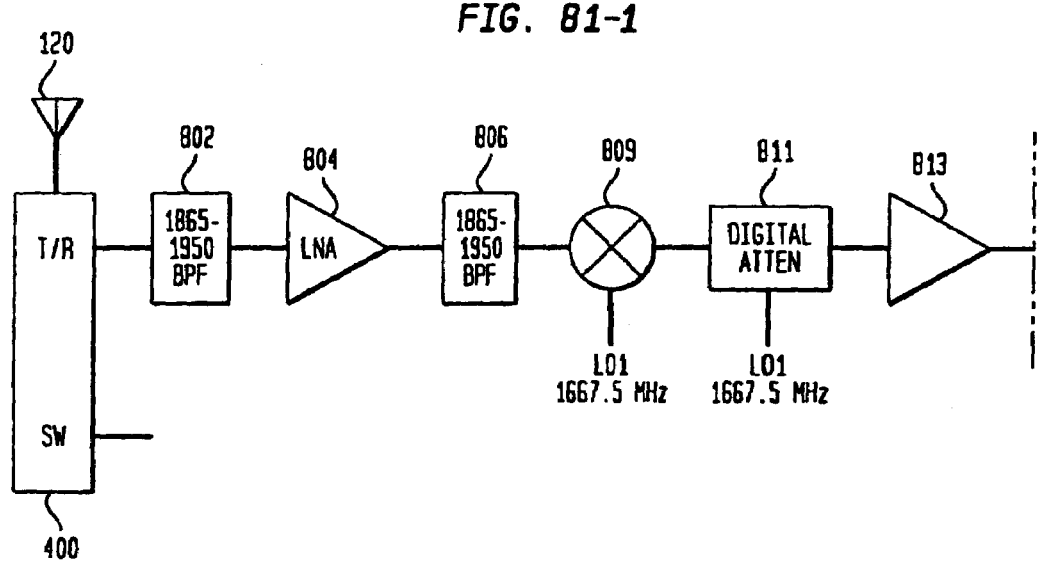
Figures 2, 81:
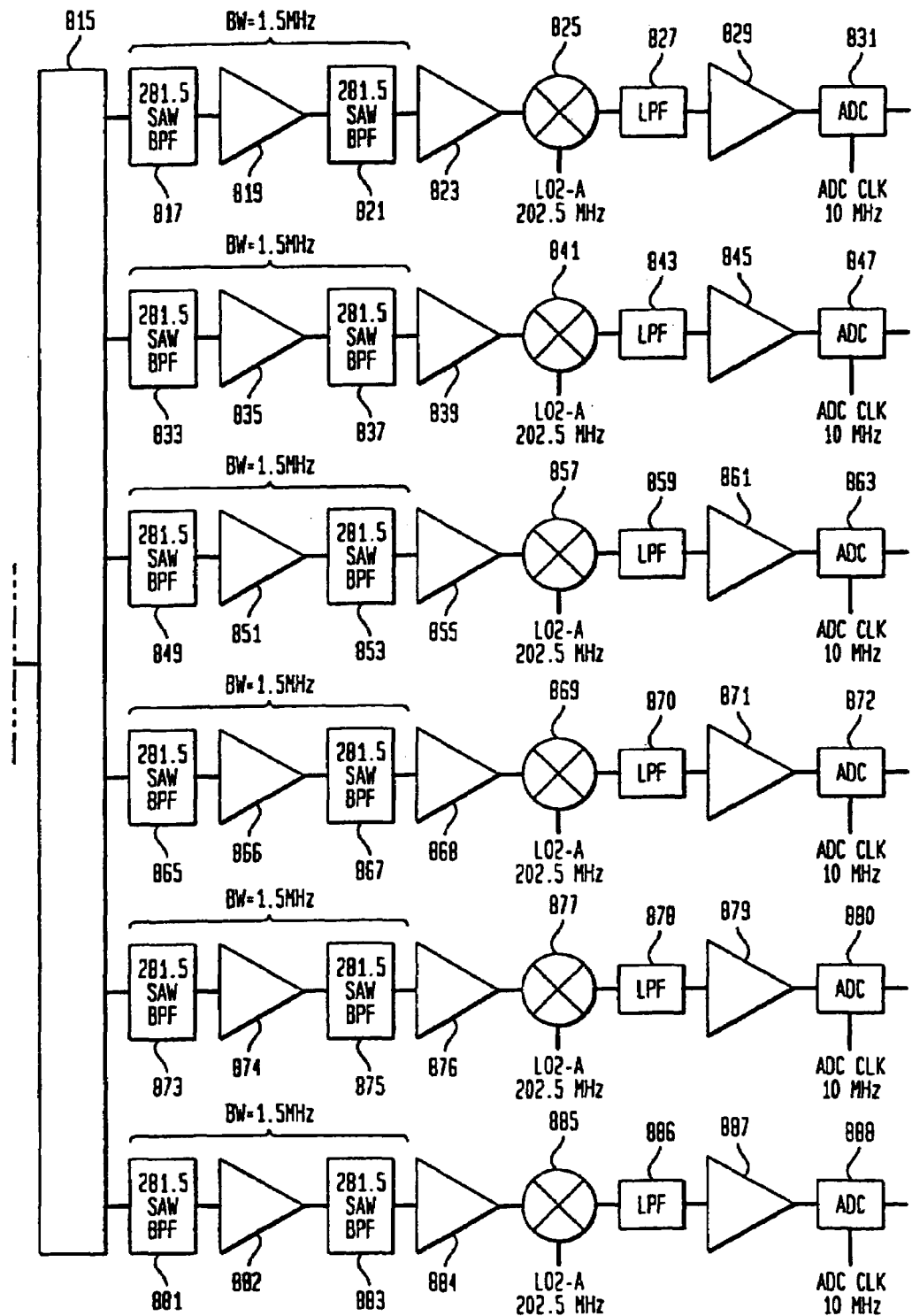

FIG. 81 depicts a schematic block diagram of the main elements of the down converter 405 within the base station 110 depicted in FIG. 73. Specifically, the antenna 120 connects to a bandpass filter 802 via the transmit/receive switch 400 while the switch 400 is in the receive mode. The filter 802 passes frequencies about 1,865 MHz and below 1,950 MHz. The filter 802 connects to the input of an amplifier 804 that, in turn, connects to a second bandpass filter 806 that has substantially the same characteristics as a filter 802. The filter 806 provides an input to a multiplier 809 that also receives inputs from a local oscillator (not shown in FIG. 81) at an oscillation frequency of 1,667.5 MHz. The output of the multiplier 809 connects to a digital attenuator 811 that receives a gain control input fee as the demodulator circuit 410 (see FIG. 73). The output of the digital attenuator 811 serves as the input to an amplifier 813 having an amplification factor.

The amplified signal output from the amplifier 813 enters a signal splitter 815 that divides the signal into, for example, six substantially identical portions. Each of the six signals output by the splitter 815 are filtered, amplified, down-converted and digitized in substantially the same way.

The first signal enters a bandpass filter 817 having a center frequency of 281.5 MHz with a bandwidth of 1.5 MHz. The output of the bandpass filter 817 serves as an input to an amplifier 819 having an amplification factor. The output of the amplifier 819 serves as the input to a bandpass filter 821 having substantially the same characteristics as a bandpass filter 817. The output of the bandpass filter 821 connects to an amplifier 823 having an amplification factor, while the output of the amplifier 823 serves as the input to a multiplier 825. The multiplier 825 also receives a local oscillator input at 282.5 MHz so as to act as a synchronous detection circuit that has an output connected to a low pass filter 827. The output of the low pass filter 827 serves as the input to an amplifier 829, while the output of the amplifier 829 serves as the input to an analog-to-digital converter 831. The analog-to-digital converter 831 further receives a 10 MHz clock input from the frequency reference circuit 409 (see FIG. 73). The output of the analog-to-digital converter 831 serves as the input to the demodulator circuit 410 in FIG. 73.

The second portion of the signal output from the signal splitter 815 is input to a saw bandpass filter 833 having a center pass frequency of 280 MHz and a bandwidth of 1.5 MHz. The bandpass filter 833 connects to the input of an amplifier 835 that, in turn, outputs a signal to a bandpass filter 837 having substantially the same characteristics as the bandpass filter 833. The output of the filter 837 serves as the input to an amplifier 839 having an amplification factor. The output of the amplifier 839 connects as an input to a multiplier circuit 841 which also receives a local oscillator signal at 282.5 MHz. The output of the multiplier circuit 841 serves as the input to a low pass filter 843 that, in turn, connects to the input of an amplifier 845 having an amplification factor. The output of the amplifier 845 is input to an analog-to-digital converter 847 that operates off of an analog-to-digital clock of 10 MHz. The 10 MHz clock is received from the frequency reference circuit 409 of FIG. 73. The output of the analog-to-digital converter 847 serves as an input to the demodulating circuit 410 (see FIG. 73).

The third portion of the signal output by the signal splitter 815 enters a bandpass filter 849 that has a center pass frequency of 278.5 MHz and a bandwidth of 1.5 MHz. The output of the bandpass filter 849 enters the input of an amplifier 851 having an amplification factor, while the output of the amplifier 851 connects to the input of a bandpass filter 853 having substantially the same bandpass characteristics as the filter 849. The output of the filter 853 connects to the input of an amplifier 855 that, in turn, connects to a multiplier 857 that connects to an analog-to-digital converter 863 via a low pass filter 859 and an amplifier 861. The amplifier 855, the multiplier 857, the low pass filter 859, the amplifier 861, and the analog-to-digital converter 863 are substantially identical to the corresponding elements 823, 825, 827, 829 and 831, and function in substantially the same manner.

The fourth portion of the signal output from the signal splitter 815 enters a bandpass filter 865 having a center bandpass frequency of 201.5 MHz and a bandwidth of 1.5 MHz. The output of the bandpass filter 865 serves as the input to an amplifier 866 having an output connected to a bandpass filter 867 that has substantially identical filtering characteristics as the bandpass filter 865. The output of the bandpass filter 867 connects to the input of an amplifier 868 having an amplification factor. The output of the amplifier 868 connects to a multiplier 869 that also receives a local oscillator frequency of 202.5 MHz. Thus, the multiplier 869 acts as a synchronous detector that outputs a down-converted base band signal to a low pass filter 870. The low pass filter 870 provides an input to an amplifier 871 having an amplification factor and the output of the amplifier 871 serves as the input to an analog-to-digital converter 872 that receives a 10 MHz analog-to-digital converter clock from the frequency reference circuit 409. The output of the analog-to-digital converter 872 serves as an input to the demodulating circuit 410 (see FIG. 73).

The fifth and sixth portions of the signals output by the signal splitter 815 are provided as inputs to analog-to-digital converters 880, 888, respectively, via bandpass filters 873, 881, amplifiers 874, 882, bandpass filters 875, 883, amplifiers 876, 884, multipliers 877, 885, low pass filters 878, 886, and amplifiers 879, 887, respectively. Each of the circuit elements between the splitter 815 and the analog-to-digital converters 880, 888 are substantially identical to their corresponding elements between the signal splitter 815 and the analog-to-digital converter 872, with the exception that the bandpass filters 873 and 875 have a center frequency of 200 MHz and the bandpass filters 881, 883 have a center pass frequency of 198.5 MHz.

The operation of the down converter portion of the base station 110 is substantially similar to that of the down converter portion of the high-bandwidth base station 110. Specifically, signals received by the antenna 120 and switched to the receiving path by the switch 400 are filtered and amplified by means of the filters 802, 806 and the amplifier 804. Subsequently, the signal is down-converted to a lower frequency band by synchronous detection within the multiplier 809. After the first down conversion step, the signal is digitally attenuated by means of the attenuator 811 and then amplified by means of the amplifier 813. The signal is then split into a plurality of substantially identical signals that each follow a different detection path. Each of the detection paths is substantially identical, with the exception that each path down converts the detected signal into a different base band frequency range. Thus, for example, the first portion of the split signal is filtered about a center frequency of 281.5 MHz by the bandpass filters 817, 821, and is amplified by the amplifiers 819, 823. This filtered signal then is synchronously detected by the multiplier 825 and converted to base band. This base band signal is subsequently filtered, amplified and digitized within the low pass filter 827, the amplifier 829, and the analog-to-digital converter 831. This sequence of detection is substantially the same for each of the six signal portions output by the signal splitter 815, with the exception that the bandpass filters operate at different centering frequencies and the local oscillator signals that serve as inputs to the various multipliers are different for the bottom three signal portions than for the top three signal portions.

FIG. 81A is a simplified schematic block diagram showing the main internal components of the frequency reference circuit 409. As shown in FIG. 81A, the frequency reference circuit 409 includes a frequency control circuit 890, a 40 MHz reference oscillator 891, and a divide-by-four circuit 892. The divide-by-four circuit 892 provides outputs to local oscillators 893, 894 and 895, as well as to each of the analog-to-digital converter circuits and the digital-to-analog converter circuits (see FIG. 82). The local oscillator 893 provides the 1,667.5 MHz output signal, while the local oscillators 894 and 895, respectively, provide the 281.25 and the 201.25 MHz oscillator signals.

Figure 82:
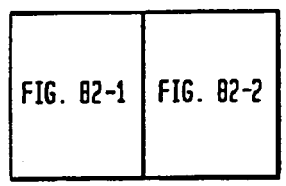
FIG. 82 is a schematic block diagram of a dual band radio frequency transmitter of a type that may advantageously be implemented within a base station constructed in accordance with the present invention.
Figures 1, 82:
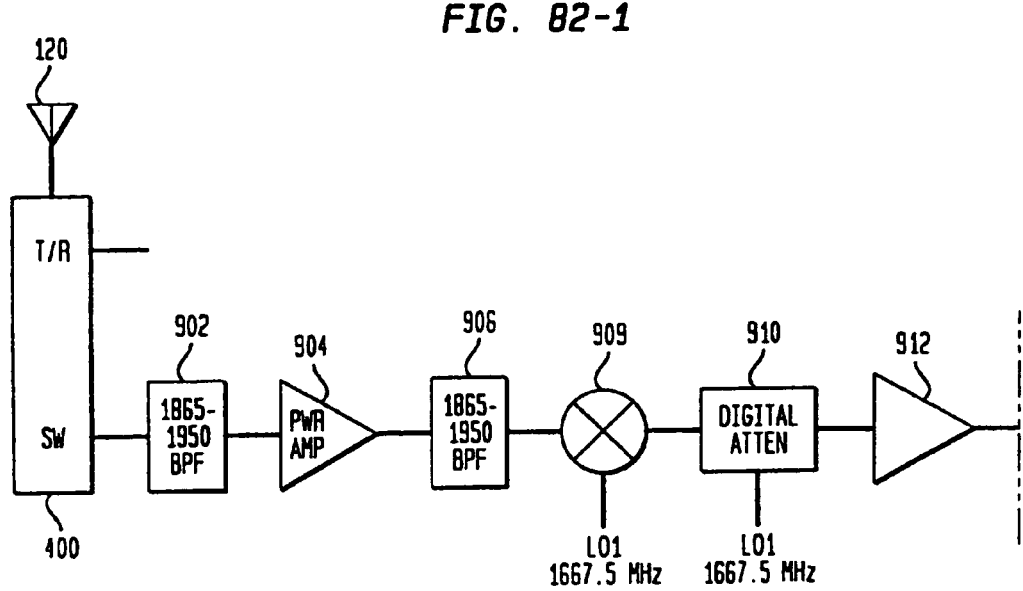
Figures 2, 82:
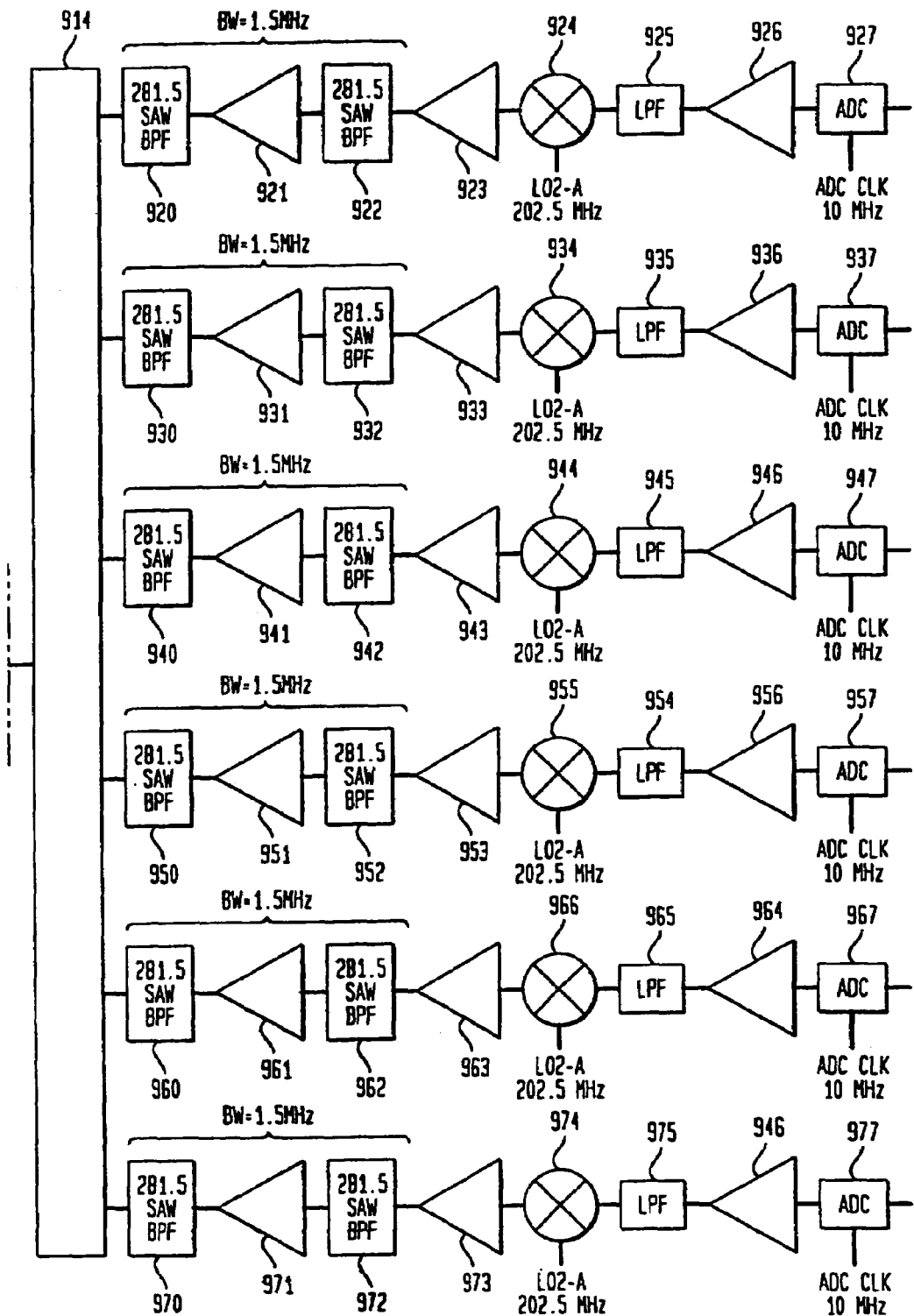

FIG. 82 is a schematic block diagram that shows the main internal components of the up converter 407 along the transmission path of the base station 110 (see FIG. 73). The antenna 120 connects to a bandpass filter 902 via the switch 400 when the switch 400 is in the transmission mode. The bandpass filter 902 allows frequencies between 1,865 MHz and 1,950 MHz to pass. The bandpass filter 902 connects to the output of a power amplifier 904 having an amplification factor. The input of the power amplifier 904 connects to a bandpass filter 906 having frequency pass characteristics that are substantially the same as the bandpass filter 902. The input of the bandpass filter 906 connects to the output of a multiplier 908 that receives a first input from a local oscillator having an oscillation frequency of 1,667.5 MHz and a second input from a digital attenuator circuit 910. The digital attenuator circuit 910 receives gain control inputs from the modulation circuit 445 (FIG. 73). The input of the digital attenuator circuit 910 connects to the output of a power amplifier 912 that, in turn, receives inputs from a summing circuit 914. The summing circuit 914 receives, in one embodiment, six separate inputs that are linearly added within the summing circuit 914 to provide an output to the amplifier 912. Each of the six inputs to the summing circuit 914 connects to a bandpass filter having a 1.5 MHz bandwidth. Specifically, the bandpass filters 920, 930, 940, 950, 960 and 970 serve as inputs to the summing circuit 914. The bandpass filters 920, 930, 940, 950, 960 and 970, respectively, have center pass frequencies of 281.5 MHz, 280 MHz, 278.5 MHz, 201.5 MHz, 200 MHz and 198.5 MHz. Each of the bandpass filters 920–970, respectively, connect to the outputs of amplifiers 921–971. The amplifiers 921–971, respectively, receive inputs from bandpass filters 922–972. The bandpass filters 922–972 have substantially the same frequency path characteristics as the bandpass filters 920–970. The bandpass filters 922–972 each connect to outputs of amplifier circuits 923–973.

The amplifier circuits 923–973 connect to the outputs of respective multipliers 924–974. The multipliers 924, 934, 944 receive local oscillator input signals at an oscillation frequency of 282.5 MHz, while the multipliers 954, 964, 974 receive local oscillator inputs at 202.5 MHz. Each of the multipliers 924–974 connect to corresponding low pass filters 925–975. The low pass filters, in turn, receive inputs from the output of respective amplifiers 926–976. Finally, each of the amplifiers 926–976, respectively, receive inputs from digital-to-analog converters 927–977. Each of the digital-to-analog converters 927–977 receive digital-to-analog converter clock input signals at 10 MHz from the output of the divide-by-four binary counter 892 (see FIG. 81A) and also receive inputs from the modulator circuit 445 shown in FIG. 73.

In operation, modulated data signals serve as inputs to the digital-to-analog converters 927–977. The digital-to-analog converters 927–977 convert the modulated digital data signals into analog signals that are subsequently amplified by the amplifiers 926–976, and filtered by the low pass filters 925–975. The outputs of the low pass filters 925–975 enter as one input of the multipliers 924–974, respectively. The second inputs of the multipliers 924–974 receive local oscillator inputs at either 282.5 MHz or 202.5 MHz. Thus, the signals output from the low pass filters 925–975 are up-converted to a first high frequency level. The up-converted signals output by the multipliers 924–974 are subsequently amplified and filtered by means of the amplifiers 923–973 and 921–971, and the filters 922–972 and 920–970. The outputs to the filters 920–970 serve as inputs to the summing circuit 914, that linearly sums each of the signals applied at the six input terminals.

The summed output of the summing circuit 914 serves as an input to the power amplifier 912. The output of the power amplifier 912 enters the digital attenuator circuit 910 so as to fine tune the gain control applied to the signal output from the signal amplifier 912, and the output of the digital attenuator 910 serves as the first input to the multiplier 908. The second input of the multiplier 908 is the local oscillator signal at 1,667.5 MHz. Thus, the multiplier 908 serves to up convert the signal output from the digital attenuator 910 to the transmission frequency of the base station 110. The output of the multiplier 908 is subsequently filtered and amplified by means of the filters 902, 906 and the amplifier 904. Finally, the output of the filter 902 serves as the input of the switch 400 in the transmit mode, that relays this up-converted and amplified signal to the antenna 120.

Method of Dynamically Allocating Bandwidth

Figure 83:
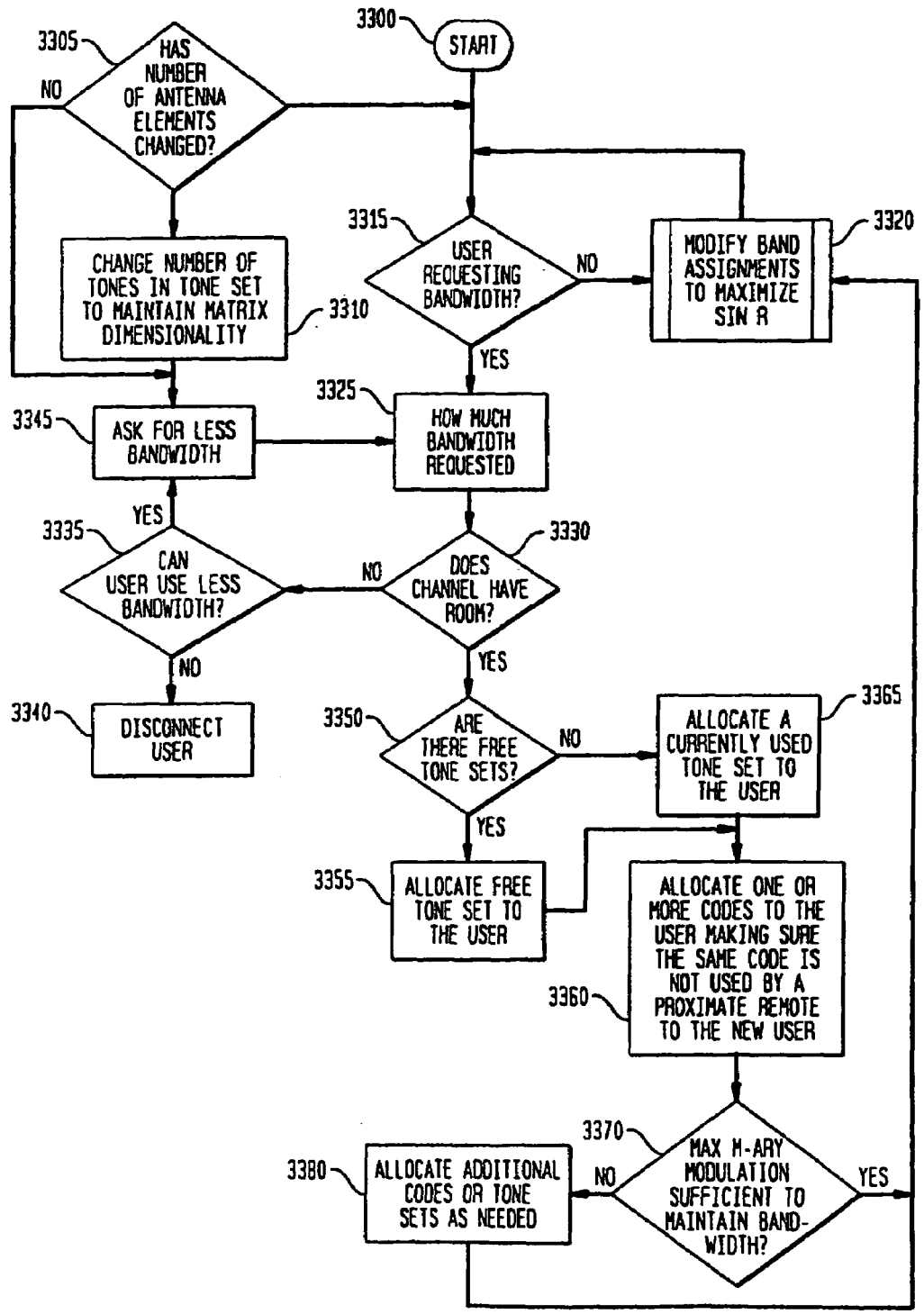
FIG. 83 depicts the bandwidth allocation method performed by the bandwidth demand controller of FIG. 74.

The bandwidth allocation method performed by the bandwidth demand controller (see FIG. 74) is depicted in FIG. 83. The method begins in a start block 3300. Once the bandwidth allocation method begins, initialization functions are performed including, as shown in FIG. 83, determining if the number of antenna sensor elements has been changed since the last use of the base station 110 or remote terminal 187, 192. For example, it may be desirable to provide a base station 110 or remote access terminal 187, 192 with increased spatial resolution capability so that the base or remote station can more accurately discriminate between incoming signals. In such a case, the base station 110 or remote terminal 187, 192 would be deactivated while a new antenna is installed having a greater number of sensor elements that, as well known in the art, would provide a greater degree of directional discrimination or spatial division for that base station or remote. Once the installation of a new antenna is complete, then the installer reactivates the base 110 or remote 187, 192 and, as indicated within a decision block 3305 a test is performed to determine if a number of antenna elements is changed. If a number of antenna elements has changed, control passes to an activity block 3310 wherein the number of tones within a tone set is redefined (e.g., to a smaller number if the number of antenna elements increases) so that the matrices used to calculate the complex weights applied to the sensors and tones within a tone set maintain the same dimensionality. Thus, as discussed above, essentially the same SINR is preserved while processing costs are not increased. After the initialization such as performed within the activity block 3310, control passes to a decision block 3315 wherein a determination is made if a new user is requesting bandwidth. If it was determined, however, within the decision block 3305 that the number of antenna elements has not been changed, then the method passes immediately to the decision block 3315 to the decision block 3305.

If it is determined within the decision block 3315, that a new user has not requested bandwidth through the access channel, then control passes to a subroutine block 3320 wherein the bandwidth assignments already allocated within the communications link are modified, if necessary, to maximize the SINR. Control returns from the subroutine block 3320 to the decision block 3315 until it is determined that a new user is requesting bandwidth over the control access channel.

When a new user requests bandwidth, control passes to an activity block 3325 to determine how much bandwidth is requested. As discussed above, the requested bandwidth is predicated upon the type of data that is transmitted (e.g., voice, video, data, etc.) as well as the transmitting device. For example, if an individual telephone unit is transmitted, then as few as 8 kilobits per second of bandwidth may be requested, while if a P-1 link connected to a PBX is requesting bandwidth, as much as 1.544 MHz will be requested. In one embodiment, the requesting device transmits an initialization or identification signal that indicates to the remote station 187, 192 the bandwidth requirements of the requested device.

Once the quantity of bandwidth requested is determined within the activity block 3325, control passes to a decision block 3330 or a determination is made if the communications channel has sufficient free bandwidth to accommodate the requesting unit. If it is determined that the channel does not have sufficient free bandwidth to accommodate the optimum bandwidth requested by the new user, then control of the method passes to an arbitration phase wherein a determination is first made within a decision block 3335 if the user can use less bandwidth. If a user cannot operate with less bandwidth than requested, then the user is disconnected and access is denied to the communications channel as indicated within activity block 3340. However, if it is determined that the user can operate with less bandwidth, then the base station 110 asks the user, via the remote station 187, 192, for a lower bandwidth requirement, as indicated within an activity block 3345. Control then returns to the activity block 3325 wherein the quantity of requested bandwidth is again determined. Of course, it will be understood, that the base station may present a suggested bandwidth that is allowable to the user via the remote station 187, 192 if the user is sophisticated enough to determine if such a suggested bandwidth would be sufficient to provide normal operation of the user communication device.

However, if it is determined that the communication channel has sufficient free bandwidth to accommodate the requesting user, then control passes from the decision block 3330 to a decision block 3350 wherein a test is performed to determine if there are any free tone sets. That is, if there are any tone sets that have not yet been allocated to other users within the region of the requesting remote terminal 187, 192. If there are free tone sets within the region of the requesting room or terminal 187, 192, then control passes to an activity block 3355 wherein one or more of the free tone sets is allocated to the user for use in transmitting data from the remote associated with the user to the base within the remote spatial cell. Control then passes from the activity block 3355 to an activity block 3360. If there is determined, however, within the decision block 3350 that there are no free tone sets, then control passes instead to an activity block 3365 wherein one or more currently used tone sets are allocated to the user for the transmission of data between the remote 187, 192 and base station 110. It is possible that multiple tone sets will be allocated to a requesting user if a very high bandwidth is requested by the user. It should also be noted here, that because the tone sets are grouped into four approximate 1 MHz bands that when multiple tone sets are allocated to a single user to establish a separate communications channel, these tone sets are typically within the same 1 MHz band.

Once control passes from either the activity block 3355 or the activity block 3365 to the activity block 3360, one or more codes (i.e., spreading codes used to modulate the various tones within the allocated tone set or tone sets) are allocated to the user making sure that the same code (i.e., on the same tone set) is not used by a proximate remote to the remote connected to the new user. In this manner, maximum frequency and code reuse is achieved by spatially separating users having the same tone sets and code assignments. Of course, it will be understood, that due to the adapted channel equalization method described above, that the spreading codes initially assigned to the remote terminals that, on line, are typically not are well-defined codes, but rather constitute linear adapted spreading weights to maximize the SINR. Therefore, it is highly unlikely that a newly allocated code will be identical to any of the spreading weights assigned to remote terminals within the same proximity as the remote terminal assigned to the new user. As discussed in greater detail above, the criteria for modifying spreading codes assigned to each new user requires that the spreading weights be linearly independent to provide at least one degree of freedom for each user within a given spatial cell site.

Control passes from the activity block 3360 to a decision block 3370 wherein a determination is made if the maximum constellation size (i.e., for any arbitrary M-ary modulation format) is sufficient to maintain the requested bandwidth given the number of tone sets and codes allocated to the user. That is, if the newly defined communication channel tolerates a sufficiently high constellation size then the required bandwidth will be satisfied for the requesting user. However, if the channel is not always resistant enough to handle the necessary constellation size to maintain the bandwidth required for operation of the new user, then additional codes or tone sets must be allocated to the user in accordance with the method described. Once the tone sets, codes, and modulation format are defined for the newly requested communication channel, control passes to the subroutine block 3320 wherein the bandwidth assignments are modified, as necessary, to maximize the SINR. Control then returns to the decision block 3315 and the process repeats as described.'

Figure 84A:
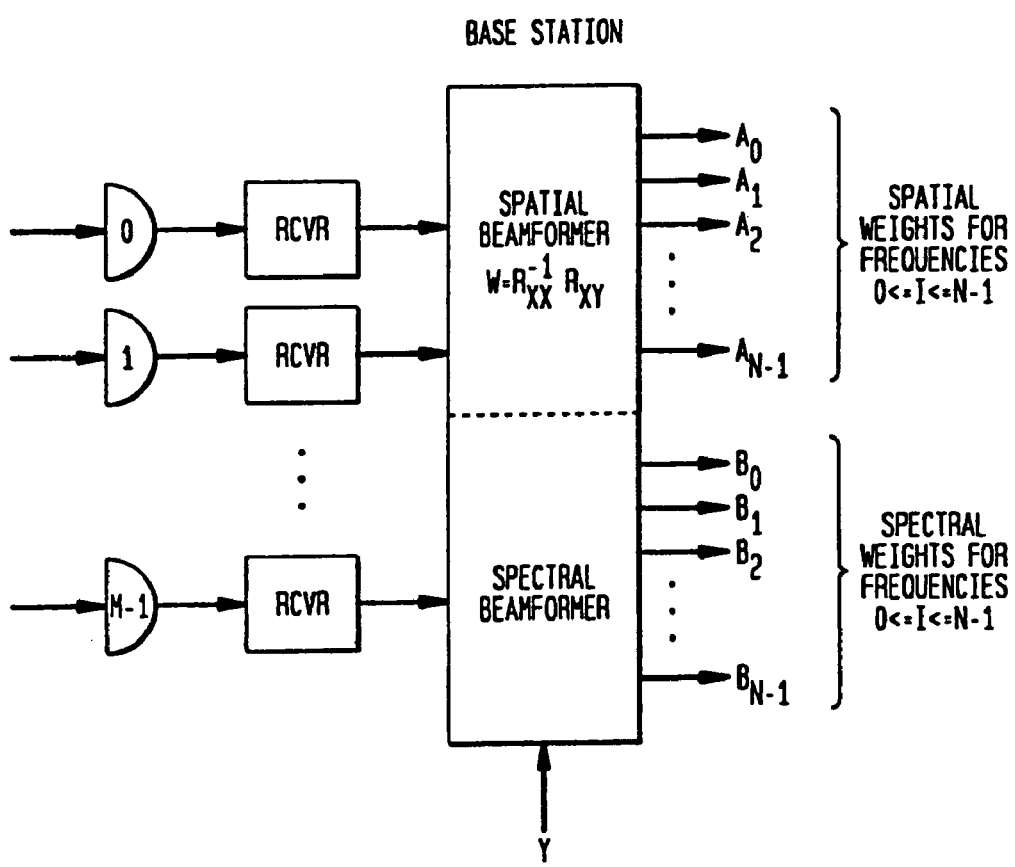
FIG. 84A and FIG. 84B show an alternate embodiment of the invention, where the spectral processing and the spatial processing are separated.
Figure 84B:
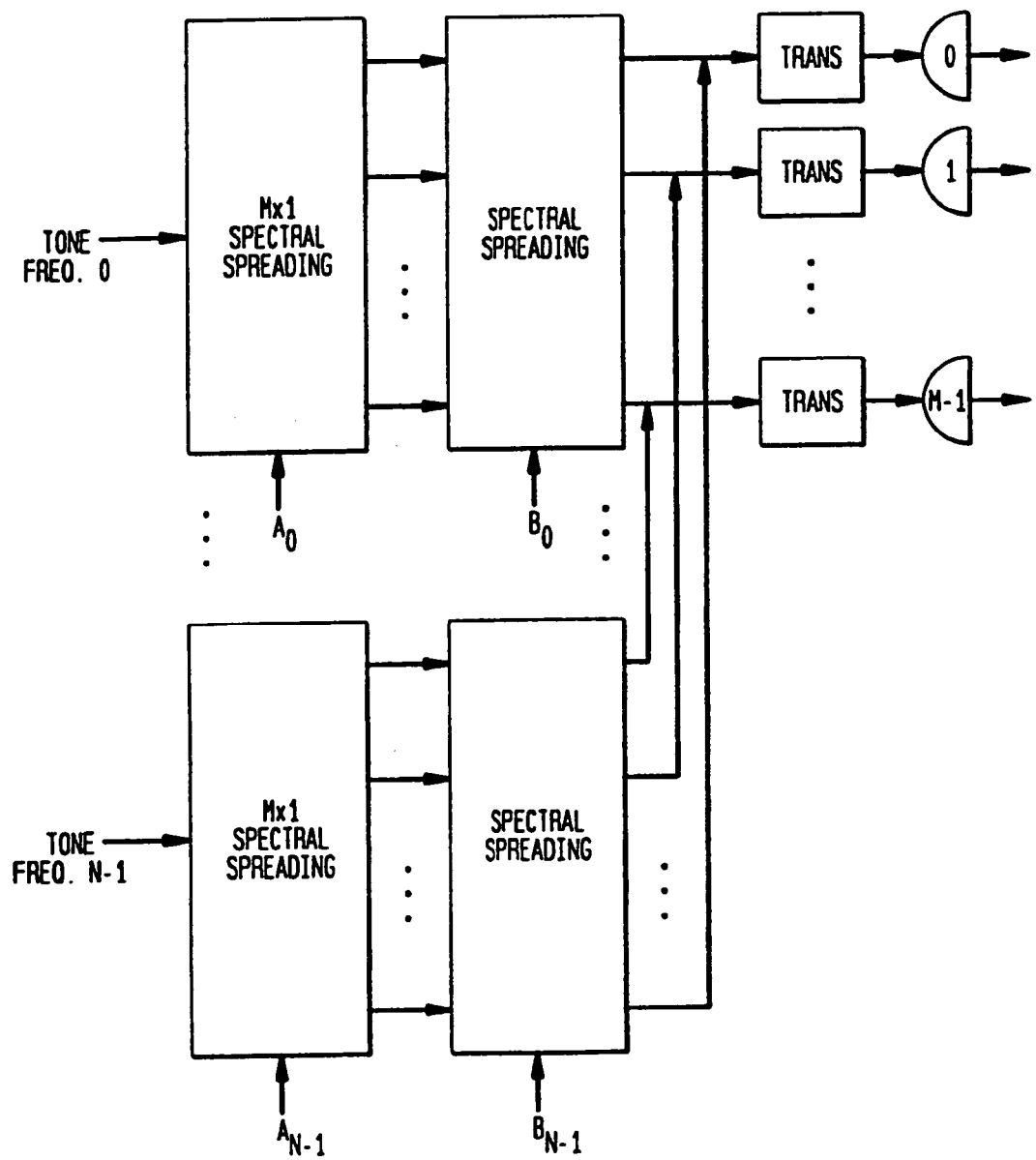
Figure 86:
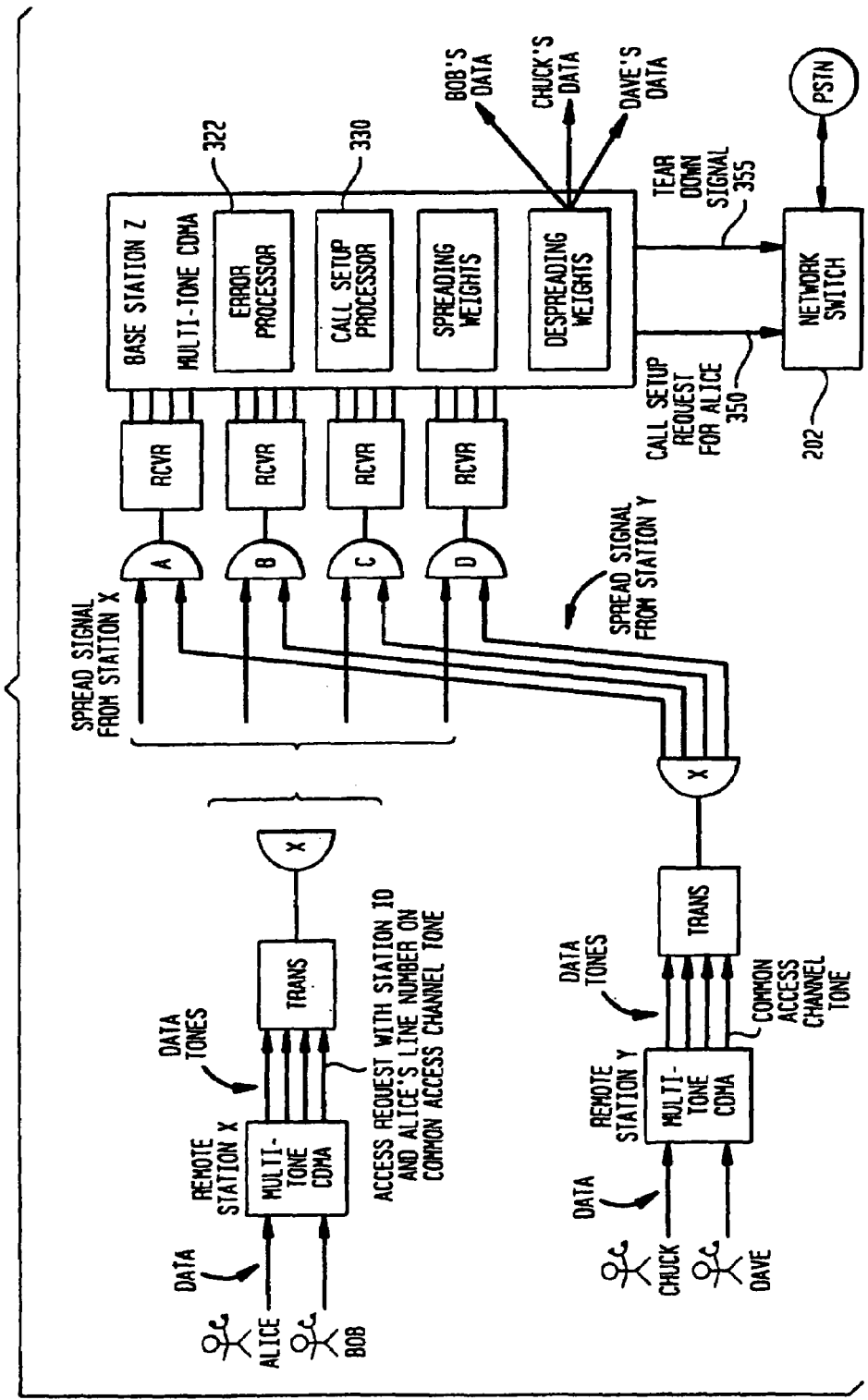
Figure 87:
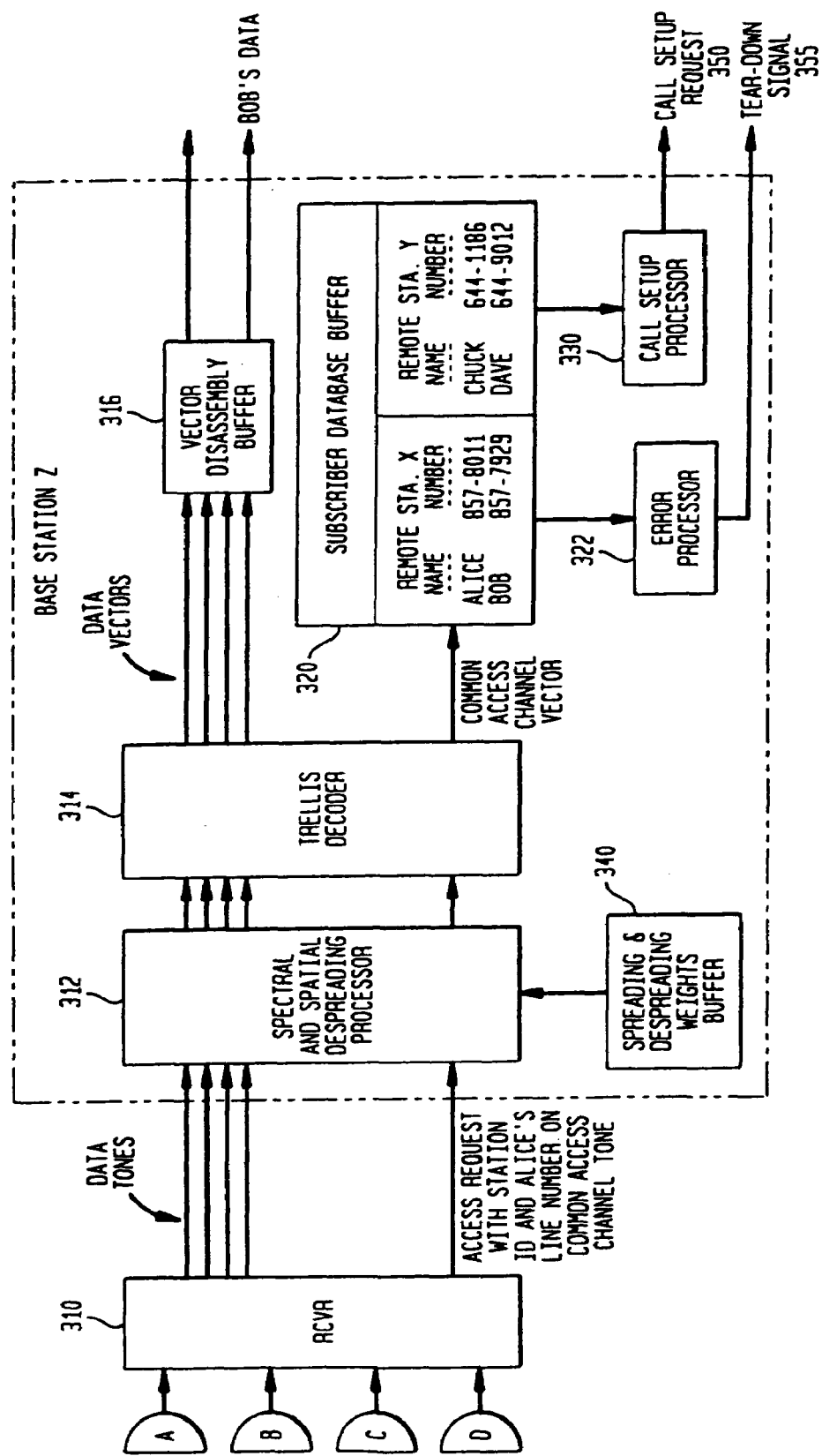
Figure 88:
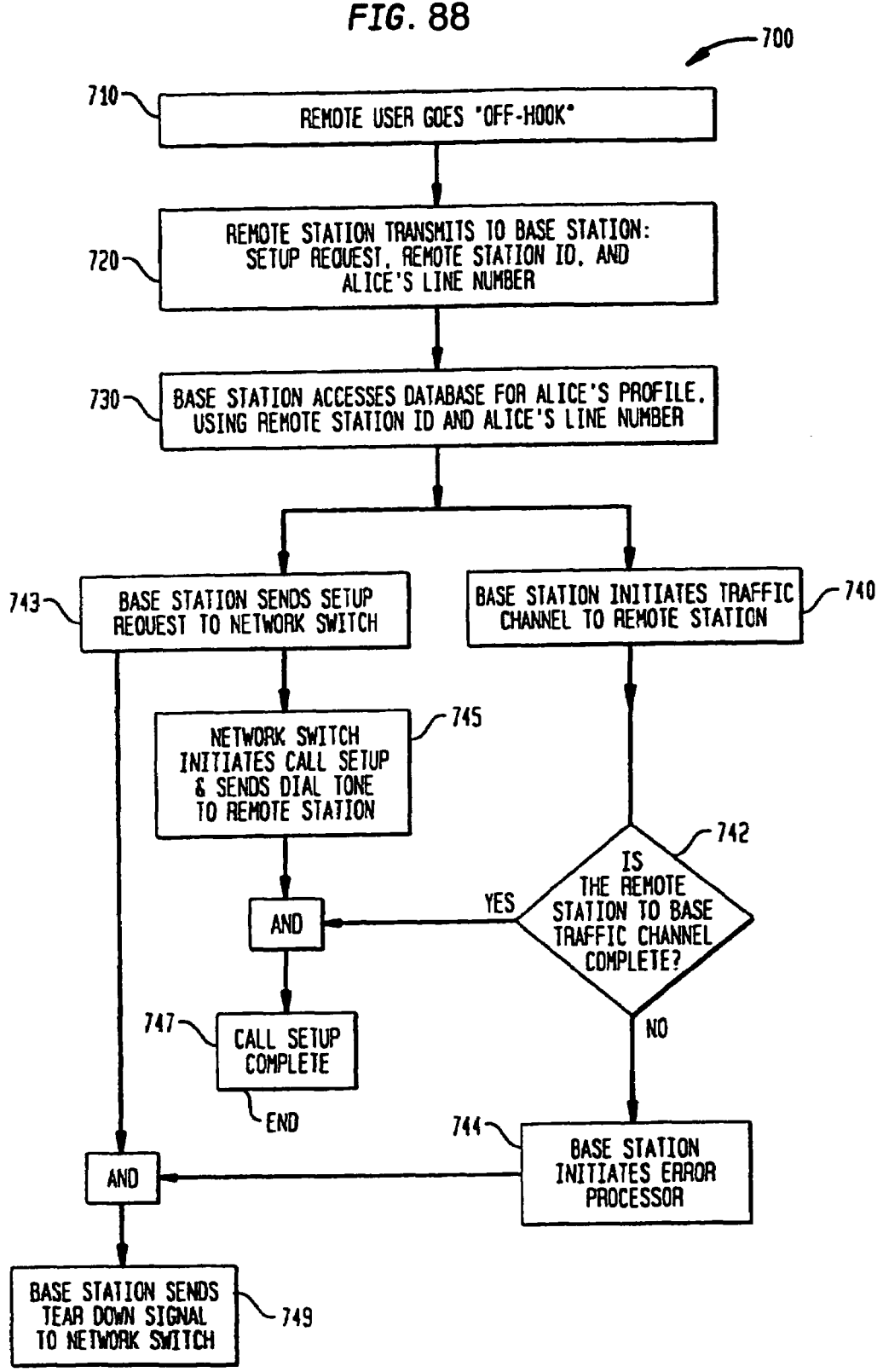
Figure 89:
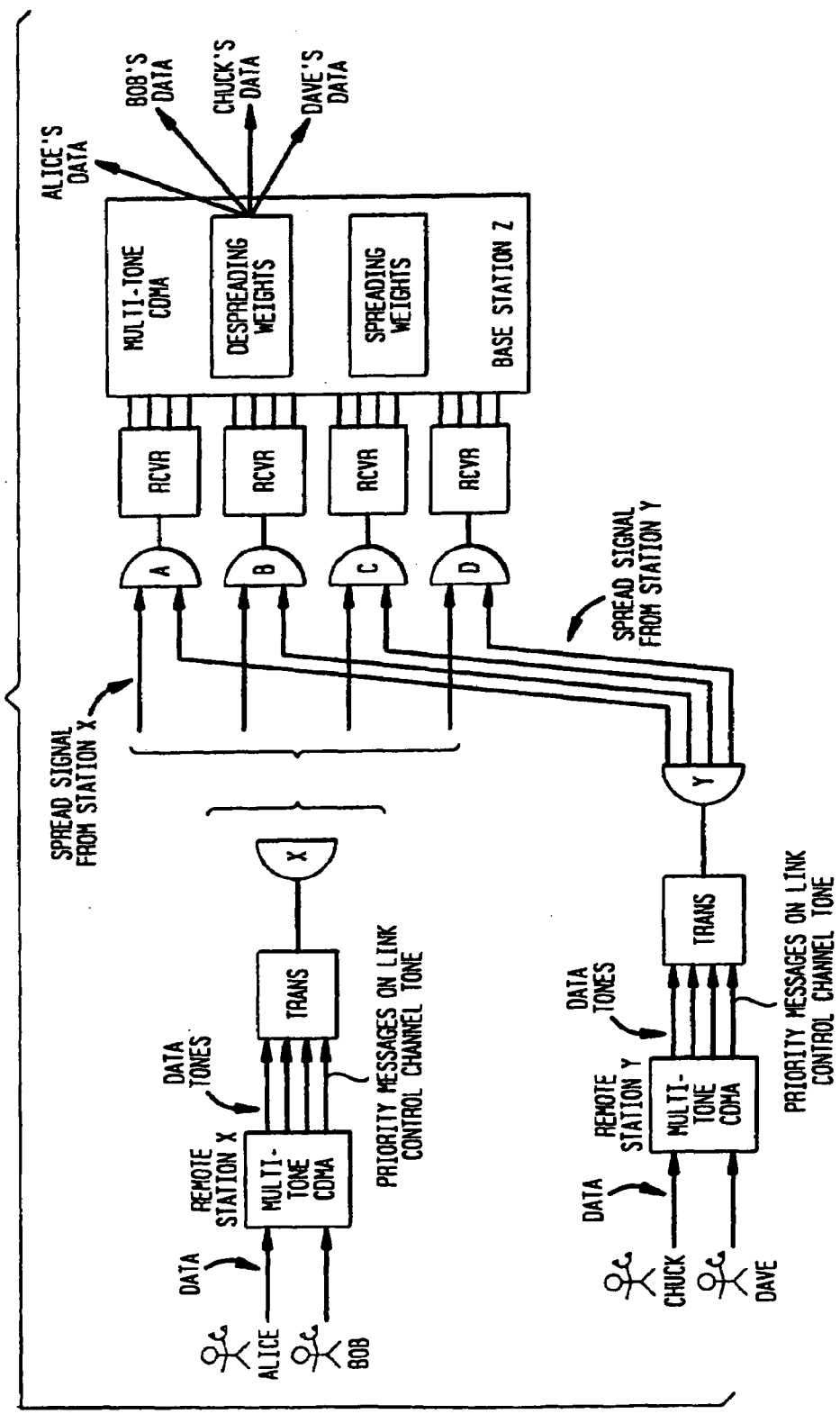
Figure 90:
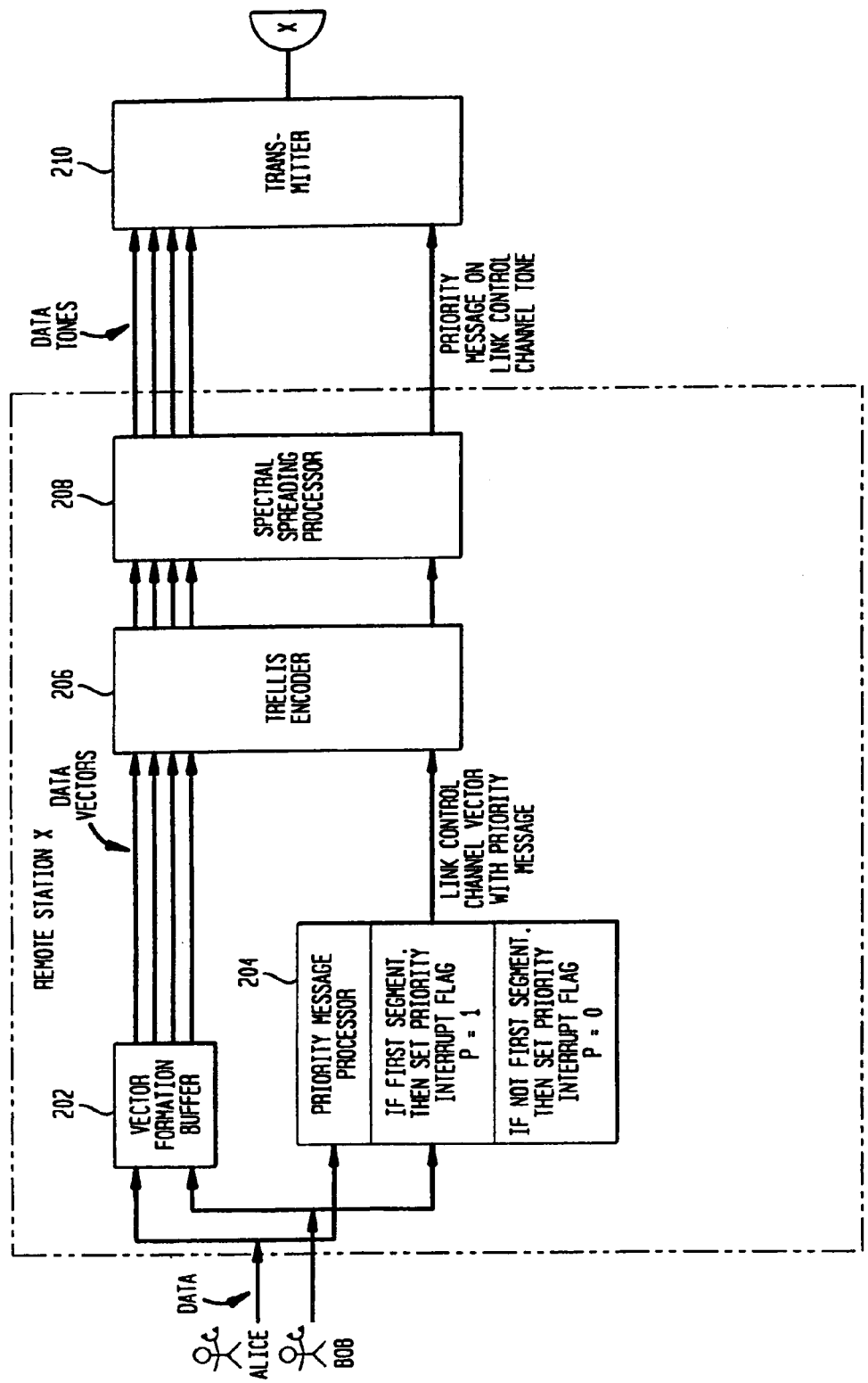
Figure 91:
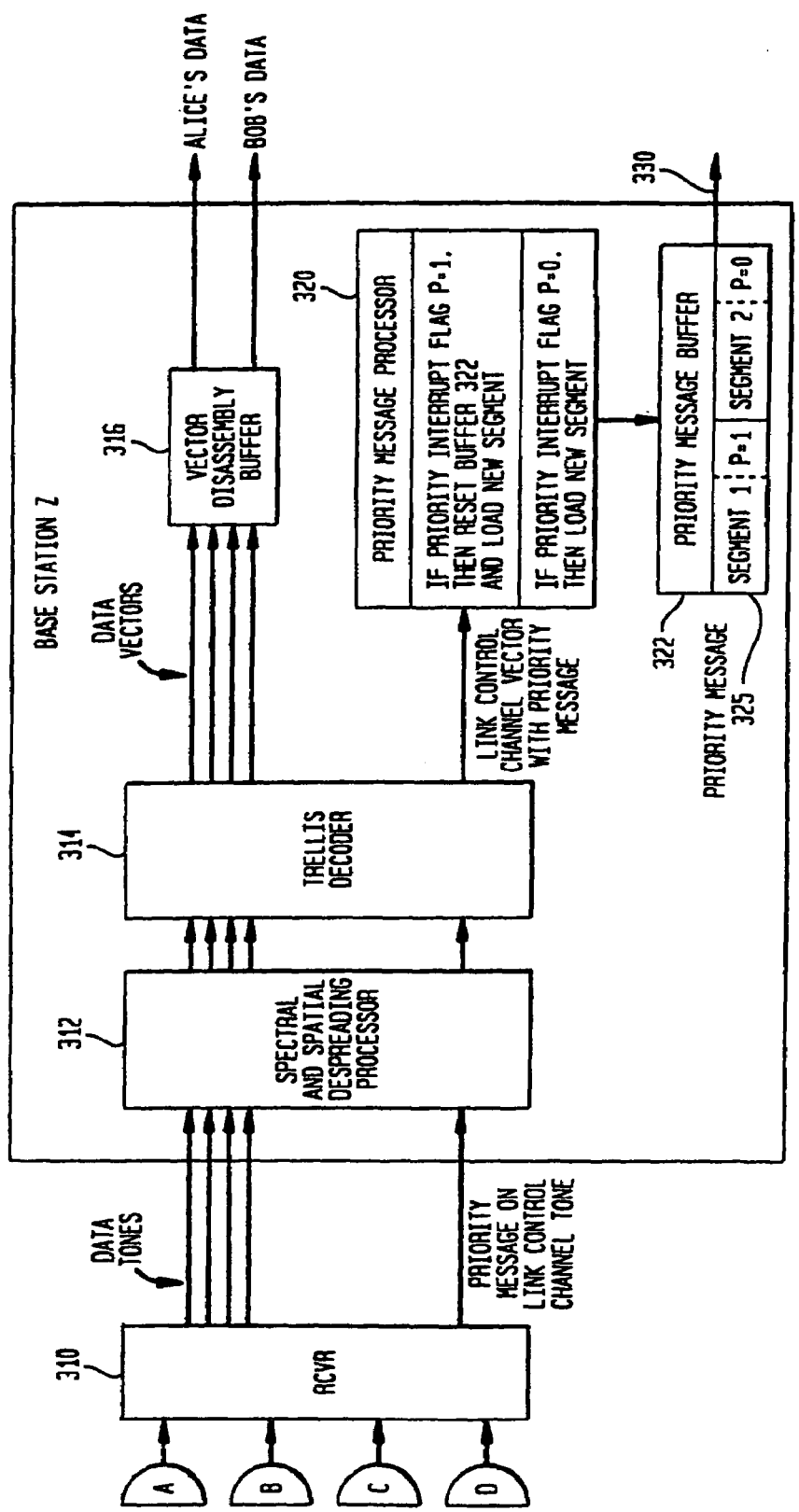
Figure 92:
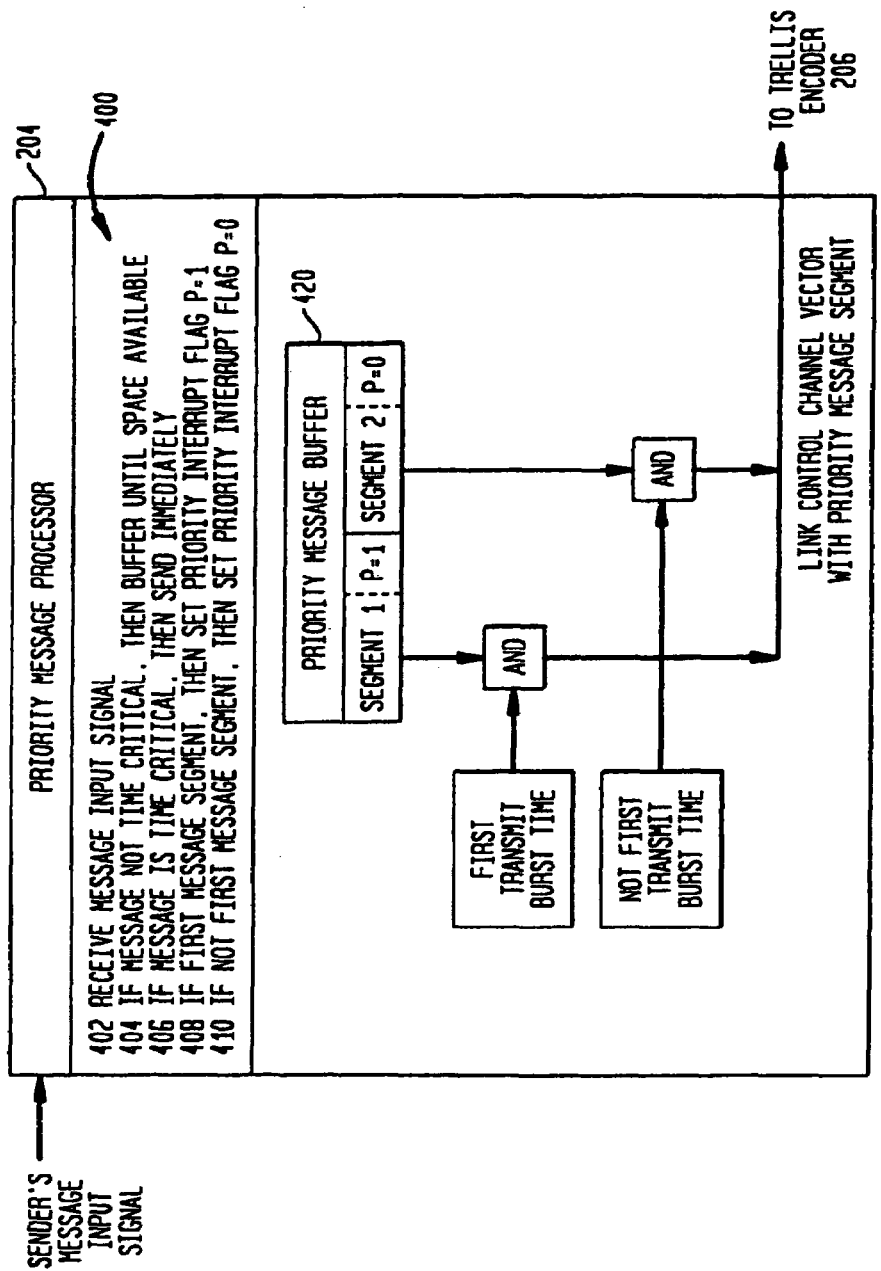
Figure 93:
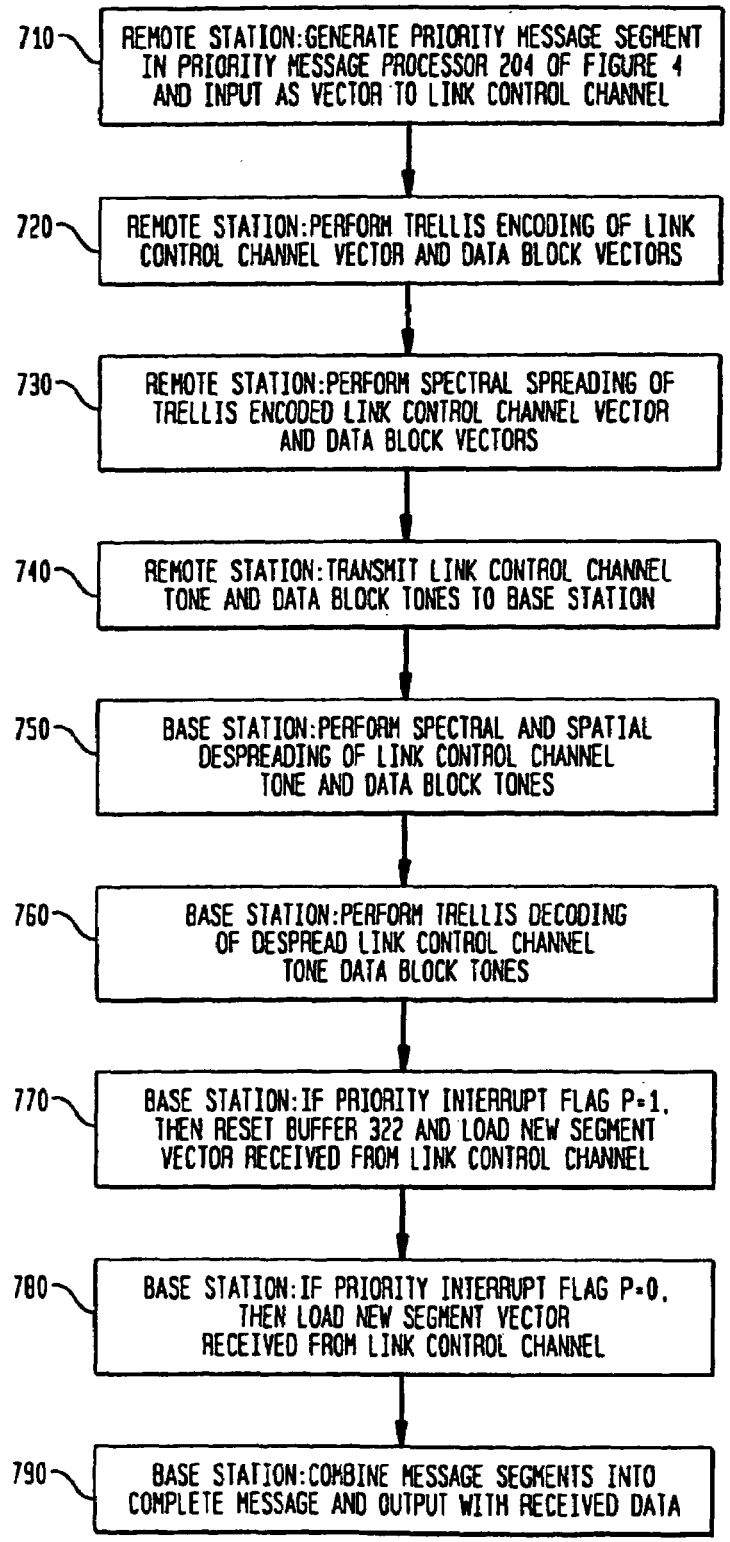
Figure 94:
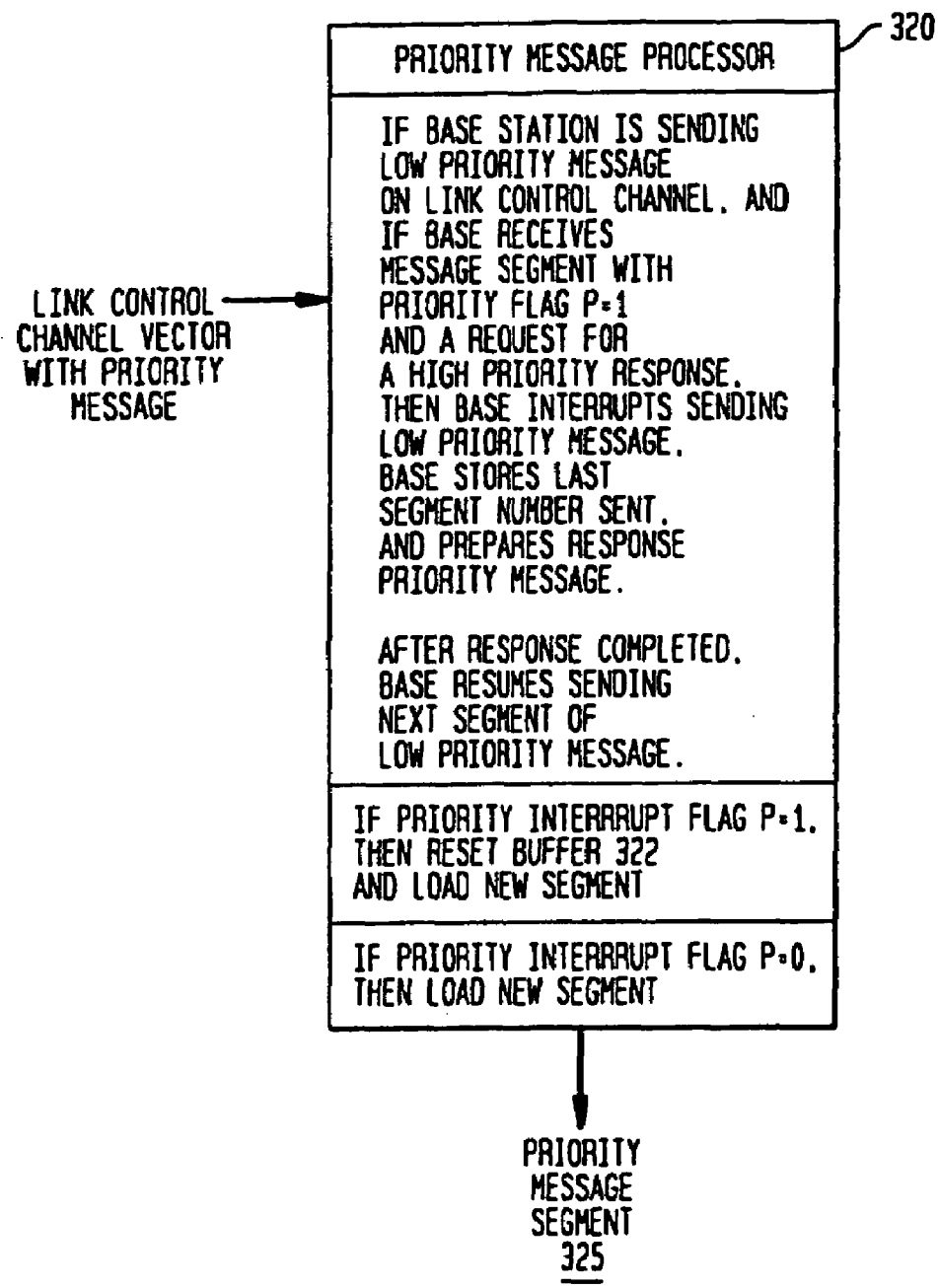
Figure 95:
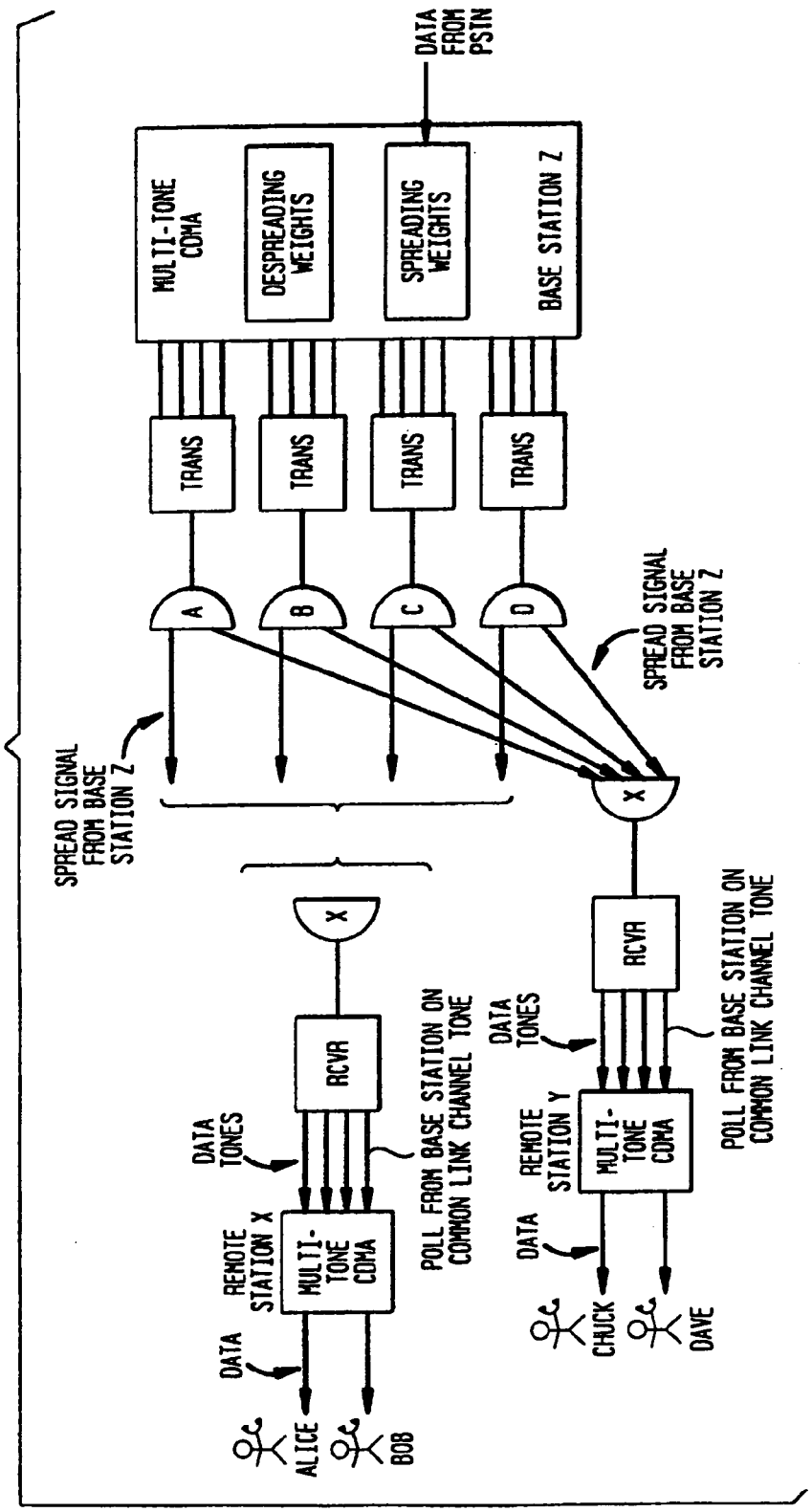
Figure 96:
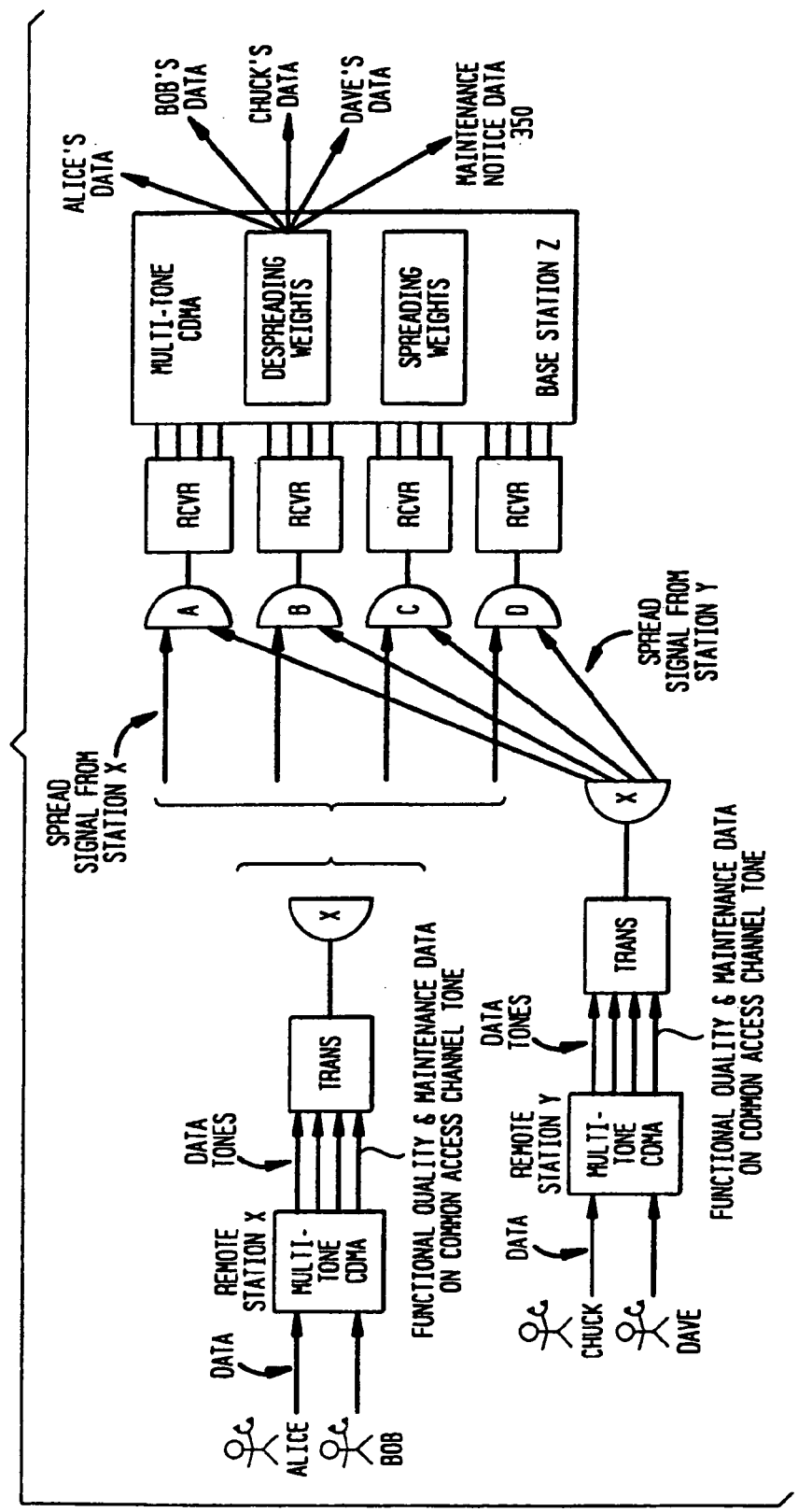
Figure 97:
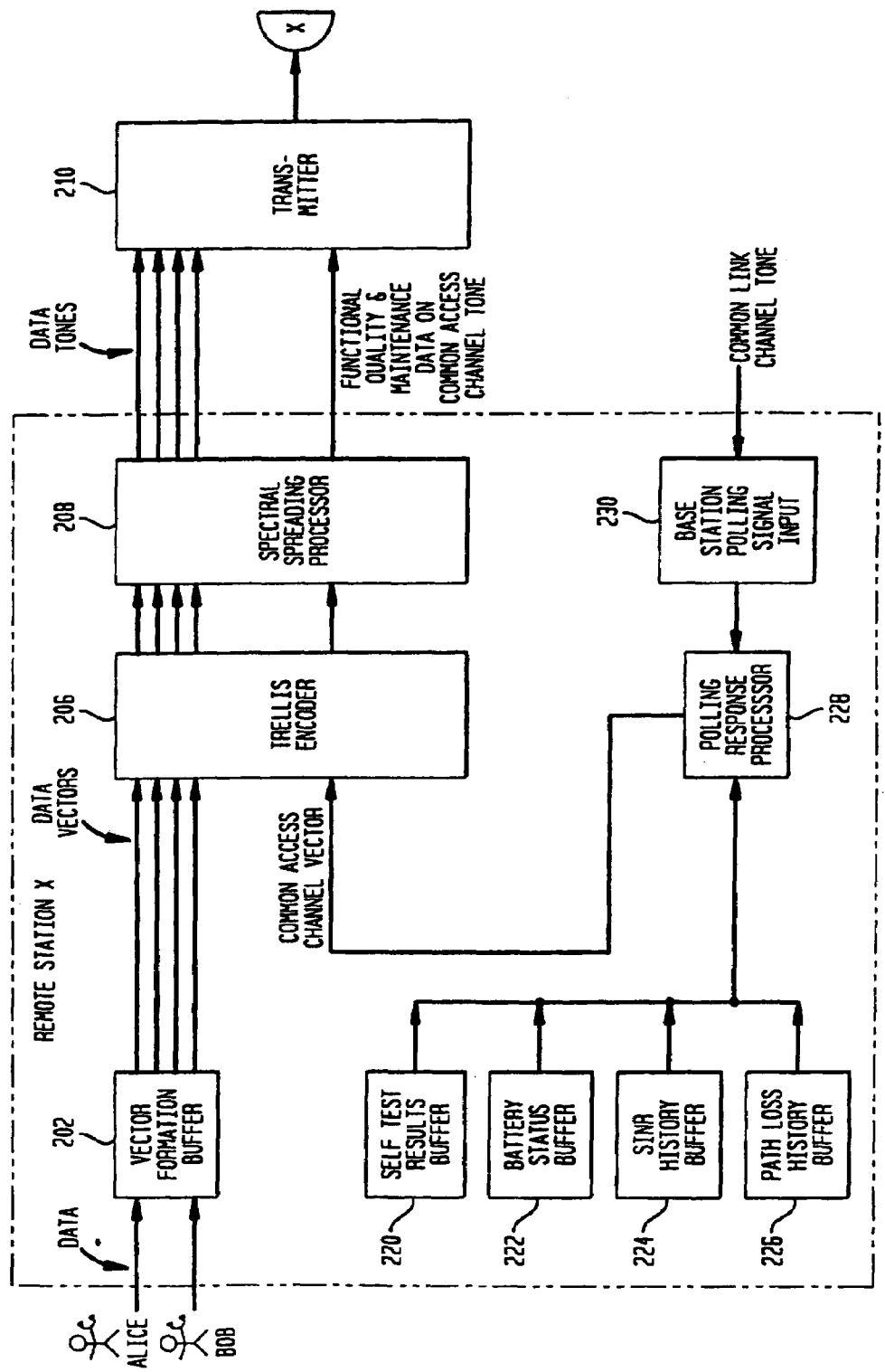
Figure 98:
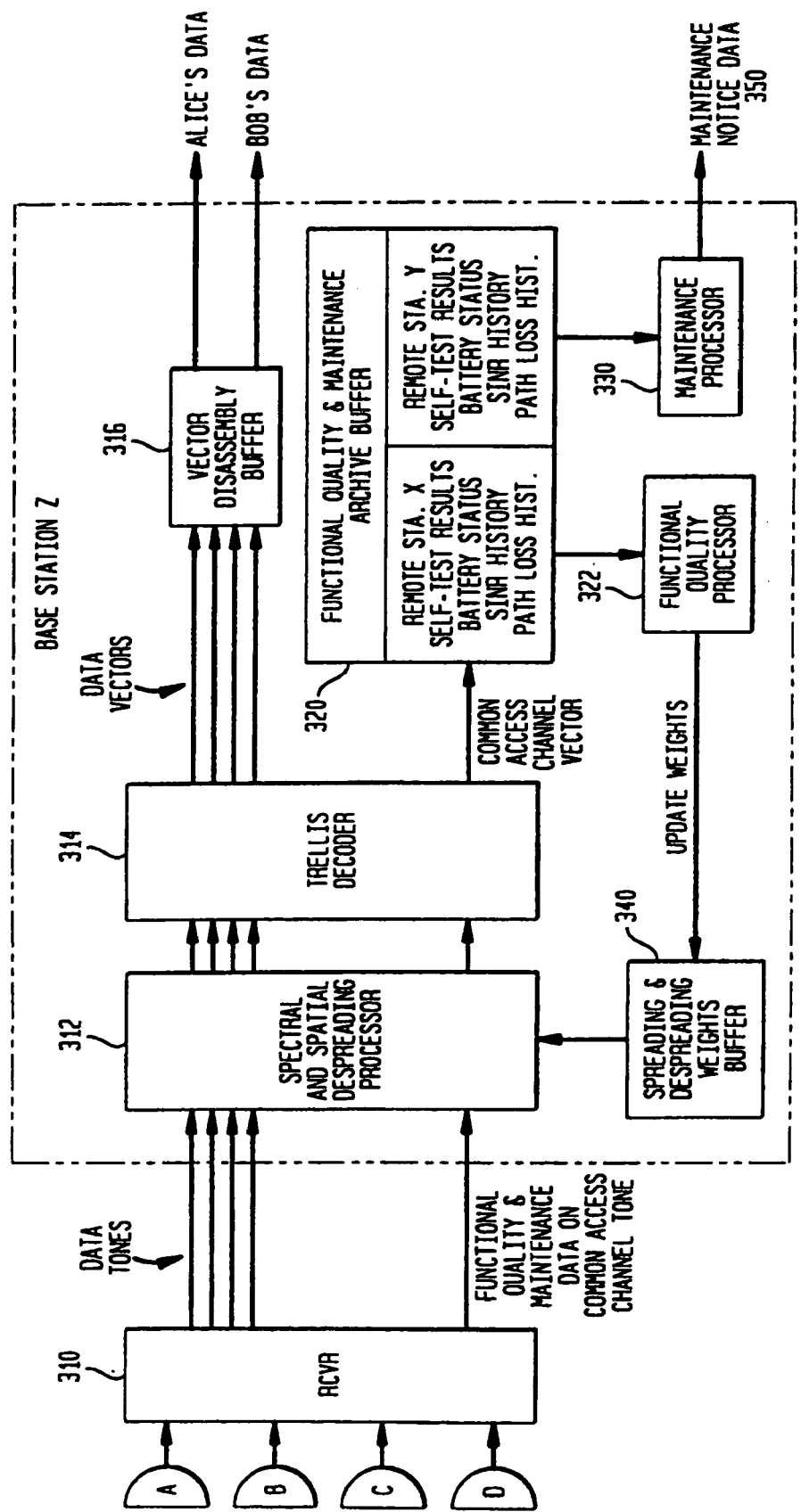
Figure 99:
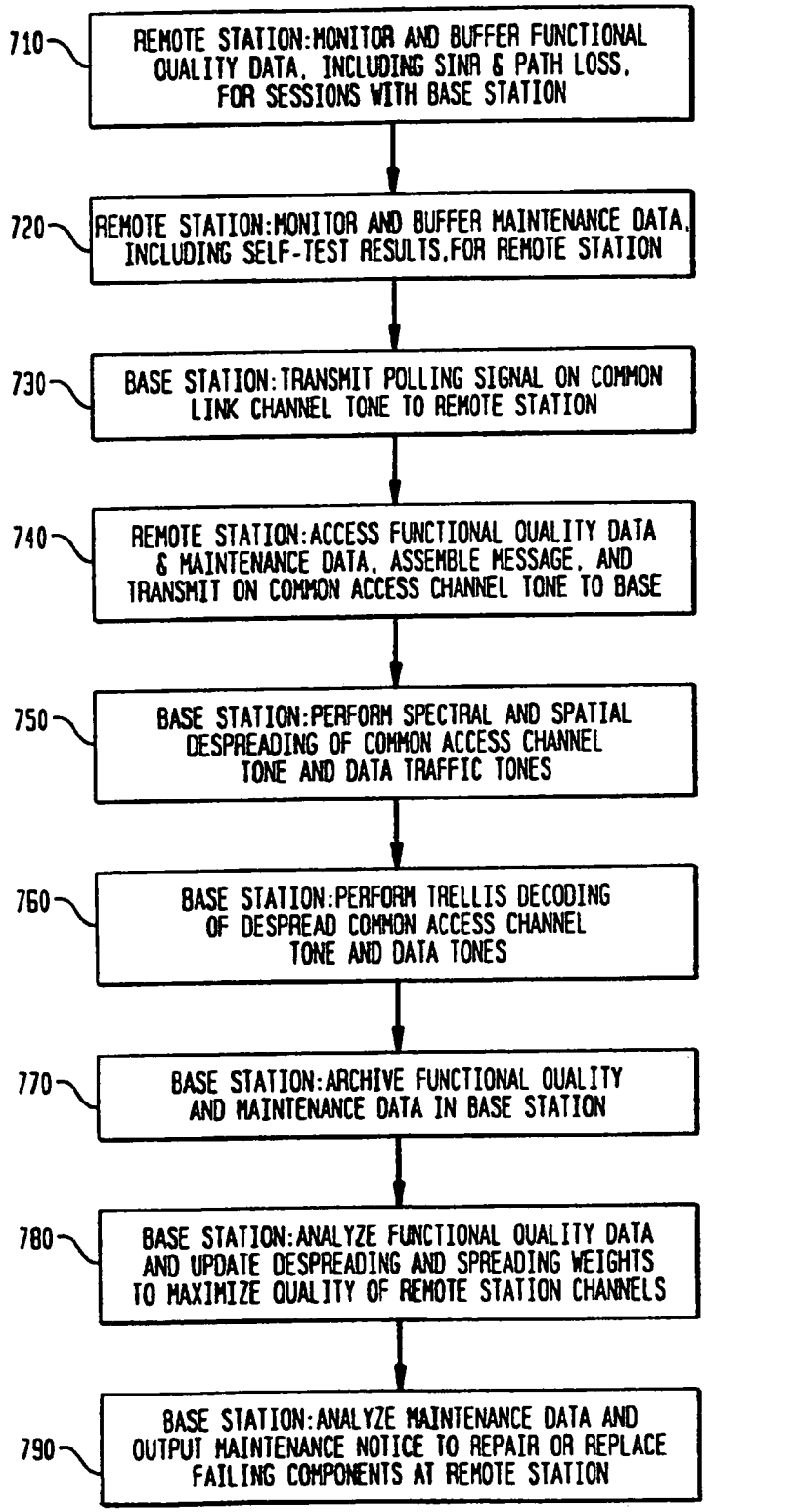
Figure 100:
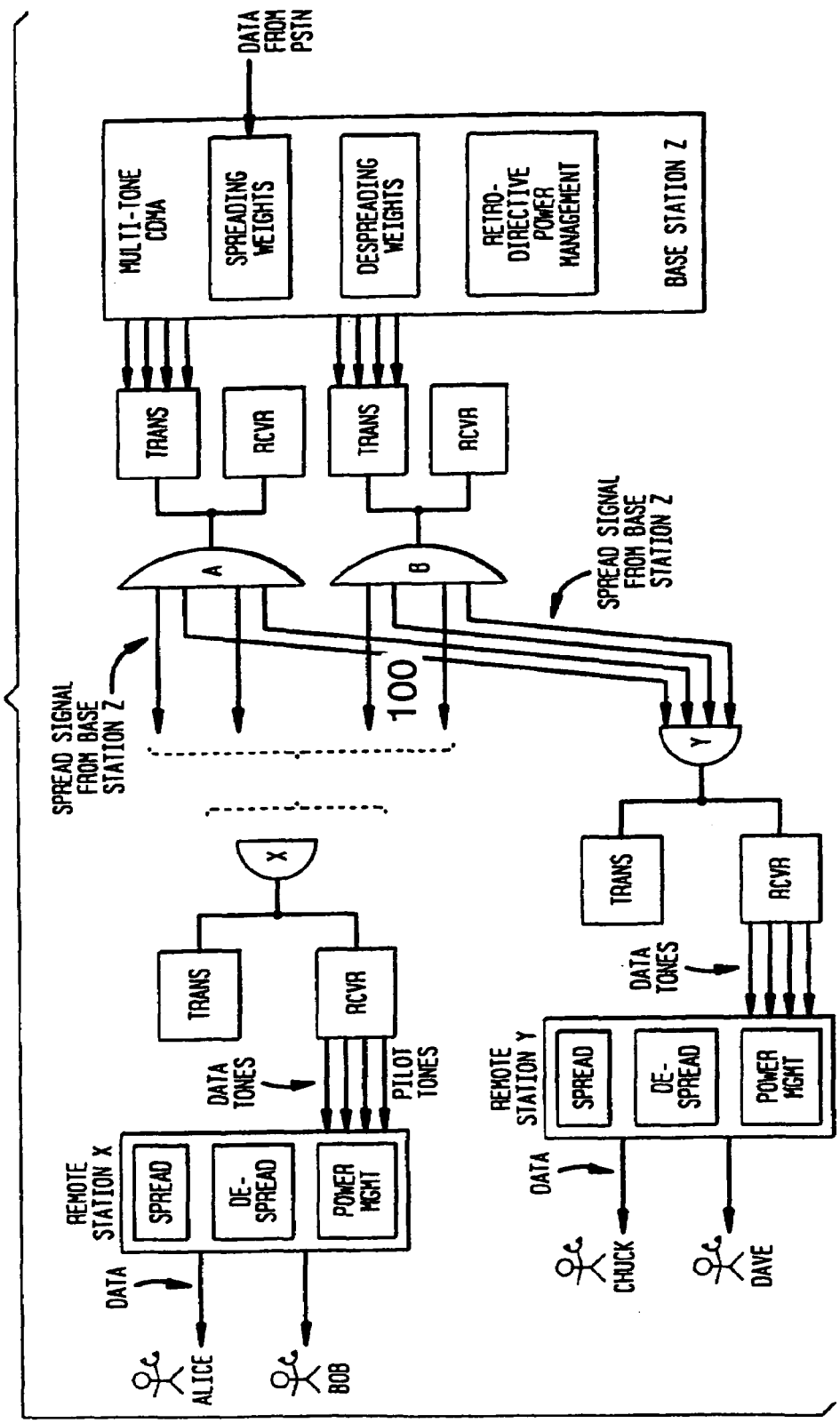
Figure 101:
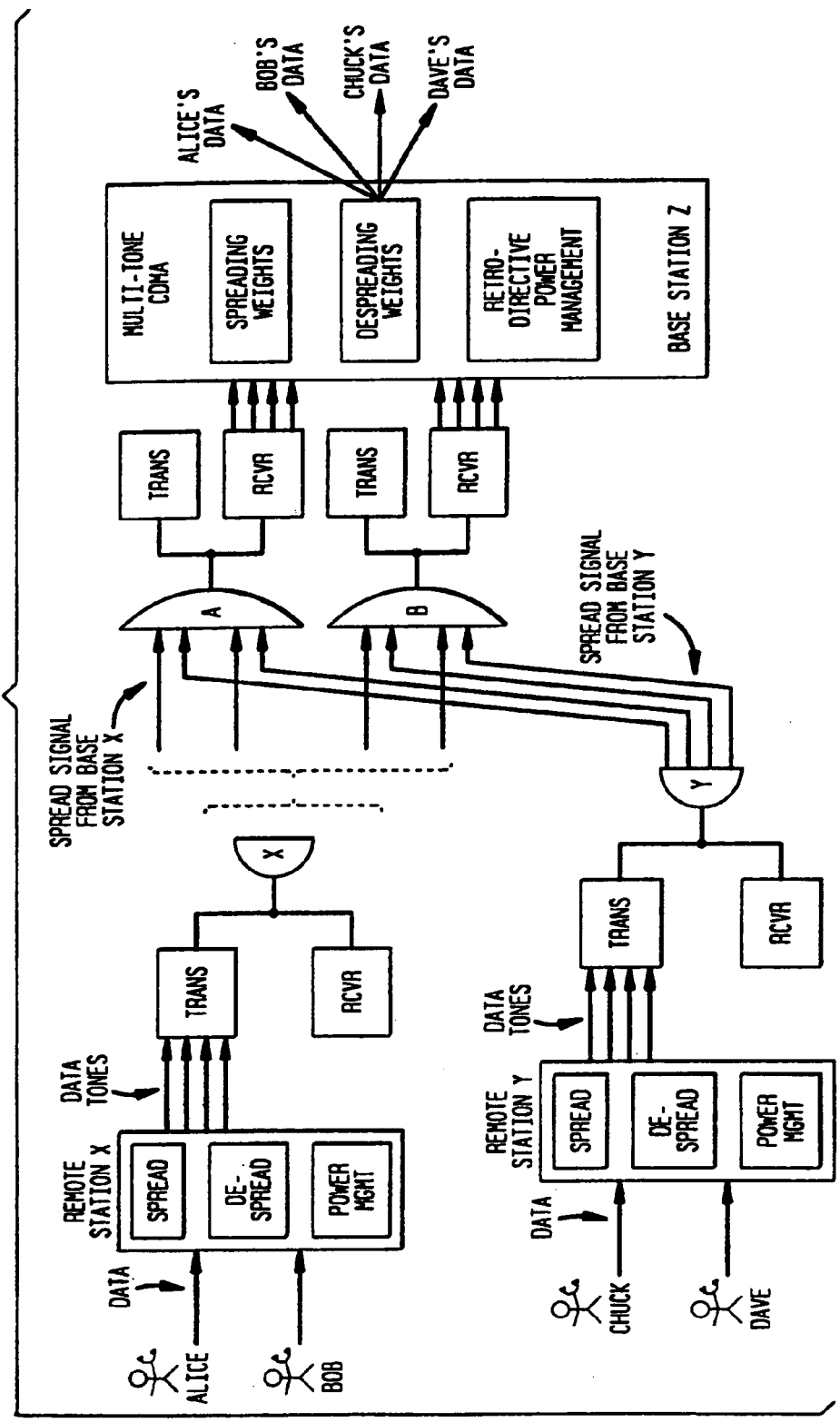
Figure 102:
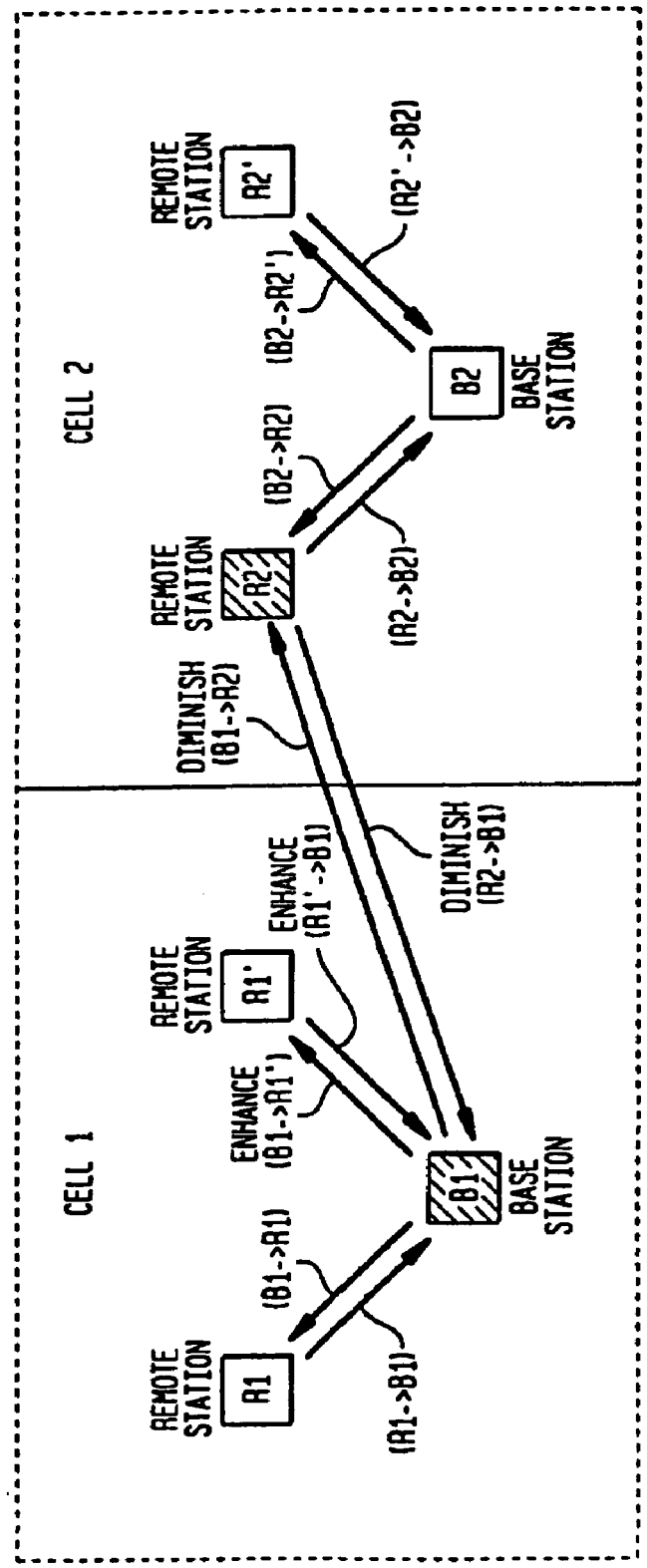
Figure 103:
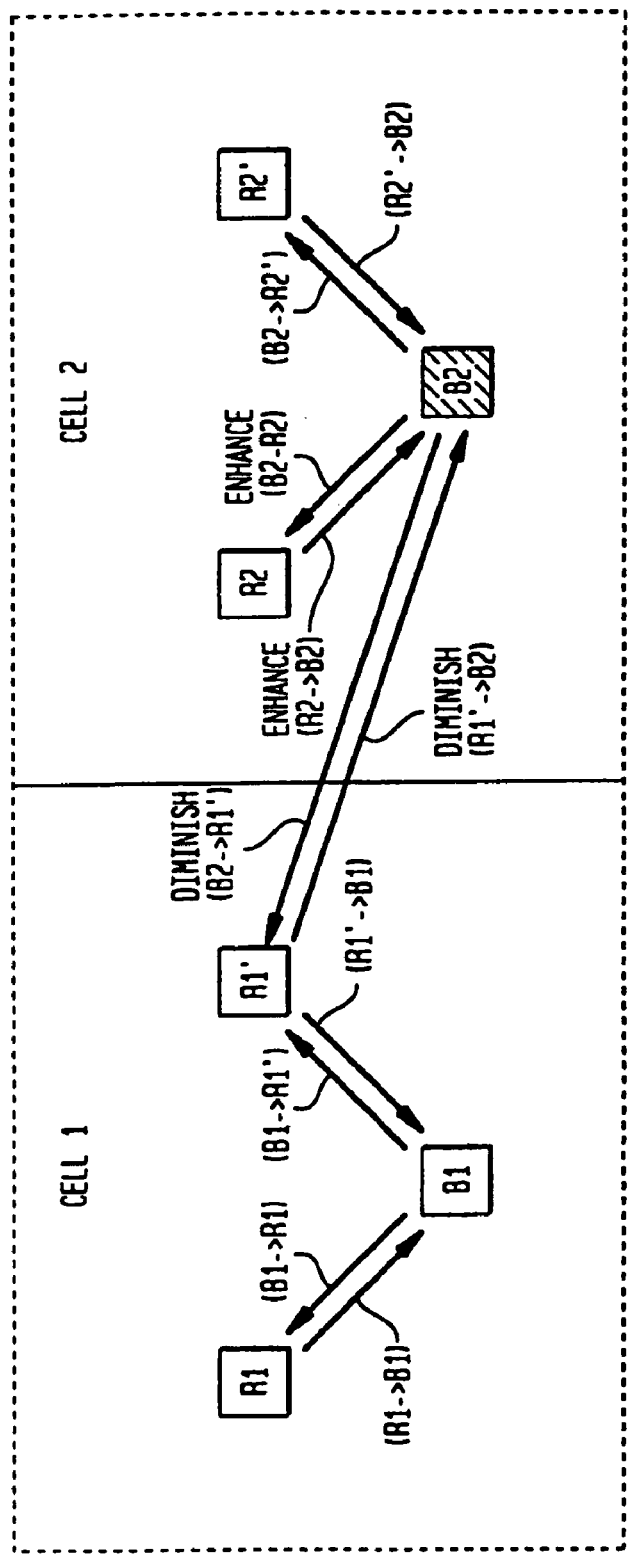
Figure 104:
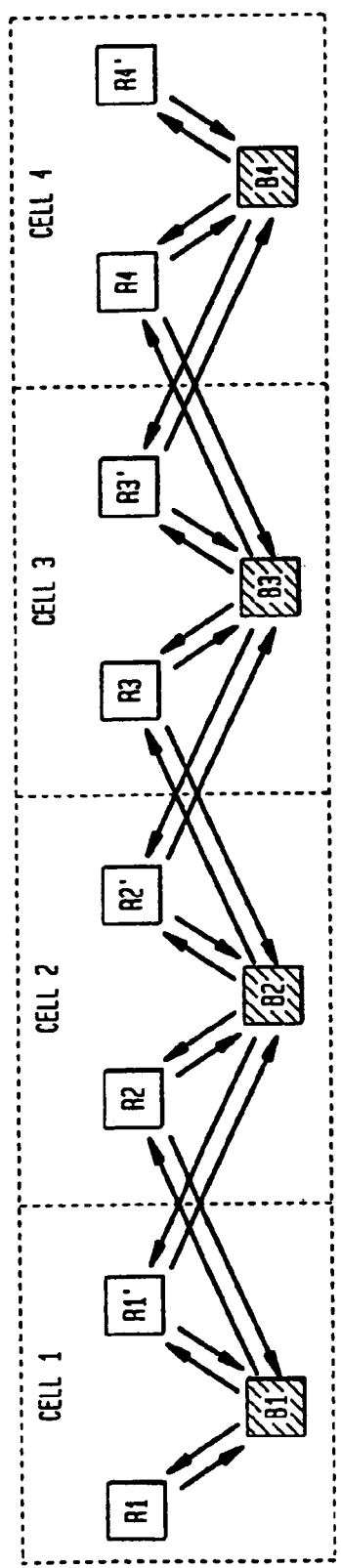
Figure 105:
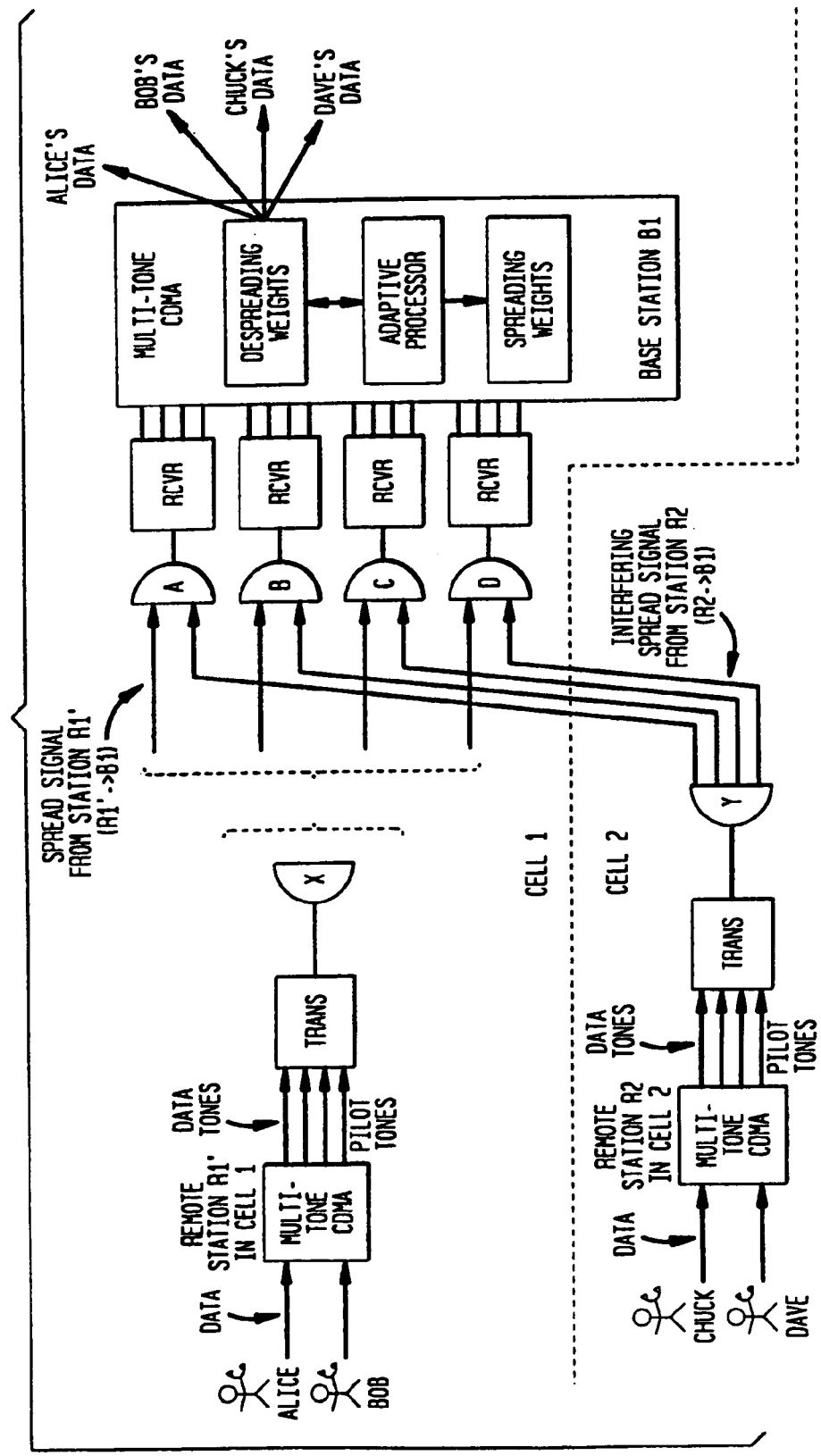
Figure 106:
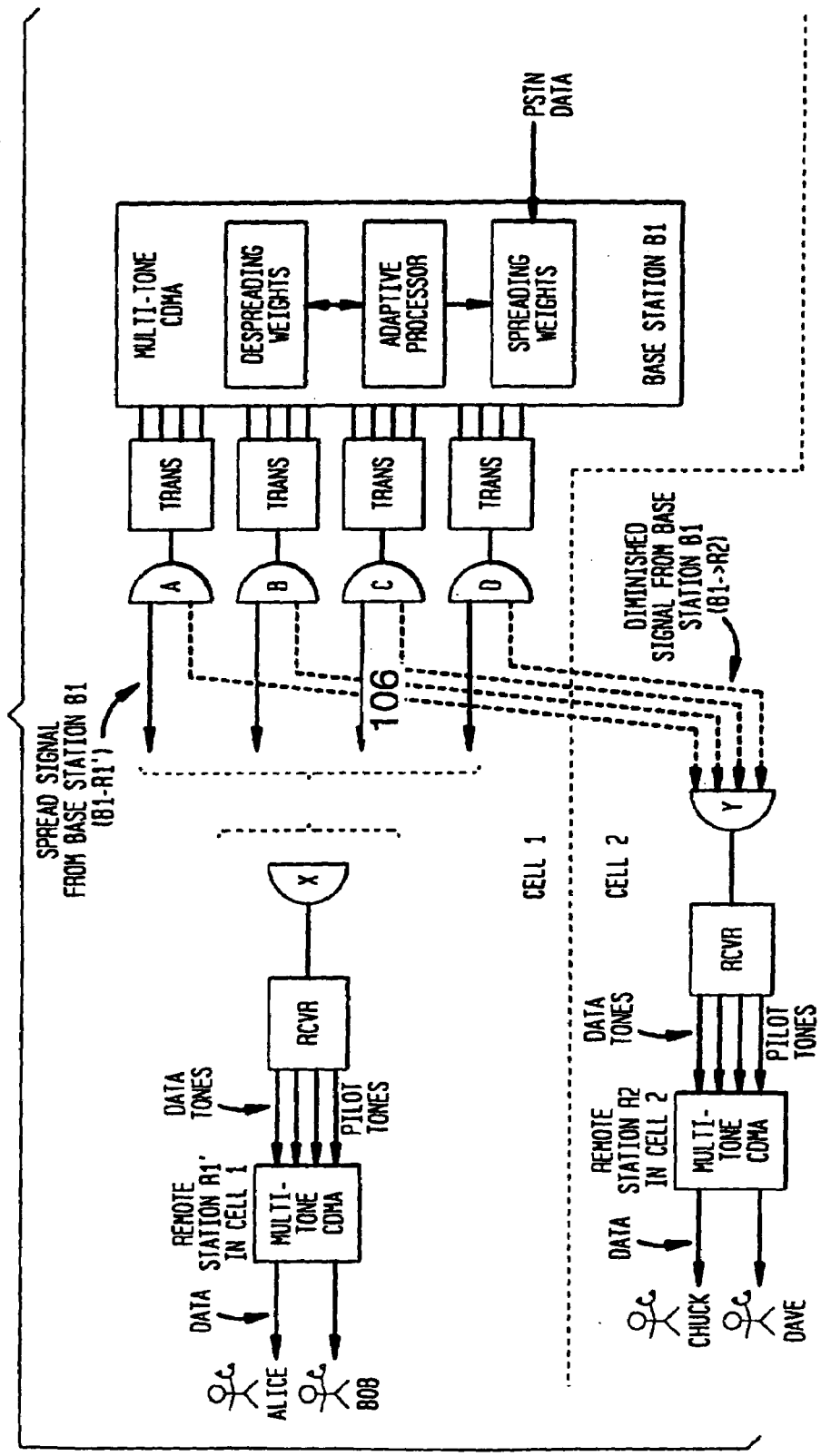

Alternative Embodiment of the Invention: Adaptive Beamforming for Plural Discrete Tones Followed by Combining Resultant Signals FIG. 84A and FIG. 84B show an alternate embodiment of the invention, where the spectral processing and the spatial processing are separated. The spatial weights are computed independently for each carrier frequency. The spatial weights are then multiplied by spectral weights which are again calculated separately to produce a composite weight. In other words, the combined spectral/spatial beamformer is broken into a separate spectral beamformer and a separate spatial beamformer which operate independently. FIG. 84A shows how the received signals on the antennas through M-1 are processed by the spatial beamformer to produce the coefficients A0 through AN-1. FIG. 84A also shows how the received signals on the antennas 0 through M-1 are processed by the spectral beamformer to produce the coefficients B0 through BN-1. FIG. 84B shows how the spatial coefficients A0 are applied to tone frequency 0 and how the result thereof is then independently operated on by the spectral coefficients B0, with the resultant signals then being transmitted on the antennas through M-1.

Similarly, FIG. 84B shows how the spatial coefficients AN-1 are applied to tone frequency n-1 and how the result thereof is then independently operated on by the spectral coefficients BN-1, with the resultant signals then being transmitted on the antennas 0 through M-1. Thus, it is seen how the spatial weights are computed independently for each carrier frequency and then the spatial weights are multiplied by spectral weights which are calculated separately to produce a composite weight.

In one form of this alternate embodiment, the base station and the remote unit can exchange as few as two tones, one in each of the two sub-bands. The separation of 80 MHz between the two sub-bands spreads the tones far enough apart so that noise bursts and interfering signals in one sub-band do not degrade the other in the other sub-band. The two tones can be separately processed by spatial spreading and despreading and thereafter combined to form the resultant signal. This alternate embodiment has the advantage of a simplified computation, while retaining a reasonable immunity to noise and interference.

At the receiving station, each tone received by the multi-element antenna array is spatially despread in a process analogous to receive beamforming. The resultant signals are then combined. A first method of signal-combining is equal gain combining, where the signals are added together. An alternate method of signal combining is maximal ration combining, where the output signal is chosen from the two tones having the better SINR.

At the transmitting station, the alternate embodiment spatially spreads a data signal modulated with the first tone. The spatial spreading uses spatial spreading codes in a process analogous to transmit beamforming. Separately, the alternate embodiment spatially spreads the data signal modulated with the second tone. Then, the two spatially spread signals are combined and transmitted from the multi-element antenna array, forming a transmitted spread signal that is spectrally and spatially spread.

The alternate embodiment of the invention can have the spatial despreading steps adaptively position spatial directions of the receiver sensitivity towards a desired signal source and/or diminish the receiver sensitivity from interfering sources. The alternate embodiment can also have et spreading steps adaptively position transmitted signal energy of the transmitted despread signal towards a source of the received spread signal and/or adaptively diminish the transmitted signal energy towards interferers. The alternate embodiment works well within the TDD protocol.

FIG. 85A, consisting of Figures A1, A2, A3 and A4, is a flow diagram of a preferred embodiment, describing the computational steps performed in the base station. In the transmission portion of the base station, traffic symbols are input on line 5 to the smear matrix step 10. Link maintenance pilot signals are input on line 7 to the digital signal processor (DSP) data processing RAM 12. Stored pilot signals are output from the RAM 12 to the link maintenance pilot (*LMP) register 14 and are then applied as one input to the smear step 10. The smear matrix 16 is also applied to the smear step 10. The output of the smear matrix 16 is also applied to the smear step 10. The output of the smear step 10 is applied to the gain emphasis step 20. The values from the gain RAM 25 are applied to the gain emphasis step 20 to provide output values which are then applied to the beam form spreading step 30. Spreading weights in a spread weight RAM 32 are applied to the beam form spread step. The X vector is output on line 40 from the beam form spread step and is sent to the transmitter for transmission to the remote stations.

On the receive side of the signal processing in the base station, the X vector from the receivers is input on line 50 to the beam form despread step 60. The despreading weight RAM 62 applies the despreading weights to the beam form despread step 60. The signal output from the beam form despread 60 is then applied to the gain emphasis step 70. Values from the gain RAM 25 are applied to the gain emphasis step 70. Values form the gain RAM 25 are applied to the gain emphasis step 70. Values output from the gain emphasis step 70 are applied to the desmear step 80. Values for pilot signals from the gain emphasis step 70 are stored in the LMP register 72 and are applied to the desmear step 80. The desmear matrix is also applied form step 74 to the desmear step 80. Traffic symbols output from the desmear step 80 on line 82 are then available to be utilized and further distributed in the base station. The pilot signals output form the LW* register 72 are stored in the LMP digital signal processing DP RAM 76 and are then output on line 78.

Various values used in the spreading and despreading computations are updated as is shown in FIG. 85A. The X vector input on line 50 is applied to the updated weight step 54. The X vector input online 50 is also applied to the data correction step 93 whose output is applied to the update weight step 54. The updated weight values output from the updated weight step 54 are sent to the valid weights step 56 and are then output to the despread RAM 62. The traffic establishment support 86 provides values to the property map 84 which processes traffic signals from line 82 and applies the output to the smear step 89. Maintenance pilot signals online 81 are applied to the digital signal processing DP RAM 83 whose output is applied to the LMP register 85 whose output is applied to the smear step 89. The smear matrix 87 is also applied to the smear step 89. The output of the smear step 89 is applied to the gain de-emphasis step 91 whose output is applied to the data correlation step 93 whose output is applied to the updated weight step 54 as previously described. In addition, the output from the smear step 89 is applied to the element-wise gain covariance step 64. Another input to the element-wise gain covariance step 64 is applied from the output of the beam form despread step 60. The output of the element-wise gain covariance step 64 is applied to the block normalization of elements step 66 which is in turn applied to the element-wise conjugation step 68 which outputs the values to the gain RAM 25. In this manner, the base station can perform both despreading operations for received signal vectors online 50 and spreading operations to transmit traffic symbols input on line 5, in accordance with the invention.

FIG. 85B, consisting of Figures B1 and B2, shows the processing of the common access channel signals. Two common access channels (CAC) signals from the transmitter are processed. A first signal is processed being received on the input line 102 and is applied to the RMGS autocorrelation step 104, whose output goes to the digital signal matrix step 106 whose output goes to the digital signal processor. The common access channel signal online 102 is also applied to the select ungated packets step 108 and to the select gated packets step 110. The output of the select ungated packets 108 is applied to the subtract even/odd packets step 112. The output of the selected gate packets 110 is applied to the apply code key step 114. The CAC code key step 116 applies it's value to the apply code key step 114. The output of the apply code key step 114 is also applied to the subtract [even/odd packets step 112. The output of the subtract even/odd packets step 112 ids applied to the RMGS autocorrelation step 118, whose output is also applied to the compute T matrix step 106. The output of the compute T matrix step 106 is then applied to the digital signal processor.

A second one of the two CAC signals input from the receiver on line 120 is applied to the select ungated packets step 122 and the select gated packets step 124. The output of the select ungated packets step 122 is applied as one input to the combined gated/ungated packets step 126. The output of the selected gated packet steep 124 is applied to the apply code key step 128 which also receives a signal from the CAC code key step 130. The output of the applied code key step 128 is the second input to the combined gated/ungated packets step 126. The output of the combined gated/ungated packets step 126 is applied to the apply despread weight step 132. A signal from the digital signal processor is applied to the rotated weight RAM 134 whose output is applied to the compute despread weight step 136. The output of the compute despread weight step 136 is applied to the apply despread weight 132, whose output is sent to the digital signal processor. In this manner, the steps shown in FIG. 85B carry out processing of the common access channel signals.

Although the preferred embodiments of the invention have been described in detail above, it will be apparent to those of ordinary skill in the art that obvious modifications may be made to the invention without departing from its spirit or essence. For example, signal constellation formats other than PSK, BPSK and QAM could be used in accordance with the system of the present invention. Furthermore, the system could optimize for bit error rate (BER) rather than SINR. Also, the number of tones in a tone set, and the number of tone sets and cluster sets in a band could be selected based upon the specific application. The selected frequency bands could also be varied as called for by specific conditions. The TDD format could be altered based upon the multipath environment to insure that an effectively static channel is observed in successive TDD frames. The maximization of the SINR could be performed based upon some signal property other than constant modulus, etc. Consequently, the preceding description should be taken as illustrative and not restrictive, and the scope of the invention should be determined in view of the following claims.

We claim:

1. A highly bandwidth-efficient communications method to optimize a multiple cell network for inter-cell interference, comprising:

receiving at a first base station located in a first cell, a first spread signal comprising a first data signal spread over a plurality of discrete tones received over a first path from a first remote station located in said first cell, said first signal further comprising an interfering signal spread over said plurality of discrete tones received over an interference path from a second remote station located in a second cell;

adaptively despreading the signal received at the first base station by using first despreading codes that are based on the characteristics of the received spread signal over said first path and over said interference path;

spreading a second data signal at the first base station with first spreading codes derived from said despreading codes based on a retrodirectivity of said first path and of said interference path, the first spreading codes distributing the second data signal over a plurality of discrete tones, forming a second spread signal that is selectively diminished in said interfering path to said second remote station;

transmitting said second spread signal from the first base station over said first path to said first remote station and transmitting the second signal selectively diminished over said interference path to said second remote station;

receiving at said second remote station said selectively diminished second spread signal;

adaptively despreading the selectively diminished second signal received at the second remote station by using second despreading codes that are based on the characteristics of the received second signal over said interference path;

spreading a third data signal at the second remote station with second spreading codes derived from said second despreading codes based on a retrodirectivity of said interference path, the second spreading codes distributing the third data signal over a plurality of discrete tones, forming a third spread signal that is selectively diminished in said interfering path to said first base station; and transmitting said selectively diminished third spread signal from the second remote station over said interference path to said first base station.

2. The highly bandwidth-efficient communications method to optimize a multiple cell network for inter-cell interference of claim 1, wherein both the first and the second spread signals have a spectral form of a discrete multitone signal.

3. The highly bandwidth-efficient communications method to optimize a multiple cell network for inter-cell interference of claim 1, wherein said first said despreading step is a multiplication of a complex number representation of the despreading codes times a complex number representation of the first spread signal.

4. The highly bandwidth-efficient communications method to optimize a multiple cell network for inter-cell interference of claim 1, wherein said first said spreading step is a multiplication of a complex number representation of the second spreading codes times a complex number representation of the second data signal.

5. The highly bandwidth-efficient communications method to optimize a multiple cell network for inter-cell interference of claim 1, wherein said first said despreading step determines values of complex despreading codes which are then multiplied with a complex number representation of the received signals, resulting in an estimate of the first data signal.

6. The highly bandwidth-efficient communications method to optimize a multiple cell network for inter-cell interference of claim 1, wherein the first base station has a multi-element antenna array receiving the first spread signal, the despreading step further comprising:

despreading the first spread signal with a unitary, adaptive despreading code that is based on the characteristics of the received spread signal, where a given element of the spreading code corresponds to a given one of said multi-element antennas and a given one of said discrete tones;

whereby said despreading step treats spatial and spectral samples of the first spread signal simultaneously.

7. The highly bandwidth-efficient communications method to optimize a multiple cell network for inter-cell interference of claim 1, wherein said first said despreading step adaptively positions the spatial direction of receive sensitivity towards a desired signal source and diminishes receive sensitivity from interfering sources.

8. The highly bandwidth-efficient communications method to optimize a multiple cell network for inter-cell interference of claim 1, wherein the first base station has a multi-element antenna array transmitting the second spread signal, and wherein said first said spreading step adaptively positions transmitted signal energy of said second spread signal towards a source of said first spread signal and adaptively diminishes transmitted signal energy towards interferers.

9. The highly bandwidth-efficient communications method to optimize a multiple cell network for inter-cell interference of claim 1, wherein said first and second signals are transmitted during consecutive parts of a time division duplex period.

10. The highly bandwidth-efficient communications method to optimize a multiple cell network for inter-cell interference of claim 1, wherein said first base station receives interference signals from interfering signal sources along with said first spread signal, said first said despreading step further comprising:

adaptively reducing the interference signals by adaptively adjusting said first despreading codes to maximize the signal quality of the received signal.

11. A highly bandwidth-efficient communications system to optimize a multiple cell network for inter-cell interference, comprising:

means for receiving at a first base station located in a first cell, a first spread signal comprising a first data signal spread over a plurality of discrete tones received over a first path from a first remote station located in said first cell, said first signal further comprising an interfering signal spread over said plurality of discrete tones received over an interference path from a second remote station located in a second cell;

means for adaptively despreading the signal received at the first base station by using first despreading codes that are based on the characteristics of the received spread signal over said first path and over said interference path;

means for spreading a second data signal at the first base station with first spreading codes derived from said despreading codes based on a retrodirectivity of said first path and of said interference path, the first spreading codes distributing the second data signal over a plurality of discrete tones, forming a second spread signal that is selectively diminished in said interfering path to said second remote station;

means for transmitting said second spread signal from the first base station over said first path to said first remote station and transmitting the second signal selectively diminished over said interference path to said second remote station;

means for receiving at said second remote station said selectively diminished second spread signal;

means for adaptively despreading the selectively diminished second signal received at the second remote station by using second despreading codes that are based on the characteristics of the received second signal over said interference path;

means for spreading a third data signal at the second remote station with second spreading codes derived from said second despreading codes based on a retrodirectivity of said interference path, the second spreading codes distributing the third data signal over a plurality of discrete tones, forming a third spread signal that is selectively diminished in said interfering path to said first base station; and means for transmitting said selectively diminished third spread signal from the second remote station over said interference path to said first base station.

12. The highly bandwidth-efficient communications system to optimize a multiple cell network for inter-cell interference of claim 11, wherein both the first and the second spread signals have a spectral form of a discrete multitone signal.

13. The highly bandwidth-efficient communications system to optimize a multiple cell network for inter-cell interference of claim 11, wherein said first said despreading is a multiplication of a complex number representation of the despreading codes times a complex number representation of the first spread signal.

14. The highly bandwidth-efficient communications system to optimize a multiple cell network for inter-cell interference of claim 11, wherein said first said spreading is a multiplication of a complex number representation of the second spreading codes times a complex number representation of the second data signal.

15. The highly bandwidth-efficient communications system to optimize a multiple cell network for inter-cell interference of claim 11, wherein said first said despreading determines values of complex despreading codes which are then multiplied with a complex number representation of the received signals, resulting in an estimate of the first data signal.

16. The highly bandwidth-efficient communications system to optimize a multiple cell network for inter-cell interference of claim 11, wherein the first base station has a multi-element antenna array receiving the first spread signal, further comprising:

means for despreading the first spread signal with a unitary, adaptive despreading code that is based on the characteristics of the received spread signal, where a given element of the spreading code corresponds to a given one of said multi-element antennas and a given one of said discrete tones;

whereby said despreading treats spatial and spectral samples of the first spread signal simultaneously.

17. The highly bandwidth-efficient communications system to optimize a multiple cell network for inter-cell interference of claim 11, wherein said first said despreading adaptively positions the spatial direction of receive sensitivity towards a desired signal source and diminishes receive sensitivity from interfering sources.

18. The highly bandwidth-efficient communications system to optimize a multiple cell network for inter-cell interference of claim 11, wherein the first base station has a multi-element antenna array transmitting the second spread signal, and wherein said first said spreading adaptively positions transmitted signal energy of said second spread signal towards a source of said first spread signal and adaptively diminishes transmitted signal energy towards interferers.

19. The highly bandwidth-efficient communications system to optimize a multiple cell network for inter-cell interference of claim 11, wherein said first and second signals are transmitted during consecutive parts of a time division duplex period.

20. The highly bandwidth-efficient communications system to optimize a multiple cell network for inter-cell interference of claim 11, wherein said first base station receives interference signals from interfering signal sources along with said first spread signal, further comprising:

means for adaptively reducing the interference signals by adaptively adjusting said first despreading codes to maximize the signal quality of the received signal.

* * * * *